(12) United States Patent
Boccon-Gibod et al.

(10) Patent No.: US 8,776,216 B2
(45) Date of Patent: *Jul. 8, 2014

(54) DIGITAL RIGHTS MANAGEMENT ENGINE SYSTEMS AND METHODS

(75) Inventors: Gilles Boccon-Gibod, Los Altos, CA (US); Julien G. Boeuf, Paris (FR)

(73) Assignee: Intertrust Technologies Corporation, Sunnyvale, CA (US)

( * ) Notice: Subject to any disclaimer, the term of this patent is extended or adjusted under 35 U.S.C. 154(b) by 2200 days.

This patent is subject to a terminal disclaimer.

(21) Appl. No.: 11/583,693

(22) Filed: Oct. 18, 2006

(65) Prior Publication Data

US 2007/0180519 A1 Aug. 2, 2007

Related U.S. Application Data

(60) Provisional application No. 60/728,089, filed on Oct. 18, 2005, provisional application No. 60/772,024, filed on Feb. 9, 2006, provisional application No. 60/744,574, filed on Apr. 10, 2006, provisional application No. 60/791,179, filed on Apr. 10, 2006, provisional application No. 60/746,712, filed on May 8, 2006, provisional application No. 60/798,925, filed on May 8, 2006, provisional application No. 60/835,061, filed on Aug. 1, 2006.

(51) Int. Cl.
*G06F 12/00* (2006.01)

(52) U.S. Cl.
USPC .................................. 726/21; 726/26; 726/27

(58) Field of Classification Search
USPC ............................................... 726/21, 26–27
See application file for complete search history.

(56) References Cited

U.S. PATENT DOCUMENTS

| | | |
|---|---|---|
| 4,827,508 A | 5/1989 | Shear |
| 4,977,594 A | 12/1990 | Shear |
| 5,050,213 A | 9/1991 | Shear |
| 5,410,598 A | 4/1995 | Shear |
| 5,414,845 A | 5/1995 | Behm et al. |
| 5,530,235 A | 6/1996 | Stefik et al. |
| 5,534,975 A | 7/1996 | Stefik et al. |
| 5,629,980 A | 5/1997 | Stefik et al. |
| 5,634,012 A | 5/1997 | Stefik et al. |

(Continued)

FOREIGN PATENT DOCUMENTS

| | | |
|---|---|---|
| EP | 0 715 247 A1 | 6/1996 |
| EP | 0840194 A2 | 6/1998 |

(Continued)

OTHER PUBLICATIONS

Tari et al., "Controlling Aggregation in Distributed Object Systems: A Graph-Based Approach," Dec. 2001, IEEE, pp. 1236-1256.*

(Continued)

*Primary Examiner* — Bradley Holder
(74) *Attorney, Agent, or Firm* — Finnegan, Henderson, Farabow, Garrett & Dunner, LLP

(57) ABSTRACT

Systems and methods are described for performing digital rights management. In one embodiment, a digital rights management engine is provided that evaluates license associated with protected content to determine if a requested access or other use of the content is authorized. In some embodiments, the licenses contain control programs that are executable by the digital rights management engine.

11 Claims, 44 Drawing Sheets

(56) References Cited

U.S. PATENT DOCUMENTS

| | | | |
|---|---|---|---|
| 5,638,443 A | 6/1997 | Stefik et al. | |
| 5,673,315 A | 9/1997 | Wolf | |
| 5,715,403 A | 2/1998 | Stefik | |
| 5,765,152 A | 6/1998 | Erickson | |
| 5,774,652 A | 6/1998 | Smith | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,937,041 A | 8/1999 | Cardillo et al. | |
| 5,940,504 A | 8/1999 | Griswold | |
| 5,943,422 A | 8/1999 | Van Wie et al. | |
| 5,949,876 A | 9/1999 | Ginter et al. | |
| 5,968,175 A | 10/1999 | Morishita et al. | |
| 5,982,891 A | 11/1999 | Ginter et al. | |
| 5,991,399 A | 11/1999 | Graunke et al. | |
| 5,999,949 A | 12/1999 | Crandall | |
| 6,006,332 A | 12/1999 | Rabne et al. | |
| 6,023,765 A | 2/2000 | Kuhn | |
| 6,044,469 A | 3/2000 | Horstmann | |
| 6,052,780 A | 4/2000 | Glover | |
| 6,112,181 A | 8/2000 | Shear et al. | |
| 6,138,119 A | 10/2000 | Hall et al. | |
| 6,157,721 A | 12/2000 | Shear et al. | |
| 6,185,683 B1 | 2/2001 | Ginter et al. | |
| 6,188,995 B1 | 2/2001 | Garst et al. | |
| 6,223,291 B1 | 4/2001 | Puhl et al. | |
| 6,226,618 B1 | 5/2001 | Downs et al. | |
| 6,233,577 B1 | 5/2001 | Ramasubramani et al. | |
| 6,233,608 B1 | 5/2001 | Laursen et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,363,488 B1 | 3/2002 | Ginter et al. | |
| 6,389,402 B1 | 5/2002 | Ginter et al. | |
| 6,427,140 B1 | 7/2002 | Ginter et al. | |
| 6,449,367 B2 | 9/2002 | Van Wie et al. | |
| 6,618,484 B1 | 9/2003 | Van Wie et al. | |
| 6,640,304 B2 | 10/2003 | Ginter et al. | |
| 6,658,568 B1 | 12/2003 | Ginter et al. | |
| 6,668,325 B1 | 12/2003 | Collberg et al. | |
| 6,735,253 B1 | 5/2004 | Chang et al. | |
| 6,769,019 B2 | 7/2004 | Ferguson | |
| 6,785,815 B1 | 8/2004 | Serret-Avila et al. | |
| 6,807,534 B1 | 10/2004 | Erickson | |
| 6,832,316 B1 | 12/2004 | Sibert | |
| 6,842,863 B1 | 1/2005 | Fox et al. | |
| 6,850,252 B1 | 2/2005 | Hoffberg | |
| 6,928,545 B1 | 8/2005 | Litai et al. | |
| 6,934,702 B2 | 8/2005 | Faybishenko et al. | |
| 6,959,290 B2 | 10/2005 | Stefik et al. | |
| 6,961,858 B2 | 11/2005 | Fransdonk | |
| 6,976,164 B1 | 12/2005 | King et al. | |
| 6,985,953 B1 | 1/2006 | Sandhu et al. | |
| 6,996,544 B2 | 2/2006 | Sellars et al. | |
| 7,089,594 B2 | 8/2006 | Lal et al. | |
| 7,107,449 B2 | 9/2006 | Mont et al. | |
| 7,113,912 B2 | 9/2006 | Stefik et al. | |
| 7,171,558 B1 | 1/2007 | Mourad et al. | |
| 7,203,966 B2 | 4/2007 | Abburi et al. | |
| 7,210,039 B2 | 4/2007 | Rodgers et al. | |
| 7,272,228 B2 | 9/2007 | Atkin et al. | |
| 7,308,717 B2 | 12/2007 | Koved et al. | |
| 7,356,690 B2 | 4/2008 | Benantar | |
| 7,359,517 B1 | 4/2008 | Rowe | |
| 7,389,270 B2 | 6/2008 | Stefik et al. | |
| 7,389,273 B2 | 6/2008 | Irwin et al. | |
| 7,484,103 B2 * | 1/2009 | Woo et al. | 713/189 |
| 7,487,363 B2 | 2/2009 | Alve et al. | |
| 7,493,289 B2 * | 2/2009 | Verosub et al. | 705/51 |
| 7,496,757 B2 | 2/2009 | Abbott et al. | |
| 7,516,331 B2 | 4/2009 | Jin et al. | |
| 7,549,172 B2 | 6/2009 | Tokutani et al. | |
| 7,558,759 B2 | 7/2009 | Valenzuela et al. | |
| 7,574,219 B2 | 8/2009 | Rofheart et al. | |
| 7,587,368 B2 | 9/2009 | Felsher | |
| 7,590,863 B2 | 9/2009 | Lambert | |
| 7,610,011 B2 | 10/2009 | Albrett | |
| 7,631,318 B2 | 12/2009 | Cottrille et al. | |
| 7,711,647 B2 * | 5/2010 | Gunaseelan et al. | 705/59 |
| 8,234,387 B2 * | 7/2012 | Bradley et al. | 709/229 |
| 8,302,178 B2 | 10/2012 | Camiel | |
| 2001/0001147 A1 | 5/2001 | Hutchison et al. | |
| 2001/0033554 A1 | 10/2001 | Ayyagari et al. | |
| 2001/0042043 A1 | 11/2001 | Shear et al. | |
| 2001/0051996 A1 | 12/2001 | Cooper et al. | |
| 2002/0002674 A1 | 1/2002 | Grimes et al. | |
| 2002/0010679 A1 | 1/2002 | Felsher | |
| 2002/0023214 A1 | 2/2002 | Shear et al. | |
| 2002/0044657 A1 | 4/2002 | Asano et al. | |
| 2002/0048369 A1 | 4/2002 | Ginter et al. | |
| 2002/0059425 A1 | 5/2002 | Belfiore et al. | |
| 2002/0087859 A1 | 7/2002 | Weeks et al. | |
| 2002/0108050 A1 | 8/2002 | Raley et al. | |
| 2002/0112171 A1 | 8/2002 | Ginter et al. | |
| 2002/0144108 A1 | 10/2002 | Benantar | |
| 2002/0144283 A1 | 10/2002 | Headings et al. | |
| 2002/0152173 A1 | 10/2002 | Rudd | |
| 2002/0157002 A1 | 10/2002 | Messerges et al. | |
| 2002/0161996 A1 | 10/2002 | Koved et al. | |
| 2002/0164047 A1 | 11/2002 | Yuval | |
| 2002/0194081 A1 | 12/2002 | Perkowski | |
| 2003/0009423 A1 | 1/2003 | Wang et al. | |
| 2003/0009681 A1 | 1/2003 | Harada et al. | |
| 2003/0023856 A1 | 1/2003 | Horne et al. | |
| 2003/0028488 A1 * | 2/2003 | Mohammed et al. | 705/59 |
| 2003/0037139 A1 | 2/2003 | Shteyn | |
| 2003/0041239 A1 | 2/2003 | Shear et al. | |
| 2003/0046244 A1 | 3/2003 | Shear et al. | |
| 2003/0051134 A1 | 3/2003 | Gupta | |
| 2003/0055878 A1 | 3/2003 | Fletcher et al. | |
| 2003/0061404 A1 | 3/2003 | Atwal et al. | |
| 2003/0065956 A1 | 4/2003 | Belapurkar et al. | |
| 2003/0069748 A1 | 4/2003 | Shear et al. | |
| 2003/0069749 A1 | 4/2003 | Shear et al. | |
| 2003/0078891 A1 * | 4/2003 | Capitant | 705/57 |
| 2003/0084003 A1 | 5/2003 | Pinkas et al. | |
| 2003/0084172 A1 | 5/2003 | deJong et al. | |
| 2003/0105721 A1 | 6/2003 | Ginter et al. | |
| 2003/0105864 A1 | 6/2003 | Mulligan et al. | |
| 2003/0126086 A1 | 7/2003 | Safadi | |
| 2003/0135628 A1 | 7/2003 | Fletcher et al. | |
| 2003/0140119 A1 | 7/2003 | Acharya et al. | |
| 2003/0144859 A1 | 7/2003 | Hsu et al. | |
| 2003/0145044 A1 | 7/2003 | Raivisto et al. | |
| 2003/0145093 A1 | 7/2003 | Oren et al. | |
| 2003/0159033 A1 | 8/2003 | Ishiguro | |
| 2003/0163431 A1 | 8/2003 | Ginter et al. | |
| 2003/0167236 A1 | 9/2003 | Stefik et al. | |
| 2003/0172127 A1 | 9/2003 | Northrup et al. | |
| 2003/0177187 A1 | 9/2003 | Levine et al. | |
| 2003/0184431 A1 | 10/2003 | Lundkvist | |
| 2003/0194093 A1 | 10/2003 | Evans et al. | |
| 2003/0207687 A1 | 11/2003 | Svedevall et al. | |
| 2003/0220835 A1 | 11/2003 | Barnes | |
| 2003/0220880 A1 | 11/2003 | Lao et al. | |
| 2003/0225701 A1 | 12/2003 | Lee et al. | |
| 2003/0226012 A1 | 12/2003 | Asokan et al. | |
| 2003/0236978 A1 | 12/2003 | Evans et al. | |
| 2004/0003139 A1 * | 1/2004 | Cottrille et al. | 709/331 |
| 2004/0003270 A1 * | 1/2004 | Bourne et al. | 713/193 |
| 2004/0003398 A1 * | 1/2004 | Donian et al. | 725/34 |
| 2004/0024688 A1 | 2/2004 | Bi et al. | |
| 2004/0054630 A1 | 3/2004 | Ginter et al. | |
| 2004/0054894 A1 | 3/2004 | Lambert | |
| 2004/0054912 A1 | 3/2004 | Adent et al. | |
| 2004/0059951 A1 | 3/2004 | Pinkas et al. | |
| 2004/0073813 A1 | 4/2004 | Pinkas et al. | |
| 2004/0103305 A1 | 5/2004 | Ginter et al. | |
| 2004/0103312 A1 | 5/2004 | Messerges et al. | |
| 2004/0107356 A1 | 6/2004 | Shamoon et al. | |
| 2004/0107368 A1 | 6/2004 | Colvin | |

(56) References Cited

U.S. PATENT DOCUMENTS

| | | |
|---|---|---|
| 2004/0117490 A1 | 6/2004 | Peterka et al. |
| 2004/0123129 A1 | 6/2004 | Ginter et al. |
| 2004/0128499 A1 | 7/2004 | Peterka et al. |
| 2004/0128546 A1 | 7/2004 | Blakley et al. |
| 2004/0133793 A1 | 7/2004 | Ginter et al. |
| 2004/0139312 A1 | 7/2004 | Medvinsky |
| 2004/0143546 A1 | 7/2004 | Wood et al. |
| 2004/0143736 A1* | 7/2004 | Cross et al. ............... 713/165 |
| 2004/0158709 A1* | 8/2004 | Narin et al. ............... 713/156 |
| 2004/0158731 A1* | 8/2004 | Narin et al. ............... 713/200 |
| 2004/0162870 A1 | 8/2004 | Matsuzaki et al. |
| 2004/0205028 A1* | 10/2004 | Verosub et al. ............. 705/59 |
| 2004/0205333 A1 | 10/2004 | Bjorkengren |
| 2004/0205765 A1 | 10/2004 | Beringer et al. |
| 2004/0216127 A1 | 10/2004 | Datta et al. |
| 2004/0249768 A1* | 12/2004 | Kontio et al. ............... 705/65 |
| 2004/0254851 A1* | 12/2004 | Himeno et al. ............. 705/26 |
| 2004/0267965 A1 | 12/2004 | Vasudevan et al. |
| 2005/0004875 A1* | 1/2005 | Kontio et al. ............... 705/52 |
| 2005/0008163 A1 | 1/2005 | Leser et al. |
| 2005/0022227 A1 | 1/2005 | Shen et al. |
| 2005/0027871 A1* | 2/2005 | Bradley et al. ............ 709/227 |
| 2005/0050332 A1 | 3/2005 | Serret-Avila et al. |
| 2005/0060560 A1 | 3/2005 | Sibert |
| 2005/0060584 A1 | 3/2005 | Ginter et al. |
| 2005/0078822 A1* | 4/2005 | Shavit et al. ............... 380/201 |
| 2005/0086501 A1* | 4/2005 | Woo et al. ................. 713/189 |
| 2005/0102513 A1 | 5/2005 | Alve |
| 2005/0108555 A1 | 5/2005 | Sibert |
| 2005/0108707 A1 | 5/2005 | Taylor et al. |
| 2005/0119977 A1* | 6/2005 | Raciborski ............... 705/59 |
| 2005/0177516 A1* | 8/2005 | Vandewater et al. ......... 705/57 |
| 2005/0192902 A1* | 9/2005 | Williams ............... 705/51 |
| 2005/0204391 A1 | 9/2005 | Hunleth et al. |
| 2005/0228858 A1* | 10/2005 | Mizutani et al. ............ 709/201 |
| 2005/0234735 A1 | 10/2005 | Williams |
| 2005/0235361 A1 | 10/2005 | Alkove et al. |
| 2005/0262520 A1 | 11/2005 | Burnett et al. |
| 2005/0262568 A1 | 11/2005 | Hansen et al. |
| 2005/0273629 A1* | 12/2005 | Abrams et al. ............. 713/189 |
| 2005/0278256 A1* | 12/2005 | Vandewater et al. ......... 705/57 |
| 2005/0278259 A1* | 12/2005 | Gunaseelan et al. ......... 705/59 |
| 2006/0015580 A1* | 1/2006 | Gabriel et al. ............. 709/219 |
| 2006/0020784 A1 | 1/2006 | Jonker et al. |
| 2006/0021065 A1 | 1/2006 | Kamperman et al. |
| 2006/0041642 A1 | 2/2006 | Rosner et al. |
| 2006/0050870 A1 | 3/2006 | Kimmel et al. |
| 2006/0129818 A1 | 6/2006 | Kim et al. |
| 2006/0136718 A1 | 6/2006 | Moreillon |
| 2006/0150257 A1 | 7/2006 | Leung et al. |
| 2006/0173985 A1 | 8/2006 | Moore |
| 2006/0248340 A1 | 11/2006 | Lee et al. |
| 2006/0294580 A1 | 12/2006 | Yeh |
| 2007/0074270 A1 | 3/2007 | Meehan et al. |
| 2007/0083757 A1 | 4/2007 | Nakano et al. |
| 2007/0192480 A1 | 8/2007 | Han et al. |
| 2007/0300070 A1 | 12/2007 | Shen-Orr et al. |
| 2008/0133417 A1 | 6/2008 | Robinson |
| 2009/0007198 A1* | 1/2009 | Lavender et al. ............. 725/91 |
| 2010/0070774 A1 | 3/2010 | Bradley et al. |

FOREIGN PATENT DOCUMENTS

| | | |
|---|---|---|
| JP | 2001-290724 | 10/2001 |
| JP | 2003-122635 A | 4/2003 |
| WO | WO 96/27155 A2 | 9/1996 |
| WO | WO 97/41654 A2 | 11/1997 |
| WO | WO 97/43761 A1 | 11/1997 |
| WO | WO 98/09209 A2 | 3/1998 |
| WO | WO 98/10381 A1 | 3/1998 |
| WO | WO 98/37481 A1 | 8/1998 |
| WO | WO 99/01815 A1 | 1/1999 |
| WO | WO 99/05600 A2 | 2/1999 |
| WO | WO 99/24928 A1 | 5/1999 |
| WO | WO 99/48296 A1 | 9/1999 |
| WO | WO 00/75925 A1 | 12/2000 |
| WO | WO 01/06374 A1 | 1/2001 |
| WO | WO 01/09702 A1 | 2/2001 |
| WO | WO 01/10076 A1 | 2/2001 |
| WO | WO 01/80472 | 10/2001 |
| WO | WO 01/86462 A1 | 11/2001 |
| WO | WO 02/078238 | 10/2002 |
| WO | WO 02/084975 A2 | 10/2002 |
| WO | WO 02/093290 A2 | 11/2002 |
| WO | WO 03/034408 A2 | 4/2003 |
| WO | WO 03/044716 A2 | 5/2003 |
| WO | WO 2004/008297 A1 | 1/2004 |
| WO | WO 2004/027588 A2 | 4/2004 |
| WO | WO 2004/030311 A1 | 4/2004 |
| WO | WO 2004/038568 A2 | 5/2004 |
| WO | WO 2004/055650 A1 | 7/2004 |
| WO | WO 2004/059451 A1 | 7/2004 |
| WO | WO 2004/070538 A2 | 8/2004 |
| WO | WO 2005/055009 A2 | 6/2005 |
| WO | WO 2006/118391 A1 | 11/2006 |
| WO | WO 2007/043015 A2 | 4/2007 |

OTHER PUBLICATIONS

Simon et al., "A Digital Licensing Model for the Exchange of Learning Objects in a Federated Environment," 2004, IEEE, pp. 1-8.*
Chang et al., "Multimedia Rights Management for the Multiple Devices of End-User," 2003, IEEE, pp. 1-6.*
Jonker et al., "Digital Rights Management in Consumer Electronics Products," Mar. 2004, IEEE Signal Processing Magazine, pp. 82-92.*
Office Action dated Jan. 4, 2008 issued in related U.S. Appl. No. 10/863,551, filed Jun. 7, 2004,
Office Action dated Jun. 28, 2008 issued in related U.S. Appl. No. 10/863,551, filed Jun. 7, 2004.
Office Action dated Apr. 14, 2009 issued in related U.S. Appl. No. 10/863,551, filed Jun. 7, 2004.
Office Action dated Dec. 8, 2009 issued in related U.S. Appl. No. 10/863,551, filed Jun. 7, 2004.
Office Action dated Sep. 11, 2009 issued in related U.S. Appl. No. 11/804,667, filed May 17, 2007.
Office Action dated Jan. 6, 2010 issued in related U.S. Appl. No. 11/829,751, filed Jul. 27, 2007.
Office Action dated Feb. 3, 2010 issued in related U.S. Appl. No. 11/894,624, filed Aug. 20, 2007.
Office Action dated Oct. 23, 2008 issued in related U.S. Appl. No. 11/894,372, filed Aug. 20, 2007.
Office Action dated Jun. 10, 2009 issued in related U.S. Appl. No. 11/894,372, filed Aug. 20, 2007.
Office Action dated Nov. 13, 2009 issued in related U.S. Appl. No. 11/894,372, filed Aug. 20, 2007.
Office Action dated Nov. 14, 2008 issued in related U.S. Appl. No. 11/929,937, filed Oct. 30, 2007.
International Search Report mailed Feb. 1, 2006 issued in related International Application No. PCT/US04/18120.
International Preliminary Examination Report mailed Jul. 17, 2006, issued in related International Application No. PCT/US04/18120.
Examiner's First Report dated Mar. 30, 2009 issued in related Australian Application No. 2004264582.
Office Action issued Apr. 3, 2009 issued in related Chinese Patent Application No. 200480021795.9.
Office Action issued Oct. 15, 2009 issued in related Chinese Patent Application No. 200480021795.9.
Supplementary European Search Report completed Apr. 14, 2008 issued in related European Application No. 04776350.3.
Examination Report dated Sep. 17, 2009 issued in related European Application No. 04776350.3.
Notice of Reasons for Rejection mailed Jul. 14, 2009 issued in related Japanese Patent Application No. 2006-509076.
Notice of Grounds for Rejection issued Feb. 10, 2010 issued in related Korean Application No. 2005-7023383.
Official Action issued in related Eurasian Application No. 200700510/27.

(56) References Cited

OTHER PUBLICATIONS

Chinnici, Roberto et al., "Web Services Description Language (WSDL) Version 1.2, Part 1: Core Language", W3C Working Draft, Jun. 11, 2003, 78 pages.
Curbera et al., "Using WSDL in a UDDI Registry, Version 1.07," UDDI Best Practice, found online at http://www.uddi.org/pubs/wsdlbestpractices-V1.07-Open_20020521.pdf, May 21, 2002.
Erickson, John S., "Toward an Open Rights Management Interoperability Framework", Yankee Book Peddler, Inc. Jun. 24, 1999.
Erikson, J.S., "A Digital Object Approach to Interoperable Rights Management: Fine-grained Policy Enforcement Enabled by a Digital Object Infrastructure," D-Lib Magazine, Jun. 2001, 18 pages, vol. 7, No. 6, available at http://www.dlib.org/dlib/june01/erickson/06erickson.html.
Gudgin, M. et al., "SOAP Version 1.2 Part 2: Adjunts, W3C Recommendation Jun. 24, 2003," W3C, pp. 1-58, from http://www.w3.org/TR/2003/REC-soap12-part2-20030624/ on Nov. 4, 2004.
http://en.wikipedia.org/wki/Authorization_Certificate, Sep. 27, 2008.
http://en.wikipedia.org/wiki/Public_key_Certificate, Sep. 27, 2008.
Peltz, C., "web services orchestration: a review of emerging technologies, tools, and standards." Hewlett Packard, Co., Jan. 2003: pp. 1-19.
Sibert, O. et al., "Digibox: A Self-Protecting Container for Information Commerce," Proceedings of the First USENIX Workshop on Electronic Commerce, Jul. 1995, 13 pages, New York, NY.
Sibert, O. et al., "Securing the Content, Not the Wire, for Information Commerce," 1996, 12 pages, InterTrust Technologies Corporation.
Stefik, M., "Introduction to Knowledge Systems, Chapter 7: Classification," 1995, pp. 543- 607, Morgan Kaufmann Publishers, Inc., San Francisco, CA.
Stefik, M., "Letting Loose the Light: Igniting Commerce in Electronic Publication," 1994-1995, 37 pages, Xerox Parc, Palo Alto, CA.
Stefik, M., "Letting Loose the Light: Igniting Commerce in Electronic Publication," Internet Dreams: Archetypes, Myths, and Metaphors, 1996, pp. 219-53, Massachusetts Institute of Technology.
Stefik, M., "Trusted Systems," Scientific American, Mar. 1997, pp. 78-81.
Swenson, K., "Process Management Standards Overview," Fujitsu Software Corporation, 26 pages.
Using WSDL in a UDDI Registry.
zur Muehlen, M. et al., "Developing Web Services Choreography Standards—The Case of REST vs. SOAP," Wesley J. Howe School of Technology Management, Stevens Institute of Technology, pp. 1-25.
Office Action dated May 12, 2010 issued in related U.S. Appl. No. 10/863,551, filed Jun. 7, 2004.
International Search Report mailed Aug. 13, 2007, for International Application No. PCT/US2006/040898, filed Oct. 18, 2006.
International Preliminary Report on Patentability issued Apr. 23, 2008, for International Application No. PCT/US2006/040898, filed Oct. 18, 2006.
European Search Report and European Search Opinion completed Jul. 2, 2009, for European Application No. EP09156631.5.
Hancke et al., "An RFID Distance Bounding Protocol," Proceedings of IEEE/Create-Net SecureComm 2005, [Online] URL:http://www.rfidblog.org.uk/RFIDdistancebound-Securecomm2005.pdf.
Office Action dated Apr. 19, 2010 issued in related U.S. Appl. No. 11/804,667, filed May 17, 2007.
Office Action mailed May 12, 2010 issued in related U.S. Appl. No. 10/863,551, filed Jun. 7, 2004.
Office Action mailed Mar. 31, 2010 issued in related U.S. Appl. No. 11/829,805, filed Jul. 27, 2007.
Office Action mailed Feb. 17, 2009 issued in related U.S. Appl. No. 11/583,671, filed Oct. 18, 2006.
Office Action mailed Nov. 24, 2009 issued in related U.S. Appl. No. 11/583,671, filed Oct. 18, 2006.
Bradley et al., "The NEMO P2P Service Orchestration Framework," 37th HICSS, Jan. 5-8, 2004, All pages.
Office Action mailed Nov. 6, 2008 issued in related U.S. Appl. No. 11/583,646, filed Oct. 18, 2006.
Office Action mailed Apr. 10, 2009 issued in related U.S. Appl. No. 11/583,646, filed Oct. 18, 2006.
Office Action mailed Dec. 2, 2009 issued in related U.S. Appl. No. 11/583,646, filed Oct. 18, 2006.
Office Action mailed Feb. 16, 2010 issued in related U.S. Appl. No. 11/583,622, filed Oct. 18, 2006.
Office Action mailed Mar. 15, 2010 issued in related U.S. Appl. No. 11/583,695, filed Oct. 18, 2006.
Office Action mailed Jul. 5, 2007 issued in related U.S. Appl. No. 11/583,527, filed Oct. 18, 2006.
Office Action mailed Jan. 3, 2008 issued in related U.S. Appl. No. 11/583,527, filed Oct. 18, 2006.
Office Action mailed Jun. 13, 2008 issued in related U.S. Appl. No. 11/583,527, filed Oct. 18, 2006.
Advisory Action mailed Oct. 6, 2008 issued in related U.S. Appl. No. 11/583,527, filed Oct. 18, 2006.
Office Action mailed Mar. 17, 2009 issued in related U.S. Appl. No. 11/583,527, filed Oct. 18, 2006.
Office Action mailed Dec. 29, 2009 issued in related U.S. Appl. No. 11/583,527, filed Oct. 18, 2006.
Examination Report dated Feb. 19, 2010, for European Application No. EP09156631.5.
White, How Computers Work, Que Corp. Millennium Ed. 1999, All pages.
Smith et al., "Virtual Machines: Versatile Platforms for Systems and Processes," Elsevier Science, May 2005, All pages.
English language translation of Notice of Grounds for Rejection, issued Jul. 29, 2010 in related Korean Application No. 2010-7007909.
English translation of Notice of Grounds for Rejection issued Aug. 24, 2010 issued in related Korean Application No. 2005-7023383.
English translation of Notice of Reasons for Rejection mailed Aug. 10, 2010 issued in related Japanese Patent Application No. 2006-509076.
English translation of Official Action issued Aug. 3, 2010 in related Eurasian Application No. 200901153.
Examination Report dated Jul. 7, 2010, issued in related Canadian Application No. 2,528,428.
English translation of Office Action issued on Aug. 20, 2010 for related Chinese Application No. 2006-80047769.2.
European Search Opinion mailed Oct. 19, 2010 for related European Application No. 09156727.1.
European Search Opinion mailed Oct. 19, 2010 for related European Application No. 09156702.4.
English translation of conclusion on Invention mailed Mar. 31, 2011 in related Eurasian Patent Application No. 2009011543.
Examination Report dated Apr. 13, 2011 issued in related European Application No. 06826285.6.
"IBM Cryptolope Live!," General Information guide, Version 1, pp. 1-36 (1997).
Kaplan, "IBM Cryptolopes®, Super Distribution and Digital Rights Management," retrieved from internet on Mar. 14, 2000: URL:http://www.research.ibm.com/people/k/kaplan/cryptolope-docs/crypap.html (1996).
First Examination Report dated Apr. 4, 2011 issued in related Australian Application No. 2006-304655.
English translation of Notice of Reasons for Rejection mailed Apr. 5, 2011 issued in related Japanese Patent Application No. 2007-320348.
English translation of Decision on Rejection issued Apr. 25, 2011 in related Chinese Patent Application No. 200480021795.9.
Examination Report dated Apr. 11, 2011 issued in related Australian Patent Application No. 2010212301.
Examination Report mailed Jul. 13, 2011 issued in related European Application No. 04776350.3.
English translation of Decision of Final Rejection mailed Jul. 12, 2011 in related Japanese Application No. 2006-509076.
English translation of Notice of Grounds for Rejection, issued Sep. 22, 2011, for Korean Application No. 2008-7011852.
English translation of a Decision of Final Rejection mailed Oct. 25, 2011 in related Japanese Patent Application No. 2007-320348.

(56) References Cited

OTHER PUBLICATIONS

English translation of Decision of Final Rejection mailed Nov. 22, 2011 in related Japanese Patent Application No. 2008-536800.
English translation of Notification No. 25, Official Action, mailed Nov. 8, 2011 in related Israeli Patent Application No. 172366.
Examination Report dated Feb. 23, 2012 issued in related European Application No. 09156702.4.
English translation of Notice of Grounds for Rejection issued Feb. 17, 2012 in related Korean Patent Applicaton No. 2011-7030396.
English translation of Conclusion on Patentability mailed Jan. 26, 2012, issued in related Eurasian Patent Application No. 200901153/31.
English translation of Notice of Amendment mailed Feb. 21, 2012 issued in related Chinese Patent Application No. 201110260513.2.
Examination Report dated Apr. 2, 2012 issued in related European Application No. 09156631.5.
Notice of Acceptance mailed Feb. 29, 2012 issued in related Australian Patent Application No. 2010212301.
English translation of Preliminary Rejection (final notification) issued May 31, 2012 in related Korean Application No. 2008-7011852.
Office Action dated Jun. 25, 2012 in related Israeli Patent Application No. 190957.
European Search Report dated Jul. 11, 2012 in related European Patent Application No. 10180088.6.
European Search Report dated Jul. 11, 2012 in related European Patent Application No. 10181095.0.
English Translation of Notice of Grouds for Rejection issued Jul. 12, 2012 in related Korean Patent Application No. 2012-7015783.
Examination Report dated Sep. 11, 2012 in related Australian Patent Application No. 2012202810.
English Translation of Notice of Grounds for Rejection issued Oct. 26, 2012 in related Korean Patent Application No. 2011-7030396.
International Search Report and Written Opinion dated Oct. 23, 2012 in related PCT Application No. PCT/US2012/033150.
English translation of Conclusion on Patentability mailed Sep. 28, 2012, issued in related Eurasian Patent Application No. 200901153.
Search and Examination Report dated Oct. 10, 2012, issued in related ARIPO Patent Application No. AP/P/2008/004453.
Summons to Attend Oral Proceedings Pursuant to Rule 115(1) EPC dated Feb. 21, 2013 in related European Patent Application No. 06826285.6.
Wong, et al. "Dynamically Loaded Classes as Shared Libraries: an Approach to Improving Virtual Machine Scalability"Parallel and Distributed Processing Symposium, 2003. Proceedings International Apr. 22-26, 2003, pp. 38-47, cited in related European Patent Application No. 06826285.6.
English translation of Notification No. 25, Official Action, mailed May 9, 2013 in related Israeli Patent Application No. 223027.
English translation of Notice of Reasons for Rejection mailed Aug. 20, 2013 in related Japanese Patent Application No. 2011-248897.
English translation of First Office Action mailed Jun. 6, 2013, issued in related Mexican Patent Application No. 2011/000735.
English translation of Third Office Action, mailed Sep. 23, 2013 in related Chinese Patent Application No. 200480021795.9.

\* cited by examiner

DIGITAL RIGHTS MANAGEMENT ENGINE SYSTEMS AND METHODS

CROSS-REFERENCE TO RELATED APPLICATIONS

This application claims the benefit of U.S. Provisional Application No. 60/728,089, filed Oct. 18, 2005, U.S. Provisional Application No. 60/772,024, filed Feb. 9, 2006, U.S. Provisional Application No. 60/744,574, filed Apr. 10, 2006, U.S. Provisional Application No. 60/791,179, filed Apr. 10, 2006, U.S. Provisional Application No. 60/746,712, filed May 8, 2006, U.S. Provisional Application No. 60/798,925, filed May 8, 2006, and U.S. Provisional Application No. 60/835,061, filed Aug. 1, 2006. U.S. Provisional Application Nos. 60/728,089, 60/772,024, 60/744,574, 60/791,179, 60/746,712, 60/798,925, and 60/835,061 are incorporated herein by reference in their entirety for any purpose.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

In modern computing systems, it is often desirable to limit access to electronic content, services, and/or processing resources, and/or to allow only certain entities to perform certain actions. A variety of techniques have been developed or proposed to enable such control. These techniques are often referred to as digital rights management (DRM) techniques because, in general terms, their goal is to manage the rights of various entities in digital or other electronic content, services, or resources. A problem with many prior art techniques is that they are overly complex, overly restrictive, relatively inflexible, fail to enable certain natural types of relationships and processes, and/or are uninteroperable with other DRM systems.

Systems and methods are described herein that can be used to ameliorate some or all of these problems. It should be appreciated that embodiments of the presently described inventive body of work can be implemented in numerous ways, including as processes, apparatuses, systems, devices, methods, computer readable media, and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body work.

Commonly-assigned U.S. patent application Ser. No. 10/863,551, Pub. No. 2005/0027871 A1 ("the '551 application"), which is hereby incorporated by reference, describes embodiments of a digital rights management (DRM) architecture and a novel DRM engine that overcome some of the weaknesses that characterize many previous DRM implementations. The present application describes enhancements, extensions, and modifications to, as well as alternative embodiments of, the architecture and DRM engine described in the '551 application, as well as new components, architectures, and embodiments. It will thus be appreciated that the material described herein can be used in the context of an architecture and/or DRM engine such as that described in the '551 application, as well as in other contexts.

1. Example DRM System

Figure 1:
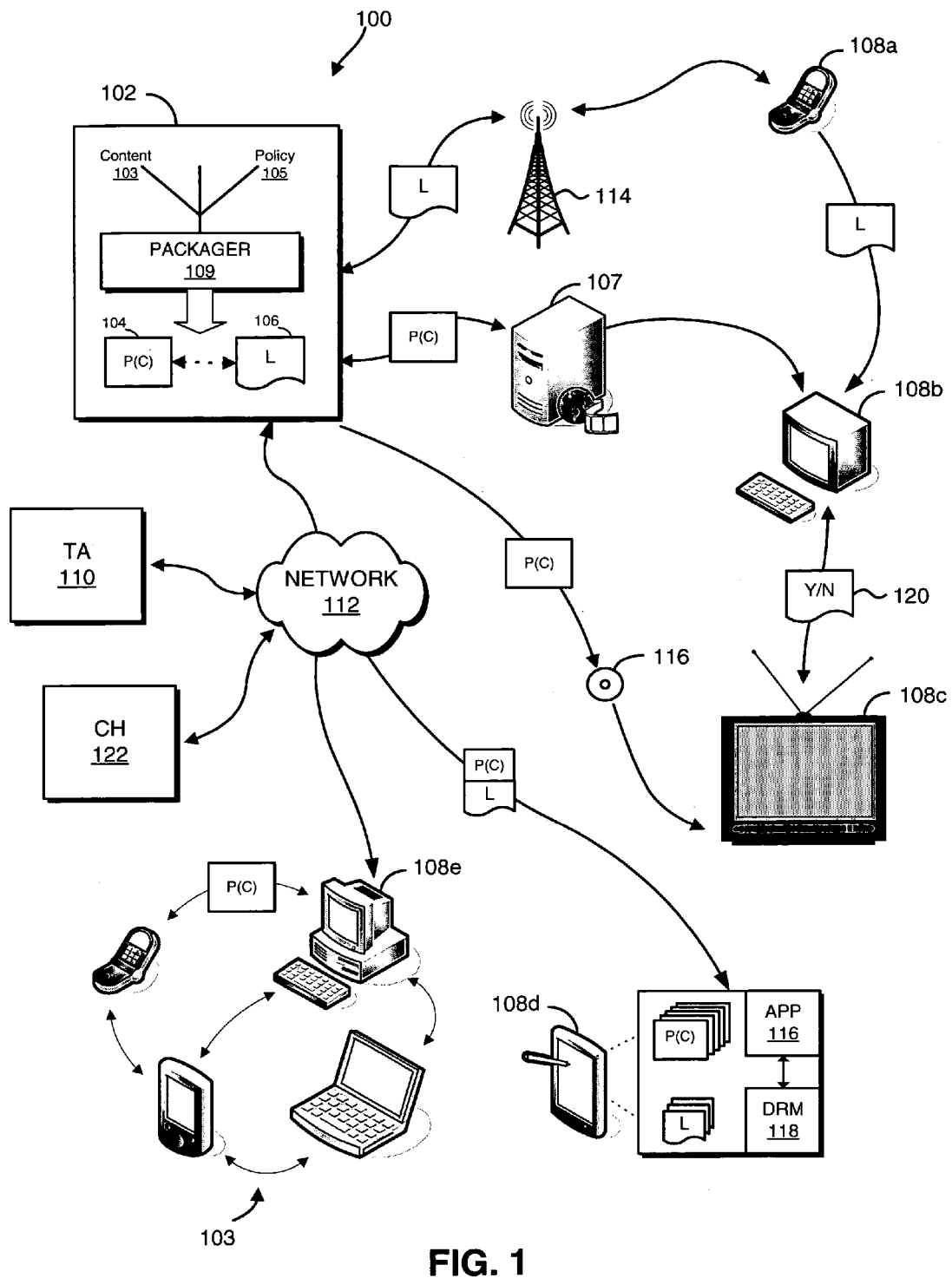
FIG. 1 shows an illustrative system for managing the use of electronic content.

FIG. 1 shows an illustrative system 100 for managing electronic content. As shown in FIG. 1, an entity 102 holding rights in electronic content 103, packages the content for distribution and consumption by end users 108a-e (referred to collectively as "end users 108," where reference numeral 108 refers interchangeably to the end user or the end user's computing system, as will be clear from the context). For example, entity 102 may comprise a content owner, creator, or provider, such as a musician, movie studio, publishing house, software company, author, mobile service provider, Internet content download or subscription service, cable or satellite television provider, the employee of a corporation, or the like, or an entity acting on behalf thereof, and content 103 may comprise any electronic content, such as digital video, audio, or textual content, a movie, a song, a video game, a piece of software, an email message, a text message, a word processing document, a report, or any other entertainment, enterprise, or other content.

In the example shown in FIG. 1, entity 102 uses a packaging engine 109 to associate a license 106 with the packaged content 104. License 106 is based on the policies 105 or other wishes of entity 102, and specifies permitted and/or prohibited uses of the content and/or one or more conditions that must be satisfied in order to make use of the content, or that must be satisfied as a condition or consequence of use. The content may also be secured by one or more cryptographic mechanisms such as encryption or digital signature techniques, for which a trust authority 110 may be used to obtain the appropriate cryptographic keys, certificates, and/or the like.

As shown in FIG. 1, packaged content 104 and licenses 106 can be provided to end users 108 by any suitable means, such as via a network 112 like the Internet, a local area network 103, a wireless network, a virtual private network 107, a wide area network, and/or the like, via cable, satellite, broadcast, or cellular communication 114, and/or via recordable media 116 such as a compact disc (CD), digital versatile disk (DVD), a flash memory card (e.g., an Secure Digital (SD) card), and/or the like. Packaged content 104 can be delivered to the user together with license 106 in a single package or transmission 113, or in separate packages or transmissions received from the same or different sources.

The end user's system (e.g., a personal computer 108e, a mobile telephone 108a, a television and/or television set-top box 108c, a portable audio and/or video player, an eBook reader, and/or the like) contains application software 116, hardware, and/or special-purpose logic that is operable to retrieve and render the content. The user's system also includes software and/or hardware, referred to herein as a digital rights management engine 118, for evaluating the license 106 associated with the packaged content 104 and enforcing the terms thereof (and/or enabling application 116 to enforce such terms), such as by selectively granting the user access to the content only if permitted by the license 106. Digital rights management engine 118 may be structurally or functionally integrated with application 116, or may comprise a separate piece of software and/or hardware. Alternatively, or in addition, a user's system, such as system 108c, may communicate with a remote system, such as system 108b, (e.g., a server, another device in the user's network of devices, such as a personal computer or television set-top box, and/or the like) that uses a digital rights management engine to make a determination 120 as to whether to grant the user access to content previously obtained or requested by the user.

The digital rights management engine, and/or other software on the user's system, or in remote communication therewith, may also record information regarding the user's access to or other use of the protected content. In some embodiments, some or all of this information might be communicated to a remote party (e.g., a clearinghouse 122, the content creator, owner, or provider 102, the user's manager, an entity acting on behalf thereof, and/or the like), e.g., for use in allocating revenue (such as royalties, advertisement-based revenue, etc.), determining user preferences, enforcing system policies (e.g., monitoring how and when confidential information is used), and/or the like. It will be appreciated that while FIG. 1 shows an illustrative DRM architecture and a set of illustrative relationships, the systems and methods described herein can be practiced in any suitable context, and thus it will be appreciated that FIG. 1 is provided for purposes of illustration and explanation, not for purposes of limitation.

Figure 2:
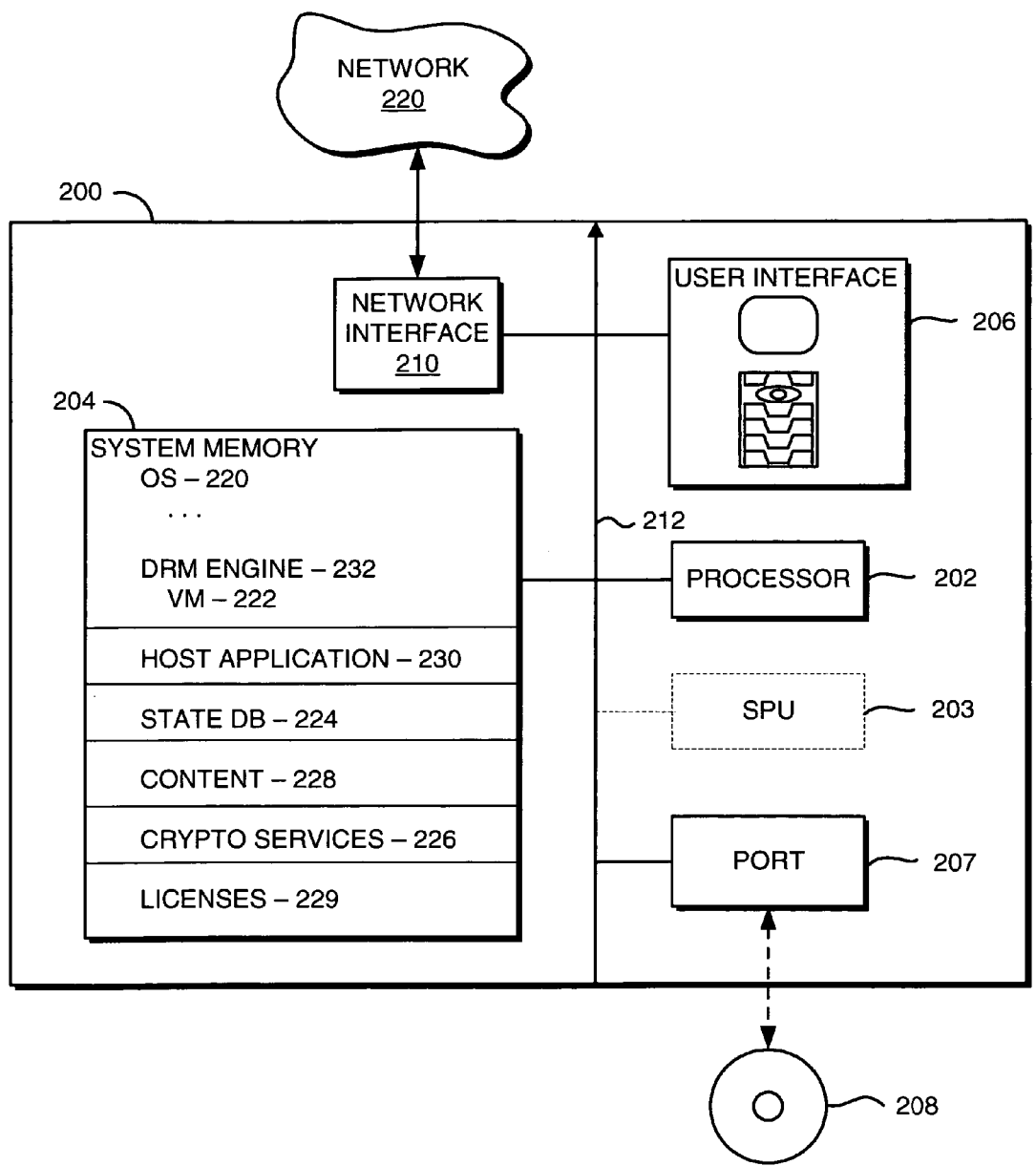
FIG. 2 shows a more detailed example of a system that could be used to practice embodiments of the inventive body of work.

FIG. 2 shows a more detailed example of a system 200 that could be used to practice embodiments of the inventive body of work. For example, system 200 might comprise an embodiment of an end user's device 108, a content provider's device 109, and/or the like. For example, system 200 may comprise a general-purpose computing device such as a personal computer 108e or network server 105, or a specialized computing device such as a cellular telephone 108a, personal digital assistant, portable audio or video player, television set-top box, kiosk, gaming system, or the like. System 200 will typically include a processor 202, memory 204, a user interface 206, a port 207 for accepting removable memory 208, a network interface 210, and one or more buses 212 for connecting the aforementioned elements. The operation of system 200 will typically be controlled by processor 202 operating under the guidance of programs stored in memory 204. Memory 204 will generally include both high-speed random-access memory (RAM) and non-volatile memory such as a magnetic disk and/or flash EEPROM. Some portions of memory 204 may be restricted, such that they cannot be read from or written to by other components of the system 200. Port 207 may comprise a disk drive or memory slot for accepting computer-readable media 208 such as floppy diskettes, CD-ROMs, DVDs, memory cards, SD cards, other magnetic or optical media, and/or the like. Network interface 210 is typically operable to provide a connection between system 200 and other computing devices (and/or networks of computing devices) via a network 220 such as the Internet or an intranet (e.g., a LAN, WAN, VPN, etc.), and may employ one or more communications technologies to physically make such connection (e.g., wireless, Ethernet, and/or the like). In some embodiments, system 200 might also include a processing unit 203 that is protected from tampering by a user of system 200 or other entities. Such a secure processing unit can help enhance the security of sensitive operations such as key management, signature verification, and other aspects of the digital rights management process.

As shown in FIG. 2, memory 204 of computing device 200 may include a variety of programs or modules for controlling the operation of computing device 200. For example, memory 204 will typically include an operating system 220 for managing the execution of applications, peripherals, and the like; a host application 230 for rendering protected electronic content; and a DRM engine 232 for implementing some or all of the rights management functionality described herein. As described elsewhere herein, DRM engine 232 may comprise, interoperate with, and/or control a variety of other modules, such as a virtual machine 222 for executing control programs, and a state database 224 for storing state information for use by virtual machine 222, and/or one or more cryptographic modules 226 for performing cryptographic operations such as encrypting and/or decrypting content, computing hash functions and message authentication codes, evaluating digital signatures, and/or the like. Memory 204 will also typically include protected content 228 and associated licenses 229, as well as cryptographic keys, certificates, and the like (not shown).

One of ordinary skill in the art will appreciate that the systems and methods described herein can be practiced with computing devices similar or identical to that illustrated in FIG. 2, or with virtually any other suitable computing device, including computing devices that do not possess some of the components shown in FIG. 2 and/or computing devices that possess other components that are not shown. Thus it should be appreciated that FIG. 2 is provided for purposes of illustration and not limitation.

A digital rights management engine and related systems and methods are described herein that can be used to provide some or all of the rights management functionality of systems such as those shown in FIGS. 1 and 2, or in other types of systems. In addition, a variety of other systems and methods are described below that could be used in the context of systems such as those shown in FIGS. 1 and 2, as well as in other contexts, including contexts unrelated to digital rights management.

2. DRM Engine Architecture

In one embodiment a relatively simple, open, and flexible digital rights management (DRM) engine is used to implement core DRM functions. In a preferred embodiment, this DRM engine is designed to integrate relatively easily into a web services environment such as that described in the '551 application, and into virtually any host environment or software architecture. In a preferred embodiment, the DRM engine is independent of particular media formats and cryptographic protocols, allowing designers the flexibility to use standardized or proprietary technologies as required by the particular situation. The governance model used by preferred embodiments of the DRM engine is simple, but can be used to express sophisticated relationships and business models.

Some of the illustrative embodiments of a DRM engine that are described below relate to an example implementation referred to as "Octopus"; however, it will be appreciated that the present inventions are not limited to the specific details of the Octopus example, which are provided for purposes of illustration, not limitation.

1.1. Overview

Figure 3:
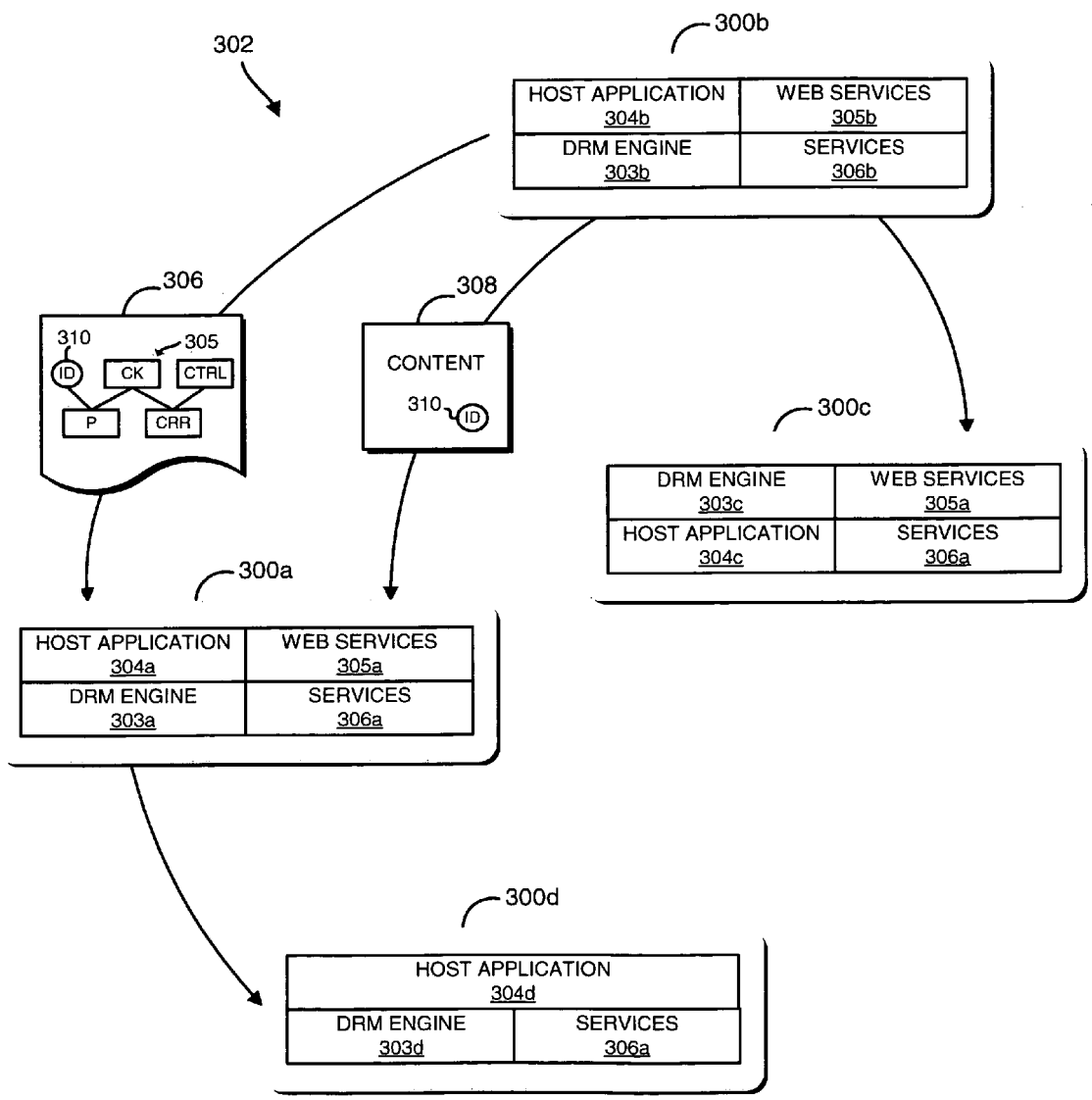
FIG. 3 shows how an illustrative digital rights management (DRM) engine might function in a network that uses DRM.

FIG. 3 shows how an illustrative DRM engine 303a might function in a system 302 that uses DRM. As shown in FIG. 3, in one embodiment DRM engine 303a is embedded or integrated within a host application 304a (e.g., a content rendering application such as an audio and/or video player, a text-rendering application such as an email program, word processor, eBook reader, or document reader, and/or the like) or is in communication therewith. In one embodiment, DRM engine 303a performs DRM functions and relies on host application 304a for services such as encryption, decryption, file management, and/or other functions can be more effectively provided by the host. For example, in a preferred embodiment DRM engine 303a is operable to manipulate the DRM objects 305 which comprise a license 306 to protected content 308. In some embodiments, DRM engine 303a may also delivers keys to host application 304a. As shown in FIG. 3, either or both of DRM engine 303a and host application 304a may make use of web services 305a and/or host services 306a for processing and/or information needed to complete their respective tasks. The '551 application provides examples of such services, and the manner in which a DRM engine 303a and host application 304a might interoperate therewith.

In the example shown in FIG. 3, DRM engine 303a, host application 304a, host services 306a, and web services interface 305a are loaded onto a device 300a, such as an end user's personal computer (PC). Device 300a is communicatively coupled to a server 300b, from which content 308 and license 306 were obtained, as well as a portable device 300d, to which device 300a may forward content 308 and/or license 306. Each of these other devices may include a DRM engine 303 that is similar or identical to DRM engine 300a, which can be integrated with the particular host application and host environment of the device. For example, server 300b might include a host application 304b that performs bulk packaging of content and/or licenses, and makes use of a DRM engine 300a to evaluate controls associated with the content that is being packaged in order to comply with any redistribution restrictions. Similarly, device 300c might include a host application 304c that is capable of both rendering and packaging content, while device 300a might include a host application that is simply able to render content. As yet another example of the potential diversity of host environments, device 300d might not include a web services interface, but may instead rely on communication with device 300a, and web services interface 305a to the extent host application 304d and/or DRM engine 303d require the use of any web services. FIG. 3 is only one example of a system in which a DRM engine might be used; it will be appreciated that embodiments of the DRM engines described herein can be implemented and integrated with applications and systems in many different ways, and are not limited to the illustrative examples shown in FIG. 3.

1.2. Objects

In preferred embodiments, content protection and governance objects are used to represent entities in a system, to protect content, to associate usage rules with the content, and to determine if access can be granted when requested.

As described in more detail below, in one embodiment, the following objects are used:

| Object Type | Function |
| --- | --- |
| Node | Represents entities |
| Link | Represents a directed relationship between entities |
| Content | Represents content (e.g., media content) |
| ContentKey | Represents encryption keys used to encrypt content |
| Control | Represents usage rules that govern interaction with content |
| Controller | Represents associations between Control and ContentKey objects |
| Protector | Represents associations between Content and ContentKey objects |

1.2.1. Node Objects

Node objects are used to represent entities in the system. In practice, a node will usually represent a user, a device, or a group. Node objects will also typically have associated attributes that represent certain properties of the entity associated with the node.

Figure 4:
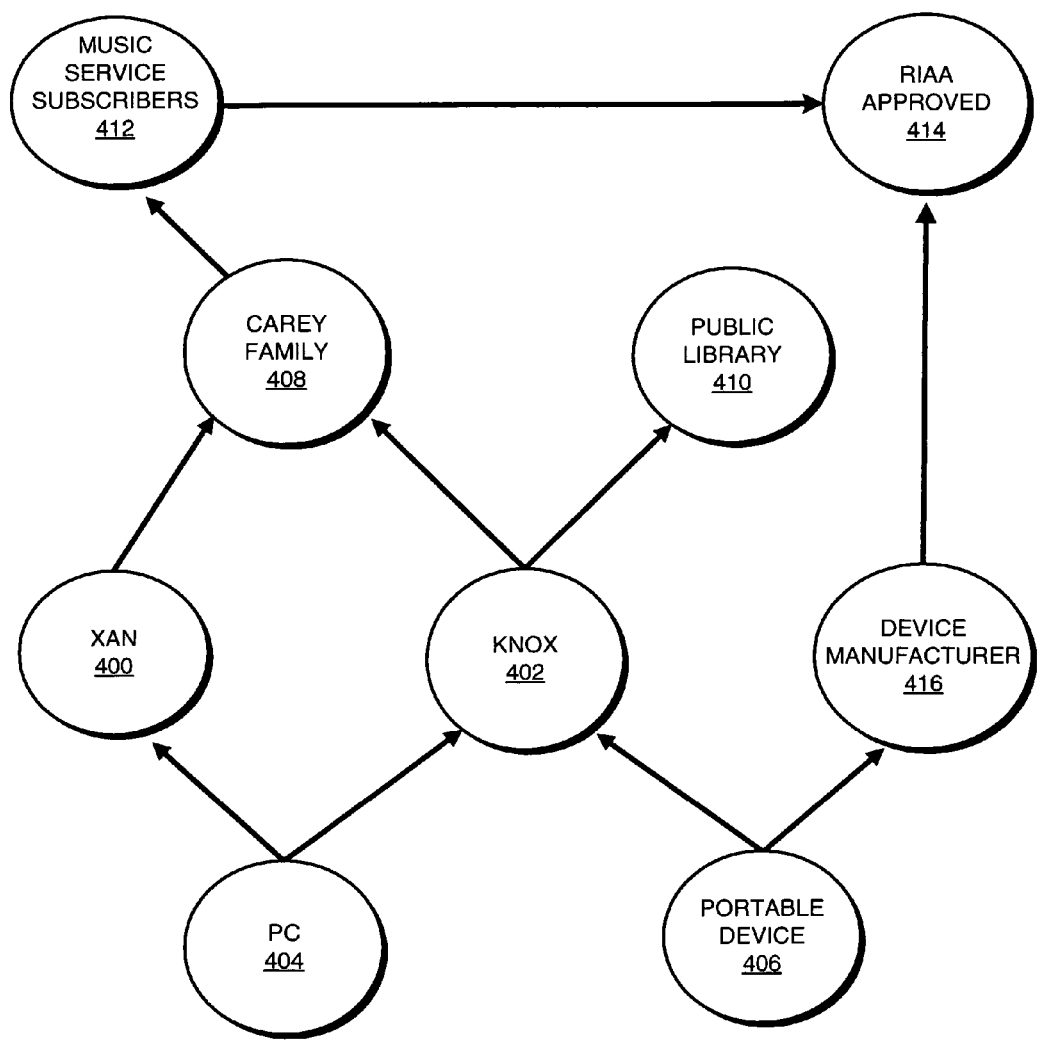
FIG. 4 shows a collection of nodes and links used to model the relationships in a DRM system.

For example, FIG. 4 shows two users (Xan 400 and Knox 402), two devices (PC 404 and portable device 406), and several entities that represent groups (e.g., members of the Carey family 408, members of the public library 410, subscribers to a particular music service 412, RIAA-approved devices 414, and devices manufactured by a specific company 416), each having an associated node object.

In one embodiment node objects include attributes that define what the node represents. One example of an attribute is a node type. Besides representing users, groups, or devices, the node type attribute could be used to represent other entities. In some embodiments, a node object can also include cryptographic key information, such as when an embodiment of the key derivation and distribution techniques described elsewhere herein is used.

In some embodiments, node objects also include a confidentiality asymmetric key pair that is used for targeting confidential information to the subsystems that have access to the confidential parts of the node object. This could be the entity that the node represents (for example, the Music Service 412) or some entity responsible for managing the node (for example, the end user (e.g., Knox 402) could be responsible for managing his or her portable device 406).

1.2.2. Link Objects

In a preferred embodiment, link objects are signed objects used to show the relationship between two nodes. For example, in FIG. 4 the link 418 from the PC node 404 to Knox 402 shows ownership. The link from Knox 402 to the Carey family node 408 shows membership, as does the link from the Carey family node 408 to the Music Service Subscribers node 412. In one embodiment, link objects express the relationship between two nodes, and thus the relationships shown in FIG. 4 could be represented using ten links.

As shown in FIG. 4, a graph 420 can be used to express the relationship between nodes, where link objects are the directed edges between nodes. For example, in FIG. 4, the relationship between the Carey family node 408 and the Music Service node 412 asserts that there exists a directed edge 422 in the graph whose vertices are the Carey family node 408 and the Music Service node 412. Knox 402 and Xan 400 are members of the Carey family 408. Because Knox 402 is linked to the Carey family 408 and the Carey family 408 is linked to the Music Service 412 there is said to be a path between Knox 402 and the Music Service 412. A DRM engine considers a node to be reachable from another node when there is a path from that node to the other node. This allows a control to be written that allows permission to access protected content based on the condition that a node is reachable from the device where the application that requests access to the protected content is executing.

As described in more detail below, link objects can also optionally contain some cryptographic data that allows derivation of content keys. Link objects may also contain control programs that define the conditions under which the link may be deemed to be valid. Such control programs can be executed or interpreted (these terms are used interchangeably herein) by a DRM engine's virtual machine to evaluate the validity of a link (e.g., to determine whether the link may be used to reach a given node in an authorization graph).

In one embodiment, links are signed. Any suitable digital signature mechanism can be used, and in one embodiment the DRM engine does not define how the link objects are signed and does not evaluate any associated certificates, instead, it relies on the host system to verify any such signatures and/or certificates. This allows the system architect or administrator to define the lifetime of a link object, to revoke it, and so on (e.g., by using expiring keys or certificates, revocation, and/or the like), thus providing an additional layer of policy management and security on top of the policy management and security provided by the DRM engine's evaluation of control programs and DRM objects in the context of specific pieces of protected content and/or links (for example, expiration of a link could alternatively, or in addition, be implemented by including an appropriate control program in the link object itself, which, when executed would enforce the expiration date or other validity period). In one embodiment, the DRM engine is generic, and works with any suitable encryption, digital signature, revocation, and/or other security scheme that is used by the host application and/or environment. Thus, for example, if the DRM engine needs to determine if a particular link has been properly signed, it might simply call the host application (and/or a host or system cryptographic service) to verify the signature in accordance with the particular signature scheme chosen by the system designer, the details of which the DRM engine itself may be unaware. In other embodiments, the DRM engine itself performs the actual signature evaluation, relying on the host simply to indicate the appropriate signature algorithm to use.

1.2.3. Content Protection and Governance

Referring once again to FIG. 3, in a typical scenario, a content provider 300b uses an application 304b that includes a packaging engine to encrypt or otherwise cryptographically secure a piece of electronic content 308 and creates a license 306 that governs access to or other use of that content. In one embodiment, license 308 comprises a set of objects 305 that specify how content 308 may be used, and also includes the content's encryption key(s) and/or the information needed to obtain them. In one embodiment, content 308 and license 306 are logically separate, but are bound together by internal references (e.g., using object IDs 310). In many situations it may be convenient to store and/or deliver the content and the license together; however, this is not required in preferred embodiments. In one embodiment, a license can apply to more than one item of content, and more than one license can apply to any single item of content.

As shown in FIG. 3, when a host application 304a running on a client device 300a wants to perform an action on a particular piece of content 308, it asks DRM engine 303a to check if the action it intends to perform (e.g., "play") is allowed. In one embodiment, the DRM engine 303a will, from the information contained in the objects 305 comprising content license 306, load and execute a control program associated with content 308, and permission to perform the action will be granted or denied based on the result returned by the control program. Permission will typically require that some conditions be met, such as the condition that a node be reachable from the node representing the requesting entity/device 300a.

Figure 5:
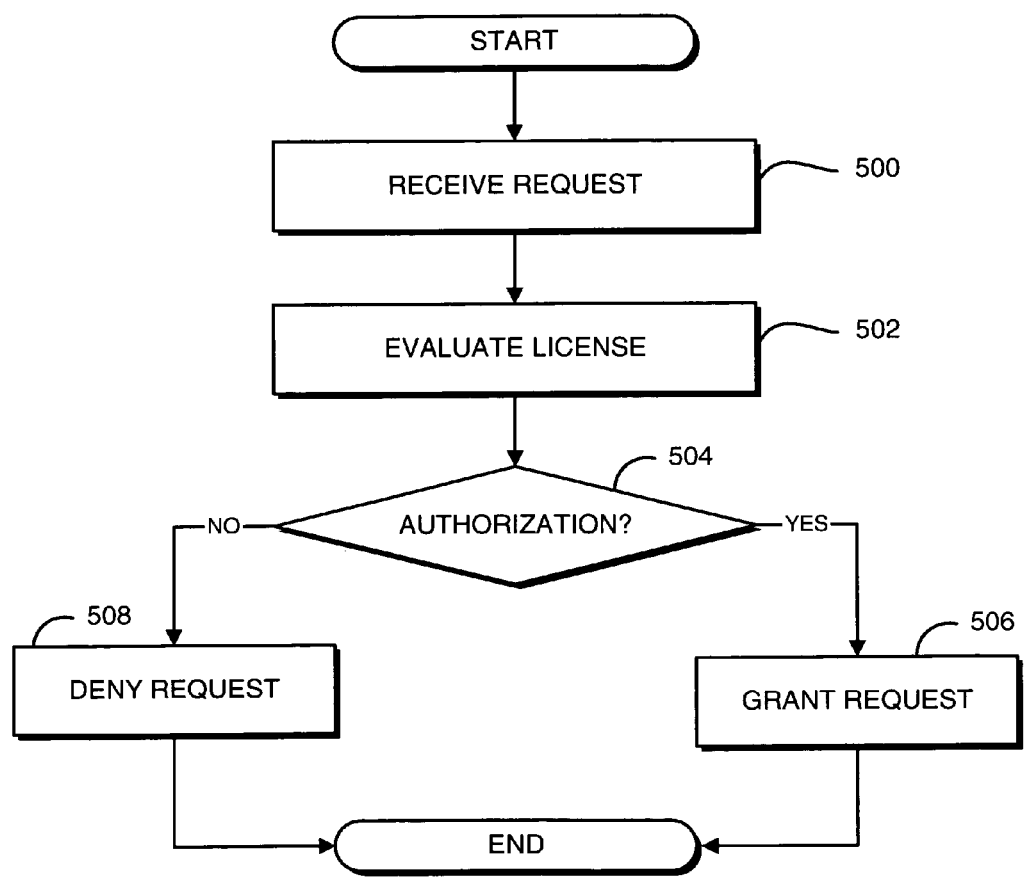
FIG. 5 is a flowchart illustrating how an embodiment of a DRM engine might determine whether a requested action is authorized.

FIG. 5 is a flowchart illustrating how an embodiment of a DRM engine might determine whether a requested action (e.g., viewing a piece of content) is authorized. As shown in FIG. 5, a request to evaluate a license for a given action is received (500). For example, this request might be received from the host application, after the host received a request from a user to perform the specified action. As shown in FIG. 5, the DRM engine evaluates the specified license (502), and determines whether the requested action is authorized (504). For example, the license may contain a control program that the DRM engine executes, the output of which is used to make the authorization decision. If the license authorizes the requested action (i.e., a "yes" exit from block 504), then the DRM engine indicates to the host application that the request is granted (506). Otherwise, the DRM engine indicates to the host application that the request is denied (508). In some embodiments, the DRM engine may also return to the host application a variety of metadata that e.g., associates conditions with a grant of authorization (e.g., obligations and/or callbacks), or provides additional information regarding the cause of a denial of authorization. For example, the DRM engine may indicate that the requested action is allowed only if the host application logs certain information regarding performance of the requested action, or as long as the host application calls the DRM engine back at predefined time intervals to, e.g., re-evaluate the license. Additional information on such obligations, callbacks, and other metadata returned by the DRM engine is provided below. If the requested action is authorized, the content key will be retrieved (e.g., from the license's ContentKey object), and used to release the content for the requested use.

1.2.4. License DRM Objects

Figure 6:
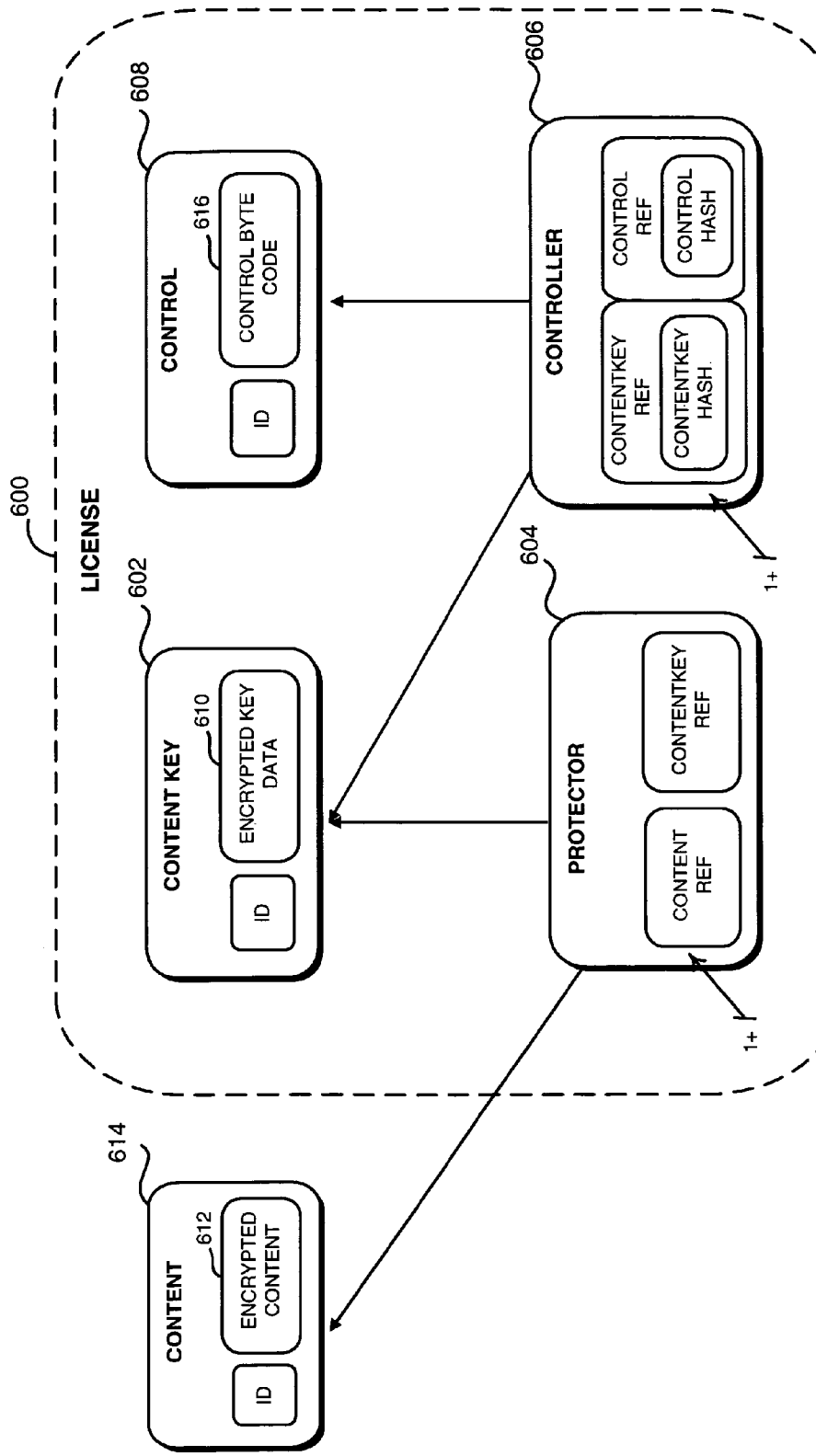
FIG. 6 shows an example of a DRM license in accordance with one embodiment of the inventive body of work.

As shown in FIG. 6, in preferred embodiment a license 600 is a collection of objects. In the example shown in FIG. 6, license 600 comprises a ContentKey object 602, a protector object 604, a controller object 606, and a control object 608. As shown in FIG. 6, ContentKey object 602 includes encrypted key data 610 (e.g., an encrypted version of the key needed to decrypt encrypted content item 612) and information regarding the cryptosystem used to encrypt the key data. Protector object 604 binds ContentKey object 602 to one or more content objects 614. As shown in FIG. 6, control object 608 includes and protects a control program 616 that specifies how content object 614 is governed. In a preferred embodiment, control program 616 is a piece of executable bytecode that runs on a virtual machine operated by the DRM engine. The control program governs whether certain actions can be performed on the content by checking for satisfaction of conditions specified in the control program, such as whether certain nodes are reachable using valid link objects, whether certain state objects have been stored, whether the host environment has certain characteristics, and/or the like. Referring once again to FIG. 6, controller object 606 is used to bind one or more ContentKey object 602 to control object 608.

License 600 may also comprise additional objects, such as metadata providing a machine- or human-readable description of the content-access conditions required by the license. Alternatively, or in addition, such metadata can be included as a resource extension of one of the other objects (e.g., control object 608). In the embodiment shown in FIG. 6, control object 608 and controller object 606 are both signed, so that the system can verify that the control information is from a trusted source before using it to make content-access decisions. In one embodiment, the validity of control object 608 can also be checked through verification of a secure hash included in controller object 606. Controller object 606 can also contain a hash value for each of the keys or other key data contained in the ContentKey object(s) 602 that it references, thereby rendering it relatively difficult for an attacker to tamper with the binding between the key data and the ContentKey object.

As shown in FIG. 6, in one embodiment content 612 is encrypted and is included in a content object 614. The decryption key 610 that is used is included within (or referenced by) ContentKey object 602, and the binding between the two is represented by the protector object 604. As shown in FIG. 6, unique IDs are used to facilitate the binding between content object 614 and ContentKey object 602. The rules that govern the use of key 610 to decrypt content 612 are included within control object 608, and the binding between control object 608 and ContentKey 602 is represented by controller object 606, again using unique IDs.

It will be appreciated that while FIG. 6 shows the objects that comprise a license in one preferred embodiment, the DRM systems and methods described herein are not limited to the use of this license structure. For example, without limitation, licenses could be used in which the functionality of the various objects shown in FIG. 6 are combined in a smaller number of objects, or spread out over additional objects, or broken up between objects in a different manner. Alternatively, or in addition, embodiments of the systems and methods described herein can be practiced with licenses that lack some of the functionality enabled by the license structure shown in FIG. 6, and/or that provide additional functionality. Thus it will be appreciated that any suitable mechanism for associating licenses with content can be used in accordance with the principles described herein, although in preferred embodiments the advantageous structure shown in FIG. 6 is used.

1.3. State Database

In one embodiment, the DRM engine includes, or has access to, a secure, persistent object store that can be used to provide a secure state storage mechanism. Such a facility is useful to enable control programs to be able to read and write state information that is persistent from invocation to invocation. Such a state database can be used to store state objects such as play-counts, date of first use, accumulated rendering times, and/or the like, as well as membership status, and/or any other suitable data. In some embodiments, a DRM engine executing on a first system may not have access to a local state database, and may be operable to access a remote state database, e.g., using web and/or host services. In some situations, it may be necessary for a DRM engine executing on a first system to access state information stored in a database on a remote system. For example the first system may not include a state database, or may not have the information it needs in its own state database. In some embodiments, when a DRM engine is faced with such a situation, it might access a remote state database via a services interface, and/or by using agent programs, as described in more detail below.

1.4. About Control Programs

The systems and methods described herein make use of control programs in a variety of contexts. For example, control programs contained in control objects can be used to express the rules and conditions governing the use of protect content. In addition, control programs in link objects can be used to express the rules and conditions used to determine whether the link is valid for a given purpose (e.g., a node reachability analysis). Such control programs are sometimes referred to herein as link constraints. Yet another context in which control programs may be used is in agent or delegate objects, were the control code is used to perform an action on behalf of another entity (in the case of agent control programs) or on behalf of another control (in the case of delegate control programs).

In one embodiment, control programs are executed or interpreted by a virtual machine hosted by a DRM engine, as opposed to being executed directly by a physical processor. It will be appreciated, however, that a physical processor or other hardware logic could be readily constructed to execute control programs. In one embodiment, the control programs are in byte-code format, which facilitates interoperability across platforms.

In a preferred embodiment, control programs are written in assembly language and converted into byte code by an assembler program. In other embodiments, templates and/or high-level rights expression languages could be used to provide the initial expression of rights, rules, and/or conditions, and a compiler could be used to convert the high-level expression into byte code for execution by an embodiment of the DRM engine described herein. For example, rights expressions written in a proprietary DRM format could, with an appropriate compiler, be converted or translated into a functionally equivalent byte code expression for execution on an embodiment of the DRM engine described herein, thus enabling a protected piece of content to be used, in accordance with the conditions specified by the content provider, on systems that understand the proprietary DRM format, as well as systems that included a DRM engine such as that described herein. It should also be appreciated that the digital rights management engine systems and methods described herein are not limited to the use of byte code rights expressions, interpreted by a virtual machine. Instead, in some embodiments, rights can be expressed in any suitable manner (e.g., using a high-level rights expression language (REL), a template, etc.), and the authorization graph and/or other techniques described herein performed using an application program designed to recognize and evaluate such rights expressions.

1.4.1. Conditions

As previously indicated, control programs typically express one or more conditions that must be satisfied in order for a request to use a piece of content to be granted, for a link to be deemed valid, and/or the like. Any suitable conditions can be used, depending on the requirements of the content provider or system architect, and/or the functionality provided by the system.

In preferred embodiments, the virtual machine used by the DRM engine supports arbitrarily complex programs that are capable of testing for conditions such as some or all of the following:

Time-based conditions: Comparing a client time value to a value or values specified in the control program.

Targeting a particular node: Checking whether a certain node is reachable from another node. This concept provides support for such models as domains, subscriptions, memberships, and the like.

Testing if certain node attributes match specified values: Checking any of a node's attributes, such as, for example, whether the rendering capabilities of a device associated with a node meet fidelity requirements.

Testing if the security-related metadata at the client is up-to-date: Checking, for example, whether the client has an acceptable version of the client software and an accurate measure of time. In some embodiment, such a check might rely, for example, on assertions in one or more certificates from a data certification service.

State-based conditions: Checking information in the state database. For example, the state database may contain information generated as a result of previous execution of control programs, and/or tokens attesting to ownership of subscriptions, membership, and/or the like, thereby enabling evaluation of conditions involving counters (e.g., number of plays, number of exports, elapsed time limits, etc.) and other information regarding recorded events and conditions.

Environmental characteristics: For example, checking whether hardware and/or software in the host environment has certain characteristics, such as the ability to recognize and enforce obligations; checking for the presence or absence of certain software or hardware components, such as a secure output channel; checking proximity information, such as the proximity of a requesting device to another device or application; checking the characteristics of, and/or data stored on, remote systems using network services and/or agents; and/or the like.

Using these or any other suitable conditions, a control object can express rules that govern how content can be rendered, transferred, exported, and/or the like. It will be appreciated that the above list of conditions is illustrative in nature, and that any suitable conditions could be defined and used by, e.g., implementing a system call for use in testing for the desired condition. For example, without limitation, if it were desired to require that a device be located on a particular sub-network, a system call could be defined (e.g., GetIPConfig) that would be operable to return the host device's IPConfig information (or a remote device's IPConfig information, if the system call were run on a remote device using an agent), which could be used by a control program to test for whether the device was located on the prescribed sub-network.

1.4.2. Agents

Preferred embodiments of the DRM engine-related systems and methods described herein provide support for independent objects that carry control programs. Such "agents" can be distributed to a DRM engine running on a remote system in order to accomplish specified functions, such as writing into the remote DRM engine's secure state store. For example, an agent could be sent as a consequence of contacting a remote service, or executing a remote control program. An agent can also be used to effect a content move operation, to initialize a counter, to deregister a node, and/or the like. As yet another example, an agent could be used to perform a reachability analysis from a remote node to another node. Such an agent could, e.g., be useful in enforcing a policy that prohibited a device registered to a first user from being registered to a second user. If the second user requested registration, an agent could be sent to the device by the second user, or a registration service acting on his or her behalf, to determine if the device was already registered to the first user, in which case the second user's registration request would be denied.

Figure 7A:
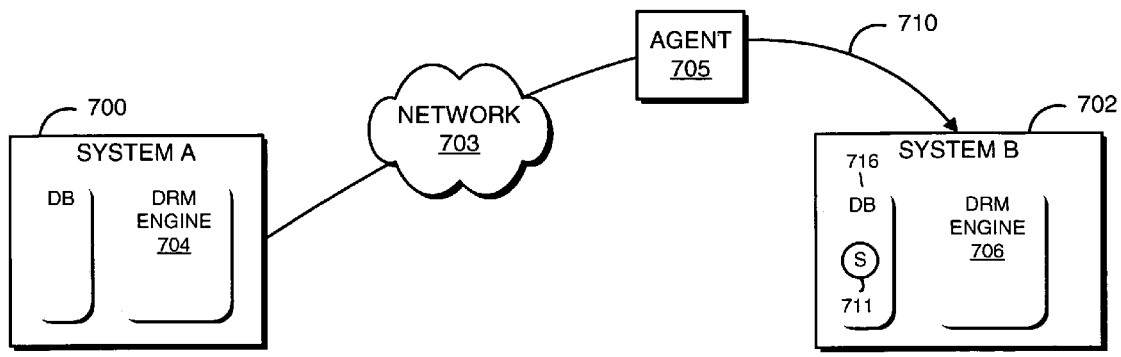
FIGS. 7A and 7B illustrate the use of agents in one embodiment.
Figure 7B:
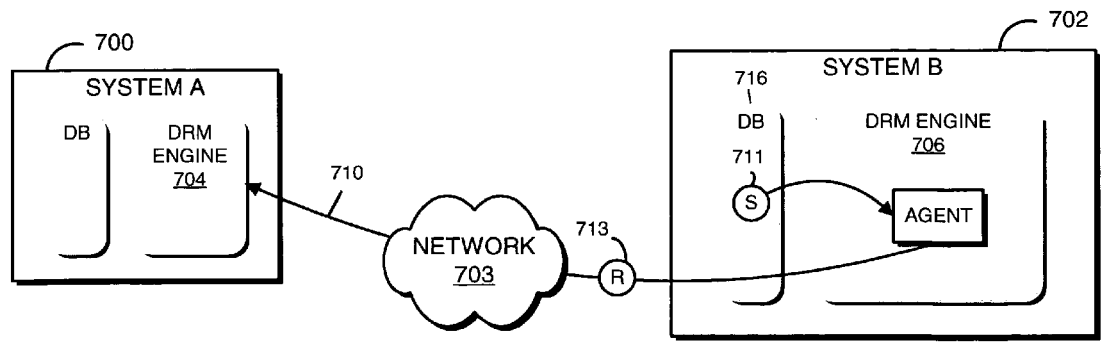

FIGS. 7A and 7B illustrate the use of agents in one embodiment. As shown in FIG. 7A, assume that two entities—system A 700 and system B 702—wish to communicate with each other over a computer network 703, and that a DRM system is being used that is capable of describing and enforcing rules for certain operations, such as accessing protected content, or creating DRM objects that can be used to represent memberships, registration status, and/or the like. In some cases, the rule(s) will be evaluated on system A 700, but will require information that depends on the state of system B 702. That information needs to be trusted by the DRM system 704 that is enforcing the rule(s) on system A 700.

For example, the DRM system 704 on system A 700 may be evaluating/enforcing a rule for performing a remote rendering of content from system A 700 to system B 702, and the rule might indicate that such an operation is permitted only if system B 702 is part of a certain group of devices, where the membership in that group is asserted by the presence of a state object 711 in a secure state database 716 accessible on system B 702.

A method used in a preferred embodiment to handle such situations makes use of agents. For example, if system A 700 needs information from system B 702, system A 700 prepares an agent 705, which, in one embodiment, is a control program (e.g., a sequence of instructions that can be executed by a DRM engine) that is sent from system A 700 to system B 702. In one embodiment, system A 700 sends agent code 705 to system B 702 over an authenticated communication channel 720 so that system A 700 can be confident that it is indeed on system B 702 that agent 705 will run. In some embodiments, along with agent code 705, system A 700 may also communicates to system B 702 one or more parameters that may be used by agent code 705 to perform its work.

As shown in FIG. 7B, system B 702 receives agent 705 and any associated agent parameters, and runs the agent code 705. When agent 705 is run on system B 702, it accesses system B's state database 716, retrieves state information 711 and/or performs one or more computations therewith, and sends the results 713 back to system A 700, preferably over authenticated communication channel 710. At this point, system A 700 has the information it needs to continue with its evaluation.

1.4.3. Link Constraints

In one embodiment, the set of routines that represent the rules that govern the performance of a certain operation (such as "play") on a content item is called an "action control". The set of routines that represent validity constraints on a link object is called a "link constraint". Like action controls, in preferred embodiments link constraints can express any suitable combination of conditions. Also like action controls, link constraints can be evaluated locally and/or remotely using a services interface or an agent.

1.4.4. Obligations and Callbacks

In one embodiment, certain actions, when granted, require further participation from the host application. Obligations represent operations that need to be performed by the host application upon or after the use of the content key it is requesting. Callbacks represent calls to one or more of the control program's routines that need to be performed by the host application upon or after the use of the content key it is requesting. Examples of obligations include, without limitation, a requirement that certain outputs and/or controls be turned off while content is being rendered (e.g., to prevent writing the content to an unprotected output or to prevent fast-forwarding through certain important segments of the content); a requirement that information regarding use of the content be recorded (e.g., metering or audit information) and/or sent to a remote site (e.g., a clearinghouse, service provider, or the like); a requirement that an agent program be executed locally or remotely; and/or the like. Examples of callbacks include, without limitation a requirement that the host call the control program back at a certain absolute time, after a certain elapsed time (e.g., an elapsed time of content usage), after occurrence of a certain event (e.g., the completion of a trial content-rendering period), when the content has stopped being used, and/or the like. For example, a callback after a certain elapsed time could be used to increment or decrement budgets, playcounts, and the like (e.g., only debiting the users budget if they use a piece of content for at least a certain amount of time), thus protecting the user from having his or her account debited if he or she accidently presses the play button but immediately presses stop.

In one embodiment, there are different types of obligations and callbacks, and if an application encounters any critical obligation or callback that it does not support, or does not understand (for example because the obligation type may have been defined after the application was implemented), the application is required to refuse to continue the action for which this obligation or callback parameter was returned.

1.4.5. Example

Figure 8:
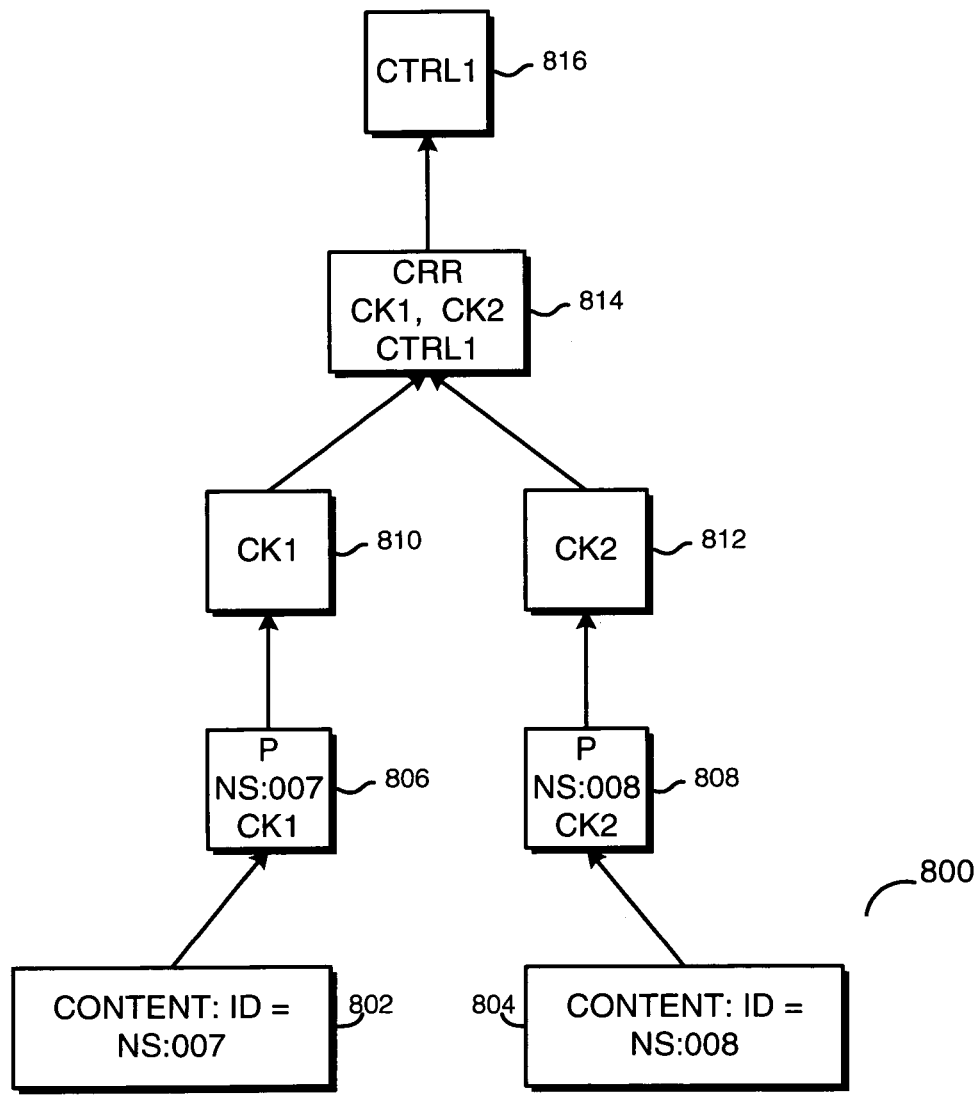
FIG. 8 shows an example of a DRM license.

FIGS. 8-12 show an example of how an illustrative embodiment of a DRM engine might control the use of a piece of content. Referring to FIG. 8, assume that the DRM engine has received a request to play a group 800 of content items 802, 804. For example, content items 802, 804 might comprise different sub-parts of a multimedia presentation, different tracks of an album, different pieces of content obtained from a subscription service, email attachments, or the like. The request may have been received by the DRM engine from a host application, which, in turn, received the request from a user of the computing device upon which the host application was running. The request from the host application will typically identify the requested action, the piece or pieces of content upon which the action is to be taken, and the license(s) that govern the content. DRM engine follows the process illustrated in FIG. 5 to determine whether the request should be granted.

Figure 9:
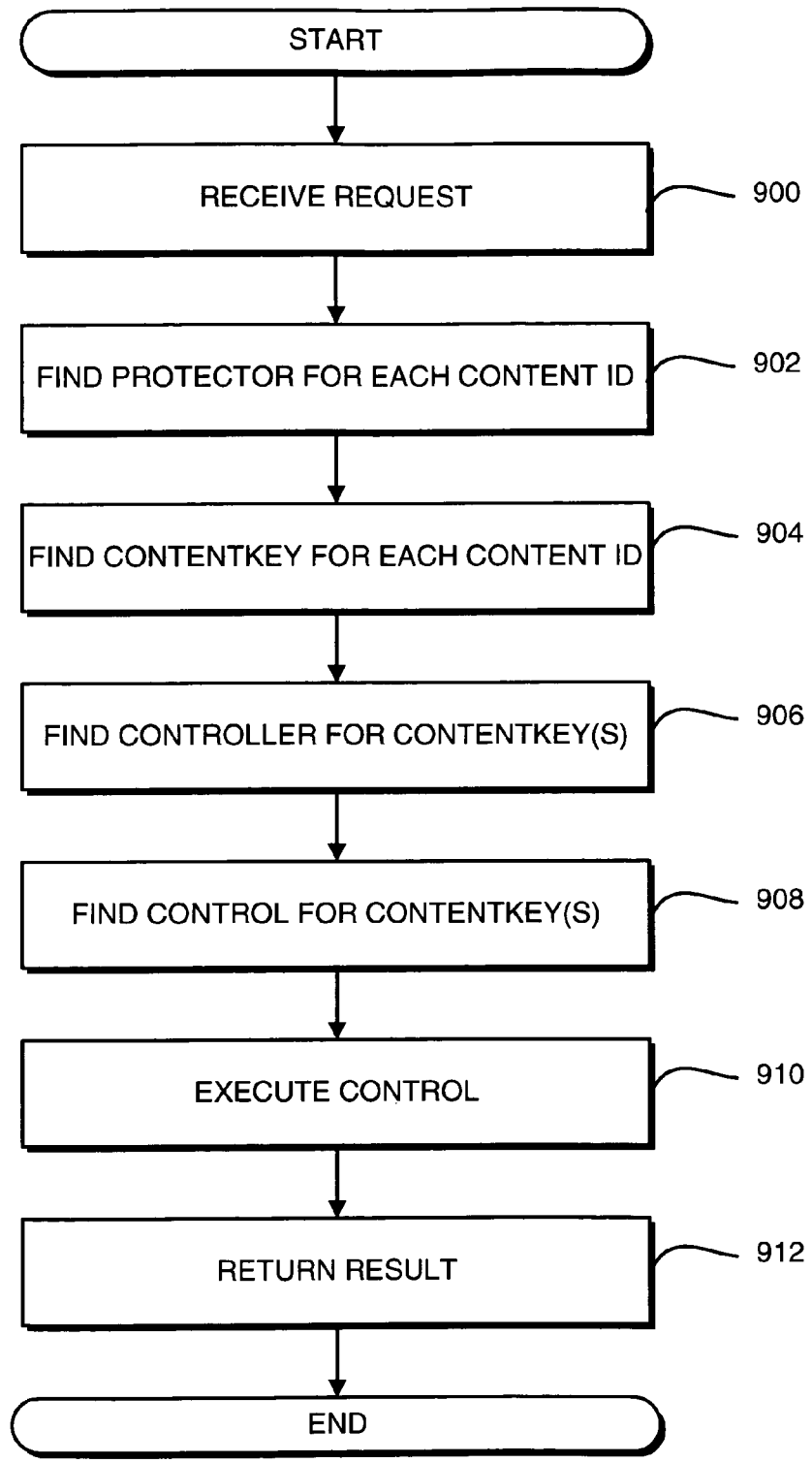
FIG. 9 is a more detailed example of how a DRM engine might determine whether a requested action is authorized.

FIGS. 8 and 9 provide a more detailed non-limiting example of the process shown in FIG. 5. Referring to FIG. 9, upon receiving the request to access content items 802 and 804 (block 900), the DRM engine examines the license(s) identified in the request, or otherwise in its possession, to see if a valid license exists. For example, the DRM engine might first identify the protector objects 806 and 808 that contain the unique identifiers of content items 802 and 804 (i.e., NS:007 and NS:008, respectively)(block 902 in FIG. 9). Next, the DRM engine locates the ContentKey objects 810 and 812 identified in protector objects 806 and 808 (block 904 in FIG. 9), which, in turn, enables the DRM engine to identify controller 814 which references both ContentKey objects 810 and 812 (block 906 in FIG. 9). In a preferred embodiment, controller 814 is signed, and DRM engine verifies its signature (or asks host services to verify it). The DRM engine uses controller 814 to identify the control object 816 that governs use of ContentKey objects 810 and 812 (and, thus, content items 802 and 804)(block 908 in FIG. 9). In a preferred embodiment, the DRM engine verifies the integrity of control object 816 (e.g., by computing a digest of control object 816 and comparing it to a digest contained in controller 814. If the integrity verification succeeds, the DRM engine executes the control code contained in control object 816 (block 910), and returns the result (block 912) to the host application, which uses it to grant or deny the user's request to access the content. The result of the control code might also optionally specify one or more obligations or callbacks which the host application will need to fulfill.

Figure 10:
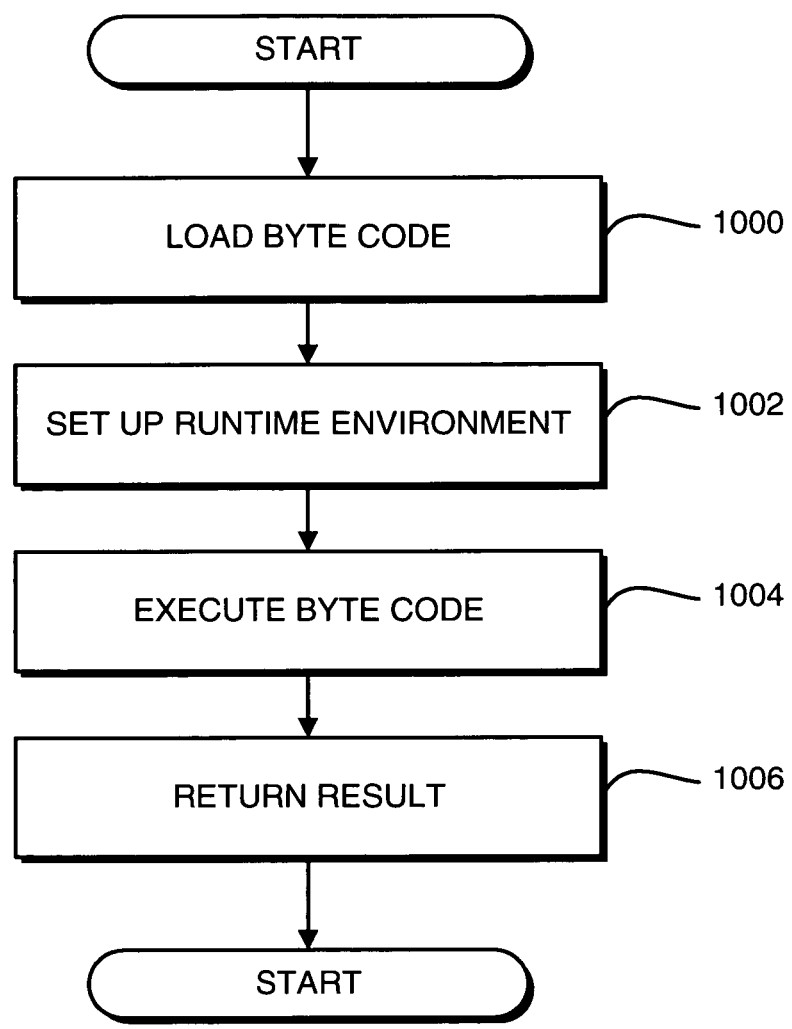
FIG. 10 is a more detailed example of how a DRM engine executes a control program in one embodiment object.

FIG. 10 is a more detailed example of how a DRM engine might perform the actions specified in blocks 910 and 912 of FIG. 9 (i.e., executing a control program and returning the result). As shown in FIG. 10, upon identifying the relevant control object, the DRM engine loads the byte code contained in the control object into a virtual machine that is preferably hosted by the DRM engine (block 1000). The DRM engine and/or the virtual machine will also typically initialize the virtual machine's runtime environment (block 1002). For example, the virtual machine might allocate the memory needed for execution of the control program, initialize registers and other environment variables, and/or obtain information about the host environment in which the virtual machine is operating (e.g., by making a System.Host.GetObject call, as described below). It will be appreciated that in some embodiments blocks 1000 and 1002 could effectively be combined or interleaved, and/or their order reversed. As shown in FIG. 10, the virtual machine next executes the control program's byte code (block 1004). As described elsewhere herein, this may involve making calls to other virtual machine code, retrieving state information from secure storage, and/or the like. When the control program has finished executing, it provides an output (e.g., in a preferred embodiment, an ExtendedStatusBlock) that may, for example, be used by the calling application to determine whether a request has been granted, and, if so, whether any obligations or callbacks are associated therewith; whether a request has been denied, and, if so, the reason for denial; or whether any errors occurred during execution (block 1006).

As previously indicated, the control code contained in control object 816 specifies the conditions or other requirements that must be satisfied in order to make the requested use of content items 802 and 804. The systems and methods described herein enable the specification of arbitrarily complex sets of conditions; however, for purposes of this example, assume that the control program is designed to require that, in order to play content items 802 and 804, (a) a given user's node must be reachable from the device on which the request to play the content was made, and (b) the current date must be after a specified date.

Figure 11:
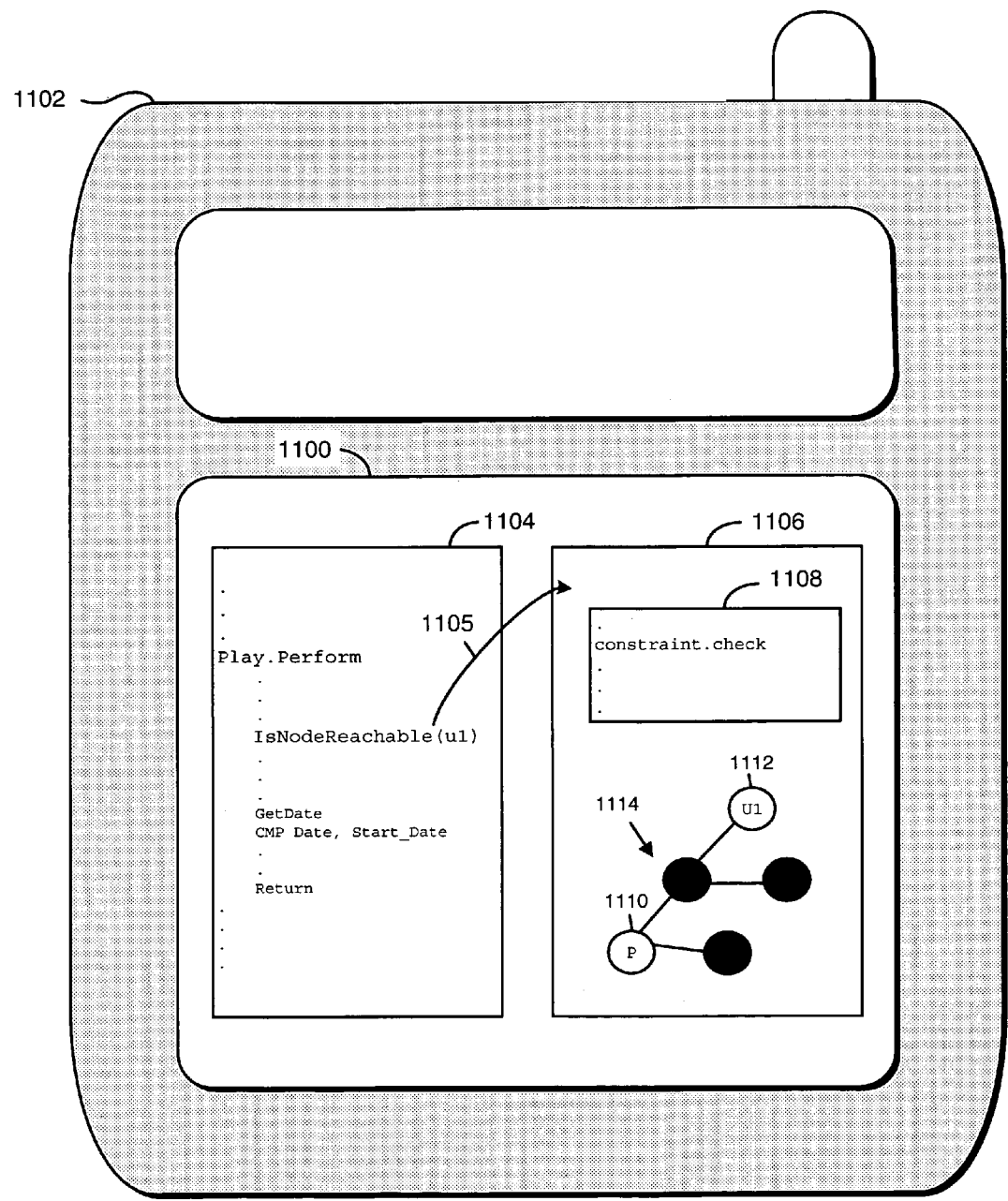
FIG. 11 shows an illustrative embodiment DRM engine running on a device.
Figure 12:
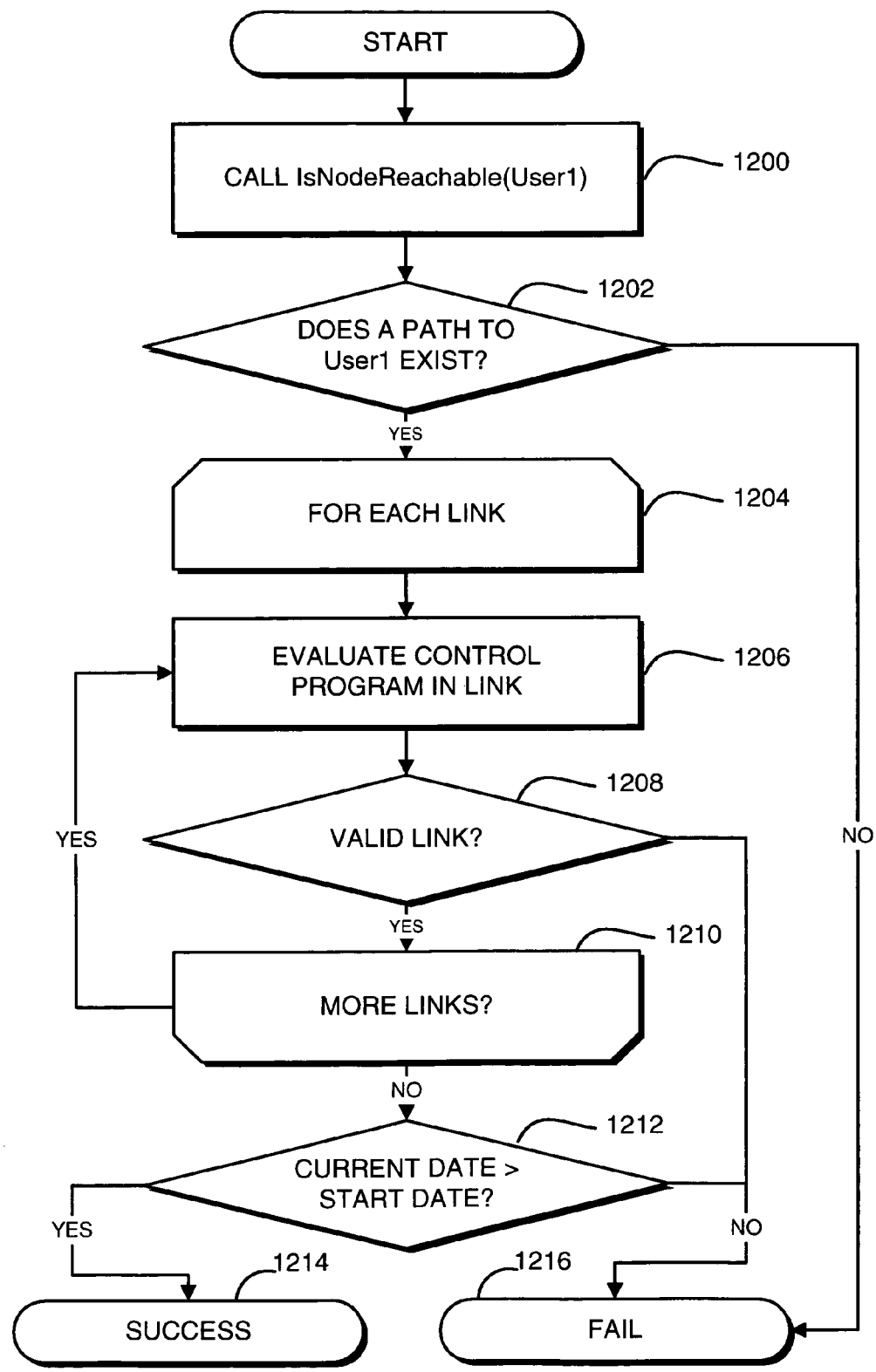
FIG. 12 is a flowchart illustrating the steps involved in executing a control program in one embodiment.

FIG. 11 shows how an illustrative embodiment of a DRM engine 1100 running on a device 1102 might execute the example control program described above, and FIG. 12 is a flowchart of the steps involved in the execution process. As shown in FIG. 11, DRM engine 1100 creates a virtual machine execution context (e.g., by calling System.Host.SpawnVm) 1104 and loads the control program. Virtual machine 1104 begins execution of the control program at the entry point specified by DRM engine 1100 (e.g., at the location of the Control.Actions.Play.perform routine). In this example, the control program needs to determine whether a given node is reachable from the personality node of the device 1102 on which the DRM engine 1100 is running. To make this determination, the control program makes a call 1105 to a link manager service 1106 provided by the DRM engine 1100, specifying the node to which linkage is required (block 1200 in FIG. 12). Link manager 1106 is responsible for evaluating link objects to determine if one node is reachable from another. To do this efficiently, link manager 1106 may pre-compute whether a path exists from the personality node 1110 of device 1102 to the various nodes 1114 specified in any link objects that device 1102 possesses. That is, link manager 1106 may, simply by checking the "to" and "from" fields of the links to which it as access, determine which nodes are potentially reachable from the personality node 1110 of device 1102. When link manager 1106 receives the call 1105 from virtual machine 1104, it determines whether the specified node 1112 is reachable by first determining if a path exists from personality node 1110 to the specified node 1112 (e.g., by checking for the node's ID in the list of nodes that it previously determined to be theoretically reachable) (block 1202 in FIG. 12). If a path exists, link manager 1106 evaluates any control programs contained in the links to see if the links are valid (blocks 1204-1210 in FIG. 12). To evaluate the control programs in the link objects (block 1206 in FIG. 12), link manager 1106 may use its own virtual machine 1108, on which it executes the control programs included in the link objects. Link manager 1106 returns the results of its determination (i.e., whether the given node is reachable) to the control program executing in virtual machine 1104, where it is used in the overall evaluation of whether the request to play the piece of content will be granted. Upon determining that the specified node 1112 is reachable from the personality node 1110 of device 1102, the control program executing on virtual machine 1104 next determines if the specified date restriction is met (block 1212 in FIG. 12). If the date restriction has been met (i.e., a "yes" exit from block 1212), then the control program returns a result indicating that the specified conditions have been met (block 1214 in FIG. 12); otherwise, control program returns a result indicating that the specified conditions were not satisfied (block 1216 in FIG. 12).

An example of a control program such as that described above is shown below:

```
; Sample Control
;
; This Control checks that a user node is reachable
; and that the date is after a specific start date
; and before a specific end date
; The values are retrieved from attributes in the control
; ========================
; constants
; ========================
```

```
    .equ DEBUG_PRINT_SYSCALL,              1
    .equ FIND_SYSCALL_BY_NAME,             2
    .equ SYSTEM_HOST_GET_OBJECT_SYSCALL,   3
    .equ SUCCESS,                          0
    .equ FAILURE,                         -1
; ========================
; data
; ========================
.data
ControlTargetNodeIdAttributePath:
    .string "Octopus/Control/Attributes/TargetNodeId"
ControlStartDateAttributePath:
    .string "Octopus/Control/Attributes/StartDate"
ControlEndDateAttributePath:
    .string "Octopus/Control/Attributes/EndDate"
TargetNodeId:
    .zeros 256
StartDate:
    .long 0
EndDate:
    .long -1
IsNodeReachableFunctionName:
    .string "Octopus.Links.IsNodeReachable"
IsNodeReachableFunctionNumber:
    .long   0
GetTimeStampFunctionName:
    .string "System.Host.GetLocalTime"
GetTimeStampFunctionNumber:
    .long   0
; ========================
; code
; ========================
.code
Global.OnLoad:
; load global functions
    ; get the syscall number for Octopus.Links.IsNodeReachable
    PUSH @IsNodeReachableFunctionName
    PUSH FIND_SYSCALL_BY_NAME
    CALL
    DUP
    PUSH @IsNodeReachableFunctionNumber
    POKE
    BRN OnLoad_Fail
    ; get the syscall number for System.Host.GetTimeStamp
    PUSH @GetTimeStampFunctionName
    PUSH FIND_SYSCALL_BY_NAME
    CALL
    DUP
    PUSH @GetTimeStampFunctionNumber
    POKE
    BRN OnLoad_Fail
    ; ok
    PUSH 0
    RET
OnLoad_Fail:
    PUSH FAILURE
    RET
Control.Actions.Play.Init:
    ; get the values from the attributes
    ; get the target node (guaranteed to be there)
    PUSH 256                                 ; ReturnBufferSize (256 bytes)
    PUSH @TargetNodeId                       ; Return value
    PUSH @ControlTargetNodeIdAttributePath   ; Name
    PUSH 0                                   ; Parent = root container
    PUSH SYSTEM_HOST_GET_OBJECT_SYSCALL
    CALL
    ; get the start date
    PUSH 4                                   ; ReturnBufferSize (4 bytes)
    PUSH @StartDate                          ; Return value
    PUSH @ControlStartDateAttributePath      ; Name
    PUSH 0                                   ; Parent = root container
    PUSH SYSTEM_HOST_GET_OBJECT_SYSCALL
    CALL
    ; get the end date
    PUSH 4                                   ; ReturnBufferSize (4 bytes)
    PUSH @EndDate                            ; Return value
    PUSH @ControlEndDateAttributePath        ; Name
    PUSH 0                                   ; Parent = root container
    PUSH SYSTEM_HOST_GET_OBJECT_SYSCALL
```

```
        CALL
        ; success
        PUSH 0
        PUSH SUCCESS
        STOP
Control.Actions.Play.Perform:
Control.Actions.Play.Check:
        ; check that the target node is reachable
        PUSH @TargetNodeId
        PUSH @IsNodeReachableFunctionNumber
        PEEK
        CALL
        BRN Play__Fail
        ; put the current time on the stack
        PUSH @GetTimeStampFunctionNumber
        PEEK
        CALL
        ; check that the date is before the end date
        DUP     ; current time
        PUSH @EndDate
        PEEK
        SWAP
        CMP
        BRN Play__Fail
        ; check that the date is after the start date
        ; the current time is on the stack
        PUSH @StartDate
        PEEK
        CMP
        BRN Play__Fail
        ; success
        PUSH 0
        PUSH SUCCESS
        STOP
Play__Fail:
        PUSH 0
        PUSH FAILURE
        STOP
.export Global.OnLoad
.export Control.Actions.Play.Init
.export Control.Actions.Play.Check
.export Control.Actions.Play.Perform
```

An additional example of a control program is included in Appendix E.

3. Content Consumption and Packaging Applications

The following is a more detailed description of illustrative embodiments of an application that consumes DRM-protected content (e.g., a media player, a word processor, an email client, etc., such as applications 303a, 303c, and 303d in FIG. 3), and a packaging application, such as application 303b, that packages content targeted to consuming applications.

1.5. Content-Consuming Application Architecture

A content-consuming application will typically focus on accessing protected content, or could be part of a general-purpose application that also performs other functions, such as packaging content. In various embodiments, a content-consuming application might perform some or all of the following:

- Provide an interface by which a user can request access to protected content objects and receive information about the content or error information;
- Manage interaction with the file system;
- Recognize the format of protected content objects;
- Request a DRM engine to evaluate licenses for pieces of content to see if permission to access the content can be granted;
- Verify digital signatures and deal with other general-purpose cryptographic functions that the DRM engine needs performed;
- Request the DRM engine to provide the keys needed to decrypt protected content; and/or
- Decrypt the protected content and interact with media rendering services to render the content.

In one embodiment, a DRM client engine evaluates the licenses associated with content, confirms or denies permission to use the content, and provides decryption keys to the content-consuming application. The DRM client engine may also issue one or more obligations and/or callbacks to the content-consuming application, requiring the application to perform certain actions as a consequence of having been given access to the content.

Figure 13:
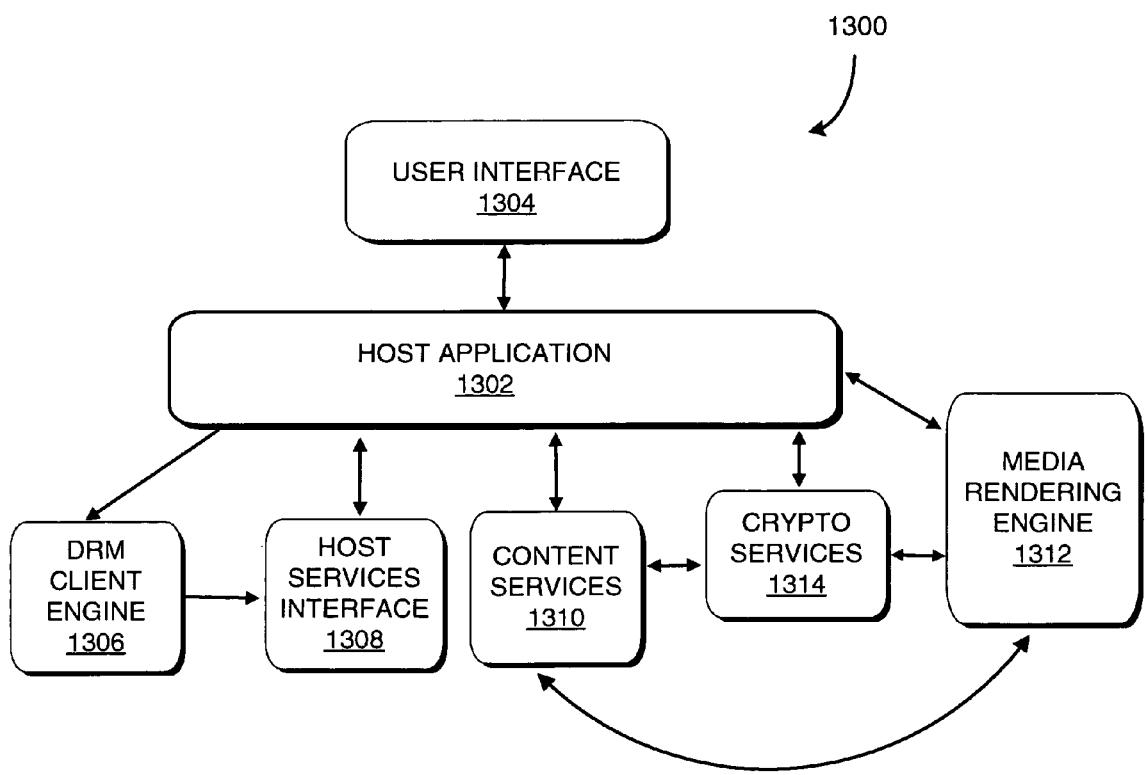
FIG. 13 shows the elements that make up a content consuming client application in one embodiment.

FIG. 13 shows the elements that make up a content-consuming client application 1300 in one embodiment. As shown in FIG. 13, host application 1302 is the logical central point of the client. It is responsible for driving the interaction pattern between the other modules, as well as interaction with the user through user interface 1304. The host application 1302 provides a set of services to DRM engine 1306 via a host services interface 1308. The host services interface 1308 allows the DRM engine 1306 to get access to data managed by the host application 1302, as well as certain library functions implemented by the host application 1302. In one embodiment, the host services interface 1308 it is the only outbound interface for the DRM engine 1306.

In one embodiment, the DRM engine 1306 does not interact directly with the multimedia content managed by the host application 1302. The host application 1302 logically interacts with content services 1310 for accessing the multimedia content, and passes on to the DRM engine 1306 only the portions of data that must be processed by the engine. Other interactions with the content are performed by the media rendering engine 1312. For example, in one embodiment content services 1310 are responsible for acquiring content from media servers, and storing and managing the content on the client's persistent storage, while media rendering engine 1312 is the subsystem responsible for accessing the multimedia content and rendering it (e.g., on a video and/or audio output). In one embodiment, the media rendering engine 1312 receives some information from DRM engine 1306 (such as content decryption keys), but in one embodiment the DRM engine 1306 does not interact with media rendering engine 1312 directly, but rather through the host application 1302.

Some of the information needed by the DRM engine 1306 might be available in-band with the multimedia content, and can be acquired and managed through the content services 1310, but some of this information may need to be obtained via means of other services such as a personalization service or a membership service (not shown).

In the embodiment shown in FIG. 13, cryptographic operations (e.g., encryption, signature verification, etc.) are handled by crypto services block 1314. In one embodiment, the DRM engine 1306 does not interact directly with the crypto services block 1314, but instead interacts indirectly via the host 1302 (using host services interface 1308), which forward its requests. Crypto services 1314 may also be used by, e.g., the media rendering engine 1312 in order to perform content decryption It will be appreciated that FIG. 13 is provided for purposes of illustration, and that in other embodiments the various components shown in FIG. 13 could be rearranged, merged, separated, eliminated, and/or new components could be added. For example, without limitation, the logical division of functionality between the DRM engine and the host application in FIG. 13 is simply illustrative of one possible embodiment, and in practical implementations variations can be made. For example, the DRM engine could be integrated wholly or partially with the host application. Thus, it will be appreciated that any suitable division of functionality between host application and DRM engine can be used.

1.6. Packager Architecture

The following provides an example of the functions that a packaging engine might perform for a host application that packages electronic content. In practice, a packaging application may focus on packaging specifically, or could be part of a general-purpose application operating at a user system that also accesses protected content (either packaged locally or elsewhere, e.g., on a network).

Figure 14:
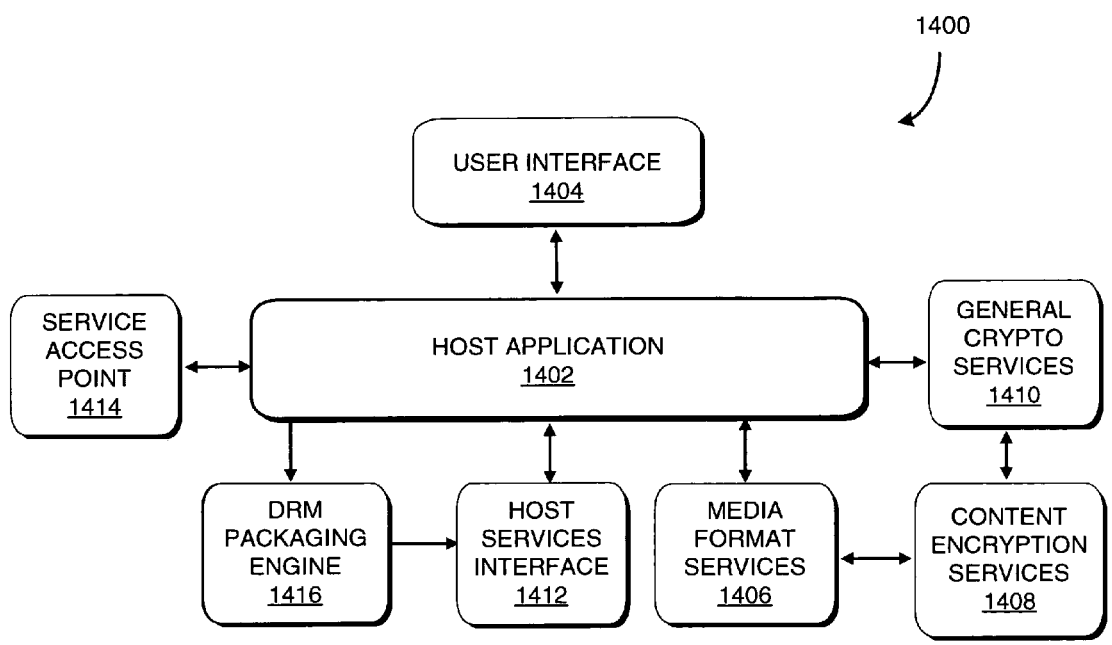
FIG. 14 shows the elements that make up a content packaging application in one embodiment.

In various embodiments, a packaging host application might perform some or all of the following:

Provide a user interface by which content and license information can be specified;
Encrypt content;
Create the DRM objects that make up a license; and/or
Create a content object that contains or references the content and contains or references a license FIG. 14 shows the elements that make up a packaging application 1400 in one embodiment. DRM packaging engine 1416 is responsible for packaging licenses such as those described herein (e.g., licenses comprising DRM objects such as controls, controllers, protectors, and the like). In some embodiments, DRM packaging engine 1416 may also associate metadata a license to explain, in human-readable form, what the license does.

In one embodiment, a host application 1402 provides a user interface 1404 and is responsible for obtaining information such as content references and the action(s) the user (typically a content owner or provider) wants to perform (e.g., to whom to bind content, what content-usage conditions to include in a license, etc). User interface 1404 can also display information about the packaging process, such as the text of the license issued and, if a failure occurs, the reason for the failure. In some embodiments, some information needed by the host application 1402 may require the use of other services, such as authentication or authorization services, and/or membership through a Service Access Point (SAP). Thus, in some embodiments the packaging application 1400 and/or the host application 1402 may need to implement some or all of the following:

Media format services 1406: In one embodiment, this element is responsible for managing media format operations such as transcoding and packaging. It is responsible as well for content encryption, which is achieved via content encryption services module 1408.

General-purpose cryptographic services 1410: In one embodiment, this element is responsible for issuing/verifying signatures, as well as encrypting/decrypting some data. Requests for such operations could be issued by the Service Access Point 1414 or by the DRM packaging engine 1416 via host services interface 1412.

Content encryption services 1408: In one embodiment, this module is logically separated from the general-purpose cryptographic services 1410 because it does not know about the application. It is driven by the media format services at content packaging time with a set of keys previously issued by the DRM packaging engine 1416.

4. Key Derivation

The following describes a key derivation system that fits naturally with preferred embodiments of the DRM engine and system architecture described herein, and/or can be used in other contexts. Some of the examples in the following section are taken from a reference implementation of a preferred embodiment of this key derivation system known as "Scuba". Additional embodiments are described in the '551 application.

Figure 15:
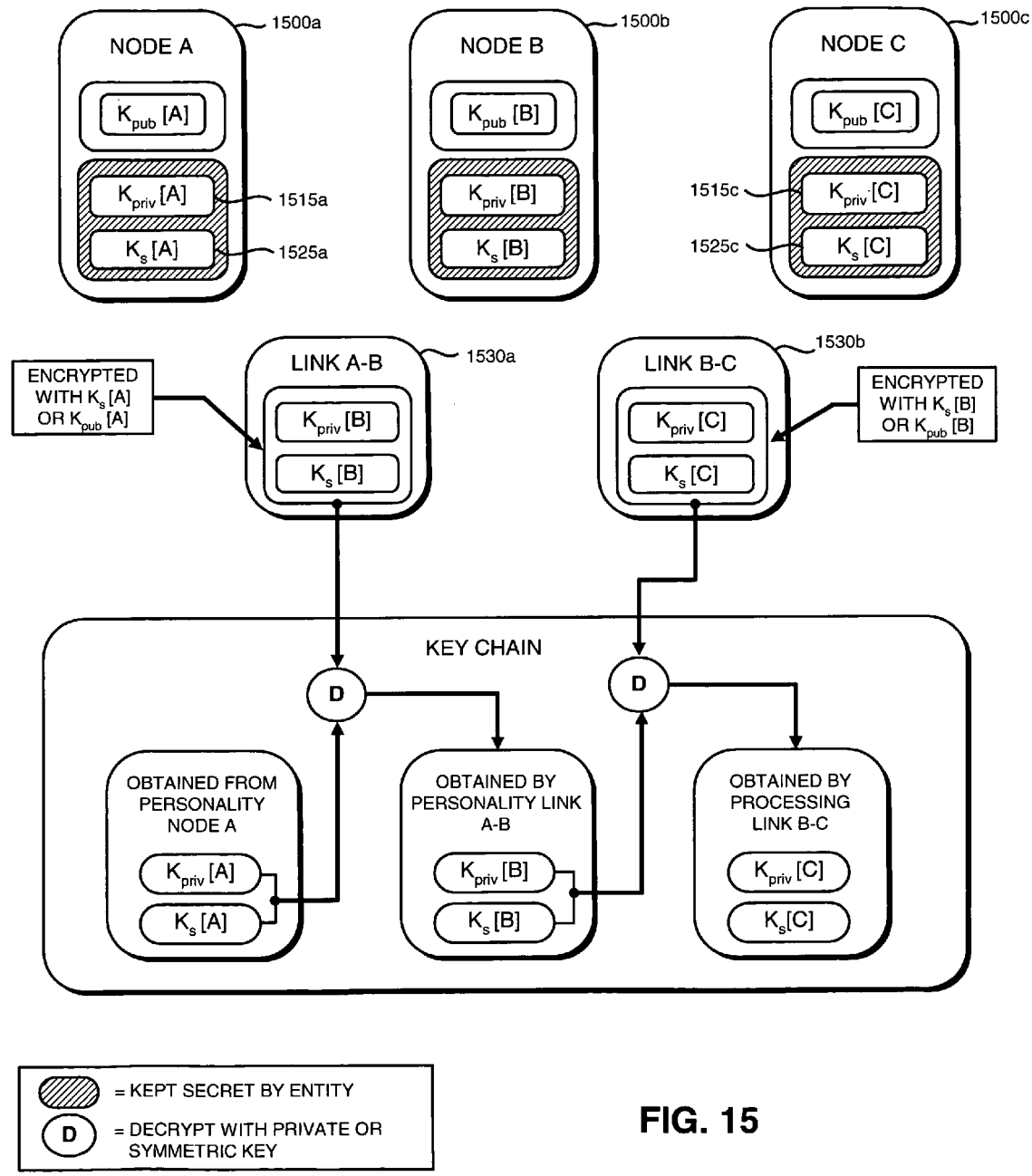
FIG. 15 shows a key derivation mechanism in accordance with one embodiment.

As shown in FIG. 15, in some embodiments link objects 1530a, 1530b are used to distribute keys, in addition to their primary purpose of establishing relationships between nodes 1500a, 1500b, 1500c. As described above, a control object can contain a control program that can be used to decide if a request to perform an action should be granted or not. To do this, the control program may check whether a specific node is reachable via a chain of links. The key derivation techniques described herein take advantage of the existence of this chain of links to facilitate the distribution of a key, such that the key can be made available to the DRM engine that is executing the control program.

In one illustrative embodiment, each node object 1500a, 1500b, 1500c in a given deployment that uses the optional key distribution system has a set of keys that are used to encrypt content keys and other nodes' keys. Link objects 1530a, 1530b created for use in the same deployment contain some cryptographic data as a payload that allows key information do be derived when chains of links are processed by a DRM engine.

With nodes and links carrying keys in this manner, given a chain of links 1530a, 1530b from a node A 1500a to a node C 1500C, an entity (e.g., the DRM engine of a client host application) that has access to the secret sharing keys of node A 1515a, 1525a, also has access to the secret sharing keys of node C 1515c, 1525c. Having access to node C's secret sharing keys gives the entity access to any content key encrypted with those keys.

1.7. Nodes, Entities, and Keys

1.7.1. Entities

In one embodiment of a DRM system, nodes are data objects, not active participants in the system. Active participants, in this context, are called entities. Examples of entities are media players, devices, a subscription service, content packagers, and the like. Entities typically have nodes associated with them. An entity that consumes content uses a DRM engine and manages at least one node object that constitutes its personality. In one embodiment, an entity is assumed to have access to all the data of the node objects it manages, including all the private information of those objects.

1.7.2. Nodes

Node objects that participate in an illustrative embodiment of the key derivation system contain keys as part of their data. In one embodiment, nodes may contain two general types of keys: sharing keys and confidentiality keys. The following sections list the different key types that can be used in various embodiments. It will be appreciated, however, that a specific deployment may use only a subset of these keys. For example, a system could be configured to work only with key pairs, omitting the use of secret symmetric keys. Or a system could be deployed without provisioning nodes with confidentiality keys if it only needed to use the sharing keys.

1.7.2.1. Sharing Keys

Sharing keys are public/private key pairs and/or symmetric keys that are shared by a node N and all the nodes Px for which there exists a link from Px to N that contains key derivation extensions.

Sharing Public Key: Kpub-share[N] This is the public part of a pair of public/private keys for the public key cipher. This key typically comes with a certificate so that its credentials can be verified by entities that want to cryptographically bind confidential information to it.

Sharing Private Key: Kpriv-share[N] This is the private part of the public/private key pair. The entity that manages the node is responsible for ensuring that this private key is kept secret. For that reason, this private key will generally be stored and transported separately from the rest of the node information. This private key can be shared downstream with other nodes through the key derivation extensions of links.

Sharing Symmetric Key: Ks-share[N] This is a key that is used with a symmetric cipher. As with the private key, this key is confidential, and the entity that manages the node is responsible for keeping it secret. This secret key can be shared downstream with other nodes through the key derivation extensions of links.

1.7.2.2. Confidentiality Keys

Confidentiality keys are key pairs and/or symmetric keys that are only known to the entity that manages the node to which they belong. The difference between these keys and the sharing keys described above is that they will not be shared with other nodes through the key derivation extensions in links.

Confidentiality Public Key: Kpub-conf[N] This is the public part of a pair of public/private keys for the public key cipher. This key typically comes with a certificate so that its credentials can be verified by entities that want to cryptographically bind confidential information to it.

Confidentiality Private Key: Kpriv-conf[N] This is the private part of the public/private key pair. The entity that manages the node is responsible for ensuring that this private key is kept secret. For that reason, this private key will generally be stored and transported separately from the rest of the node information.

Confidentiality Symmetric Key: Ks-conf[N] This is a key that is used with a symmetric cipher. As with the confidentiality private key, this key is kept secret.

1.8. Cryptographic Elements

Preferred embodiments of the key derivation and distribution systems described herein can be implemented using a variety of different cryptographic algorithms, and are not restricted to any specific choice of cryptographic algorithm. Nevertheless, for a given deployment or profile, all participating entities will generally need to agree on a set of supported algorithms (where the term profile will generally refer to the specification of a set of actual technologies used in a particular implementation (e.g., an RSA for key derivation; XML for encoding objects; MP4 for the file format, etc.) and/or other representation of the semantic context that exists when objects are defined in a practical deployment).

In one embodiment, deployments include support for at least one public key cipher (such as RSA) and one symmetric key cipher (such as AES).

The following notation will be used when referring to cryptographic functions:

Ep(Kpub[N], M) means "the message, M, encrypted with the public key, Kpub, of node, N, using a public key cipher"

Dp(Kpriv[N], M) means "the message, M, decrypted with the private key, Kpriv, of node, N, using a public key cipher"

Es(Ks[N], M) means "the message, M, encrypted with the symmetric key, Ks, of node, N, using a symmetric key cipher"

Ds(Ks[N], M) means "the message, M, decrypted with the symmetric key, Ks, of node, N, using a symmetric key cipher"

1.9. Targeting of Content Keys

In a preferred embodiment, two types of cryptographic targeting are used. Targeting a content key to a target node's sharing keys means making that key available to all entities that share the secret sharing keys of that target node. Targeting a content key to a node's confidentiality keys means making that key available only to the entity that manages that node. Targeting of a content key is done by encrypting the content key, CK, carried in a ContentKey object using one or both of the following methods:

Public Binding: Create a ContentKey object that contains Ep(Kpub[N], CK)

Symmetric Binding: Create a ContentKey object that contains Es(Ks[N], CK)

In a preferred embodiment, symmetric binding is used where possible, as it involves a less computationally intensive algorithm, and therefore makes it less onerous to the receiving entity. However, the entity (typically, a content packager) that creates the ContentKey object may not always have access to Ks[N]. If the packager does not have Ks[N], then it can use public binding, since Kpub[N] is not confidential information and therefore can be made available to entities that need to do public binding. Kpub[N] will usually be made available to entities that need to target content keys, accompanied by a certificate that can be inspected by the entity to decide whether Kpub[N] is indeed the key of a node that can be trusted to handle the content key in accordance with some agreed-upon policy (e.g., that the node corresponds to an entity running a DRM engine and host application that comply with the functional, operational, and security policies of the system).

1.10. Derivation of Keys Using Links

To allow an entity to have access to the sharing keys of all the nodes reachable from its personality node, in one embodiment link objects contain an optional key extension payload. This key extension payload allows entities that have access to the private/secret keys of the link's "from" node to also have access to the private/secret sharing keys of the link's "to" node. In this way, an entity can decrypt any content key targeted to a node that is reachable from its personality node (if the targeting was done using the target node's sharing keys).

In one embodiment, when a DRM engine processes link objects, it processes the key extension payload of each link in order to update an internal chain of keys to which it has access. In one embodiment, the key extension payload of a link, L, from node, F, to node, T, comprises either:

Public derivation information: Ep(Kpub-share[F], {Ks-share[T],Kpriv-share[T]}) or Symmetric derivation information: Es(Ks-share[F], {Ks-share[T],Kpriv-share [T]})

Where {Ks-share[T], Kpriv-share[T]} is a data structure containing Ks-share[T] and Kpriv-share[T].

The public derivation information is used to convey the secret sharing keys of node T, Ks-share[T] and Kpriv-share [T], to any entity that has access to the private sharing key of node F, Kpriv-share[F].

The symmetric derivation information is used to convey the secret sharing keys of node T, Ks-share[T] and Kpriv-share[T], to any entity that has access to the symmetric sharing key of node F, Ks-share[F].

As for targeting content keys to nodes, the preferred payload to include in a link is the symmetric derivation information. This is possible when the link creator has access to Ks-share[F]. If not, then the link creator will fall back to including the public derivation information as the payload for the link.

Assuming that the DRM engine processing a link already had Ks-share[F] and Kpriv-share[F] in its internal key chain, after processing the link, L[F→T], it will also have Ks-share [T] and Kpriv-share[T].

Since, in one embodiment, links can be processed in any order, the DRM engine may not be able to do the key derivation computations at the time a given link, L, is processed. This might be due to the fact that, at that time, the DRM engine's key chain might not yet contain the keys of the "from" node of that link. In this case, the link is remembered, and processed again when new information becomes available to the DRM engine, such as after processing a new link, P. If the "to" node of link P is the same as the "from" node of link L, and the "from" node of link P is a reachable node, then the "from" node of link L will also be reachable, and the key derivation step adds the private sharing keys of the "from" node of link L to the key chain.

5. Implementation Examples

Several examples are provided below to illustrate how various embodiments of the systems and methods described herein could be applied in practice. The systems and methods described herein can enable a wide range of rights management and other functionality, and thus it will be appreciated that the specific examples that are given here are not intended to be exhaustive, but are rather illustrative of the scope of the inventive body of work.

1.11. Example: Users, PCs, and Devices

Assume that you want to implement a DRM system that ties the right to play content to a particular user, and you want to make it easy for the user to play content on all the playback devices that he or she owns. Assume that you decide that you are going to provide users with software that enables them to add playback devices as needed (e.g., mobile players). Also assume, however, that you want to set some policy to limit the number of general-purpose devices to which the user can transfer the content, so that the user does not have the ability to act as a distribution agency.

Based on these system requirements, it might, for example, make sense to tie the licenses you create to users, and to establish relationships between users and the devices that they use. Thus, in this example, you might first decide what kinds of nodes you need to establish the sorts of relationships that you require. For example, you might define the following types of nodes:

User (e.g., an individual who owns the rights to use the content)

PC (e.g., a software application, running on a personal computer, that can play content and specify additional playback devices)

Device (e.g., a portable content-rendering device)

Each node object can include a type attribute that indicates whether the object represents a user, a PC, or a device.

Say, for example, that you decide to restrict the maximum number of PC node objects that can be attached to any one user at a particular time to four (4). You decide there is no need to restrict the number of devices attached to the user as long as you provide restriction on the number of PCs. Based on this, a control program can be set up to allow access if a relationship can be established between the user node and the node that requests access. That node, then, could be either a PC or a device.

Figure 16:
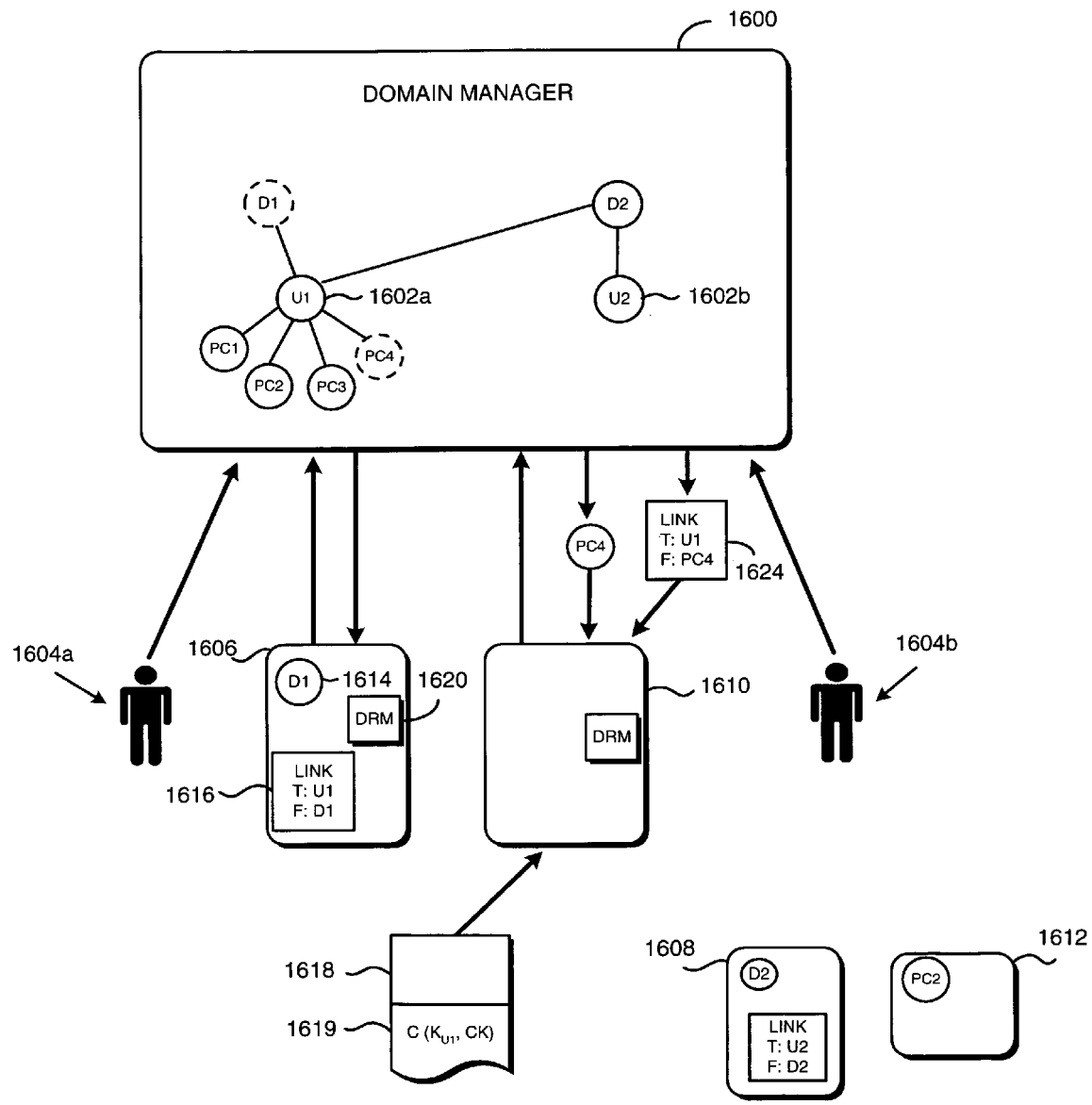
FIG. 16 shows an example of a DRM system.

FIG. 16 shows a system designed to fulfill the foregoing requirements. Server 1600 assigns a user node object 1602a, 1602b to each new user 1604a, 1604b, and manages the ability of users 1604a, 1604b to associate devices 1606, 1608 and PCs 1610, 1612 therewith for the purpose of accessing protected content. When a user 1604a wishes to associate a new device 1606 with his or her user node 1602a, server 1600 determines whether the device 1606 already contains personalization information 1614, as might be the case if the device 1606 was personalized at the time manufacture. If the device does contain personalization information 1614, server 1600 uses that personalization information 1614 to create a link 1616 from the device 1606 to the user's node 1602a, and sends link 1616 to the user's device 1606. When user 1604a obtains protected content 1618 (e.g., from server 1600 or from some other content provider), that content 1618 is targeted to the user's node 1602a (e.g., by encrypting the content's decryption key with one of the secret sharing keys associated with the user's node 1602a) and a license 1619 is associated therewith specifying the conditions under which the content can be accessed. When user 1604a attempts to play content 1618 on device 1606, the DRM engine 1620 running on device 1606 evaluates the license 1619, which indicates that the content 1618 can be played as long as user node 1602a is reachable. DRM engine 1620 evaluates link 1616, which shows that user node 1602a is reachable from device 1606, and grants user 1604a's request to access content 1618, e.g., by authorizing decryption of the content decryption key contained within license 1619.

Since the content decryption key, in this example, is encrypted using a secret key associated with the user's node 1602a, this secret key will need to be obtained in order to decrypt the content decryption key. If the optional key derivation techniques described elsewhere herein have been used, the user node's key can be obtained simply by decrypting the key derivation information contained in link 1616 using one of device 1606's secret keys. The decrypted key derivation information will contain the key needed to decrypt the content decryption key contained in license 1619 (or information from which it can be derived or obtained).

Referring once again to FIG. 16, assume user 1604a wishes to associate a new PC 1610 with his or her user node 1602a. Server 1600 verifies that the maximum number of PCs have not already been associated with user node 1602a, and authorizes PC 1610 to be associated with user node 1602a. To perform the association, however, server 1600 needs to obtain personalization information from PC 1610 (e.g., cryptographic keys, a unique identifier, etc.). If, however, the PC 1610 has not been previously personalized (as might be the case if the user simply downloaded a copy of the PC software) server 1600 will perform the personalization process (e.g., by creating a PC node object using the bootstrap protocol described elsewhere herein) or direct the user to a service provider who can perform the personalization process. Upon completion of the personalization process, server 1600 can create a link 1624 from PC 1610 to user node 1602a and send the link to the PC 1610, which could continue to use it as long as it remained valid.

The user could request to add additional PCs later, and the server would enforce the policy that limits the number of PC node objects per user to 4 (typically it would also provide the ability for users to remove PCs from its active list as needed).

As yet another example, assume now that the service provider has decided that users should be able to play any content that they own on any device that they own. The service provider might also wish to allow the user's PC software to create links to each of his or her devices, rather than requiring the user to contact server 1600. In such an embodiment, when the user wished to play content on a new device, the user's PC software would access the new device's confidential personalization information and use it to create a new link for that device (e.g., a link from the new device to the user's node 1602a). If the device was not personalized, then the PC software might access a remote service, or direct the device to access the remote service, to perform the personalization process. The PC software would then send the link to the new device, at which point the new device would be able to play the content as long as it remained valid, since, in one embodiment, once a link object exists there is no need to create another one unless the link object expires or is otherwise invalidated.

In the examples shown above, content is targeted to the user. To do this, a packager application chooses a new ID for the content, or uses an existing one, creates an encryption key and associated ContentKey object, as well as a protector object to bind the content object and the ContentKey object. The packager then creates a control object with a control program (e.g., compiled in byte code executable by the DRM engine's virtual machine) that allows the "play" action to take place if and only if the user node is reachable from the PC or device node that is requesting the action. Typically, the control, controller, protector and ContentKey objects are embedded in the packaged content if appropriate, so that the PCs and devices do not have to obtain them separately.

In one embodiment, when a device or a PC wants to play content, it follows a process such as that previously described in connection with FIG. 9. That is, the DRM engine finds the protector object for the content ID of the content, then the ContentKey object referenced by that protector, then the controller object that references that ContentKey object, and finally the control object referenced by that controller. The DRM engine executes the control program of the control object, which checks whether or not the user node is reachable. If the device or PC node has the necessary link objects to verify that there exists a path between its node and the user node, then the condition is met and the control program allows the use of the key represented in the ContentKey object. The media rendering engine of the device or PC can then decrypt and play the content.

1.12. Example: Temporary Login

Figure 17:
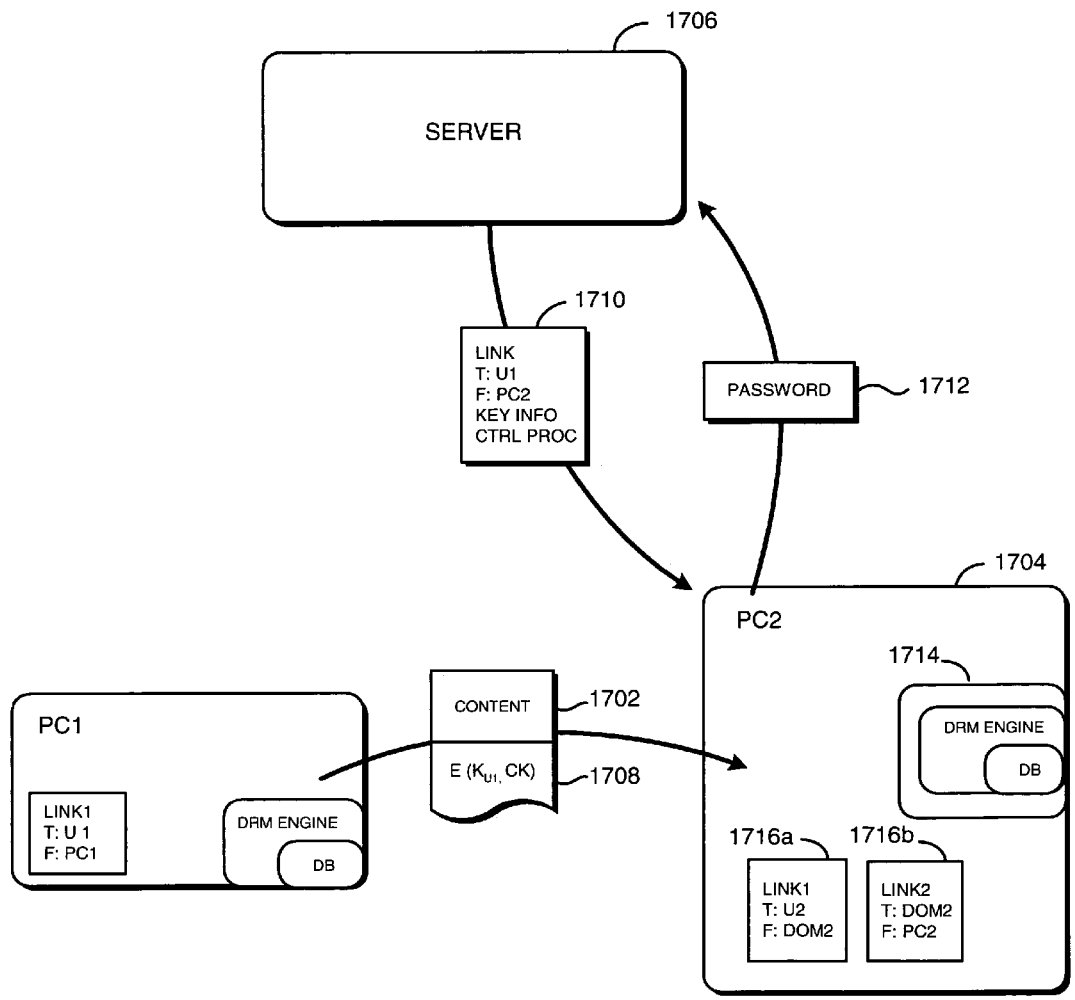
FIG. 17 shows an example of a DRM system that provides for temporary login.

FIG. 17 is another example of a potential application of the DRM systems and methods described herein. This example is similar to the example in the preceding section, except here the policy that governs creation of link objects between PC node objects and user node objects allows for a temporary login of no more than 12 hours, as long as the user does not already have a temporary login on another PC. This feature would allow a user 1700 to take his content 1702 to a friend's PC 1704, log in to that PC 1704 for a period of time, and play the content 1702 on the friend's PC 1704.

To accomplish this, a link object 1710 would be created with a limited validity period. In one embodiment, this could be done as follows:

For ease of explanation, assume that the DRM-enabled consuming software 1714 required to play the DRM-protected content 1702 is already present on the friend's PC 1704. The file containing the content 1702 and license 1708 is transferred to the friend's PC 1704. When the user tries to play the content 1702, the software 1714 recognizes that there is no valid link object linking the local PC node with the node of the user who owns the content. Software 1714 prompts the user for his credentials 1712 (this could be provided via a username/password, a mobile phone authentication protocol, a smartcard, or any authentication system allowed under the policy of the system) and communicates with a backend system 1706. The backend system 1706 checks the attributes of the user node object and PC node object for which the link is requested, and checks that there is no active temporary login link object still valid. If those conditions are met, the backend service 1706 creates a link object 1710 linking the friend's PC node object and user's node, with a validity period limited to the requested login duration (e.g., less than 12 hours, to comply with the policy in this example). Having the link object 1710 now enables the friend's PC 1704 to play the user's content 1702 until the link 1710 expires.

1.13. Example: Enterprise Content Management

Figure 18:
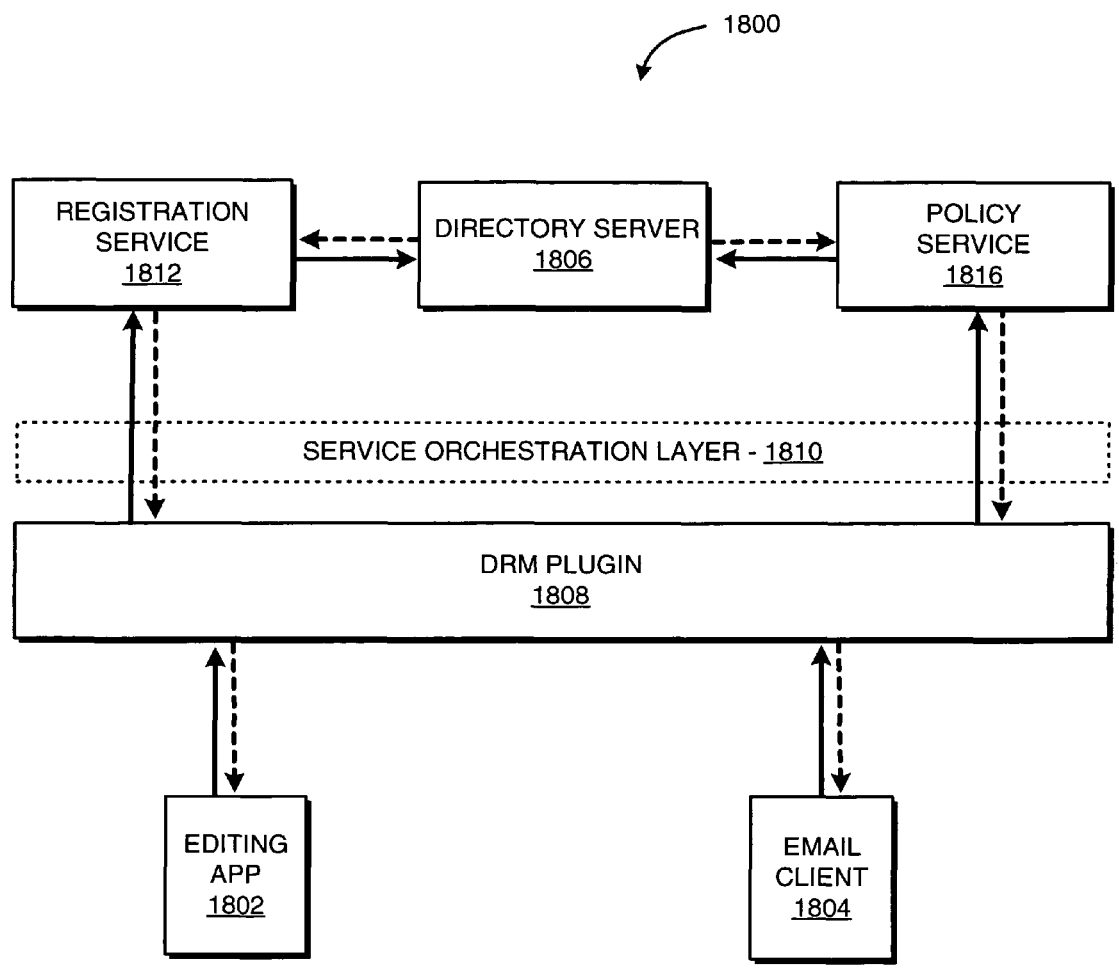
FIG. 18 shows the high-level architecture of an illustrative system for managing enterprise documents.

FIG. 18 shows the high-level architecture of an illustrative system 1800 for managing enterprise documents (e.g., email, word processing documents, presentation slides, instant messaging text, and/or the like). In the example shown in FIG. 18, a document editing application (e.g., a word processor) 1802, an email client 1804, and a directory server (e.g., an Active Directory server) 1806 make use of a digital rights management (DRM) plug-in 1808, a network service orchestration layer 1810, a registration service 1812, and a policy service 1816 to facilitate management of documents, email messages, and/or the like in accordance with policies. In a preferred embodiment, the DRM plug-in 1808, network service orchestration layer 1810, policy service 1816, and registration service 1812 are implemented using the DRM engine and service orchestration technologies described elsewhere herein and in the '551 application. For example, in one embodiment DRM plug-in 1808 may comprise an embodiment of the DRM engine described above. It will be appreciated that while FIG. 18 shows an embodiment in which existing applications such as word processor 1802 and email client 1804 are integrated with the DRM engine via a plugin that the applications can call, in other embodiments the DRM engine could be included as an integral part of either or both of the applications themselves. It will also be appreciated that the illustrative system shown in FIG. 18 can be implemented within a single enterprise or may span multiple enterprises.

In the illustration shown in FIG. 18, the directory server 1806 may, for example, contain user profiles and group definitions. For example, a group called "Special Projects Team" may be set up by a company's system administrator to identify the members of the company's Special Projects Team.

In one embodiment the directory server 1806 may comprise an Active Directory server running web services, such as those described in the '551 application (and implemented, e.g., with standard IIS based technologies on the Windows® platform), that issue nodes, links, and licenses to the people in the Special Projects Team group based on content that is accessed. If membership changes in the group, then new tokens may be issued. For revocation of rights, the directory server 1806 can run a security metadata service based on technology such as that described in the '551 application (occasionally referred to herein as "NEMO" technology). In some embodiments, the client can be required to have an to-date time value or notion of time (based on whatever freshness value the company chooses to define (e.g., 1 week, 1 day, 1 hour, every 5 minutes, etc.)) in order to use DRM licenses. For example, a token that the security metadata service provides might include a trusted and authenticable time value. In some embodiments, the client can identify user node IDs in security metadata service interactions. Security metadata can be evaluated directly in the context of license controls to determine if a user still has a given membership. Security metadata can also return agents that can determine if relationships such as being a member in the Special Projects Team are valid. Thus, in some embodiments it is possible to leverage a company's existing authorization and authentication infrastructure (e.g., the company's Active Directory server) with just the addition of a few well-defined web services.

Figure 19:
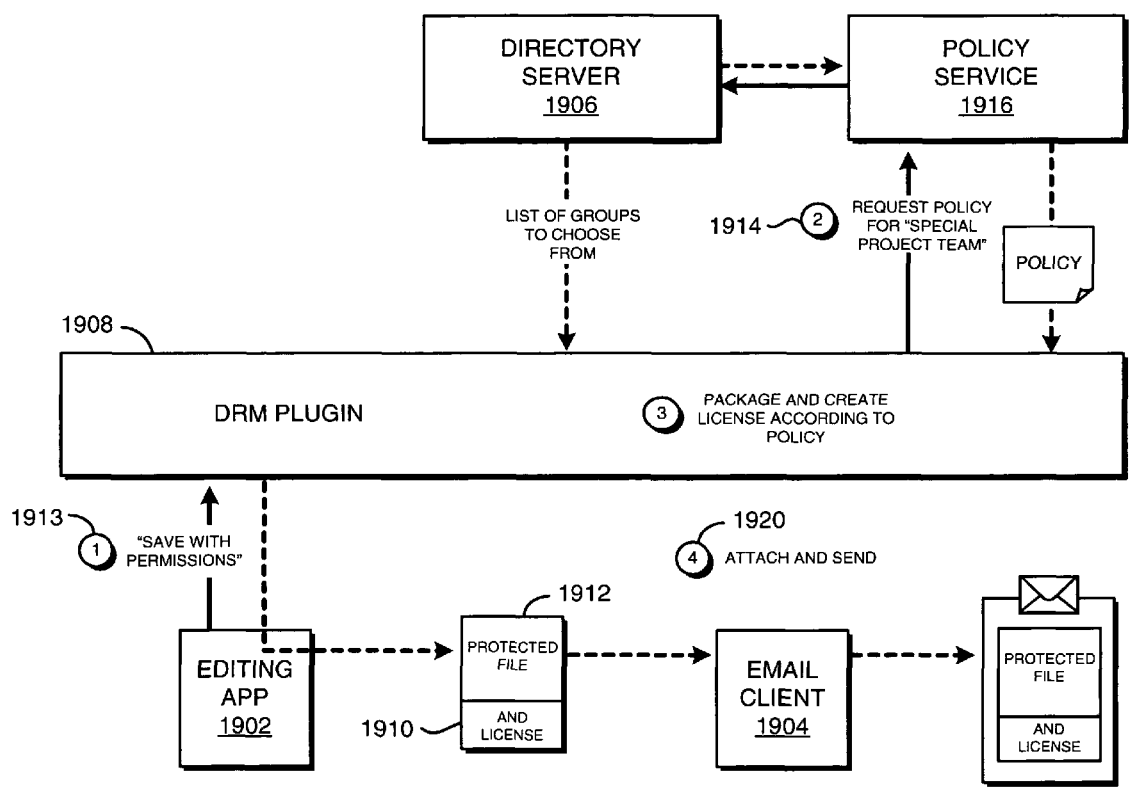
FIG. 19 shows an example of a how a system such as that shown in FIG. 18 can be used to manage access to or other use of a document.

FIG. 19 shows an example of how a system such as that shown in FIG. 18 can be used to manage access to or other use of a document. In this example, a particular employee (John) might frequently work on highly confidential strategic projects, and may have already installed the DRM plugin 1908 for his applications (e.g., a word processing program 1902, an email program 1904, a calendar program, a program or program suite that integrates such programs, and/or the like). At some point during the creation of his document, John accesses a "permissions" pull-down menu item that has been added to his application's toolbar (action 1913). A permissions dialog box appears which contacts his company's Active Directory Server 1906 for a directory of individuals and groups that have been set up on the system. He selects "Special Projects Team" from the list, and elects to give everyone on the team permission to view, edit, and print the document. Using the NEMO service orchestration technologies described in the '551 application, the DRM plugin 1908 contacts a NEMO-enabled Policy Service extension 1916 to the Active Directory 1906 and requests a copy of the Policy to use to protect files for the Special Projects Team (action 1914). When John saves the document, the DRM plugin automatically encrypts the file 1912, and creates a license object targeted and bound to the group known as "Special Projects Team" 1910. The license 1910 allows the file 1912 to be accessed (e.g., viewed, edited, printed, etc.) by any device that can produce a valid chain of links from its Device Node to the Special Projects Team Group Node.

John can access the document 1912 because his device has a link to John's User Node, and it also has a link from John's User Node to the "Special Projects Team" Group Node. Likewise, if he forwards this document to others, they can only access it if they also can produce a valid chain of links to the "Special Projects Team" Group Node (e.g., by requiring that the Special Projects Team Node be reachable by the device).

Figure 20:
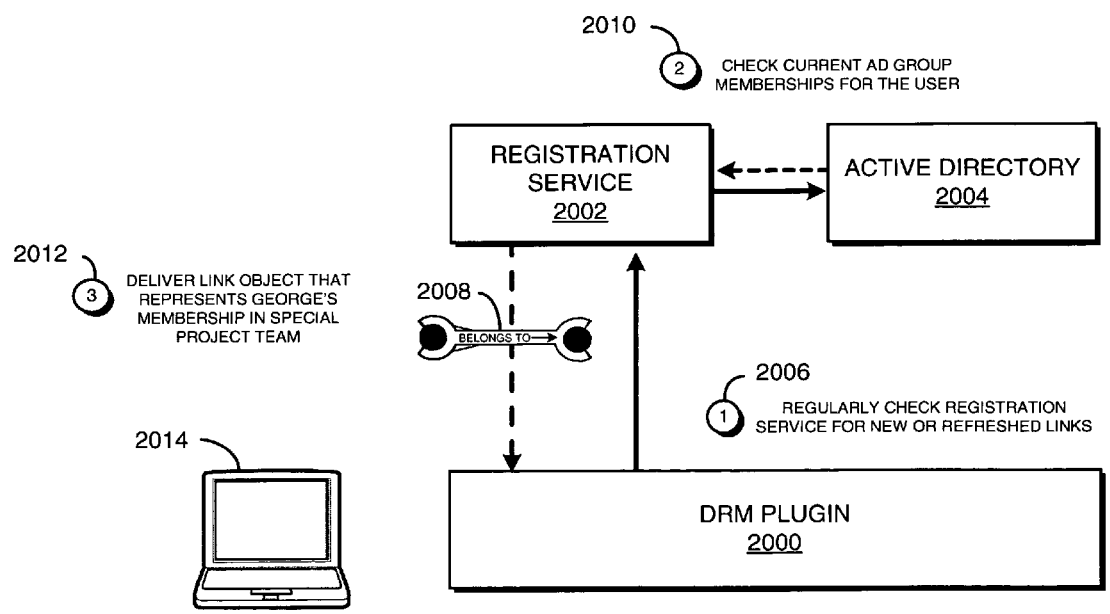
FIG. 20 shows an additional example of a how a system such as that shown in FIG. 18 can be used to manage access to or other use of a document.

John might save the file (already protected) on his computer, and later attach it to an email message (action 1920). For example, he might open an old email to his boss (George), attach the file as he normally does, and send the message. As shown in FIG. 20, George also has the DRM plugin 2000 installed on his computer 2014. When he logged in to his computer 2014, the plugin 2000 opportunistically checked all of the groups that he has been added to (action 2006), and downloaded new, refreshed links for any that had expired (action 2012). If he had been added to "Special Projects Team" since his last login, his plugin 2000 would download a Link Object 2008 that links his User Node to the "Special Projects Team" Group Node. This Link 2008 signifies that User Node "George" is a member of the Group Node "Special Projects Team". In this example, assume Link Object 2008 has an expiration date after which it will no longer be valid (e.g., 3 days).

Figure 21:
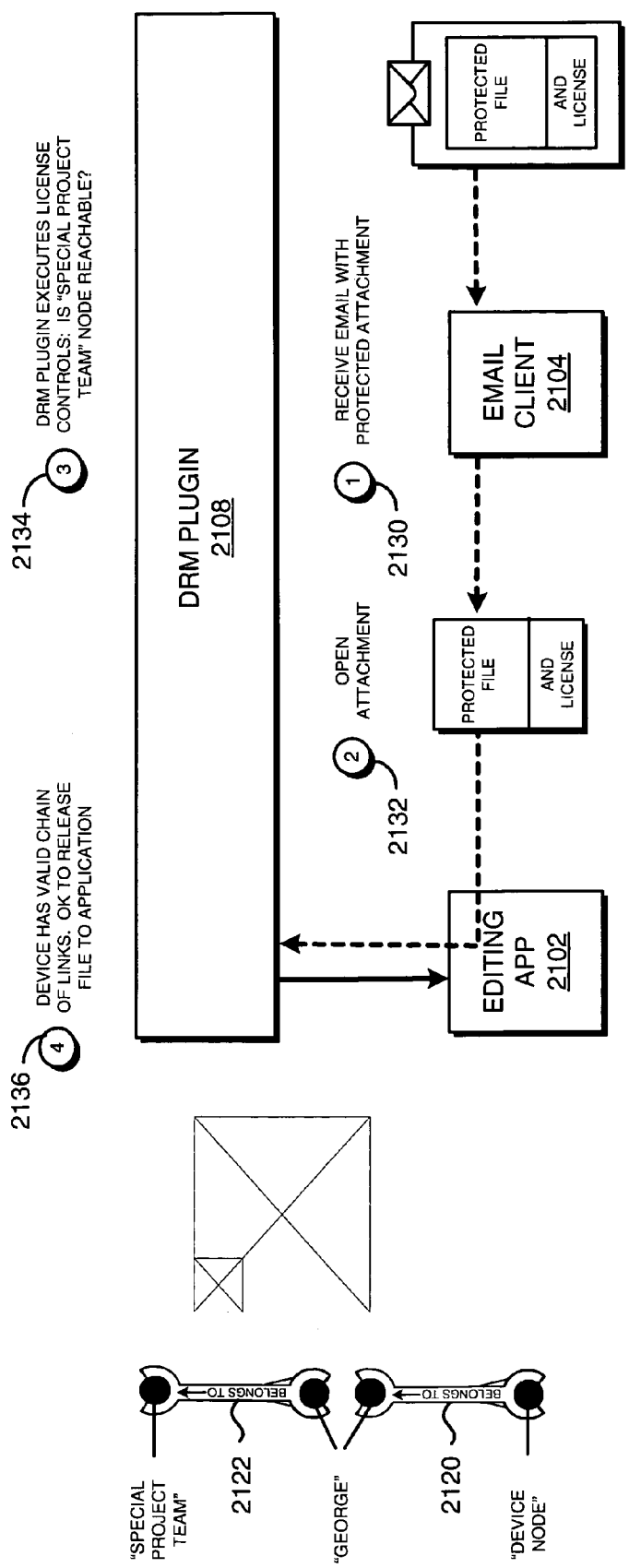
FIG. 21 shows additional features of the example shown in FIG. 20.

As shown in FIG. 21, when George tries to open the document (actions 2130, 2132), the DRM plugin 2108 checks the embedded (or attached) license, and learns that the "Special Projects Team" node must be reachable. His plugin 2108 constructs (and validates) a chain of links 2120, 2122 from his computer's Device Node to the User Node "George"; and from User Node "George" to Group Node "Special Projects Team" (action 2134). Since the device has a valid chain of Links 2120, 2122, his plugin 2108 permits access to the file.

As described elsewhere herein, in some embodiments links can also carry a secure chain of keys. Thus, in some embodiments, by producing a chain of Links to the Special Projects Team Node, the plugin can not only prove that it is permitted to access the content, but also that it is capable of decrypting a chain of keys that enable it to decrypt the content.

If, for example, another employee ("Carol") receives John's email accidentally, and attempts to open the document, her DRM plugin will retrieve the license bundled with the file and evaluate the terms of the license. Her PC has a link to her User Node "Carol"; but since she is not a member of the team, there is no Link from "Carol" to the "Special Projects Team" Group Node. Since "Special Projects Team" is not reachable, she is not permitted to access the file.

If Carol is eventually added to the group "Special Projects Team". The next time her DRM plugin refreshes her memberships, it will detect this new group, and download a Link Object that links her User Node to the Special Projects Team Node. Her plugin now has all of the links it needs to construct a chain from her Device Node to her User Node to the Special Projects Team Node. The Special Projects Team node now "is reachable" and she can open any documents or emails that are targeted to the Special Projects Team—even those that were created before she joined the team.

Assume that a month later George moves on to a new role and is removed from the Special Projects Team Group in the Active Directory. The next time George logs in, his plugin does not receive a new, refreshed Link Object associating his User Node "George" to the "Special Projects Team". When, weeks later, he tries to open John's file, his plugin attempts to construct a chain of links to the Special Projects Team. His PC still has a link to the User Node "George" (George's PC still belongs to him); but the Link from "George" to the "Special Projects Team" has expired. Since "Special Projects Team" is not reachable, he is not permitted to access the file.

Assume that the company has a policy that requires access to all confidential information to be logged. In one such an embodiment, the policy for the Special Projects Team dictates that all licenses that are created for this group also need to require collection and reporting of usage information to, e.g., a central repository. Thus, in this example, when evaluating (e.g., executing) the control program in the license, the plugin executes the requirement to log the access and does so. For example, activity of consequences can be logged in a local protected state database such as that described herein, and when network connectivity is re-established the relevant content can be reported via services previously described.

Figure 22:
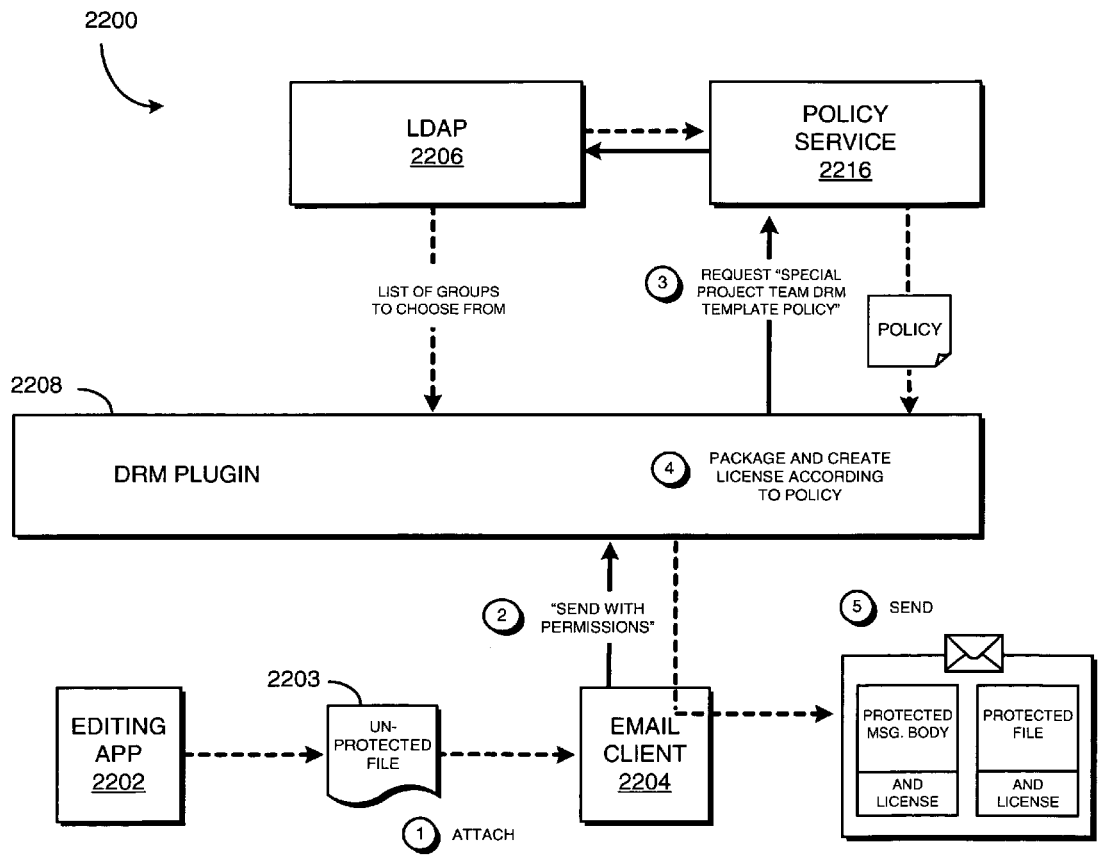
FIG. 22 shows another illustrative system for managing electronic content within an enterprise.

FIG. 22 shows another illustrative system 2200 for managing electronic content within an enterprise. In the example shown in FIG. 22 an LDAP server 2206 is used to manage user profiles, group definitions, and role assignments, and contains a group definition called "Special Projects Team", and a role definition of "Attorney".

Assume that John is an attorney and wishes to send an email with an attachment to other members of the Special Projects Team. When John installs the DRM plug-in 2208 for his applications, it also installs items to his email toolbar. At some point during his composition of the email message, John accesses "Set Permissions" from a pull-down menu that was added to his toolbar. The DRM plug-in 2208 contacts a Policy Servic 2216 and displays a list of corporate messaging policies from which to choose. John selects "Special Project DRM Template" and the DRM plug-in 2208 uses the NEMO protocol to request and ensure the authenticity, integrity, and confidentiality of policy object that it receives. The policy describes how the licenses that use this template should be created, including how they should be targeted and bound.

When John hits "Send", the DRM plugin 2208 encrypts the message and attachment, and generates the associated license(s). The license requires that in order to access the email or the attachment, either the Special Projects Team Group Node or the "Attorneys" Group Node must be reachable.

The license(s) are bundled with the encrypted message payload and encrypted attachment. The message is subsequently sent to a list of recipients using standard email functionality. Since the license rules and encryption are not dependent on the addressing of the email, the fact that an incorrect email recipient might be erroneously included does not put the contents of the email or attachment at risk.

Since such an unintended recipient will not have a valid Link Object linking his User Node to the Special Projects Team, he is not permitted to access the content if and when he attempts to do so. Furthermore, since his device does not have the necessary chain of Links (and the keys they contain), his device does not even have the capability to decrypt the content.

However, if the unintended recipient, in turn, forwards the same, unmodified email using standard email functionality to a member of the Special Projects Team. That member will have a Link Object that Links his User Node to the "Special Projects Team" Group Node, and will be able to access the email's contents.

Assume that another attorney ("Bill") at the company has also received a Link Object that associates him with the "Special Projects Team" Group Node. Bill can also view the file. If he forwards the message to a paralegal ("Trent"), who is neither an attorney nor associated with the Special Projects Team, Trent will not have a Link Object that connects him with the "Special Projects Team" Group Node, and he will not be able to access the document.

If Trent is subsequently added to the Special Projects Team group in the LDAP directory 2206, he will be given the necessary Link Object(s) and will be able to access the previously forwarded email.

If, as previously discussed, the company has a policy indicating that a reporting requirement be included in all licenses, then, in one embodiment, whenever a control program within one of these licenses is executed (e.g., when someone attempts to access the file), a reporting event can be triggered. The reporting step can additionally include an indicator as to whether or not access was granted or denied—this is a matter of implementation choice. If such an indicator is used, a log can be maintained of the number of attempts to access a particular document, and status or other information on each (e.g., success, failure, etc.).

As yet another example, assume that one of the members ("Stephen") of the Special Projects Team travels to another company to perform work on the special project. Before leaving for the other company, Stephen's email client downloads a local copy of all the email in is Inbox. The protected report attached to one of these emails also includes an embedded (or attached) license. This license object includes both the rules for accessing the content as well as an encrypted content key. The only "missing link" required to access the content is the necessary link objects to reach the "Special Projects Team" Group Node.

Since, in this example, the company's policy is to allow Link Objects to remain valid for 3 days, the Link Object that links Stephen's User Node to the Special Projects Team Node, will remain valid while he is traveling and disconnected. If he attempts to access the file while offline, the Special Projects Team Group Node will still be reachable, and he will be permitted to access the file.

If, however, Stephen stays offline for more than three days, the Link Object linking him to the Special Projects Team will expire. The Special Projects Team Group Node will then no longer be reachable, and he will not be permitted to access the file.

If Stephen eventually travels to a location where he can connect to the company's system (e.g., via VPN), his DRM plug-in will request refreshed copies of Link Objects for each of the groups to which he belongs. Since he is still part of the "Special Projects Team" group, he will receive a new link object from his User Node to the Special Projects Team Group Node. This link replaces the 'old' link which has expired and is no longer valid.

Since the "Special Projects Team" Node is now reachable using this new, refreshed Link, he is once again able to access the protected report. The new link object will be valid for a period of 3 days, after which it will also expire.

As yet another example, assume that a member ("Sally") of the Special Projects Team wishes to communicate with another team member via an instant messenger, save a copy of the communication, and give it to another member of the team (e.g., via an email attachment, a diskette, a dongle, or the like). In this example, the instant messenger client (and, potentially any other messaging or communication products which the company offers its employees) is linked to a DRM plugin which, as in the previous examples, accesses the Policy "Special Project DRM Template" that dictates how licenses are to be targeted and bound. When Sally attempts to save her instant messaging conversation (e.g., by selecting "Save-As"), the plug-in chooses an encryption key (e.g., randomly) and packages (encrypts) the text of the conversation. Per company policy, the DRM plugin then generates a license object that is targeted and bound to the Special Projects Team Group Node.

The file containing the protected IM transcript is bundled with the license to access the transcript contents. As in the previous examples, the License contains both the rules that govern access to the content, as well as an encrypted copy of the content key. Sally can transfer this bundled file to an email, USB dongle, diskette, etc. using standard 'drag and drop' procedures, and send it to someone else. Provided that the recipient's device can produce valid links to the Special Project Group Node, access to the content is permitted and possible.

Assume that Sally gives the file to John, who is also a member of the Special Projects Team. If John has a recently-refreshed Link Object that identifies him as a member of the Special Projects Team, he will be able to access the file. Per the company's policy, this Link Object contains an expiration date that will cause it to expire in three days. Therefore, even if John remains disconnected, he will still have access as long as that link remains valid.

If, at some later time, John leaves the Special Projects Team for another job assignment, and finds the USB dongle from Sally in his bag and attempts to open the file using his desktop computer, the Link Object associating his User Node to the Special Projects Team will have expired. Since he is no longer part of the team, the DRM plugin on his device no longer can acquire new, refreshed links. Since the "Special Projects Team" Group Node is no longer reachable by his device, access is not permitted.

Figuring that his laptop has not been connected to the network since he changed jobs, he also tries to open the file with that device. Since the maximum allotted time has passed, that Link is also no longer valid. In some embodiments, each time he attempts to access the file, a report can be generated and queued to be sent to a central repository.

The central repository receives multiple reports of unsuccessful attempts to access the file and flags a manager via email. The manager reminds John that he is no longer permitted to access the confidential material and asks for all files to be destroyed (even though the system indicates that access has not been granted).

As yet another example, assume that a governmental agency or outside auditor wishes to investigate or audit the Special Projects Team's handling of confidential information. To support the investigation, the company wishes to demonstrate audit records for access to sensitive information related to the Special Project.

To this end, the company first scans all cleartext message archives for any messages related to the Special Project. To their relief, they discover that, in adherence to company policy, no employees sent messages discussing the Special Project without appropriate DRM protection (e.g. outside of the system).

The company then uses the DRM access records to produce an audit trail detailing who was given access to protected information, and when.

Per company procedure, when the Special Projects Team Group was established, it also included the Chief Compliance Officer (CCO) by default. A Link Object for Chief Compliance Officer was created and saved to the archive server, which allows him or her to review the contents of all messages if needed in the future.

In this example, the policy defined for the Special Projects Team indicated that all Licenses generated by the team must include the requirement to report any attempted access to the file, including the date and time, UserNode, and whether or not access was granted. These reports were saved in an access log on a central repository.

The CCO checks the access logs for all accesses associated with the Special Projects Team prior to the date when any leak or other irregularity was suspected to have occurred. The CCO also searches the email, IM, and network backup archives for all message traffic and system files on or before that date. Since each file has an attached license (with content key), and the CCO has the necessary Link Objects to satisfy the requirements of the License, he or she is permitted to access the contents of each and every message that was accessed prior to the time in question.

The access logs and unencrypted message contents are made fully available to the agency/auditor as part of the investigation.

In some embodiments the policy for the Special Projects Team could also have included the requirement to set an expiration date for the all licenses related to the Special Project. For example, if the company were only statutorily required to keep records of this nature for a period of 1 year, they could indicate in the policy that Licenses expire one year following date of issue. In that case, the company might only keep records as long as legally required to do so. Even the CCO would not have access after that time.

In the foregoing discussion, reference has occasionally been made to "targeting" and "binding". In preferred embodiments, targeting and binding represent two different, yet closely related processes. In preferred embodiments, "binding" is primarily a cryptographic process, concerned with protecting the key that was used to encrypt the content. When a License is 'bound' to a Node (for example the "Special Projects Team" Node), it can mean, e.g., that the content key is encrypted with the public key associated with that Node. Thus, only devices that have access to the private key of the Node will have the necessary key to decrypt the content (and in preferred embodiments, the only way to get access to the private key of a Node is to decrypt a chain of Links to that Node); however, simply having the correct private key only indicates that the device has the capability to decrypt the content, if it is also permitted to do so.

In preferred embodiments, whether or not a device is permitted to access the content is determined by a Control Program within the License, and specifically, how it is "targeted". "Targeting" refers to adding a requirement in the Control Program to specify that a particular node (or nodes) "are reachable" to perform a use of the content. In the examples shown above, the Control Program typically specifies that a particular Node "Special Projects Team" is reachable by the consuming device.

In some instances, it may be desirable to have licenses targeted to more than one Node, such as a new product development team at a company ("Company") that is working with multiple suppliers to bid on components for a new top secret product. Assume that during the early stages of the project, Supplier A and Supplier B (competitors) both have links to "SecretProjectX". Supplier A wants its ideas to be shared with all members of SecretProjectX, but does not want them to inadvertently leak to Supplier B. Supplier A can target these licenses such that: ("SecretProjectX is reachable") AND ("Supplier A is reachable" or "Company is reachable"). If Company inadvertently shares this information to everyone in Secret Project X (including Supplier B), those at supplier B will not be permitted to look at it, limiting any non-disclosure risk to Company and eliminating the prospect of Supplier A losing its trade-secrets.

1.14. Example: Healthcare Records

Figure 23:
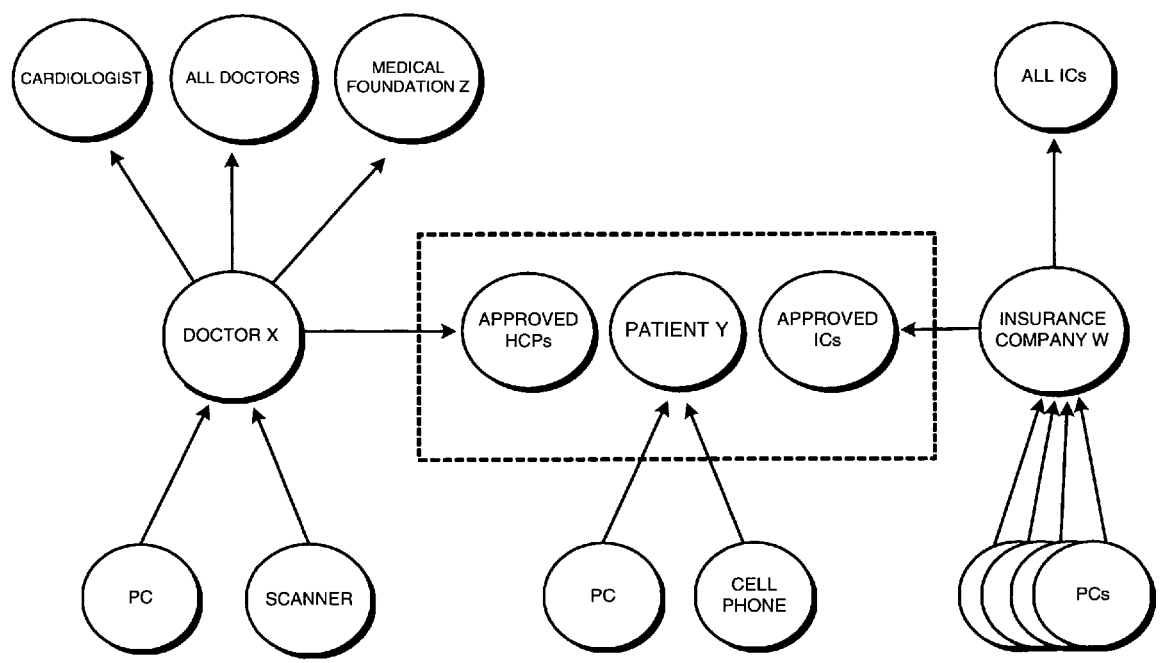
FIG. 23 illustrates how the systems and methods described herein could be applied to manage healthcare records.

FIG. 23 illustrates how the systems and methods described herein could be applied to manage healthcare records. Assume that medical records have different levels of confidentiality, and that it is desirable to grant different access rights to different entities in the system (e.g., patients, doctors, insurance companies, and the like). For example, it may be desirable to permit some records to be viewed only by the patient, to permit some records to be viewed only by the patient's doctor, to permit some records to be viewable by the patient but only editable by the patient's doctor, to permit some records to be viewable by all doctors, to permit some records to be viewed by all insurance companies, to permit some records to be viewable only by the patient's insurance company, and/or the like.

As shown in FIG. 23, this healthcare ecosystem 2300 can be modeled using DRM objects like nodes and links, such as those describe elsewhere herein. For example, nodes could be assigned to the patient 2302, the patient's doctors 2304, the patient's insurance company 2306, the patient's devices (2308, 2310) a specific one of patient's doctors 2312, the doctor's computing devices 2314, 2316, the group of all doctors 2318, the group of doctors of a certain specialty 2320, a medical institution 2322, an insurance company 2324, the computing devices used by the insurance company 2326, the group of all insurance companies 2328, and the like.

Assume that the patient's doctor uses his or her PC to create a medical record regarding the patient. For example, the medical record may comprise a document template with a number of fields for his or her notes, diagnoses, prescription instructions, instructions for the patient and/or the like. The template may also allow the doctor to select the security policies for governing the document and/or the individual field thereof. For example, the doctor's application may present a set of standard security policy choices, and, upon obtaining the doctor's selection, may automatically generate a license based on those choices and associate with the protected (e.g., encrypted) content of the medical record.

For purposes of this example, assume the license grants viewing access to the patient, to all healthcare providers who treat the patient, and to all insurance companies that provide coverage for the patient. Further assume, for the sake of illustration, that the license grants editing rights only to cardiologists at medical institution x.

The packaging application accepts the doctor's policy specification input (which may simply comprise a mouse click on a standard template) and generates a license that includes a control program such as that shown below:

```
Action.Edit.Perform( ) {
    if (IsNodeReachable("MedicalFoundationX") &&
        IsNodeReachable("Cardiologist")) {
        return new ESB(ACTION_GRANTED);
    } else {
        return new ESB(ACTION_DENIED);
    }
}
Action.View.Perform( ) {
    if (IsNodeReachable("PatientY") ||
        IsNodeReachable("HCPsPatientY") ||
        IsNodeReachable("ICsPatientY") {
        return new ESB(ACTION_GRANTED);
    } else if (EmergencyException == TRUE) {
        return new ESB(ACTION_GRANTED, new
            NotificationObligation( )); }
    else {
        return new ESB(ACTION_DENIED);
    }
}
```

The medical record and its associated license might then be stored in a central database of medical records, a database operated by the particular medical foundation, and/or the like. If patient Y subsequently visits another healthcare provider, and authorizes that healthcare provider as one of his approved healthcare providers (e.g., by signing an authorization form), that healthcare provider will obtain a link to the patient y approved healthcare providers node, which the healthcare provider would store on his computer system. If that healthcare provider were to then obtain the medical record created by doctor x, he would be able to gain viewing access to that medical record, since patient y's approved healthcare provider node would be reachable from the new healthcare provider's computer system. If on the other hand, an unapproved healthcare provider were to obtain a copy of the (encrypted) medical record, he would be unable to access it since none of the required nodes (i.e., patient y's node, the node for all of patient y's approved healthcare providers, and the node for all of patient y's approved insurance companies) would be reachable from his computing system.

Note, however, that the example control program shown above includes an override feature that can be invoked, e.g., in emergencies if, for example, a healthcare provider needs to access the protected medical record, but is unable to satisfy the conditions of the control program (e.g., because the healthcare provider attempting to make emergency access to the medical record has not previously been registered as a healthcare provider of patient Y). Note also, however, that invocation of the emergency access exception will cause information to be automatically recorded regarding the invocation and/or other circumstances, and, in this example, will also cause a notification to be sent (e.g., to the patient's preferred healthcare provider—i.e., an entity explicitly authorized by the patient—and/or the patient himself). The association of such obligations with the emergency exception may discourage abuse of the exception, since a record of the abuse would exist.

It will be appreciated that this example program has been provided to facilitate explanation of certain embodiments of the systems and methods described herein. For example, whether a system includes support for emergency exceptions will typically depend on the requirements and desires of the system architect. Thus, for example, some embodiments may not support emergency exceptions, others may support emergency exceptions, but limit the class of entities who can invoke such exceptions to the class of "all doctors" (e.g., by requiring that the EmergencyException flag be set to "true" AND the All Doctors node be reachable), and others still may support emergency exceptions, but not associate mandatory obligations therewith (since inability to comply with the obligation would, in a preferred embodiment, render the content inaccessible, relying instead on non-technical, legal or institutional means for enforcement (e.g., by trusting healthcare providers not to abuse the ability to invoke the exception, and/or relying on industry certification and the legal system to prevent abuse).

Yet another variation that could be made to the examples provided above might be to require stronger proof that a doctor, or a specifically named doctor, was actually the one accessing a medical record, as opposed to someone else sitting at the computer that the doctor uses to access records (and thus a computer potentially containing the links necessary to satisfy a reachability analysis). Such a stronger form of authentication could be enforced in any suitable manner. For example, it could be wholly or partially enforced at the application or system level by protecting the doctor's computer and/or the software used to access medical records using passwords, dongles, biometric identification mechanisms, and/or the like. Alternatively, or in addition, the control programs associated with certain medical records could themselves include an obligation or condition require such stronger identification, such as checking for the presence of a dongle, requiring the host to obtain a password, and/or the like.

1.15. Example: Subscriptions

Figure 24:
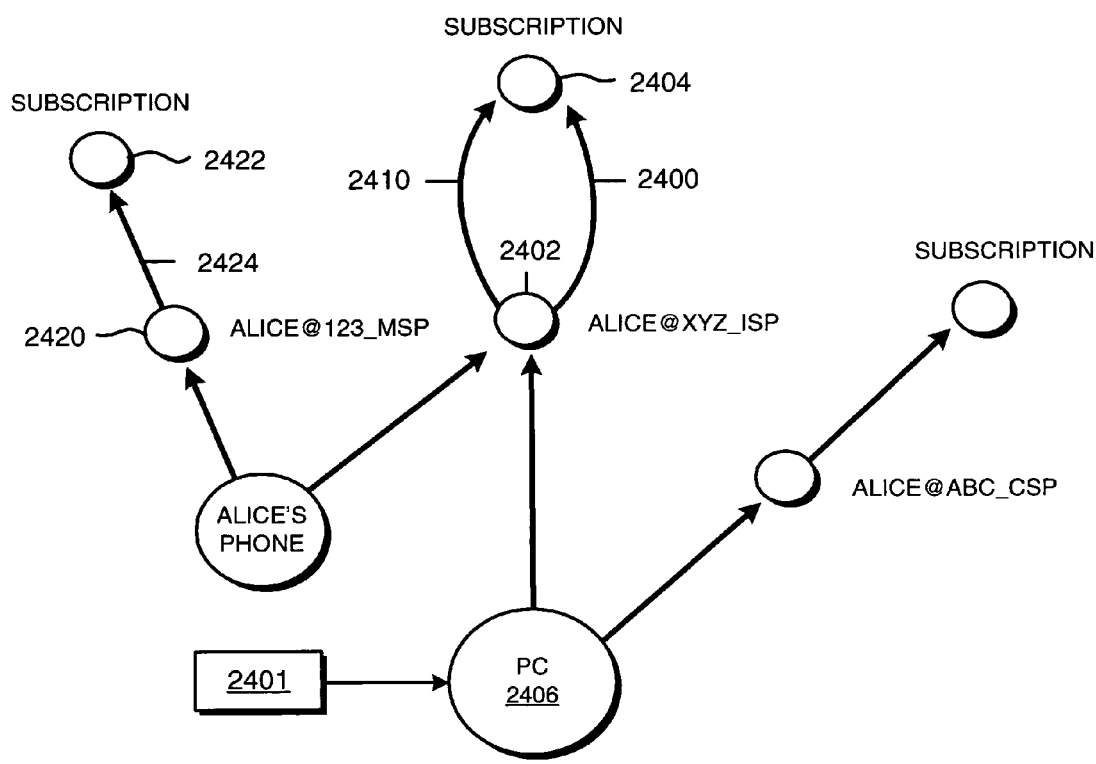
FIG. 24 is an illustration of how the systems and methods presented herein could be used in a context of an electronic subscription service.

FIG. 24 is an illustration of how the systems and methods presented herein could be used in the context of an electronic subscription service. Say, for example, that a user (Alice) wishes to obtain a subscription to jazz music from an Internet service provider (XYZ ISP). The Internet service provider may offer a variety of different subscription options, including a trial subscription that is free of charge, but can only be used to play subscription content five times before expiring (e.g., by playing one song five times, by playing five different songs once each, or the like). The trial subscription also will only make the content available in slightly degraded form (e.g., reduced fidelity or resolution). Alice uses her personal computer to access the service provider's Internet website, and opts for the trial subscription. The service provider then issues a link object 2400 and an agent 2401 and sends them to Alice's personal computer 2406. The agent 2401 is operable to initialize a state in Alice's secure state database that will be used to keep track of the number of times Alice has used trial content. The link 2400 is from Alice's ISP account node (Alice@XYZ_ISP) 2402 to subscription node 2404 and includes a control program that, when Alice requests to play a piece of content, checks the current value of the state variable set by the agent 2401 to see if additional plays are allowed.

When Alice downloads a piece of content to her PC and attempts to play it, the DRM engine on her PC evaluates the license associated with the content, which indicates that subscription node 2404 must be reachable in order to play the content. Alice had previously registered her PC with her ISP, at which time she received a link 2405 from her PC node 2406 to her account node 2402. The DRM engine thus possess link objects 2405, 2400 connecting PC node 2406 to subscription node 2404; however, before granting Alice's request to play the content, the DRM engine first determines whether the links are valid by executing any control programs that the links contain. When the control program in link 2400 is executed, the DRM engine checks the state database entry to determine if 5 plays have already been made, and, if they have not, grants her request to play the content, but also issues an obligation to the host application. The obligation requires the host to degrade the content before rendering. The host application determines that it is able to fulfill this obligation, and proceeds to render the content. In order to enable Alice to preview content before counting that content against her five free trial-offer plays, the control program might also include a callback that checks, e.g., 20 seconds after a request to play a piece of content has been granted, to see if the content is still being played. If the content is still being played, the play count is decremented, otherwise it is not. Thus, Alice can select from any of the content items offered by the subscription service, and play any five of them before her trial subscription expires.

Once Alice's trial subscription expires, Alice decides to purchase a full, monthly subscription which enables her to play as many content items as she wishes for a monthly fee. Alice use's her PC to sign up for the subscription, and receives a link 2410 from her account node 2402 to the subscription node 2404. The link includes a control program indicating that the link is only valid for one month (e.g., the control program checks an entry in the state database to see if one month has elapsed since the link was issued). This link 2410 is sent to Alice's PC, along with an agent program that is operable to initialize an appropriate entry in the state database of the PC's DRM engine indicating the date on which the link was issued. When Alice downloads a piece of content from the subscription service and attempts to play it, her PC's DRM engine determines that a path to the subscription node exists comprised of links 2405, 2410. The DRM engine executes any control programs contained in links 2405, 2410 to determine if the links are valid. If less than a month has elapsed since link 2410 was issued, the control program in link 2410 will return a result indicating that link 2410 is still valid, and Alice's request to play the piece of content. If Alice attempts to play a piece of content she previously obtained during her free trial period, the DRM engine on her PC will perform the same analysis and grant her request. Since the license associated with the piece of content obtained during the trial period indicates that if the TrialState variable in the secure database is not set, the only condition is that the subscription node must be reachable, Alice can now access that content once again since the subscription node is once again reachable from Alice's PC, this time via link 2410, not link 2400, which is no longer valid. Thus, Alice does not need to obtain a second copy of the content item to replace the copy she obtained during the free trial offer. Similarly, if Alice obtains a piece of subscription content from her friend, Bob, who is also a subscriber to the same service, Alice will, in this example, be able to play that content, too, since the content's license simply requires that the subscription node be reachable, not that it be reachable via Bob's PC or account.

It will be appreciated that the above examples are simply intended to illustrate some of the functionality that can be enabled by the systems and methods described herein, and is not intended to suggest that subscriptions must be implemented in precisely the manner described above. For example, in other embodiments, the license associated with a piece of subscription content might be bound to a user's node, rather than the subscription node, thus preventing two subscribers from sharing content like Bob and Alice were able to do in the example described above. It will be appreciated that many other variations to the above examples could be made.

The table below provides some illustrative pseudo-code for the agent, link, and license control programs in the example described above:

```
The subscription trial gives you access to up to 5 pieces of
subscription content. The content will be marked as rendered only after
20 seconds of rendering. Content rendered in the context of the trial
will have to be degraded by the rendering applicatio.
The real subscription will be renewed every month and has no such
limitations on the number or quality of the renderings.
The code of the agent is as follows:
```

```
TrialAgent( ) {
    SetObject("TrialState", 5);
}
```

The code of the control program in the trial link will be:

```
====================================
Control.Link.Constraint.Check( ) {
    if (GetObject("TrialState", 5) > 0) {
        return SUCCESS;
    } else {
        return FAILURE;
    }
}
====================================
When Alice registers for real to the subscription service, she gets back
a link (from: Alice, to: Subscription) and an agent
The code of the agent is as follows:
====================================
RealSubscriptionAgent( ) {
    // erase the TrialState if present
    trialState = GetObject("TrialState");
    if (trialState != NULL) {
        SetObject("TrialState", NULL); // erase
    }
}
====================================
The code of the link will be:
====================================
Control.Link.Constraint.Check( ) {
    if (GetTrustedTime( ) < ExpirationDate) {
        return SUCCESS;
    } else {
        return FAILURE;
    }
}
====================================
The content licenses targeted to the subscription all have the same
control program:
====================================
Action.Play.Perform( ) {
    // first check if the subscription node is reachable
    if (!IsNodeReachable("SubscriptionNode")) {
        return new ESB(ACTION_DENIED);
    }
    // now check if the TrialState is present
    if (GetObject("TrialState) != NULL) {
        // we're in the trial mode: we need a callback and an obligation
        return new ESB(ACTION_GRANTED,
                        new OnTimeElapsedCallback(20, DecrementCounter),
                        new DegradeRenderingObligation( ));
    } else {
        // we're in paid subscription mode: just return ACTION_GRANTED
        return new ESB(ACTION_GRANTED);
    }
}
// code of the callback function of OnTimeElapsed
DecrementCounter( ) {
    SetObject("TrialState", GetObject("TrialState") - 1); }
====================================
```

Referring once again to FIG. 24, Alice also has an account 2420 with her mobile service provider, which remains valid as long as she remains connected to the network. Alice is not required to make a special payment for the subscription, in exchange for which she gets sent a link; instead renewal links 2424 are sent to her phone automatically when she connects to the network. These links enable her to access any of the content items or services offered by the mobile service provider, which have licenses that require only that the subscription node 2422 be reachable. If Alice changes mobile service providers, she will unable to access previously acquired content once her links 2424 expire.

Figure 25:
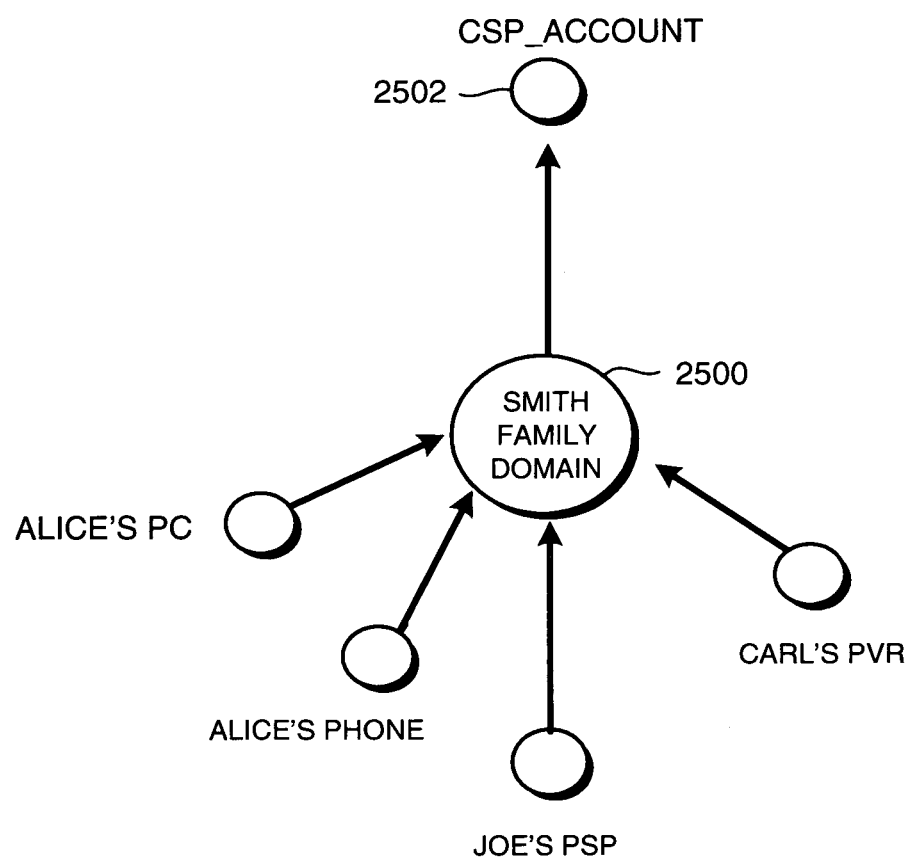
FIG. 25 is an illustration of how the systems and methods described herein could be used in a context of a home network domain.

FIG. 25 shows an example of how a service provider might interact with a home network domain 2500. In this example, devices are registered to a home network domain which enforces a policy that allows up to 5 devices to belong to the domain at any one time. Although the Smith family's cable service provider did not provide the domain manager software used to set up the home network domain 2500, cable service provider knows that the domain manager has been implemented by a certified provider of home network domain manager software, and thus trusts the domain manager software to operate as intended. As shown in FIG. 25, the Smith family connects Alice's phone and PC, Carl's PVR, and Joe's PSP to the domain 2500, resulting in links being issued from each of these devices to the domain node 2500. When new content is received, e.g., at the PVR, discovery services such as those described in the '551 application enable the other devices in the domain to automatically obtain the content and any necessary links. Links are issued from the domain node 2500 to the service provider account node 2502. Some of the cable service provider's content has a license with an obligation that fast forward and rewind must be disabled so that advertisements will be viewed. Carl's PVR and PC Alice's PC are able to enforce the obligation, and thus can play the content. Alice's mobile phone is unable to enforce the obligation and thus denies access to the content.

1.16. Additional Examples: Content and Rights Sharing

As the preceding examples illustrate, embodiments of the systems and methods presented herein enable electronic content to be shared in natural ways. For example, the systems and methods described herein can be used to enable consumers to share entertainment content with their friends and family members, and/or enjoy it on all of their family's devices, while simultaneously protecting against wider, unauthorized distribution. For example, automated peer-to-peer discovery and notification services can be used, such that when one device obtains content or associated rights, other devices can automatically become aware of that content, thereby providing a virtual distributed library that can be automatically updated. For example, in one embodiment if one user obtains content or rights on a portable device at one location, then comes home, the user's family's devices can automatically discover and make use of those rights. Conversely, if a user obtains rights on a device on his or her home network, his or her portable devices can discover and carry away that content for use elsewhere. Preferred embodiments of the systems and methods described herein can be used to create services and rights objects that allow the above-described scenarios to be completely automated, using, for example, the service discovery and inspection techniques described in the '551 application. For example, the devices registered to a particular domain may provide services to each other (e.g., sharing of rights and content), and/or remote services can be invoked to facilitate local sharing of content. The systems and methods described enable the creation of DRM frameworks that are not focused on preventing the creation of copies per se, but rather are designed to work harmoniously with network technology to allow content to be shared, while protecting against consumers becoming illicit distributors of the content.

Preferred embodiments of the DRM systems and methods described herein also enable the determination of rights without the verbose types of rights expressions characteristic of some other DRM systems. Instead, preferred embodiments use a set of crafted rights objects that can interact contextually. These objects describe relationships and controls among entities such as users, devices, content, and groups thereof. For example, such contextual interactions might allow a device to determine that a given piece of content can be played because (a) the content was obtained from a legitimate content service that the user currently subscribes to, (b) the user is part of a specific family group, and (c) the device is associated with this specific family group. There are numerous types of relationships such as those described in this example, which users understand intuitively, and preferred embodiments of the systems and methods described herein enable the creation of systems that naturally understand these kinds of relationships. The relationships among entities can be created, destroyed, and changed over time, and preferred embodiments provide a natural way of determining rights in a dynamic networked environment—an environment that consumers can naturally understand. Nevertheless, if a content deployer wants to use a more traditional rights expression approach, preferred embodiments can accommodate that as well. For example, tools can be used to translate traditional rights expressions into sets of objects such as those described above, and/or a DRM engine can be implemented that operates directly on such rights expressions. Alternatively, in some embodiments, devices do not need to understand such traditional rights expressions, and are not constrained by their limitations.

Preferred embodiments of the systems and methods described herein also have a very general notion of a media service. A broadcast service and an Internet download or subscription service are examples of media services. Restrictions associated with these services can make content difficult to share. With preferred embodiments of the systems and methods described herein, content can be obtained on broadcast, broadband, and mobile services, and shared on a group of networked devices in the home, including portable devices. Alternatively, or in addition, services can be offered by individual devices in a peer-to-peer fashion via wireless connectivity. For example, the new generation of WiFi enabled cellphones can provide content catalog services to other devices. Such a service allows other devices to "see" what content is available to be shared from the device. The service provides information that can be used to determine the rights so that any limitations can be accepted or easily eliminated.

Preferred embodiments of the systems and methods described herein are not confined to one service or to one platform. As explained above, preferred embodiments are capable of working with numerous services, including "personal" services. This is becoming more and more important as home and personal networks become more ubiquitous. For example, digital cameras are now available with WiFi connectivity, making it very convenient to share photos over networks. It is nice to be able to automate the sharing of photographs, but the camera will encounter many different networks as it is carried about. Automated sharing is convenient, but personal photos are, of course, personal. Embodiments of the systems and methods described herein make it easy to share photos within a family on the family's devices, but not with arbitrary devices that happen to encounter the camera on a network. In general, as more devices become networked, it is going to be increasingly important to manage the rights of all content on those devices. Although the purpose of networking is to allow information on the networked devices to be shared, networks will overlap and merge into one another. Networks enable content to be shared easily but it should not be shared arbitrarily. Thus, it is desirable to have a DRM system that is network-aware and that can use the context provided by the content, the user, the network, and characteristics of devices to determine if and how content should be shared. Preferred embodiments of systems and methods described herein enable such an approach.

6. Reference Architecture for Content Consumption and Packaging

The following is a description of a reference architecture for a consuming application (e.g., a media player) that consumes DRM-protected content, and a packaging application (e.g., an application residing on a server) that packages content targeted to consuming applications.

1.17. Client Architecture

The following provides an example of functions that an illustrative embodiment of a DRM engine might perform for a host application that consumes content.

1.17.1. Host Application to DRM Engine Interface

Although in a preferred embodiment there is no required API for DRM engines, the following are high-level descriptions of the type of interface provided by an illustrative DRM engine (referred to as the "Octopus" DRM engine) to a host application in one illustrative embodiment:

Octopus::CreateSession(hostContextObject)→Session— Creates a session given a Host Application Context. The context object is used by the Octopus DRM engine to make callbacks into the application.

Session::ProcessObject(drmObject)—This function should be called by the host application when it encounters certain types of objects in the media files that can be identified as belonging to the DRM subsystem. Such objects include content control programs, membership tokens, etc. The syntax and semantics of those objects is opaque to the host application.

Session::OpenContent(contentReference)→Content—The host application calls this function when it needs to interact with a multimedia content file. The DRM engine returns a Content object that can be used subsequently for retrieving DRM information about the content, and interacting with it.

Content::GetDrmInfo( )—Returns DRM metadata about the content that is otherwise not available in the regular metadata for the file.

Content::CreateAction(actionInfo)→Action—The host application calls this function when it wants to interact with a Content object. The actionInfo parameter specifies what type of action the application needs to perform (e.g., Play), as well as any associated parameters, if necessary. The function returns an Action object that can then be used to perform the action and retrieve the content key.

Action::GetKeyInfo( )—Returns information that is necessary for the decryption subsystem to decrypt the content.

Action::Check( )—Checks whether the DRM subsystem will authorize the performance of this action (i.e. whether Action::Perform( ) would succeed).

Action::Perform( )—Performs the action, and carries out any consequences (with their side effects) as specified by the rule that governs this action.

1.17.2. DRM Engine to Host Services Interface

The following is an example of the type of Host Services interface needed by an illustrative embodiment of a DRM engine from an illustrative embodiment of a host application.

HostContext::GetFileSystem(type)→FileSystem—Returns a virtual FileSystem object that the DRM subsystem has exclusive access to. This virtual FileSystem will be used to store DRM state information. The data within this FileSystem should only be readable and writeable by the DRM subsystem.

HostContext::GetCurrentTime( )—Returns the current date/time as maintained by the host system.

HostContext::GetIdentity( )—Returns the unique ID of this host.

HostContext::ProcessObject(dataObject)—Gives back to the host services a data object that may have been embedded inside a DRM object, but that the DRM subsystem has identified as being managed by the host (e.g., certificates).

HostContext::VerifySignature(signatureInfo)—Checks the validity of a digital signature over a data object. In one embodiment the signatureInfo object contains information equivalent to the information found in an XMLSig element. The Host Services are responsible for managing the keys and key certificates necessary to validate the signature.

HostContext::CreateCipher(cipherType, keyInfo)→Cipher—Creates a Cipher object that the DRM subsystem can use to encrypt and decrypt data. A minimal set of cipher types will be defined, and for each a format for describing the key info required by the cipher implementation.

Cipher::Encrypt(data)

Cipher::Decrypt(data)

HostContext::CreateDigester(digesterType)→Digester—Creates a Digester object that the DRM subsystem can use to compute a secure hash over some data. In one embodiment, a minimal set of digest types can be defined.

Digester::Update(data)

Digester::GetDigest( )

1.17.3. UML Sequence Diagram

Figure 26:
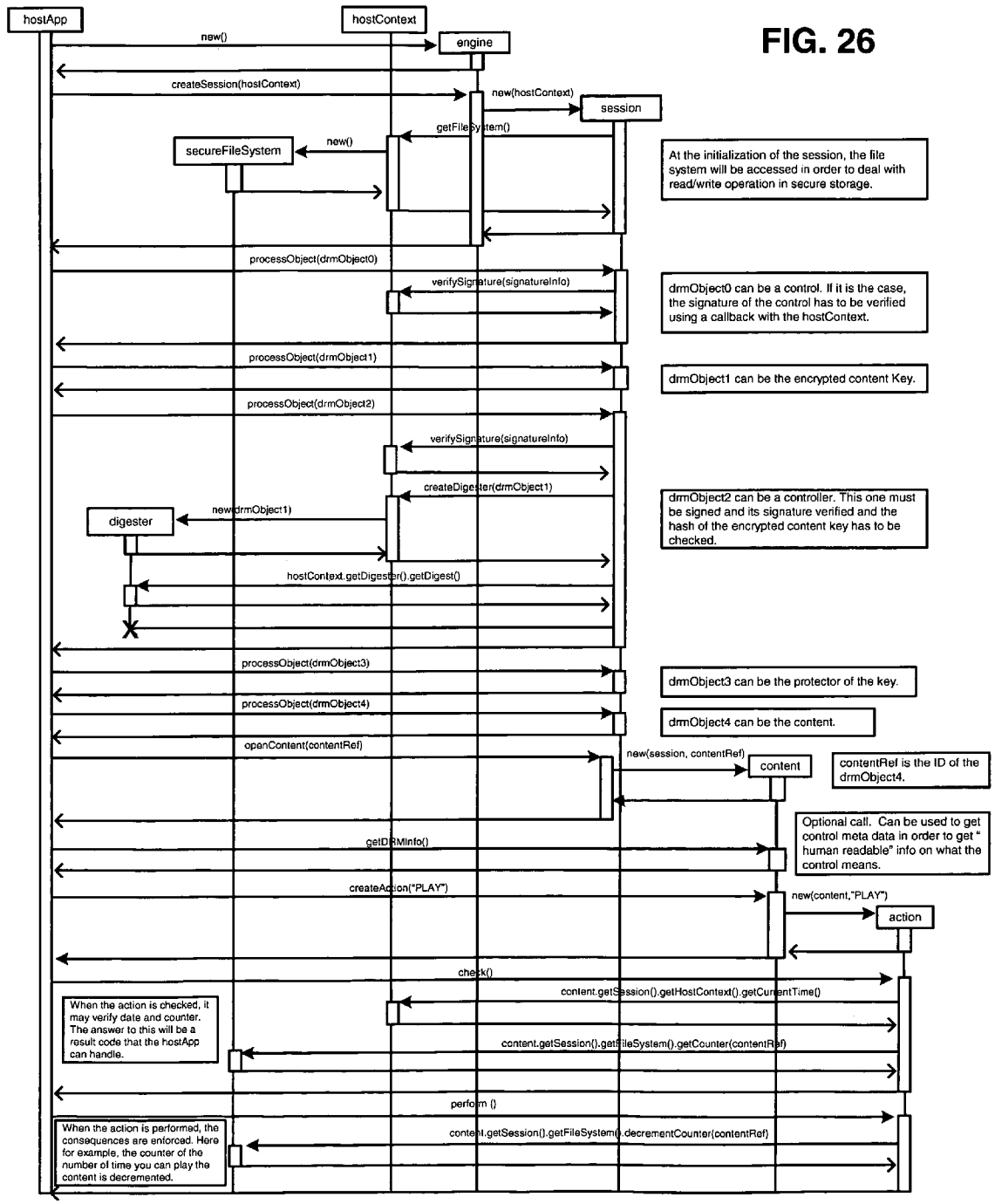
FIG. 26 illustrates the interactions that take place between a host application and a DRM client engine in one example embodiment.

FIG. 26 illustrates the use of the illustrative APIs set forth in the preceding sections, and the interactions that take place between the host application and the DRM client engine in an exemplary embodiment.

1.18. Packager Reference Architecture

The following provides an example of the functions that a packaging engine might perform for a host application that packages content. In practice, a packaging application may focus on packaging specifically, or could be part of a general purpose application operating at a user system that also accesses protected content (either packaged locally or elsewhere in a network).

1.18.1. Host Application to Packaging Engine Interface

This section provides a high-level description of an illustrative API between a host application and a packaging engine used in connection with a reference DRM engine referred to as "Octopus".

Octopus::CreateSession(hostContextObject)→Session. Creates a session given a host application context. The context object that is returned by this function is used by the packaging engine to make callbacks into the application.

Session::CreateContent(contentReferences[ ])→Content. The host application calls this function in order to create a content object that will be associated with license objects in subsequent steps. Having more than one content reference in the contentReferences array implies that these are bound together in a bundle (e.g., one audio and one video track) and that the license issued should be targeted to these as one indivisible group.

Content::SetDrmInfo(drmInfo). The drmInfo parameter specifies the metadata of the license that will be issued. The drmInfo will act as a guideline to translate the license into bytecode for the virtual machine.

Content::GetDRMObjects(format)→drmObjects. This function is called when the host application is ready to get the drmObjects that the packager engine created. The format parameter will indicate the format expected for these objects (e.g., XML or binary atoms).

Content::GetKeys( )→keys[ ]. This function is called by the host packaging application when it needs keys in order to encrypt content. In one embodiment, there is one key per content reference.

1.18.2. Packaging Engine to Host Services Interface

The following is an example of the type of interface that an illustrative packaging engine needs the host application to provide in one embodiment.

HostContext::GetFileSystem(type)→FileSystem. Returns a virtual FileSystem object that the DRM subsystem has exclusive access to. This virtual FileSystem can be used to store DRM state information. The data within this FileSystem should only be readable and writeable by the DRM subsystem.

HostContext::GetCurrentTime( )→Time. Returns the current date/time as maintained by the host system.

HostContext::GetIdentity( )→ID. Returns the unique ID of this host.

HostContext::PerformSignature(signatureInfo, data). Some DRM objects created by the packaging engine will have to be trusted. This service provided by the host will be used to sign a specified object.

HostContext::CreateCipher(cipherType, keyInfo)→Cipher. Creates a cipher object (an object that is able to encrypt and decrypt data) that the packaging engine can use to encrypt and decrypt data. In one embodiment, the cipher object is used to encrypt the content key data in the ContentKey object.

Cipher::Encrypt(data). Encrypts data.

Cipher::Decrypt(data). Decrypts data.

HostContext::CreateDigester(digesterType)→Digester. Creates a digester object that the packaging engine can use to compute a secure hash over some data.

Digester::Update(data). Feeds data to the digester object.

Digester::GetDigest( ). Computes a digest.

HostContext::GenerateRandomNumber( ). Generates a random number that can be used for generating a key.

Figure 27:
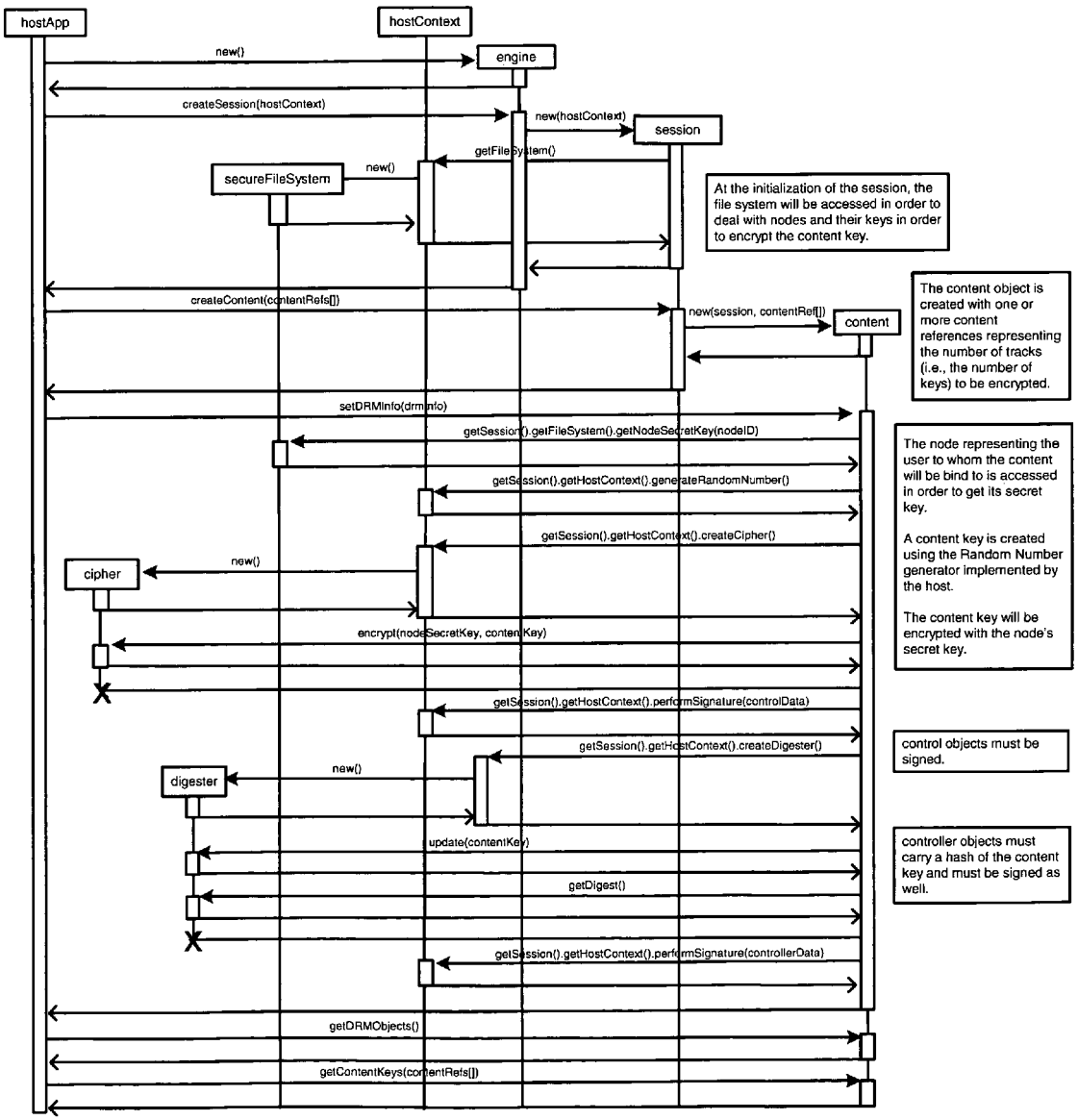
FIG. 27 illustrates the interactions that take place between a host application and a packaging engine in one illustrative embodiment.

FIG. 27 is a UML diagram showing an example of the use of the illustrative APIs set forth above, and the interactions that take place between the host application and the packaging engine in one illustrative embodiment.

7. Objects

This section provides more information regarding the DRM objects that serve as the building blocks of an illustrative implementation of a DRM engine. First, a relatively high-level overview is given of the types of objects the DRM engine uses for content protection and governance. Next, a more detailed description of these objects and the information they convey is provided, along with some example data structures used in one illustrative embodiment.

1.19. Content Protection and Governance DRM Objects

As previously described in connection with FIG. 6, content governance objects (sometimes referred to, collectively with node and link objects, as "DRM objects") are used to associate usage rules and conditions with protected content. Together, these objects form a license.

Figure 28A:
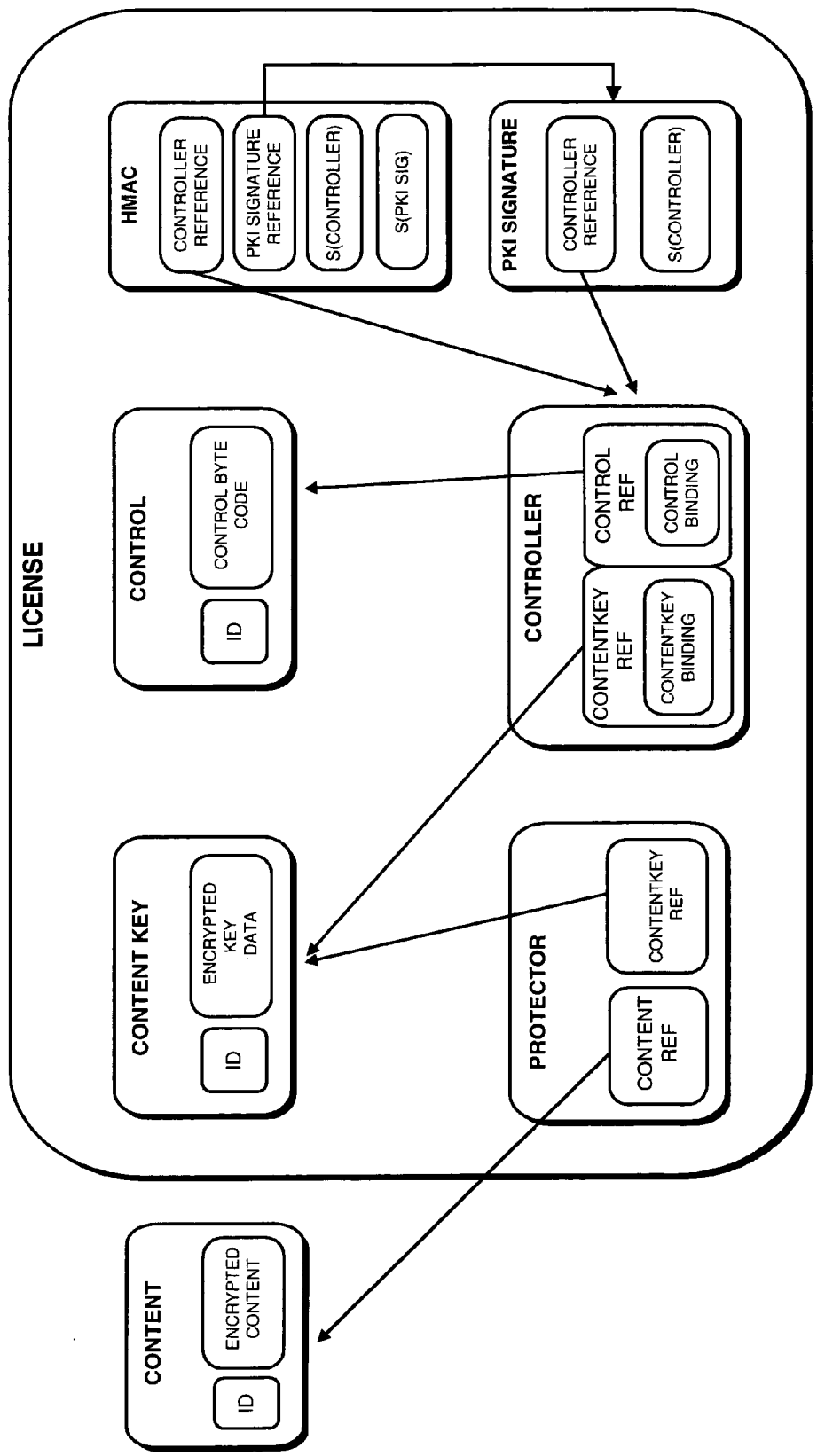
FIG. 28A is a more detailed illustration of a license in accordance with one embodiment.

As shown in FIG. 6, the data represented by content object 614 is encrypted using a key. That key needed to decrypt the content is represented by ContentKey object 602, and the binding between the content and the key used to encrypt it is represented by protector object 604. The rules that govern the use of the decryption key are represented by control object 608, and the binding between the ContentKey 602 and the control object 608 is represented by controller object 606. In one embodiment, trusted systems will only make use of the content decryption key under governance of the rules expressed by the byte code in control object 608. FIG. 28A is a more detailed illustration of a license such as that shown in FIG. 6, and illustrates a signature scheme that is used in one embodiment.

1.19.1. Common Elements

In one embodiment, objects share common basic traits: they can each have an ID, a list of attributes, and a list of extensions.

1.19.1.1. IDs

Objects that are referenced by other objects have a unique ID. In one embodiment, IDs are simply URIs, and the convention is that those URIs are URNs

1.19.1.2. Attributes

Attributes are typed values. Attributes can be named or unnamed. The name of a named attribute is a simple string or URI. The value of an attribute is of a simple type (string, integer, or byte array) or a compound type (list and array). Attributes of type 'list' contain an unordered list of named attributes. Attributes of type 'array' contain an ordered array of unnamed attributes.

An object's 'attributes' field is a (possibly empty) unordered collection of named attributes.

1.19.1.3. Extensions

Extensions are elements that can be added to objects to carry optional or mandatory extra data. Extensions are typed, and have unique IDs as well. Extensions can be internal or external.

1.19.1.3.1. Internal Extensions

Internal extensions are contained in the object they extend. They have a 'critical' flag that indicates whether the specific extension data type for the extension is required to be known to the implementation that uses the object. In one embodiment, if an implementation encounters an object with a critical extension with a data type that it does not understand, it must reject the entire object.

In one embodiment, the ID of an internal extension needs to be locally unique: an object cannot contain two extensions with the same ID, but it is possible that two different objects each contain an extension with the same ID as that of an extension of the other object.

An object's 'extensions' field is a (possibly empty) unordered collection of internal extensions.

1.19.1.3.2. External Extensions

External extensions are not contained in the object they extend. They appear independently of the object, and have a 'subject' field that contains the ID of the object they extend. In one embodiment, the ID of an external extension needs to be globally unique.

1.19.2. Content

In one embodiment, the content object is an "external" object. Its format and storage are not under the control of the DRM engine, but under the content management subsystem of the host application (for instance, the content could be an MP4 movie file, an MP3 music track, etc.). In one embodiment, the format for the content needs to provide support for associating an ID with the content payload data. The content payload is encrypted in a format-dependent manner (typically with a symmetric cipher, such as AES).

1.19.3. ContentKey

The ContentKey object represents a unique encryption key, and associates an ID with it. The purpose of the ID is to enable Protector objects and Controller objects to make references to ContentKey objects. The actual key data encapsulated in the ContentKey object is itself encrypted so that it can only be read by the recipients that are authorized to decrypt the content. The ContentKey object specifies which cryptosystem was used to encrypt the key data. The cryptosystem used to protect the content key data is called the Key Distribution System. Different Key Distribution Systems can be used. An example of a Key Distribution System is the Scuba Key Distribution System described above.

1.19.4. Protector

The Protector object contains the information that makes it possible to find out which key was used to encrypt the data of Content objects. It also contains information about which encryption algorithm was used to encrypt that data. In one embodiment, the Protector object contains one or more IDs that are references to Content objects, and exactly one ID that is a reference to the ContentKey object that represents the key that was used to encrypt the data. If the Protector points to more than one Content object, all those Content objects represent data that has been encrypted using the same encryption algorithm and the same key. In one embodiment, unless the cryptosystem used allows a safe way of using the same key for different data items, it is not recommended that a Protector object point to more than one Content object.

1.19.5. Control

The control object contains the information that allows the DRM engine to make decisions regarding whether certain actions on the content should be permitted when requested by the host application. In one embodiment, the rules that govern the use of content keys are encoded in the control object as byte code for execution by the virtual machine. The control object also has a unique ID so that it can be referenced by a controller object. In one embodiment, control objects are signed, so that the DRM engine can verify that the control byte code is valid and trusted before it is used to make decisions. The validity of the control object can also optionally be derived through the verification of a secure hash contained in a controller object.

1.19.6. Controller

The controller object contains the information that allows the DRM engine to find out which control governs the use of one or more keys represented by ContentKey objects. The controller object contains information that binds it to the ContentKey objects and the control object that it references. In one embodiment, controller objects are signed (e.g., by a packager application that has a certificate allowing it to sign controller objects), so that the validity of the binding between the ContentKey and the control object that governs it, as well as the validity of the binding between the ContentKey ID and the actual key data, can be established. The signature of the controller object can be a public key signature or a symmetric key signature, or a combination of both. Also, when the digest of the control object referenced by the controller object is included in the controller object, the validity of the control object can be derived without having to separately verify the signature of the control object.

1.19.6.1. Symmetric Key Signature

In one embodiment, this is the preferred type of signature for controller objects, and is implemented by computing a Message Authentication Code (MAC) of the controller object, keyed with the same key as the key represented by the corresponding ContentKey object. In one embodiment, the canonical method for this MAC is to use HMAC with the same hashing algorithm as the one chosen for the PKI signature algorithm used in the same deployment.

1.19.6.2. Public Key Signature

This type of signature is used when the identity of the signer of the controller object needs to be known. This type of signature is implemented with a public key signature algorithm, signing with the private key of the principal who is asserting the validity of this object. In one embodiment, when using this type of signature, a symmetric key signature will also be present, and sign both the controller object as well as the public key signature, so that is can be guaranteed that the principal who signed with its private key also had knowledge of the actual value of the content key carried in the ContentKey object.

1.20. Identity and Key Management DRM Objects

As previously described, node objects represent entities in a DRM profile, and no implicit or explicit semantics are used to define what the node objects represent. A given deployment (DRM profile) of a system will define what types of principals exist, and what roles and identities different node objects represent. That semantic information is typically expressed using attributes of the node object.

Figure 28B:
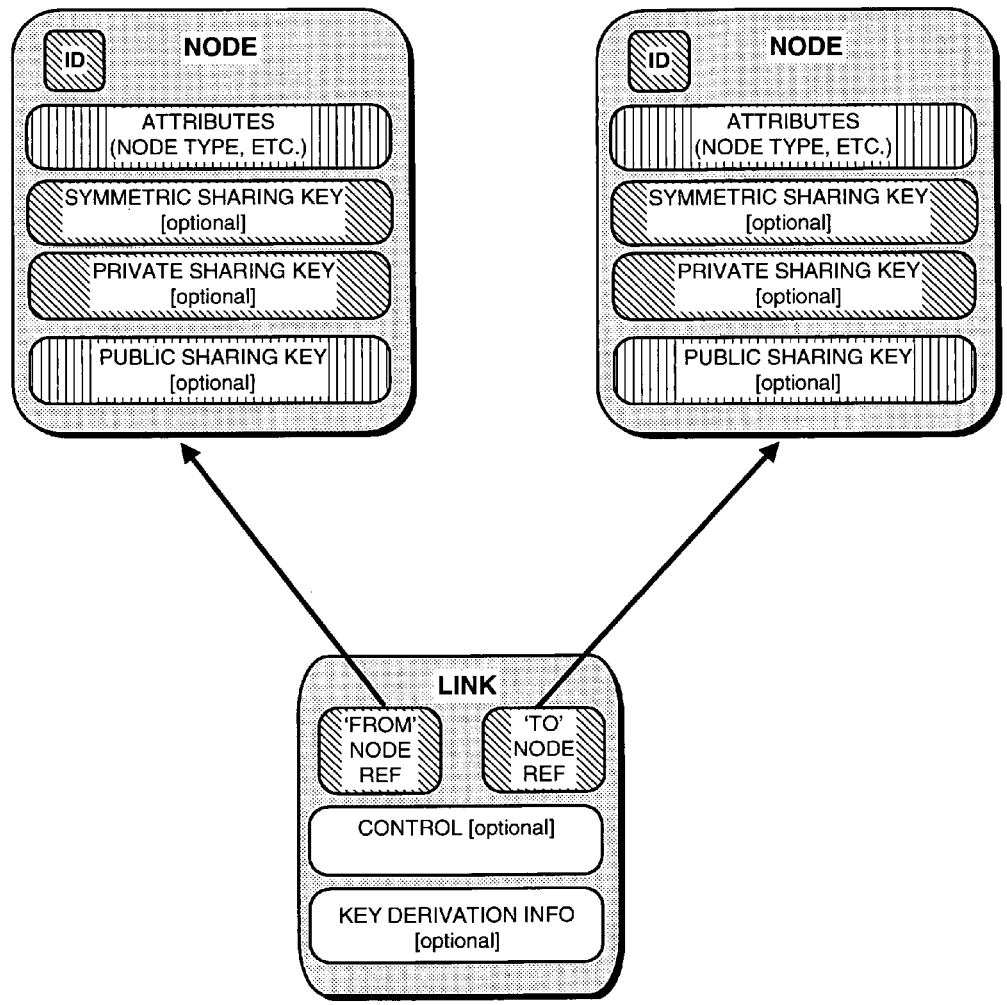
FIG. 28B illustrates the relationship between links and nodes in one example embodiment.

Link objects represent relationships between nodes. Link objects can also optionally contain some cryptographic data that allows the link to be used for content key derivation. Just as for nodes, in one embodiment no implicit or explicit semantics are used to define what a link relationship means. Depending on what the from and to nodes of the link represent in a given DRM Profile, the meaning of the link relationship can express membership, ownership, association, and/or many other types of relationships. In a typical DRM profile, some node objects could represent users, other nodes could represent devices, and other nodes could represent user groups or authorized domains (ADs). In such a context, links between devices and users might represent an ownership relationship, and links between users and user groups or authorization domains might represent membership relationships. FIG. 28B illustrates the structure and interrelationship between nodes and links in one example embodiment.

1.20.1. Node

The node object represents an entity in the system. The node object's attributes define certain aspects of what the node object represents, such as the role or identity represented by the node object in the context of a DRM profile. The node object may also have a confidentiality asymmetric key pair that is used for targeting confidential information to the subsystems that have access to the confidential parts of the node object (typically, the entity represented by the node, or some entity that is responsible for managing that node). Confidential information targeted at a node can be encrypted with that node's confidentiality public key. The node object may also have a sharing asymmetric key pair and a sharing symmetric key can be used in conjunction with link objects when the system uses a ContentKey derivation system for ContentKey distribution, such as that described elsewhere herein. In a preferred embodiment, only entities that need to be referenced by link or control objects, or to receive cryptographically targeted information, need to have corresponding node objects.

1.20.2. Link

The link object is a signed assertion that there exists a directed edge in the graph whose vertices are the node objects. For a given set of nodes and links, we say that there is a path between a node X and a node Y if there exists a directed path between the node X vertex and the node Y vertex in the graph. When there is a path between node X and node Y, we say that node Y is reachable from node X. The assertions represented by link objects are used to express which nodes are reachable from other nodes. The controls that govern content objects can check, before they allow an action to be performed, that certain nodes are reachable from the node associated with the entity performing the action. For example, if node D represents a device that wants to perform the "play" action on a content object, a control that governs the content object can test if a certain node, U, representing a certain user, is reachable from node D. To determine if node U is reachable, the DRM engine can check whether there is a set of link objects that can establish a path between node D and node U.

In one embodiment, the DRM engine verifies link objects before it uses them to decide the existence of paths in the node graph. Depending on the specific features of the certificate system (e.g., x509v3) used to sign link objects, link objects can be given limited lifetimes, be revoked, etc. In one embodiment, the policies that govern which keys can sign link objects, which link objects can be created, and the lifetime of link objects are not directly handled by the DRM engine. Instead, those policies leverage the node's attribute information. To facilitate the task of enforcing certain policies, in one embodiment, a way to extend standard certificate formats with additional constraint checking is provided. These extensions make it possible to express validity constraints on certificates for keys that sign links, such that constraints such as what type of nodes the link is connecting, as well as other attributes, can be checked before a link is considered valid.

In one embodiment, a link object can contain a control object that will be used to constrain the validity of the link. In addition, in one embodiment a link object may contain cryptographic key derivation data that provides the user with sharing keys for key distribution. That cryptographic data will contain, in addition to metadata, the private and/or symmetric sharing keys of the "from" node, encrypted with the sharing public key and/or the sharing symmetric key of the "to" node.

1.21. Data Structures

The following paragraphs describe, in more detail, an illustrative object model for the objects discussed above, defining the fields that each type of object has in one illustrative embodiment. Data structures are described using a relatively simple object description syntax. Each object type is defined by a class that can extend a parent class (this is an "is-a" relationship). The class descriptions are in terms of the simple abstract types "string" (character strings), "int" (integer value), "byte" (8-bit value), and "boolean" (true or false) but do not define any specific encoding for those data types, or for compound structures containing those types. The way objects are encoded, or represented, can vary depending on the implementation of the engine. In practice, a given profile of use of the DRM engine can specify how the fields are represented (e.g., using an XML schema).

In one illustrative embodiment, the following notations are used:

| | |
|---|---|
| class ClassName {<br>    field1;<br>    field2;<br>    ....<br>} | Defines a class type. A class type is a heterogeneous compound data type (also called object type). This compound type is made up of one or more fields, each of a simple or compound type. Each field can be of a different type. |
| type[ ] | Defines a homogeneous compound data type (also called list or array type). This compound type is made up of 0 or more elements of the same type (0 when the list is empty). |
| String | Simple type: represents a character string |
| Int | Simple type: represents an integer value |
| Byte | Simple type: represents an integer value between 0 and 255 |
| Boolean | Simple type: represents a boolean value (true or false) |
| class SubClass extends SuperClass {...} | Defines a class type that extends another class type. A class that extends another one contains all the fields of the class it extends (called the superclass) in addition to its own fields. |
| Abstract class {...} | Defines an abstract class type. Abstract class types are types that can be extended, but are never used by themselves. |
| {type field;} | Defines an optional field. An optional field is a field that may be omitted from the compound data type that contains it. |
| (type field;) | Defines a field that will be skipped when computing the canonical byte sequence for the enclosing compound field |
| class SubClass extends SuperClass(field=value) {...} | Defines a subclass of a class type and specifies that for all instances of that subclass, the value of a certain field of the superclass is always equal to a fixed value. |

1.21.1. Common Structures

In one illustrative embodiment, the following common structures are used:

```
abstract class Octobject {
    {string id;}
    Attribute[ ] attributes;
    InternalExtension[ ] extensions;
}
class Transform {
    string algorithm;
}
class Digest {
    Transform[ ] transforms;
    string algorithm;
    byte[ ] value;
}
class Reference {
    string id;
    {Digest digest;}
}
```

1.21.1.1. Attributes

In one embodiment, there are four kinds of attributes: IntegerAttribute, StringAttribute; ByteArrayAttribute, and ListAttribute, each having a name and a type.

```
abstract class Attribute {
    {string name;}
    string type;
}
class IntegerAttribute extends Attribute(type='int') {
    int value;
}
class StringAttribute extends Attribute(type='string') {
    string value;
}
class ByteArrayAttribute extends Attribute(type='bytes') {
    byte[ ] value;
}
Class ListAttribute extends Attribute(type='list') {
    Attribute[ ] attributes; // must all be named
}
Class ArrayAttribute extends Attribute(type='array') {
    Attribute[ ] attributes; // must all be unnamed
}
```

1.21.1.2. Extensions

In the illustrative embodiment under discussion, there are two types of extensions: internal extensions, which are carried inside the Octobject, and external extensions, which are carried outside the Octobject.

```
abstract class ExtensionData {
    string type;
}
abstract class Extension {
    string id;
}
class ExternalExtension extends Extension {
    string subject;
    ExtensionData data;
}
class InternalExtension extends Extension {
    boolean critical;
    {Digest dataDigest;}
    (ExtensionData data;)
}
```

In some embodiments, it will be important to be able to verify the signature of an object even if a particular type of ExtensionData is not understood by a given implementation. Thus, in one embodiment, a level of indirection with the dataDigest field is added. If the specification of the ExtensionData mandates that the data is part of the signature within the context of a particular object, then the dataDigest field will be present. An implementation that understands this ExtensionData, and is therefore capable of computing its canonical representation, can then verify the digest. If, in such an embodiment, the specification of this ExtensionData mandates that the data is not part of the signature, then the dataDigest field will not be present.

1.21.2. Node objects

```
class Node extends Octobject {
}
```

1.21.3. Link objects

```
class Link extends Octobject {
    string fromId;
    string toId;
    {Control control;}
}
```

1.21.4. Control objects

```
class Control extends Octobject {
    string protocol;
    string type;
    byte[ ] codeModule;
}
```

1.21.5. ContentKey objects

```
abstract class Key {
    string id;
    string usage;
    string format;
    byte[ ] data;
}
abstract class PairedKey extends Key {
    string pairId;
}
class ContentKey extends Octobject {
    Key secretKey;
}
```

In one embodiment, each key has a unique id, a format, a usage (that can be null), and data. The 'usage' field, if it is not empty, specifies the purpose for which the key can be used. For normal content keys, this field is empty. In embodiments in which a key distribution scheme such as that described above is used, this field may specify if this is a sharing key or a confidentiality key. The 'format' field specifies the format of the 'data' field (such as, for example, 'RAW' for symmetric keys, or 'PKCS#8' for RSA private keys, etc.). The 'data' field contains the actual key data, formatted according to the 'format' field.

For keys that are part of a key pair (such as RSA keys), the extra field 'pairId' gives a unique identifier for the pair, so that the pair can be referenced from other data structures.

In one embodiment the data field in the key object is the plaintext value of the actual key (i.e., it is the plaintext value of the key that will be hashed), even though the object's actual representation contains an encrypted copy of the key.

1.21.6. Controller objects

```
class Controller extends Octobject {
    Reference controlRef;
    Reference[ ] contentKeyRefs;
}
```

8. Virtual Machine

Preferred embodiments of the DRM engine described herein use a virtual machine (sometimes referred to herein as the "control virtual machine," the "control VM," or simply the "VM") to execute control programs that govern access to content. Illustrative embodiments of such a virtual machine are described below, as are various modifications and design considerations that could be made to this illustrative embodiment. The integration of an illustrative embodiment of the virtual machine (referred to as the "Plankton" virtual machine) with an illustrative embodiment of the DRM engine (referred to as "Octopus") is also described. It should be appreciated, however, that embodiments of the digital rights management engine, architecture, and other systems and methods described herein can be used with any suitable virtual machine, or, in some embodiments, without a virtual machine at all, and thus it will be appreciated that the details provided below regarding example embodiments of a virtual machine are for purposes of illustration and not limitation.

In a preferred embodiment, the control VM is a traditional virtual machine, designed to be easy to implement using various programming languages with a very small code footprint. It is based on a simple, stack-oriented instruction set that is designed to be minimalist, without undue concern for execution speed or code density. In situations where compact code is required, data compression techniques can be used to compress the virtual machine's byte code.

In preferred embodiments, the control virtual machine is designed to be suitable as a target for low or high level programming languages, and supports assembler, C, and FORTH. In addition, it will be appreciated that compilers for other languages, such as Java or custom languages, can be created in a relatively straightforward fashion to compile code into the format (e.g., byte code) used by the virtual machine. In one embodiment the control virtual machine is designed to be hosted within a host environment, not run directly on a processor or in silicon. In preferred embodiments, the natural host environment for the virtual machine is the DRM engine, although it will be appreciated that the virtual machine architecture described herein could alternatively, or in addition, be used in other contexts.

Figure 29:
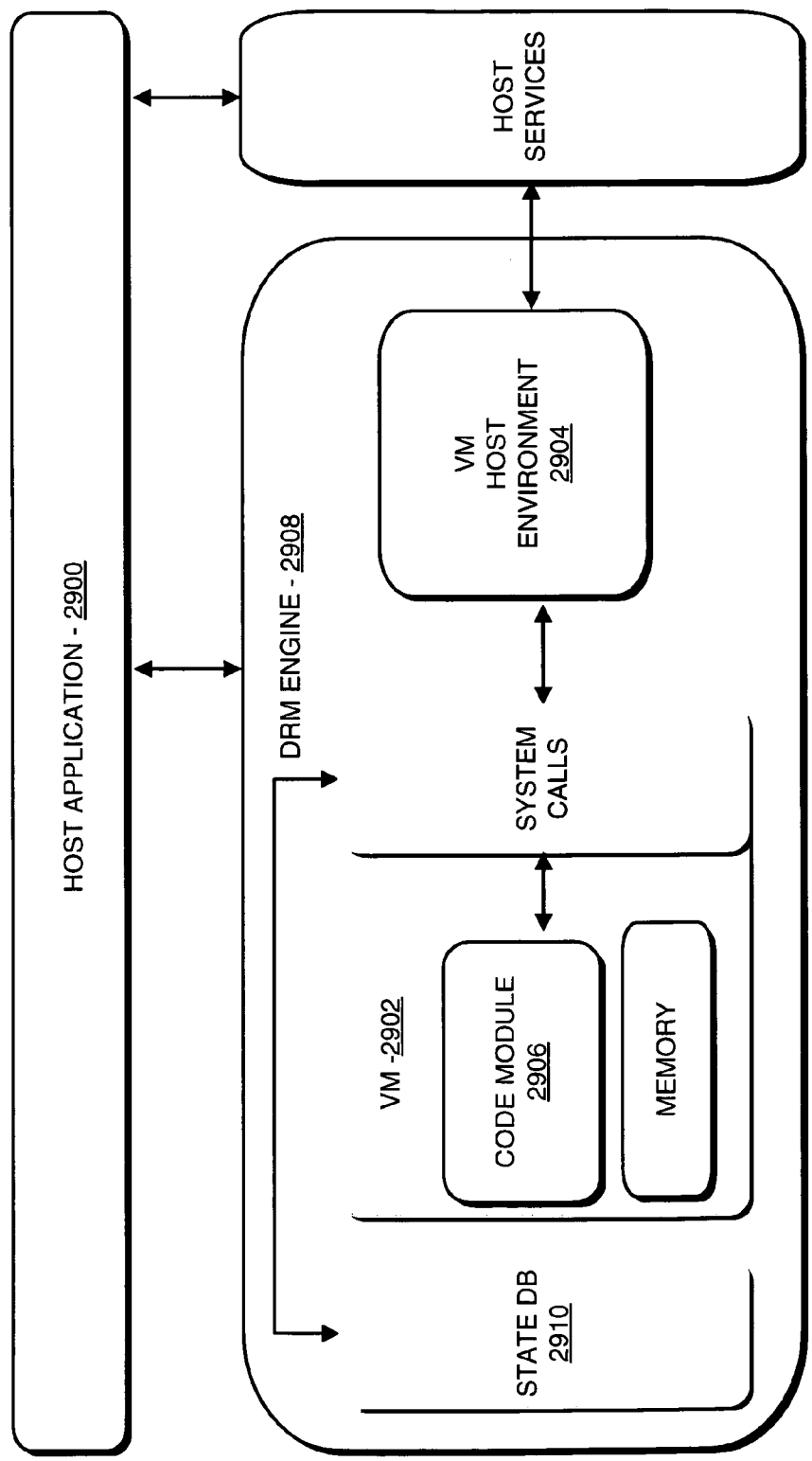
FIG. 29 illustrates the operating environment of an illustrative implementation of a virtual machine.

FIG. 29 illustrates the operating environment of an illustrative implementation of the control virtual machine 2902. As shown in FIG. 29, in one embodiment virtual machine 2902 runs within the context of its host environment 2904, which implements some of the functions needed by the virtual machine as it executes programs 2906. Typically, the control VM runs within the DRM engine 2908, which implements its host environment. As shown in FIG. 29, in a preferred database, the virtual machine 2902 and the DRM engine 2908 have access to a secure database 2910 for persistent storage of state information.

1.22. Architecture

1.22.1. Execution Model

In preferred embodiments, the VM runs programs by executing instructions stored in byte code in code modules. Some of these instructions can call functions implemented outside of the program itself by making system calls. System calls can be implemented by the VM itself or delegated to the host environment.

In one embodiment, the VM executes instructions stored in code modules as a stream of byte codes loaded into memory. The VM maintains a virtual register called the Program Counter (PC), which is incremented as instructions are executed. The VM executes each instruction, in sequence, until an OP_STOP instruction is encountered, an OP_RET instruction is encountered with an empty call stack, or a runtime exception occurs. Jumps are specified either as a relative jump (specified as a byte offset from the current value of PC), or as an absolute address.

1.22.2. Memory Model

In one embodiment, the VM uses a relatively simple memory model, in which memory is separated into data memory and code memory. For example, data memory can be implemented as a single, flat, contiguous memory space, starting at address 0, and can be implemented as an array of bytes allocated within the heap memory of the host application or host environment. In one embodiment, attempts to access memory outside of the allocated space will cause a runtime exception which will cause program execution to terminate.

Data memory is potentially shared between several code modules concurrently loaded by the virtual machine. The data in the data memory can be accessed by memory-access instructions, which, in one embodiment, can be either 32-bit or 8-bit accesses. 32-bit memory accesses are performed using big-endian byte order. In a preferred embodiment, no assumptions are made with regards to alignment between the virtual machine-visible memory and the host-managed memory (i.e., the host CPU virtual or physical memory).

In one embodiment, code memory is a flat, contiguous memory space, starting at address 0, and can be implemented as an array of bytes allocated within the heap memory of the host application or host environment.

The VM may support loading more than one code module. If the VM loads several code modules, in one embodiment all the code modules share the same data memory (although each module's data is preferably loaded at a different address), but each has its own code memory, thus preventing a jump instruction in one code module to cause a jump to code in another code module.

1.22.3. Data Stack

In one embodiment, the VM has the notion of a data stack, which represents 32-bit data cells stored in the data memory. The VM maintains a virtual register called the Stack Pointer (SP). After reset, the SP points to the end of the data memory, and the stack grows downward (when data is pushed on the data stack, the SP register is decremented). The 32-bit data cells on the stack are interpreted either as 32-bit addresses or 32-bit integers, depending on the instruction referencing the stack data. Addresses are unsigned integers. In one embodiment, all other 32-bit integer values on the data stack are interpreted as signed integers unless otherwise specified.

1.22.4. Call Stack

In one embodiment, the VM manages a call stack used for making subroutine calls. In one embodiment, the values pushed on this stack cannot be read or written directly by the memory-access instructions. This stack is used internally by the VM when executing OP_JSR, OP_JSRR, and OP_RET instructions. For a given VM implementation, the size of this return address stack can be fixed to a maximum, which will allow only a certain number of nested calls.

1.22.5. Pseudo Registers

In one embodiment, the VM reserves a small address space at the beginning of data memory to map pseudo-registers. In one embodiment, the addresses of these pseudo-registers are fixed. For example, the following registers could be defined:

| Address | Size | Name | Description |
|---|---|---|---|
| 0 | 4 | ID | 32-bit ID of the currently executing code segment. This ID is chosen by the VM when a module is loaded. The VM changes this register if it changes from the code segment of one module to the code segment of another module |
| 4 | 4 | DS | 32-bit value set to the absolute data address at which the data segment of the currently executing module has been loaded. This value is determined by the VM's module loader |
| 8 | 4 | CS | 32-bit value set to the absolute code address at which the code segment of the currently executing module has been loaded. This value is determined by the VM's module loader. |
| 12 | 4 | UM | 32-bit value set to the absolute data address of the first byte following the region of the data memory space where the data segments of code modules have been loaded. |

1.22.6. Memory Map

The following shows the layout of data memory and code memory in an illustrative embodiment:

| Data Memory | |
|---|---|
| Address Range | Description |
| 0 to 15 | Pseudo-registers |
| 16 to 127 | Reserved for future VM/System use |
| 128 to 255 | Reserved for application use |
| 256 to DS − 1 | Unspecified. The VM may load the data segments of code modules at any address at or above 256. If it chooses an address larger than 256, the use of the address space between 256 and DS is left unspecified. This means that the virtual machine implementation is free to use it any way it sees fit. |
| DS to UM − 1 | Image of the data segments of one or more code modules loaded by the virtual machine. |
| UM to End | Shared address space. The code modules' data and the data stack share this space. The data stack is located at the end of that space and grows down. The end represents the last address of the data memory space. The size of the data memory space is fixed by the VM based on memory requirements contained in the code module and implementation requirements. |

| Code Memory | |
|---|---|
| Address Range | Description |
| 0 to CS − 1 | Unspecified. The virtual machine may load the code segments of code modules at any address at or above 0. If it chooses an address larger than 0, the use of the address space between 0 and CS is left unspecified. This means that the virtual machine is free to use it in any way it sees fit. |
| CS to CS + size(code segment) − 1 | Image of the code segment of a code module loaded by the virtual machine |

1.22.7. Executing Routines

Before executing a code routine, in one embodiment the virtual machine implementation resets the data stack pointer to point to the top of the initialized data stack. The initialized data stack contains the routine's input data, and extends to the end of the data memory. The initialized data stack may be used as a way to pass input arguments to a routine. When there is no initialized data stack, the data stack pointer points to the end of the data memory. In one embodiment, the initial call stack is either empty or contains a single terminal return address pointing to an OP_STOP instruction, which will force execution of the routine to end on an OP_STOP instruction in case the routine finished with an OP_RET instruction.

When execution stops, either because a final OP_RET instruction with an empty call stack has been executed or a final OP_STOP instruction has been executed, any data left on the data stack is considered to be the output of the routine.

1.22.8. Runtime Exceptions

In one embodiment, any of the following conditions is considered to be a runtime exception which causes execution to stop immediately:

An attempt to access data memory outside the current data memory address space.

An attempt to set the PC to, or cause the PC to, reach a code address outside the current code memory address space.

An attempt to execute undefined byte code.

An attempt to execute an OP_DIV instruction with a top-of-stack operand equal to 0.

An attempt to execute an OP_MOD instruction with a top-of-stack operand equal to 0.

An overflow or underflow of the Call Stack.

1.23. Instruction Set

In one embodiment, the control VM uses a relatively simple instruction set. Though limited, the number of instructions is sufficient to express programs of arbitrary complexity. Instructions and their operands are represented by a stream of byte codes. In one embodiment, the instruction set is stack-based, and except for the OP_PUSH instruction, none of the instructions have direct operands. Operands are read from the data stack, and results pushed on the data stack. In one embodiment, the VM is a 32-bit VM: all the instructions operate on 32-bit stack operands, representing either memory addresses or signed integers. Signed integers are represented with 2 s complement binary encoding. An illustrative embodiment of an instruction set for use with the control VM is shown in the following table. In the table, the stack operands for instructions with two operands are listed as "A,B" where the operand on the top of the stack is listed last (i.e., "B"). Unless otherwise specified, the term "push," as used in the following description of one illustrative embodiment, refers to pushing a 32-bit value onto the top of the data stack.

| OP CODE | Name | Byte Code | Operands | Description |
|---|---|---|---|---|
| OP_NOP | No Operation | 0 | | Do Nothing |
| OP_PUSH | Push Constant | 1 | N (direct) | Push a 32-bit constant |
| OP_DROP | Drop | 2 | | Remove the top cell of the data stack |
| OP_DUP | Duplicate | 3 | | Duplicate the top cell of the data stack |
| OP_SWAP | Swap | 4 | | Swap top two stack cells |
| OP_ADD | Add | 5 | A, B | Push the sum of A and B (A + B) |
| OP_MUL | Multiply | 6 | A, B | Push the product of A and B (A * B) |
| OP_SUB | Subtract | 7 | A, B | Push the difference between A and B (A − B) |
| OP_DIV | Divide | 8 | A, B | Push the division of A by B (A/B) |
| OP_MOD | Modulo | 9 | A, B | Push A modulo B (A % B) |
| OP_NEG | Negate | 10 | A | Push the 2's complement negation of A (−A) |
| OP_CMP | Compare | 11 | A, B | Push −1 if A less than B, 0 if A equals B, and 1 if A greater than B |
| OP_AND | And | 12 | A, B | Push bit-wise AND of A and B (A & B) |
| OP_OR | Or | 13 | A, B | Push the bit-wise OR of A and B (A | B) |
| OP_XOR | Exclusive Or | 14 | A, B | Push the bit-wise eXclusive OR of A and B (A ^ B) |
| OP_NOT | Logical Negate | 15 | A | Push the logical negation of A (1 if A is 0, and 0 if A is not 0) |
| OP_SHL | Shift Left | 16 | A, B | Push A logically shifted left by B bits (A << B) |
| OP_SHR | Shift Right | 17 | A, B | Push A logically shifted right by B bits (A >> B) |
| OP_JMP | Jump | 18 | A | Jump to A |
| OP_JSR | Jump to Subroutine | 19 | A | Jump to subroutine at absolute address A. The current value of PC is pushed on the call stack. |
| OP_JSRR | Jump to Subroutine (Relative) | 20 | A | Jump to subroutine at PC + A. The current value of PC is pushed on the call stack. |
| OP_RET | Return from Subroutine | 21 | | Return from subroutine to the return address popped from the call stack. |
| OP_BRA | Branch Always | 22 | A | Jump to PC + A |
| OP_BRP | Branch if Positive | 23 | A, B | Jump to PC + B if A > 0 |
| OP_BRN | Branch if Negative | 24 | A, B | Jump to PC + B if A < 0 |
| OP_BRZ | Branch if Zero | 25 | A, B | Jump to PC + B if A is 0 |
| OP_PEEK | Peek | 26 | A | Push the 32-bit value at address A |

| OP CODE | Name | Byte Code | Operands | Description |
|---|---|---|---|---|
| OP_POKE | Poke | 27 | A, B | Store the 32-bit value A at address B |
| OP_PEEKB | Peek Byte | 28 | A | Read the 8-bit value at address A, 0-extend it to 32-bits and push it on the data stack |
| OP_POKEB | Poke Byte | 29 | A, B | Store the least significant 8 bits of value A at address B |
| OP_PUSHSP | Push Stack Pointer | 30 | | Push the value of SP |
| OP_POPSP | Pop Stack Pointer | 31 | A | Set the value of SP to A |
| OP_CALL | System Call | 32 | A | Perform System Call with index A |
| OP_STOP | Stop | 255 | | Terminate Execution |

1.24. Code Modules

In a preferred embodiment, code modules are stored in an atom-based format, similar or identical to that used for the MPEG-4 file format, in which atoms contain a 32-bit size (e.g., represented by 4 bytes in big-endian byte order), followed by a 4-byte type (e.g., bytes that correspond to ASCII values of letters of the alphabet), followed by a payload (e.g., 8 bytes).

Figure 30:
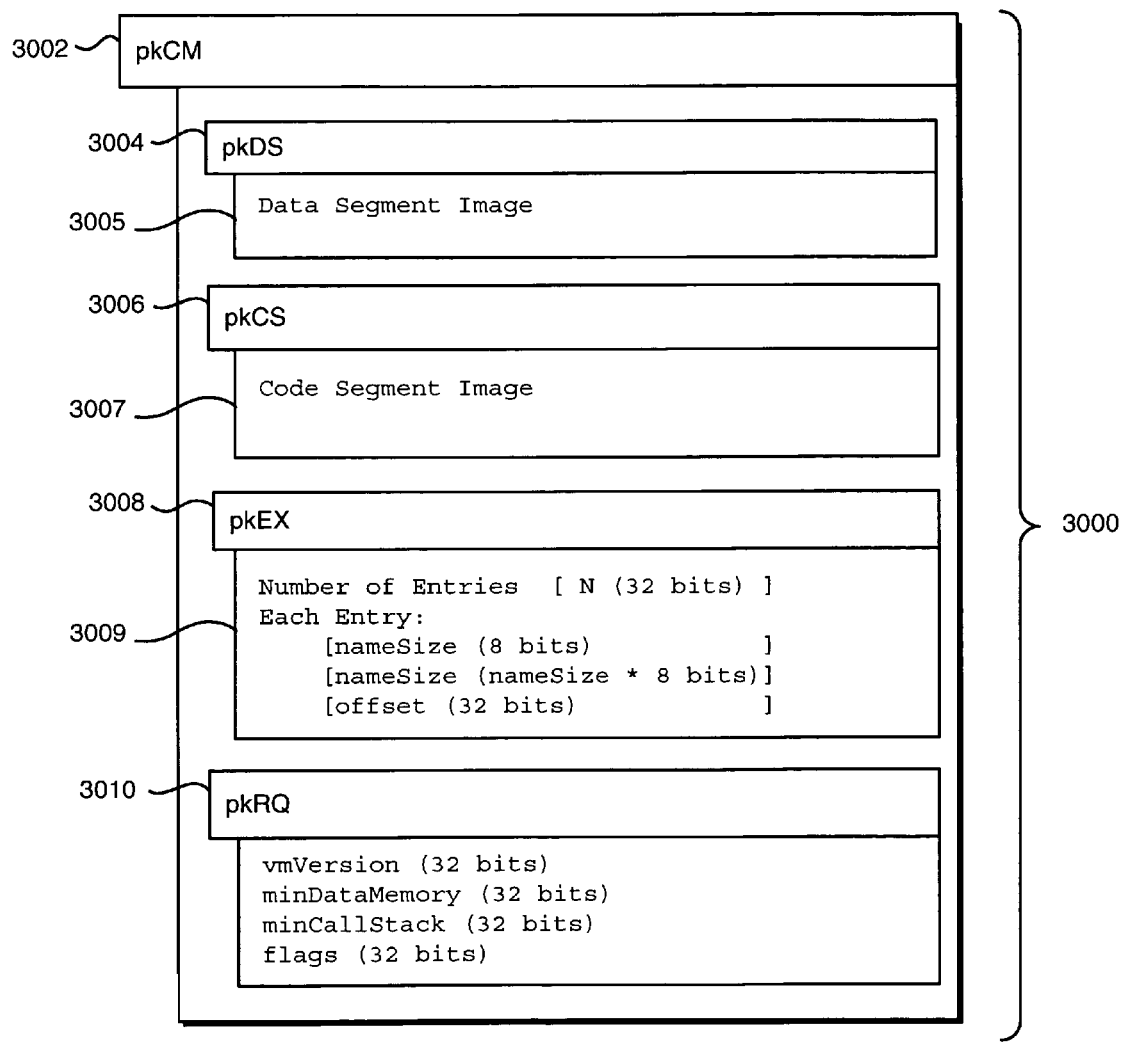
FIG. 30 illustrates an extended status block data structure in accordance with one embodiment.

FIG. 30 shows the format of an illustrative code module 3000. Referring to FIG. 30, pkCM atom 3002 is the top-level code module atom. It contains a sequence of sub-atoms. In one embodiment, pkCM atom 3002 contains one pkDS atom 3004, one pkCS atom 3006, one pkEX atom 3008, and possibly one pkRQ atom 3010. The pkCM atom 3002 may also contain any number of other atoms that, in one embodiment, are ignored if present. In one embodiment, the order of the sub-atoms is not specified, so implementations should not assume a specific order.

1.24.1. pkDS Atom

Figure 31A:
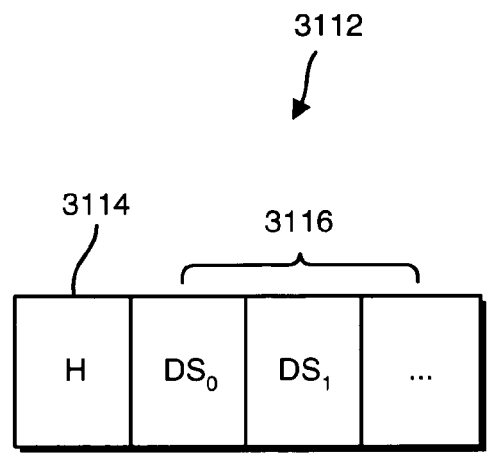
FIG. 31A shows a memory image of a data segment in one embodiment.

As shown in FIG. 30, pkDS atom 3004 contains a memory image 3005 of a data segment that can be loaded into data memory. As shown in FIG. 31A, in one embodiment memory image 3005 is represented by a sequence of bytes 3112, consisting of one header byte 3114 followed by zero or more data bytes 3116. Header byte 3114 encodes a version number that identifies the format of the bytes that follow 3116.

In one embodiment, only one version number is defined (i.e., DataSegmentFormatVersion=0), and in this format the data bytes of the memory image represent a raw image to be loaded into memory. The virtual machine loader only loads the data bytes 3116 of the memory image 3105, not including the header byte 3114. In one embodiment, the virtual machine loader is operable to refuse to load an image in any other format.

1.24.2. pkCS Atom

Figure 31B:
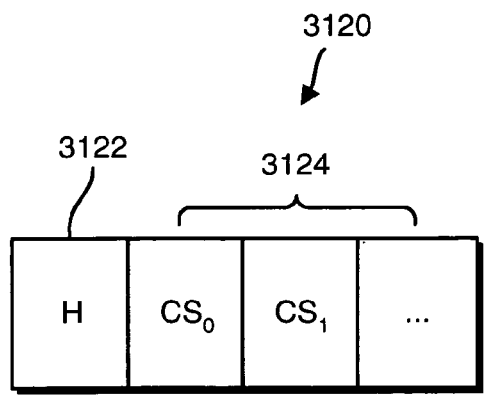
FIG. 31B shows an example of the memory image of a code segment in one embodiment.

As shown in FIG. 30, pkCS atom 3006 contains a memory image 3007 of a code segment that can be loaded into code memory. As shown in FIG. 31B, in one embodiment memory image 3007 is represented by a sequence of bytes 3120 consisting of one header byte 3122 followed by zero or more data bytes 3124. Header byte 3122 encodes a version number that identifies the format of the bytes that follow 3124.

Figure 31C:
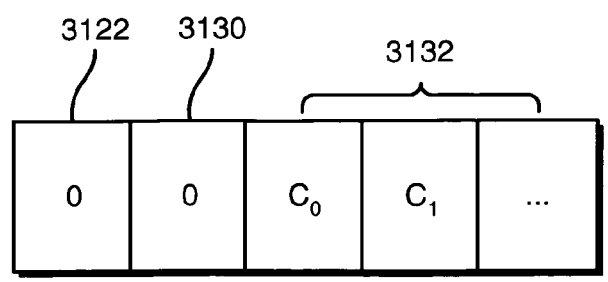
FIG. 31C shows an example of an export entry memory image in one embodiment.

In one embodiment, only one version number is defined (i.e., CodeSegmentFormatVersion=0), and, as shown in FIG. 31C, in this version the byte following header byte 3122 contains another header byte 3130 containing a version number that identifies the byte code encoding of the following bytes 3132. In the example shown in FIG. 31C, header byte 3130 identifies ByteCodeVersion=0, which specifies that data bytes 3132 contain a raw byte sequence with byte code values such as those defined in the example instruction set that is set forth above. In a preferred embodiment, the virtual machine loader only loads the byte code portion 3132 of the data bytes, not the two header bytes 3122, 3130.

1.24.3. pkEX Atom

Figure 31D:
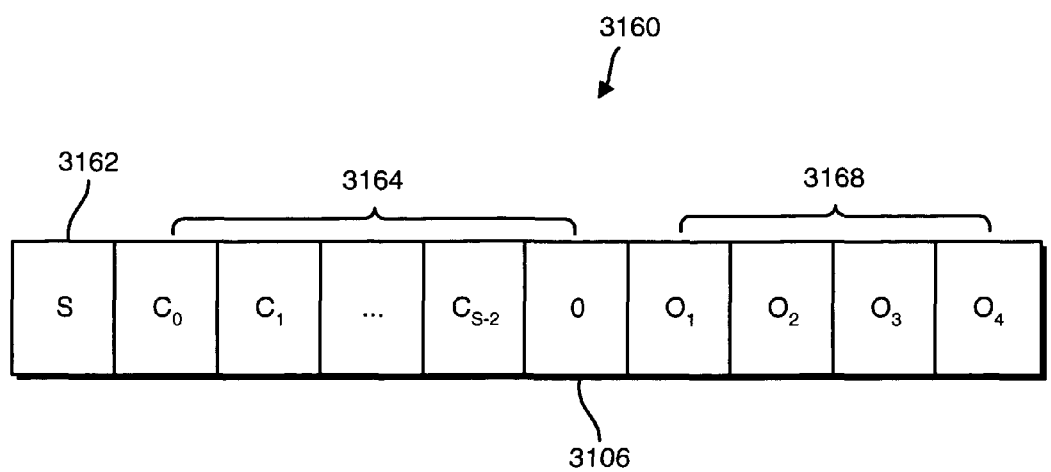
FIG. 31D shows a generic example of an export table entry in one embodiment.
Figure 31E:
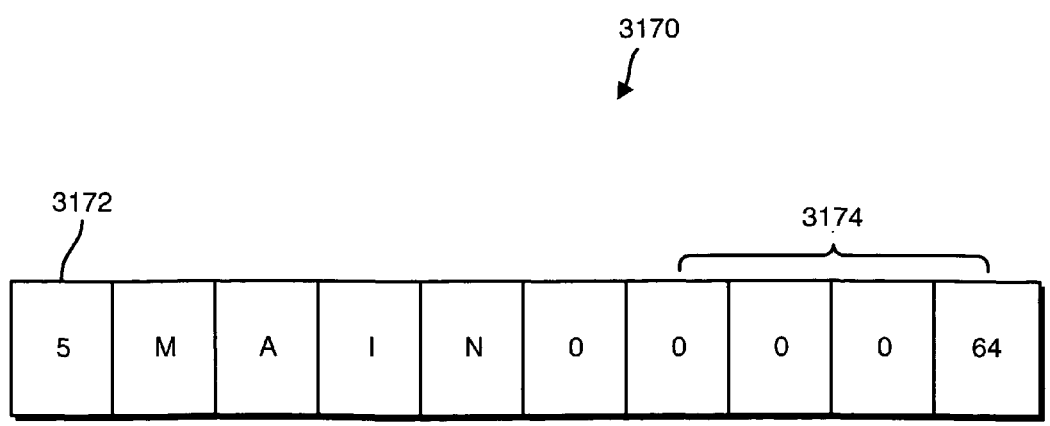
FIG. 31E shows an example of an export table entry for an example entry point.

Referring once again to FIG. 30, the pkEX atom 3008 contains a list of export entries. In the example shown in FIG. 30, the first four bytes 3009 of pkEX atom 3008 encode a 32-bit unsigned integer in big-endian byte order equal to the number of entries that follow. As shown in FIG. 31D, each following export entry 3160 consists of a name, encoded as one byte 3162 containing the name size, S, followed by S bytes 3164 containing the ASCII characters of the name, including a terminating zero 3166, followed by a 32-bit unsigned integer 3168 in big-endian byte order representing the byte offset of the named entry point, measured from the start of the byte code data stored in the 31 CS atom. FIG. 31E shows an example of an export table entry 3170 for the entry point MAIN at offset 64, in which the first byte 3172 indicates that the size of the name (i.e., "MAIN"), plus the terminating zero, is five bytes, and in which the last four bytes 3174 indicate that the byte offset is 64.

1.24.4. pkRQ Atom

As shown in FIG. 30, pkRQ atom 3010 contains requirements that need to be met by the virtual machine implementation in order to execute the code in the code module. In one embodiment, this atom is optional, and if it is not present, the virtual machine uses default implementation settings, such as may be defined by an implementation profile.

In one embodiment, the pkRQ atom consists of an array of 32-bit unsigned integer values, one for each field:

| Field Name | Description |
|---|---|
| vmVersion | Version ID of the VM Spec |
| minDataMemorySize | Minimum size in bytes of the data memory available to the code. This includes the data memory used to load the image of the Data Segment, as well as the data memory used by the Data Stack. In one embodiment, the VM must refuse to load the module if it cannot satisfy this requirement. |
| minCallStackDepth | Minimum number of nested subroutine calls (OP_JSR and OP_JSRR) that must be supported by the VM. In one embodiment, the VM must refuse to load the module if it cannot satisfy this requirement. |
| Flags | Set of bit-flags to signal required features of the VM. |

| Field Name | Description |
|---|---|
| | In one embodiment, a VM implementation must refuse to load a code module that has any unknown flag set. For example, if there are no flags defined, in one embodiment a |

-continued

| Field Name | Description |
|---|---|
| | VM implementation must check that this flag is set to 0. |

1.24.5. Module Loader

The virtual machine is responsible for loading code modules. When a code module is loaded, the Data Segment memory image encoded in the pkDS atom is loaded at a memory address in the Data Memory. That address is chosen by the VM loader, and is stored in the DS pseudo-register when the code executes.

The Code Segment memory image encoded in the pkCS atom is loaded at a memory address in the Code Memory. That address is chosen by the VM loader, and is stored in the CS pseudo-register when the code executes.

When a code module is loaded, the special routine named "Global.OnLoad" is executed if this routine is found in the entries of the Export table. This routine takes no argument on the stack, and returns an integer status upon return, 0 signifying success, and a negative error code signifying an error condition.

When a code module is unloaded (or when the virtual machine that has loaded the module is disposed of), the special routine named "Global.OnUnload" is executed if it is found in the Export table. This routine takes no argument on the stack, and returns an integer status upon return, 0 signifying success, and a negative error code signifying an error condition.

1.25. System Calls

The virtual machine's programs can call functions implemented outside of their code module's Code Segment. This is done through the use of the OP_CALL instruction, which takes an integer stack operand specifying the System Call Number to call. Depending on the System Call, the implementation can be a byte code routine in a different code module (for instance, a library of utility functions), executed directly by the VM in the VM's native implementation format, or delegated to an external software module, such as the VM's host environment.

In one embodiment, if an OP_CALL instruction is executed with an operand that contains a number that does not correspond to any System Call, the VM behaves as if the SYS_NOP system call was called.

1.25.1. System Call Numbers Allocation

In the illustrative embodiment under discussion, System Call Numbers 0 to 1023 are reserved for fixed System Calls (these System Calls will have the same number on all VM implementations). System Call Numbers 1024 to 16383 are available for the VM to assign dynamically (for example, the System Call Numbers returned by System.FindSystemCallByName can be allocated dynamically by the VM, and do not have to be the same numbers on all VM implementations).

In one example embodiment, the following fixed System Call Numbers are specified:

| Mnemonic | Number | System Call |
|---|---|---|
| SYS_NOP | 0 | System.NoOperation |
| SYS_DEBUG_PRINT | 1 | System.DebugPrint |
| SYS_FIND_SYSTEM_CALL_BY_NAME | 2 | System.FindSystemCallByName |
| SYS_SYSTEM_HOST_GET_OBJECT | 3 | System.Host.GetObject |
| SYS_SYSTEM_HOST_SET_OBJECT | 4 | System.Host.SetObject |

1.25.2. Standard System Calls

In one embodiment, a few standard system calls are supported that are useful for writing control programs. These calls include the fixed-number system calls listed in the table above, as well as system calls that have dynamically determined numbers (i.e., their system call number is retrieved by calling the System.FindSystemCallByName system call with their name passed as the argument).

In one embodiment, the system calls specified in this section that can return a negative error code may return error codes with any negative value. Section 8.4.4 defines specific, illustrative values. In one embodiment, if negative error code values are returned that are not predefined, they are interpreted as if they were the generic error code value FAILURE.

System.NoOperation.

This call takes no inputs and returns no outputs, and simply returns without doing anything. It is used primarily for testing the VM.

System.DebugPrint.

This call takes as its input, from the top of the stack, the address of a memory location containing a null-terminated string, and returns no output. A call to this function causes the string of text to be printed to a debug output, which can be useful in debugging. If the VM implementation does not include a facility to output debug text (such as might be the case in a non-development environment), the VM may ignore the call and treat it as if System.NoOperation had been called.

System.FindSystemCallByName.

This call finds the number of a system call given its name. The call takes as its input (from the top of the stack) the address of a null-terminated ASCII string containing the name of the system call for which to look, and returns (to the top of the stack) the system call number if a system call with the specified name is implemented, an ERROR_NO_SUCH_ITEM if the system call is not implemented, and a negative error code if an error occurs.

System.Host.GetLocalTime.

This call takes no inputs, and returns, to the top of the stack, the current value of the local time of the host, which, in one embodiment, is expressed as a 32-bit signed integer equal to the number of minutes elapsed since Jan. 1, 1970 00:00:00, or a negative error code.

System.Host.GetLocalTimeOffset.

This call takes no inputs, and returns, to the top of the stack, the current time offset (from UTC time) of the host, which, in one embodiment, is expressed as a 32-bit signed integer number equal to the number of minutes difference between local time and UTC time (i.e. LocalTime−UTC).

System.Host.GetTrustedTime.

This call takes no inputs, and returns, to the top of the stack, the trusted time and the value of one or more flags. In one embodiment, the trusted time is the current value of the trusted time clock (if the system includes such a trusted clock), or a negative error code if the trusted time is not available. In one embodiment, the value of trusted time is expressed as a 32-bit signed integer equal to the number of minutes elapsed since Jan. 1, 1970 00:00:00 UTC, or a negative error code. In one embodiment the flags are the bit-set of flags that further define the current state of the trusted clock. In one embodiment, if an error has occurred (e.g., the value of TrustedTime is a negative error code) the value returned for the flags is 0.

In one embodiment, the following flag is defined:

| Bit index (0 is LSB) | Name | Description |
| --- | --- | --- |
| 0 | TIME_IS_ESTIMATE | The value of TrustedTime is known to not be at its most accurate value, and therefore should be considered an estimate. |

This system call is relevant on systems that implement a trusted clock that can be synchronized with a trusted time source and maintain a monotonic time counter. The value of the trusted time is not guaranteed to always be accurate, but in one embodiment the following properties are required to be true:

The value of the trusted time is expressed as a UTC time value (the trusted time is not in the local time zone, as the current locality usually cannot be securely determined).
The trusted time never goes back.
The trusted clock does not advance faster than realtime.

Therefore, in this example embodiment, the value of TrustedTime is between the value of the last synchronized time (synchronized with a trusted time source) and the current real time. If the system is able to determine that its trusted clock has been operating and updating continuously and normally without interruption since the last synchronization with a trusted time source, it can determine that the value of TrustedTime is not an estimate, but an accurate value, and set the TIME_IS_ESTIMATE flag to 0.

In one embodiment, if the trusted clock detects that a hardware or software failure condition has occurred, and it is unable to return even an estimate of the trusted time, an error code is returned, and the value of the returned flags is set to 0.

System.Host.GetObject:

This system call is a generic interface that allows a program to access objects provided by the virtual machine's host. The System.Host.GetObject call takes the following inputs (listed from the top of the stack downwards): Parent, Name, ReturnBuffer, and ReturnBuffer Size. Where "Parent" is the 32-bit handle of the parent container; "Name" is the address of a null-terminated string containing the path to the requested object, relative to the parent container; "ReturnBuffer" is the address of a memory buffer where the value of the object is to be stored; and "RetumBufferSize" is a 32-bit integer indicating the size in bytes of the memory buffer in which the value of the object is to be stored.

The System.Host.GetObject call produces the following outputs (listed from the top of the stack downwards): TypeID, Size. Where "TypeId" is the object type id, or a negative error code if the call failed. If the requested object does not exist, the error returned is ERROR_NO_SUCH_ITEM. If the buffer supplied for the return value is too small, the error returned is ERROR_INSUFFICIENT_SPACE. If the part of the object tree that is being accessed is access-controlled, and the calling program does not have the permission to access the object, ERROR_PERMISSION_DENIED is returned. Other error codes may be returned. "Size" is a 32-bit integer indicating the size in bytes of the data returned in the buffer supplied by the caller, or the size required if the caller provided a buffer that was too small.

In one embodiment, there are four types of host objects: strings, integers, byte arrays, and containers.

| Object Type | Type Id Name | Type Id Value |
| --- | --- | --- |
| Container | OBJECT_TYPE_CONTAINER | 0 |
| Integer | OBJECT_TYPE_INTEGER | 1 |
| String | OBJECT_TYPE_STRING | 2 |
| Byte Array | OBJECT_TYPE_BYTE_ARRAY | 3 |

In one embodiment, the value of a byte array object is an array of 8-bit bytes, the value of a string object is a null-terminated character string incoded in UTF-8, and the value of an integer object is a 32-bit signed integer value. Containers are generic containers that contain a sequence of any number of objects of any combination of types. Objects contained in a container are called the children of that container. The value of a container is a 32-bit container handle that is unique within a given VM instance. In one embodiment, the root container '/' has the fixed handle value 0.

In one embodiment, the namespace for host objects is hierarchical, where the name of a container's child object is constructed by appending the name of the child to the name of the parent container, separated by a '/' character. String and integer objects do not have children. For example, if a container is named '/Node/Attributes', and has a string child named 'Type', then '/Node/Attributes/Type' refers to the child string.

The root of the namespace is '/'. All absolute names start with a '/'. Names that do not start with a '/' are relative names. Relative names are relative to a parent container. For example, the name 'Attributes/Type', relative to parent '/Node', is the object with the absolute name '/Node/Attributes/Type'.

In one embodiment, container objects can also have real and virtual child objects that be accessed by using virtual names. Virtual names are names that are not attached to host objects, but a convention to identify either unnamed child objects, child objects with a different name, or virtual child objects (child objects that are not real children of the container, but created dynamically when requested).

In one embodiment, for objects, the following virtual names are defined as virtual child object names:

| Virtual Name | Description |
| --- | --- |
| @Name | Virtual string object: the name of the object. If the object is unnamed, the value is an empty string. Note that unnamed objects are only accessible through the @<n> virtual name of a container object (see below) |
| @Size | Virtual integer object. The integer value is equal to the size in bytes required to store this object. For integers, this value is 4; for strings, it is the number of bytes needed to store the UTF-8 string plus a null byte terminator. For byte arrays, this is the number of bytes in the array. |
| @Type | Virtual integer object. The integer value is equal to the object's Type Id. |

For containers, the following virtual names are defined as virtual child object names in one embodiment:

| Virtual Name | | Description |
|---|---|---|
| Virtual Index | @<n> | Virtual object: the <n>th object in a container. The first object in a container has index 0. <n> is expressed as a decimal number. Example: if 'Attributes' is a container that contains 5 child objects, 'Attributes/@4' is the 5$^{th}$ child of the container. |
| Virtual Size | @Size | Virtual integer object. The integer value is equal to the number of objects in the container. |

EXAMPLES

The following table shows an example of a hierarchy of Host Objects:

| Name | Value | Children | | | |
|---|---|---|---|---|---|
| Node | 1 | Name | Value | Children | |
| | | Type Name | "Device" Value | Children | |
| | | Attributes | 2 | Name | Value | Children |
| | | | | Color Name | "Red" Value | Children |
| | | | | Size Name | 78 Value | Children |
| | | | | Domain | "TopLevel" | |

In this example, calling System.Host.GetObject(parent=0, name="Node") returns a type ID of 0 (i.e., container), and causes the handle value of 1 to be written in the buffer supplied by the caller. The size of the value is 4 bytes.

Calling System.Host.GetObject(parent=0, name="Node/Attributes/Domain") returns a type ID of 2 (i.e., string), and causes the string "TopLevel" to be written in the buffer supplied by the caller. The size of the value is 9 bytes.

Calling System.Host.GetObject(parent=1, name="Attributes/@ 1") returns a type ID of 1 (i.e., integer), and causes the integer 78 to be written in the buffer supplied by the called. The size of the value is 4 bytes.

Calling System.Host.GetObject(parent=0, name="DoesNotExist") returns the error code ERROR_NO_SUCH_ITEM.

System.Host.SetObject. This system call is a generic interface that allows a program to create, write, and destroy objects provided by the virtual machine's host. The description of the object names and types is the same as for the System.Host.GetObject call described above. Not all host objects support being written to or destroyed, and not all containers support having child objects created. When a SetObject call is made for an object that does not support the operation, ERROR_PERMISSION_DENIED is returned.

The System.Host.SetObject system call takes as input the following parameters, listed from the top of the stack downwards:

| Top of stack |
|---|
| Parent |
| Name |
| ObjectAddress |
| ObjectType |
| ObjectSize |
| ... |

Parent: 32-bit handle of the parent container.

Name: address of a null-terminated string containing the path to the object, relative to the parent container.

ObjectAddress: address of a memory buffer where the value of the object is stored. If the address is 0, the call is interpreted as a request to destroy the object. The data at the address depends on the type of the object.

ObjectType: the type ID of the object.

ObjectSize: 32-bit integer indicating size in bytes of the memory buffer where the value of the object is stored. In the illustrative embodiment under discussion, the size is set to 4 for integer objects, and to the size of the memory buffer, including the null terminator, for string objects. For byte array objects, the size is the number of bytes in the array.

The System.Host.SetObject system call returns a ResultCode to the top of the stack as an output. The ResultCode is 0 if the call succeeded, and a negative error code if the call failed. If the call is a request to destroy an object and the requested object does not exist, or the call is a request to create or write an object and the object's parent does not exist, the error code returned is ERROR_NO_SUCH_ITEM. If the part of the object tree that is being accessed is access-controlled, and the calling program does not have the permission to access the object, ERROR_PERMISSION_DENIED is returned. Other error codes may also be returned.

There is a special case when the object refers to a container and the ObjectAddress is not 0. In this case the ObjectSize parameter is set to 0 and the value of ObjectAddress is ignored. If the container already exists, nothing is done, and a SUCCESS ResultCode is returned. If the container does not exist, and the parent of the container is writeable, an empty container is created.

Octopus.Links.IsNodeReachable.

This system call is used by control programs to check whether a given node is reachable from the node associated with the entity hosting this instance of the virtual machine. The call takes as its input a NodeId from the top of the stack, where the NodeId is a null-terminated string containing the ID of the target node to be tested for reachability. As output, the call returns a ResultCode and a StatusBlockPointer to the top of the stack. The ResultCode is an integer value that is 0 if the node is reachable, or a negative error code if it is not. The StatusBlockPointer is the address of a standard ExtendedStatusBlock, or 0 if no status block is returned.

System.Host.SpawnVm.

This system call is used by control programs to request that a new instance of a virtual machine be created, and a new code module loaded. In one embodiment, the host of the newly created virtual machine exposes the same host objects as the ones exposed to the caller, except the host object "/Octopus/Runtime/Parent/Id" is set to the identity of the caller. In one embodiment, this host object is a container. The children of this container are objects of type string, each with a value representing a name. In one embodiment, the semantics and specific details of those names are specified by the specification of the virtual machine's host.

In one embodiment, when the virtual machine that is running the code for the caller terminates, any spawned virtual machine that has not been explicitly released by calling System.Host.ReleaseVm is automatically released by the system as if System.Host.ReleaseVm had been called.

The System.Host.SpawnVm call takes as its input a ModuleId from the top of the stack. The ModuleId identifies the code module to be loaded into the new virtual machine instance. In one embodiment, the specification of the virtual machine's host describes the mechanism by which the actual code module corresponding to this module ID is to be located.

The System.Host.SpawnVm call returns a ResultCode and a VmHandle to the top of the stack. The ResultCode is an integer value that is 0 if the call was successful, and a negative error code if it failed. The VmHandle is an integer value identifying the instance of the virtual machine that has been created. If the call fails, this handle is set to 0. In one embodiment, this handle is only guaranteed to be unique within the virtual machine in which this call is made.

System.Host.CallVm.

This system call is used by control programs to call routines that are implemented in code modules loaded in virtual machine instances created using the System.Host.SpawnVm system call. This system call takes the following input from the top of the stack:

| Top of stack: |
| --- |
| VmHandle |
| EntryPoint |
| ParameterBlockAddress |
| ParameterBlockSize |
| ReturnBufferAddress |
| ReturnBufferSize |
| ... |

VmHandle: an integer value representing the handle of a virtual machine that was created by calling System.Host.SpawnVm.

EntryPoint: the address of a null-terminated string that specifies the name of the entry point to call. This name needs to match one of the entry points in the Export Table of the code module that was loaded into the virtual machine instance that corresponds to the VmHandle parameter.

ParameterBlockAddress: the address of a memory block that contains data to be passed to the callee. If no parameters are passed to the callee, this address is set to 0.

ParameterBlockSize: the size in bytes of the memory block at address ParameterBlockAddress, or 0 if ParameterBlockAddress is 0.

ReturnBufferAddress: the address of a memory buffer where the caller can receive data from the callee. If the caller does not expect any data back from the callee, this address is set to 0.

ReturnBufferSize: the size in bytes of the memory buffer at address ReturnBufferAddress, or 0 if ReturnBufferAddress is 0.

The System.Host.CallVm call returns the following output to the top of the stack:

| Top of Stack: |
| --- |
| SystemResultCode |
| CalleeResultCode |
| ReturnBlockSize |
| ... |

SystemResultCode: an integer value that is 0 if the call was successful or a negative error code if it failed. This value is determined by the system, not by the callee. Success only indicates that the system was able to successfully find the routine to call, execute the routine, and get the return value from the routine. The return value from the routine itself is returned in the CalleeResultCode value.

CalleeResultCode: an integer value that is returned by the callee.

ReturnBlockSize: the size in bytes of the data returned in the buffer supplied by the caller, or the size required if the caller provided a buffer that was too small. If no data was returned by the callee, the value is 0.

In the illustrative embodiment under discussion, the called routine complies with the following interface conventions: When the routine is called, the top of the stack contains the value ParameterBlockSize, supplied by the caller, indicating the size of the parameter block, followed by ParameterBlockSize bytes of data. If the size is not a multiple of 4, the data on the stack will be padded with zeros to ensure that the stack pointer remains a multiple of 4. Upon return, the called routine provides the following return values on the stack:

| Top of stack: |
| --- |
| ResultCode |
| ReturnBlockAddress |
| ReturnBlockSize |
| ... |

ReturnBlockAddress: the address of a memory block that contains data to be returned to the caller. If no data is returned, this address is set to 0.

ReturnBlockSize: size in bytes of the memory block at address ReturnBlockAddress, or 0 if ReturnBlockAddress is 0.

System.Host.ReleaseVm.

This system call is used by control programs to release a virtual machine that was spawned by a previous call to System.Host.SpawnVm. Any virtual machines spawned by the released virtual machine are released, and so on, recursively. The System.Host.ReleaseVm call takes as its input a VmHandle from the top of the stack, the VmHandle representing the handle of a virtual machine that was created by calling System.Host.SpawnVm. The System.Host.ReleaseVm call returns a ResultCode to the top of the stack as an output. The ResultCode is an integer value that is 0 if the call was successful or a negative error code if it failed.

1.25.3. Standard Data Structures

The following are standard data structures used by some of the standard system calls.

1.25.3.1. Standard Parameters

| ParameterBlock: | |
| --- | --- |
| Name | Type |
| Name | NameBlock |
| Value | ValueBlock |

Name: name of the parameter.

Value: value of the parameter

| ExtendedParameterBlock: | |
| --- | --- |
| Name | Type |
| Flags | 32-bit bit field |
| Parameter | ParameterBlock |

Flags: vector of boolean flags.
Parameter: parameter block containing a name and a value.

| NameBlock: | |
| --- | --- |
| Name | Type |
| Size | 32-bit integer |
| Characters | Array of 8-bit characters |

Size: 32-bit unsigned integer equal to the size in bytes of the "characters" field that follows. If this value is 0, the characters field is left empty (i.e., nothing follows).
Characters: Null-terminated UTF-8 string.

| ValueBlock: | |
| --- | --- |
| Name | Type |
| Type | 32-bit integer |
| Size | 32-bit integer |
| Data | Array of 8-bit bytes |

Type: 32-bit type identifier. In one embodiment, the following types are defined:

| Identifier | Type Name | Description |
| --- | --- | --- |
| 0 | Integer | 32-bit integer value, encoded as four 8-bit bytes in big-endian byte order. In one embodiment the value is considered signed unless otherwise specified. |
| 1 | Real | 32-bit floating point value, encoded as IEEE-754 in big-endian byte order |
| 2 | String | Null-terminated UTF-8 string |
| 3 | Date | 32-bit unsigned integer value, representing the number of minutes elapsed since January 1, 1970 00:00:00. In one embodiment, unless otherwise specified, the value is considered to be a UTC date, the most significant bit of which must be 0. |
| 4 | Parameter | ParameterBlock structure |
| 5 | ExtendedParameter | ExtendedParameterBlock structure |
| 6 | Resource | The value is a resource. The resource here is referenced by ID: the Data field of the value is a null-terminated ASCII string containing the ID of the resource that should be de-referenced to produce the actual data. |
| 7 | ValueList | An array of values (encoded as a ValueListBlock) |
| 8 | ByteArray | The value is an array of 8-bit bytes |

Size: 32-bit unsigned integer equal to the size in bytes of the "data" field that follows. If this value is 0, the data field is left empty (i.e., nothing follows the size field in the Value-Block).

Data: array of 8-bit bytes representing a value. The actual bytes depend on the data encoding specified by the type field.

| ValueListBlock: | |
| --- | --- |
| Name | Type |
| ValueCount | 32-bit integer |
| Value0 | ValueBlock |
| Value1 | ValueBlock |
| ... | ... |

ValueCount: 32-bit unsigned integer equal to the number of ValueBlock structures that follow. If this value is 0, no ValueBlocks follow.

Value0, Value1, . . . : sequence of zero or more ValueBlock structures.

1.25.3.2. Standard ExtendedStatus

The standard ExtendedStatusBlock is a data structure typically used to convey extended information as a return status from a call to a routine or a system call. It is a generic data structure that can be used in a variety of contexts, with a range of different possible values for its fields. In one embodiment, an ExtendedStatusBlock is defined as follows:

| ExtendedStatusBlock: | |
| --- | --- |
| Name | Type |
| GlobalFlags | 32-bit bit field |
| Category | 32-bit integer |
| SubCategory | 32-bit integer |
| LocalFlags | 32-bit bit field |
| CacheDuration | CacheDurationBlock |
| Parameters | ValueListBlock |

GlobalFlags: boolean flags whose semantics are the same regardless of the category field. The position and meaning of the flags are defined by profiles that use standard ExtendedStatusBlock data structures.

Category: Unique integer identifier of a category to which this status belongs. The category identifier values are defined by profiles that use standard ExtendedStatusBlock data structures.

SubCategory: Integer identifier (unique within the category) of a sub-category that further classifies the type of status described by this block.

LocalFlags: Boolean flags whose semantics are local to the category and subcategory of this status block. The position and meaning of the flags are defined by profiles that define and use the semantics of the category.

CacheDuration: Indicates the duration for which this status can be cached (i.e. remains valid). See the definition of the CacheDurationBlock type, below, for how the actual value of the duration is defined.

Parameters: List of zero or more ValueBlocks. Each ValueBlock contains a parameter encoded as a value of type Parameter or ExtendedParameter. Each parameter binds a name to a typed value, and is used to encode flexible variable data that describes the status block in more detail than just the category, sub-category, cache duration, and flags.

| CacheDurationBlock: | |
|---|---|
| Name | Type |
| Type | 32-bit integer |
| Value | 32-bit integer |

Type: Integer identifier for the type of the value. In one embodiment, the following types are defined:

| Type | Description |
|---|---|
| 0 | The value is a 32-bit unsigned integer that represents the number of seconds from the current time. A value of 0 means that the status cannot be cached at all, and therefore can only be used once. The special value 0xFFFFFFFF is interpreted as an infinite duration (i.e., the status can be cached indefinitely). |
| 1 | The value is a 32-bit unsigned integer that represents an absolute local time, expressed as the number of minutes elapsed since January 1, 1970 00:00:00. In one embodiment, the most significant bit must be 0. |

Value: 32-bit integer, the meaning of which depends on the Type field.

1.25.4. Standard Result Codes

Standard result codes are used in various APIs. Other result codes may be defined for use in more specific APIs.

| Value | Name | Description |
|---|---|---|
| 0 | SUCCESS | Success |
| −1 | FAILURE | Unspecified failure |
| −2 | ERROR_INTERNAL | An internal (implementation) error has occurred |
| −3 | ERROR_INVALID_PARAMETER | A parameter has an invalid value |
| −4 | ERROR_OUT_OF_MEMORY | Not enough memory available to complete successfully |
| −5 | ERROR_OUT_OF_RESOURCES | Not enough resources available to complete successfully |
| −6 | ERROR_NO_SUCH_ITEM | The requested item does not exist or was not found |
| −7 | ERROR_INSUFFICIENT_SPACE | Not enough memory supplied by the caller (typically used when a return buffer is too small) |
| −8 | ERROR_PERMISSION_DENIED | Permission to perform the call is denied to the caller. |
| −9 | ERROR_RUNTIME_EXCEPTION | An error has occurred during execution of byte code |
| −10 | ERROR_INVALID_FORMAT | Error caused by data with an invalid format (for example, invalid data in a code module) |

1.26. Assembler Syntax

This section describes an example syntax for use in compiling programs into the bytecode format described elsewhere herein. It should be appreciated that this is just one example of one possible syntax, and that any suitable syntax could be used. As previously indicated, it should also be understood that the bytecode format presented herein is also just an example, and the systems and methods described herein could be used with any other suitable byte code format or other code format.

An assembler reads source files containing code, data, and processing instructions, and produces binary code modules that can be loaded by a control virtual machine. In one illustrative embodiment, the assembler processes a source file sequentially, line by line. Lines can be zero or more characters, followed by a newline. Each line can be one of: an empty line (whitespace only), a segment directive, a data directive, an assembler directive, a code instruction, a label, or an export directive. In addition, each line can end with a comment, which starts with a ';' character and continues until the end of the line.

Data and instructions read from the source files have an implicit destination segment (i.e., where they end up when loaded by the VM). At any point during the parsing process, the assembler will have a "current" segment which is the implicit destination segment for data and instructions. The current segment can be changed using segment directives.

1.26.1. Segment Directives

Segment directives change the current segment of the parser. In one embodiment, the supported segment directives are .code and .data. The code segment holds the byte code instructions, and the data segment holds global variables.

1.26.2. Data Directives

Data directives specify data (e.g., integers and strings) that will be loaded in the virtual machine's data segment. In one embodiment, the supported data directives are:

.string "<some chars>"—Specifies a string of characters. In one embodiment, the assembler adds an octet with value 0 at the end of the string.

.byte <value>—Specifies an 8-bit value. <value> can be expressed as a decimal number, or a hexadecimal number (prefixed by 0x).

.long <value>—Specifies a 32-bit value. <value> can be expressed as a decimal number, or a hexadecimal number (prefixed by 0x).

1.26.3. Assembler Directives

In one embodiment, the supported assembler directives are .equ <symbol>, <value>, which sets the symbol <symbol> to be equal to the value <value>. Symbols are typically used as operands or code instructions.

1.26.4. Labels

Labels are symbols that point to locations within segments. Labels pointing to instructions in the code segment are typically used for jump/branch instructions. Labels pointing to data in the data segment are typically used to refer to variables. In one embodiment, the syntax for a label is: <LABEL>:

Note that there is nothing after the ":", except an optional comment. A label points to the location of the next data or instruction. In one embodiment, it is ok to have more than one label pointing to the same address.

1.26.5. Export Directives

Export directives are used to create entries in the "export" section of the code module produced by the assembler. Each entry in the export section is a (name, address) pair. In the illustrative embodiment under discussion, only addresses within the code segment can be specified in the export section.

The syntax of the export directive is: export <label>, which will export the address pointed to by <label>, with the name "<label>".

1.26.6. Code Instructions

When compiling data destined for the code segment, the assembler reads instructions that map directly, or indirectly, into byte codes. In the example instruction set shown above, most virtual machine byte codes have no direct operands, and appear with a simple mnemonic on a single line. To make the assembler syntax more readable, some instructions accept pseudo-operands, which look as if they were byte code operands, but are not really; in this case, the assembler generates one or more byte code instructions to produce the same effect as if the instruction did have a direct operand. For example, the branch instructions use pseudo-operands.

1.26.6.1. Branch Operands

Branch instructions can be specified verbatim (without any operand), or with an optional operand that will be converted by the assembler into a corresponding byte code sequence. The optional operand is an integer constant or a symbol. When the operand is a symbol, the assembler computes the correct integer relative offset so that the branch ends up at the address corresponding to the symbol.

1.26.6.2. Push Operands

In one embodiment, the PUSH instruction always takes one operand. The operand can be one of an integer constant, a symbol, or the prefix "@" directly followed by a label name. When the operand is a symbol, the value that is pushed is the direct value of that symbol, whether the symbol is a label or an .equ symbol (the value is not incremented by a segment offset). When the operand is a label name prefixed with "@", the value pushed depends on what the label points to. The value pushed on the stack is the absolute address represented by the label (i.e., the local label value added to the segment offset).

1.26.7. Examples

```
; constants
    .equ SOMECONST, 7
; what follows goes into the data segment
    .data
VAR1:
    .byte 8
VAR2:
    .string "hello\0"
VAR3:
    .long 0xFFFCDA07
VAR4:
    .long 0
; what follows goes into the code segment
    .code
FOO:
    PUSH 1
    ADD
    RET
BAR:
    PUSH 2
    PUSH @FOO        ; push the address of the label FOO
    JSR              ; jump to the code at label FOO
    PUSH SOMECONST   ; push the value 7
    PUSH @VAR1       ; push the addr of VAR1
    PUSH VAR1        ; push the offset of VAR1 within the data
                       segment
    PUSH @VAR3       ; push the addr of VAR3
    PEEK             ; push the value of VAR3
    PUSH @VAR4       ; push the addr of VAR4
    POKE             ; store the value on top of the stack into
                       VAR4
    PUSH @VAR2       ; push the addr of the string "hello"
```

1.26.8. Command Line Syntax

In one embodiment, the assembler is a command-line tool that can be invoked with the following syntax: "PktAssembler [options]<input_file_path> <output_file_path>", where the [options] can be: -cs int, -ds int, -xml id, or -h, where "-cs int" is a Code Segment Address Value (default=8), "-ds int" is a Data Segment Address Value (default=4), "-xml id" is used to output a control object as an XML file with the specified ID, and "-h" is used to display help information.

9. Controls

This section describes illustrative embodiments of control objects. Control objects can be used to represent rules that govern access to content by granting or denying the use of the ContentKey objects they control. They can also be used to represent constraints on the validity of a link object in which they are embedded. They can also be used as standalone program containers that are run on behalf of another entity, such as in agents or delegates. In one embodiment, controls contain metadata and byte-code programs, which implement a specific interaction protocol. The purpose of a Control Protocol is to specify the interaction between the DRM engine and a control program or between a host application and a control program through the DRM engine. This section also describes illustrative actions the application can perform on the content, which action parameters should be supplied to the control program, and how the control program encodes the return status indicating that the requested action can or cannot be performed, as well as parameters that can further describe the return status.

In this section, the following abbreviations and acronyms are used:

ESB: Extended Status Block
LSB: Least Significant Bit
Byte: 8-bit value, or octet
Byte Code: stream of bytes that encode executable instructions and their operands

1.27. Control Programs

In one embodiment, a control object contains a control program. The control program includes a code module containing byte-code that is executable by a virtual machine, and a list of named routines (e.g., entries in the export table).

In one embodiment, the set of routines that represent the rules that govern the performance of a certain operation (such as "play") on a content item is called an 'action control'. The set of routines that represent validity constraints on a link object is called a "link constraint". The set of routines that are intended to be executed on behalf of a remote entity (such as during a protocol session with a DRM engine running on a different host) is called an "agent". The set of routines that are intended to be executed on behalf of another control (such as when a control program uses the System.Host.CallVm system call) is called a "delegate".

1.27.1. Interface to Control Programs

In one embodiment, control programs are executed by a virtual machine running in a host environment. The host environment can be implemented in any suitable manner; however, for ease of explanation and for purposes of illustration, it will be assumed in the following discussion that the implementation of the virtual machine's host environment can be logically separated into two parts: a host application, and a DRM engine. It will be appreciated, however, that other embodiments may have a different logical separation of functions, which may be equivalent to the logical structure described above.

As was shown in FIG. 29, in preferred embodiments, the DRM engine 2908 is the logical interface between the host application 2900 and control programs 2906. The host application 2900 makes logical requests to the engine 2908, such as requesting access to a content key for a certain purpose (e.g., to play or render a content stream). In one embodiment, the engine 2908 ensures that the interaction protocol described below is implemented correctly, such as by ensuring that any guarantees regarding a control program's initialization, call sequence, and other interaction details are met.

When the host application 2900 requests the use of content keys for a set of content IDs, the DRM engine 2908 determines which Control object to use. The Protector objects allow the engine to resolve which ContentKey objects need to be accessed for the requested content IDs. The engine then finds the Controller object that references those ContentKey objects. In one embodiment, a Controller object can reference more than one ContentKey object. This allows multiple ContentKey objects to be governed by the same Control object. When the host application requests access to a content key by invoking an action, it can request content IDs as a group, to the extent that the ContentKey objects that correspond to them are referenced by the same Controller object. In one embodiment, a request to access a group of content keys referenced by more than one controller object is not allowed.

In one embodiment, the DRM engine follows a convention for mapping actions to routine names. For example, in one embodiment, for each of the routines described below, the name that appears in the Export Table entry in the code module is the respective string shown below in Sections 9.1.4-9.1.7.

1.27.1.1. Control Loading

In one embodiment, before the engine can make calls to control routines, it needs to load the control's code module into the virtual machine. In one embodiment, only one code module per VM is loaded.

1.27.1.2. Atomicity

In one embodiment, the engine ensures that calls to routines within control programs are atomic with respect to the resources it makes available to the routine, such as the object (or "state") database. Thus, in such an embodiment, the engine needs to ensure that those resources remain unmodified during the execution of any of the routines it calls. This may be done by effectively locking those resources during a routine call, or by preventing multiple VMs to run concurrently. However, the engine need not guarantee that those resources are unmodified across successive routine invocations.

1.27.2. Control Protocol

In one embodiment, the routine naming, the input/output interface, and the data structures for each routine in a code module, together, constitute a Control Protocol. The protocol implemented by a code module is signaled in the Control object's "protocol" field. The illustrative Control Protocol described below will be called the Standard Control Protocol, and its identifier (the value of the 'protocol' field) is "http://www.octopus-drm.com/specs/scp-1_0".

In one embodiment, before the DRM engine loads a code module and calls routines in the control program, it needs to guarantee that the interaction with the control program will be consistent with the specification for the specific protocol id signaled in the protocol field. That includes any guarantee about the features of the virtual machine that need to be implemented, guarantees about the size of the address space available to the control program, and the like.

It is possible for control protocols, such as the Standard Control Protocol, to evolve over time without having to create a new protocol specification. As long as the changes made to the protocol are consistent with previous revisions of the specification, and as long as existing implementations of the DRM engine, as well as existing control programs that comply with that protocol, continue to perform according to the specification, then the changes are deemed compatible. Such changes may include, for instance, new action types.

1.27.3. Byte Code Type

In the illustrative embodiment described above involving the Standard Control Protocol, the type of the byte-code module is "Plankton byte-code module version 1.0". In this example embodiment, the value for the "type" field of the Control object is "http://www.octopus-drm.com/specs/pkcm-1_0".

1.27.4. General Control Routines

General routines are routines that are applicable to the control as a whole, and are not specific to a given action or link constraint. The following general control routines are used in one illustrative embodiment:

1.27.4.1. Control.Init

This routine is optional (i.e., it is not required in all controls). If this routine is used, the engine calls it once before any other control routine is called. The routine has no inputs, and returns a ResultCode to the top of the stack as an output. The ResultCode is 0 on success, or a negative error code on failure. In one embodiment, if the ResultCode is not 0, the engine aborts the current control operation and does not make any further calls to routines for this control.

1.27.4.2. Control.Describe

This routine is optional. The routine is called when the application requests a description of the meaning of the rules represented by the control program in general (i.e. not for a specific action). The routine has no inputs, and returns a ResultCode and a StatusBlockPointer to the top of the stack as outputs, where the ResultCode is an integer value (0 if the routine completed successfully, or a negative error code otherwise), and where the StatusBlockPointer is the address of a standard ExtendedStatusBlock. The ExtendedStatusBlock contains information that an application can interpret and use to provide information to the user regarding the meaning of the rules represented by the control program.

1.27.4.3. Control.Release

This routine is optional. If this routine exists, the DRM engine calls it once after it no longer needs to call any other routine for the control. No other routine will be called for the control unless a new use of the control is initiated (in which case, the Control.Init routine will be called again). The routine has no inputs, and returns a ResultCode to the top of the stack as an output. The ResultCode is 0 on success, or a negative error code on failure.

1.27.5. Action Routines

Each possible action has a name (e.g., play, transfer, export, etc.). In one illustrative embodiment, for a given action <Action>, the following routine names are defined (where "<Action>" denotes the actual name of the action (e.g., "play", "transfer", "export", etc.)):

1.27.5.1. Control.Actions.<Action>.Init

This routine is optional. If it exists, the engine calls it once before any other routine is called for this action. The routine has no inputs, and returns a ResultCode to the top of the stack as an output. The ResultCode is 0 on success, or a negative error code on failure. In one embodiment, if ResultCode is not 0, the engine aborts the current action and does not make any further calls to routines for this action in this control.

1.27.5.2. Control.Actions.<Action>.Check

In the illustrate embodiment being discussed, this routine is required, and is called to check, without actually performing a given action, what the return status would be if the Perform routine were to be called for that action. It is important for this routine not to have any side effects. Note that if the Perform routine also has no side effects, the Check and Perform entries in the control's Entries Table can point to the same routine. This routine has the same inputs and outputs as the Perform routine described below.

1.27.5.3. Control.Actions.<Action>.Perform

In one embodiment, this routine is required, and is called when the application is about to perform the action. The routine has no inputs, and returns a ResultCode and a StatusBlockPointer to the top of the stack as outputs, where the ResultCode is an integer value (0 if the routine completed successfully, or a negative error code otherwise), and where the StatusBlockPointer is the address of a standard ExtendedStatusBlock. Note that in one embodiment a success ResultCode (i.e., 0) does not mean that the request was granted. It only means that the routine was able to run without error. It is the ExtendedStatusBlock that indicates whether the request was granted or denied. However, if the ResultCode indicates a failure, the host application proceeds as if the request was denied. For example, in one embodiment the StatusBlock's category should be ACTION_DENIED, or the returned ExtendedStatusBlock is rejected, and the host application aborts the action.

When an action is performed, only the Perform routine needs to be called. The engine does not need to call the Check routine beforehand. An implementation of the Perform routine can call the Check routine internally if it chooses to do so, but should not assume that the system will have called the Check routine beforehand.

1.27.5.4. Control.Actions.<Action>.Describe

This routine is optional, and is called when an application requests a description of the meaning of the rules and conditions represented by the control program for the given action. The routine has no inputs, and returns a ResultCode and a StatusBlockPointer to the top of the stack as outputs, where the ResultCode is an integer value (0 if the routine completed successfully, or a negative error code otherwise), and where the StatusBlockPointer is the address of a standard ExtendedStatusBlock.

1.27.5.5. Control.Actions.<Action>.Release

This routine is optional. If it exists, it is called once after the DRM engine no longer needs to call any other routines for the given action. No other routine are called for the given action unless a new use of the action is initiated (in which case, the Init routine will be called again). The routine has no inputs, and returns a ResultCode to the top of the stack as an output. The ResultCode is 0 on success and a negative error code on failure. If the ResultCode is not 0, the engine does not make any further calls to routines for the given action

1.27.6. Link Constraint Routines

In one embodiment, when a link object has an embedded control, the DRM engine calls the link constraint routines in that control to verify the validity of the link object. The following link constraint routines are used in one illustrative embodiment:

1.27.6.1. Control.Link.Constraint.Init

This routine is optional, and, if it exists, is called exactly once before any other routine is called for the given link constraint. The routine has no inputs, and returns a ResultCode to the top of the stack as an output. The ResultCode is 0 on success and a negative error code on failure. If the ResultCode is not 0, the engine deems the validity constraint for the link object to be unsatisfied, and avoids making further calls to routines for the link control.

1.27.6.2. Control.Link.Constraint.Check

In the illustrative embodiment being discussed, this routine is required, and is called to check if the validity constraint for a given link is satisfied. The routine has no inputs, and returns a ResultCode and a StatusBlockPointer to the top of the stack as outputs, where the ResultCode is an integer value (0 if the routine completed successfully, or a negative error code otherwise), and where the StatusBlockPointer is the address of a standard ExtendedStatusBlock. If the ResultCode is not 0, the engine deems the validity constraint for the link object to be unsatisfied, and avoids making further calls to routines for the link control. Even if the ResultCode is 0 (success), this does not mean that the constraint has been satisfied; it only means that the routine was able to run without error. It is the StatusBlock that indicates whether the constraint is satisfied or not.

1.27.6.3. Control.Link.Constraint.Describe

This routine is optional, and is called when the application requests a description of the meaning of the constraint represented by the control program for a given link. The routine has no inputs, and returns a ResultCode and a StatusBlockPointer to the top of the stack as outputs, where the ResultCode is an integer value (0 if the routine completed successfully, or a negative error code otherwise), and where the StatusBlockPointer is the address of a standard ExtendedStatusBlock.

1.27.6.4. Control.Link.Constraint.Release

This routine is optional, and, if it exists, is called by the engine once after the engine no longer needs to call any other routine for the given constraint. The routine has no inputs, and returns a ResultCode to the top of the stack as an output. The ResultCode is 0 on success and a negative error code on failure. In the embodiment being discussed, after calling this routine, no other routine can be called for the given constraint unless a new cycle is initiated (in which case, the Init routine is called again). Similarly, if the ResultCode is not 0, the engine does not make further calls to routines for the given link constraint.

1.27.7. Agent Routines

In one embodiment, an agent is a control object that is designed to run on behalf of an entity. Agents are typically used in the context of a service interaction between two endpoints, where one endpoint needs to execute some virtual machine code within the context of the second endpoint, and possibly obtain the result of that execution. In one embodiment, a control can contain multiple agents, and each agent can contain any number of routines that can be executed; however, in practice, agents typically have a single routine.

In one illustrative embodiment, the following entry points are defined for, agents, where <Agent> is a name string that refers to the actual name of an agent.

1.27.7.1. Control.Agents.<Agent>.Init

This routine is optional, and, if it exists, the engine calls it once before any other routine is called for the given agent. The routine has no inputs, and returns a ResultCode to the top of the stack as an output. The ResultCode is 0 on success and a negative error code on failure.

1.27.7.2. Control.Agents.<Agent>.Run

In the illustrative embodiment under discussion, this routine is required, and is the main routine of the agent. The routine has no inputs, and returns a ResultCode, a ReturnBlockAddress, and a ReturnBlockSize to the top of the stack as outputs. The ResultCode is an integer value (0 if the routine completed successfully, or a negative error code otherwise), the ReturnBlockAddress is the address of a block of memory that contains data that the agent code is expected to return to the caller (if the routine does not need to return anything, the address is 0), and the ReturnBlockSize is the size in bytes of the block of memory at the ReturnBlockAddress. In one embodiment, if ReturnBlockAddress is 0, the value of ReturnBlockSize is also 0.

1.27.7.3. Control.Agents.<Agent>.Describe

This routine is optional, and is called when an application request a description of a given agent. The routine has no inputs, and returns a ResultCode and a StatusBlockPointer to the top of the stack as outputs, where the ResultCode is an integer value (0 if the routine completed successfully, or a negative error code otherwise), and where the StatusBlockPointer is the address of a standard ExtendedStatusBlock.

1.27.7.4. Control.Agents.<Agent>.Release

This routine is optional, and, if it exists, the engine calls it once after the engine no longer needs to call any other routines for this agent. No other routine will be called for this agent unless a new cycle is initiated (in which case, the Init routine will be called again). The routine has no inputs, and returns a ResultCode to the top of the stack as an output. The ResultCode is 0 on success and a negative error code on failure.

1.28. Extended Status Blocks

The following example definitions are applicable to the ExtendedStatusBlock data structures returned by illustrative embodiments of several of the routines described above. Examples of ExtendedStatusBlock data structures are described in connection with the description of the virtual machine.

In one embodiment, there are no global ExtendedStatusBlock flags. In this embodiment, control programs set the GlobalFlag field of the ExtendedStatuBlock to 0.

1.28.1. Categories

The following paragraphs define values for the Category field of ExtendedStatusBlocks in accordance with one embodiment. In one embodiment, none of these categories have sub-categories, and thus the value of the SubCategory field of the ExtendedStatusBlocks is set to 0.

In one embodiment, the following category codes are defined:

1.28.1.1. Actions Check and Perform Routines

| Value | Name | Description |
|---|---|---|
| 0 | ACTION_GRANTED | The application is authorized to use the content keys controlled by the control program for the purpose of the requested action. The parameter list of the returned ExtendedStatusBlock should not contain any of the constraint parameters, but may contain obligation and/or callback parameters. |
| 1 | ACTION_DENIED | The application is not authorized to use the content keys controlled by the control program for the purpose of the requested action. When an action is denied, the control program should include in the parameter list of the returned ExtendedStatusBlock one or more of the constraints that were not met and caused the action to be denied (the constraints that were not evaluated and the constraints that did not cause the action to fail should be omitted). In one embodiment, the parameter list of the returned ExtendedStatusBlock must not contain any obligation or callback parameter. |

In one embodiment, in the context of ExtendedStatusBlock parameters returned by action routines, a constraint means a condition that is required to be true or a criterion that is required to be met in order for the result of the routine to return an ExtendedStatusBlock with the category ACTION_GRANTED.

In one embodiment, values for the LocalFlags field common to both categories described above include:

| Bit Index (0 is LSB) | Name | Description |
|---|---|---|
| 0 | OBLIGATION_NOTICE | The parameter list contains one or more parameters that are related to obligations |
| 1 | CALLBACK_NOTICE | The parameter list contains one or more parameters that are related to callbacks |
| 2 | GENERIC_CONSTRAINT | The parameter list contains one or more parameters that are related to generic constraints |
| 3 | TEMPORAL_CONSTRAINT | The parameter list contains one or more parameters that are related to temporal constraints |
| 4 | SPATIAL_CONSTRAINT | The parameter list contains one or more parameters that are related to spatial constraints |
| 5 | GROUP_CONSTRAINT | The parameter list contains one or more parameters that are related to group constraints |
| 6 | DEVICE_CONSTRAINT | The parameter list contains one or more parameters that are related to device constraints |
| 7 | COUNTER_CONSTRAINT | The parameter list contains one or more parameters that are related to counter constraints |

In the table shown above, the parameter list that is referred to is the "Parameters" field of the ExtendedStatusBlock data structure.

1.28.1.2. Describe Routine Category Codes

In one embodiment, no category codes are defined for Describe routines. In one embodiment, the same local flags as the ones defined for Action routines apply to Describe routines, and Describe routines should include in their returned ExtendedStatusBlock a parameter named 'Description' as specified below. In one embodiment, Describe routines do not contain in their returned ExtendedStatusBlock any obligation or callback parameters; however, Describe routines should include in their returned ExtendedStatusBlock parameters that describe some or all of the constraints that are applicable for the corresponding action or link constraint.

1.28.1.3. Link Constraint Routine Category Codes

| Value | Name | Description |
| --- | --- | --- |
| 0 | LINK_VALID | The link constrained by this control program is valid. The parameter list of the returned ESB should not contain any of the constraint parameters, and, in one embodiment, must not contain obligation or callback parameters |
| 1 | LINK_INVALID | The link constrained by this control program is invalid. When a link is invalid, the control program should include in the parameter list of the returned ESB one or more of the constraints that were not met and caused the link to be invalid (the constraints that were not evaluated and the constraints that did not cause the action to fail should be omitted). In one embodiment, the parameter list of the returned ESB must not contain any obligation or callback parameter. |

In one embodiment, the same local flags as the ones defined for Action routines apply for each of these categories.

In one embodiment, in the context of ExtendedStatusBlock parameters returned by link constraint routines, a constraint means a condition that is required to be true or a criterion that is required to be met in order for the result of the routine to return an ExtendedStatusBlock with the category LINK_VALID.

1.28.2. Cache Durations

The CacheDuration field of an ExtendedStatusBlock is an indication of the validity period of the information encoded in the ExtendedStatusBlock. When an ExtendedStatusBlock has a non-zero validity period, it means that the ExtendedStatusBlock can be stored in a cache, and that during that period of time a call to the exact same routine call with the same parameters would return the same ExtendedStatusBlock, so the cached value may be returned to the host application instead of calling the routine.

1.28.3. Parameters

Some parameters are used to convey detailed information about the return status, as well as variable bindings for template processing (see Section 9.4).

In one embodiment, except for obligations and callbacks, all the constraints described here are strictly for the purpose of helping the host application classify and display, not for enforcement of the usage rules. The enforcement of the rules is the responsibility of the control program.

In one embodiment, the parameters defined in the following section are encoded either as a ParameterBlock, if no parameter flags are applicable, or as an ExtendedParameterBlock, of one or more flags are applicable. Representative flags are described below:

1.28.3.1. Description

Parameter Name: Description

Parameter Type: ValueList

Description: List of description parameters. Each value in the list is of type Parameter or Extended Parameter. In one embodiment, the following parameters are defined: Default, Short and Long. Each of them, if present has for a value the ID of one of the control's resources. That resource should contain a textual payload, or a template payload. If the resource is a template, it is processed to obtain a textual description of the result (either a description of the entire control program, or of a specific action). The template is processed using as variable bindings the other parameters of the list in which the 'Description' parameter appears.

In one embodiment, the 'Short' and 'Long' descriptions can only be included if a 'Default' description is also included.

| Name | Type | Description |
| --- | --- | --- |
| Default | Resource | Id of the resource that contains the normal description text or template |
| Short | Resource | Id of the resource that contains the short description text or template |
| Long | Resource | Id of the resource that contains the long description text or template |

1.28.3.2. Constraints

In one embodiment, constraint parameters are grouped in lists that contain constraints of similar types. In one embodiment, standard constraints are defined for some of the types. In one embodiment, controls may return constraint parameters that are not included in the set of standard constraints, provided that the name of the constraint parameters be a URN in a namespace that guarantees the uniqueness of that name. This may include vendor-specific constraints, or constraints defined in other specifications.

1.28.3.2.1. Generic Constraints

Parameter Name: GenericConstraints

Parameter Type: ValueList

Description: List of generic constraints that may be applicable. Each value in the list is of type Parameter or ExtendedParameter.

In one embodiment, generic constraints are constraints that do not belong to any of the other constraint types defined in this section. In one embodiment, no generic constraint parameters are defined.

1.28.3.2.2. Temporal Constraints

Parameter Name: TemporalConstraints

Parameter Type: ValueList

Description: List of temporal constraints that may be applicable. Each value in the list is of type Parameter or Extended Parameter. Temporal constraints are constraints that are related to time, date, duration, and/or the like. In one embodiment, the following temporal constraint parameters are defined:

| Name | Type | Description |
| --- | --- | --- |
| NotBefore | Date | Date before which the action is denied |
| NotAfter | Date | Date after which the action is denied |
| NotDuring | ValueList | List of 2 values of type Date. The first value is the start of the period, and the second is the end of the period that is excluded. |

| Name | Type | Description |
|---|---|---|
| NotLongerThan | Integer | Max number of seconds after first use. In one embodiment, this value is unsigned. |
| NotMoreThan | Integer | Max number of seconds of accumulated use time. In one embodiment, this value is unsigned. |

1.28.3.2.3. Spatial Constraints
Parameter Name: SpatialConstraints
Parameter Type: ValueList
Description: List of spatial constraints that may be applicable. In one embodiment, each value in the list is of type Parameter or ExtendedParameter. Spatial constraints are constraints that are related to physical locations. In one embodiment, no standard spatial constraints are defined.

1.28.3.2.4. Group Constraints
Parameter Name: GroupConstraints
Parameter Type: ValueList
Description: List of group constraints that may be applicable. Each value in the list is of type Parameter or Extended Parameter. Group constraints are constraints that are related to groups, group membership, identity groups, and/or the like. In one embodiment, the following parameters are defined:

| Name | Type | Description |
|---|---|---|
| MembershipRequired | Resource | Id of the resource that contains the text or template for the name or identifier of a group of which a membership is required |
| IdentityRequired | Resource | Id of the resource that contains the text or template for the name or identifier of an individual |

1.28.3.2.5. Device Constraints
Parameter Name: DeviceConstraints
Parameter Type: ValueList
Description: List of device constraints that may be applicable. Each value in the list is of type Parameter or Extended Parameter. Device constraints are constraints that are related to characteristics of a device, such as features, attributes, names, identifiers, and/or the like. In one embodiment, the following parameters are defined:

| Name | Type | Description |
|---|---|---|
| DeviceTypeRequired | Resource | Id of the resource that contains the text or template for the type of host device that is required |
| DeviceFeatureRequired | Resource | Id of the resource that contains the text or template for name of feature that the host device must have |
| DeviceIdRequired | String | Id that the device is required to have. This Id may be any string that can be used to identify the device (e.g., device name, device serial number, a node id, and/or the like). |

1.28.3.2.6. Counter Constraints
Parameter Name: CounterConstraints
Parameter Type: ValueList
Description: List of counter constraints that may be applicable. Each value in the list is of type Parameter or ExtendedParameter. Counter constraints are constraints that are related to counted values, such as play counts, accumulated counts, and/or the like. In one embodiment, no standard counter constraints are defined.

1.28.3.3. Parameter Flags
In one embodiment, the following flags may be used for all the parameters described in Section 9.2.3, when they are encoded as an ExtendedStatusBlock:

| Bit Index (0 is LSB) | Name | Description |
|---|---|---|
| 0 | CRITICAL | The semantics associated with this parameter need to be understood by the host application. If they are not, the entire ExtendedStatusBlock should be treated as not understood and rejected. In one embodiment, this flag should not be used for parameters that are descriptive in nature. |
| 1 | HUMAN_READABLE | This parameter represents a value whose name and value are suitable to display in a textual or graphical user interface. Any parameter that does not have this flag set should be reserved for the host application, and not be shown to a user. For parameter values of type Resource, it is not the resource ID, but the resource data payload referenced by the ID, that is human-readable. |

1.29. Obligations and Callbacks

In one embodiment, certain actions, when granted, require further participation from the host application. Obligations represent operations that need to be performed by the host application upon or after the use of the content key it is requesting. Callbacks represent calls to one or more of the control program routines that need to be performed by the host application upon or after the use of the content key they are requesting.

In one embodiment, if an application encounters any critical obligation or callback that it does not support, or does not understand (for example because the obligation type may have been defined after the application was implemented), it must refuse to continue the action for which this obligation or callback parameter was returned. In one embodiment, a critical obligation or callback is indicated by setting the CRITICAL parameter flag for the parameter that describes it.

If a control has side effects (such as decrementing a play count, for example), it should use the OnAccept callback to require the host application to call a certain routine if it is able to understand and comply with all critical obligations and callbacks. The side effect should happen in the callback routine. In one example embodiment, implementations are required to understand and implement the OnAccept callback, since it can be useful in preventing side effects (e.g., updates to the state database) from occurring prematurely (e.g., before the host application determines that it is unable to comply with a given critical obligation or callback and needs to terminate performance of an action), thus providing a measure of transactional atomicity.

1.29.1. Parameters

The following parameters define several types of obligations and callbacks that can be returned in ExtendedStatusBlock data structures.

1.29.1.1. Obligations

Parameter Name: Obligations

Parameter Type: ValueList

Description: List of obligation parameters. Each value in the list is of type Parameter or Extended Parameter. In one embodiment, the following obligation parameters are defined:

| Name | Type | Description |
|---|---|---|
| RunAgentOnPeer | ValueList | The host application needs to send an agent control to run on a peer of the currently running protocol session. |
| | Type | Description |
| | String | Id of the Control that contains the agent to run. |
| | String | Name of the agent to run. |
| | Integer | Instance Id. This value is used to uniquely identify this agent obligation instance. This id will also allow the system to correlate this agent obligation with an OnAgentCompletion callback parameter. |
| | String | Context Id. This Id will be visible to the running agent on the peer under the agent's session context Host Object path: Octopus/Agent/Parameters/Session/ContextId. |
| | ValueList | List of values of type Parameter. All those parameters will be visible to the agent as input parameters. |

1.29.1.2. Callbacks

Parameter Name: Callbacks

Parameter Type: ValueList

Description: List of callback parameters. Each value in the list is of type Parameter or Extended Parameter. In one embodiment, the following callbacks parameters are defined:

| Name | Type | Description |
|---|---|---|
| OnAccept | Callback | The host application must call back if it is able to understand all the critical obligations and callback parameters contained in this ESB. In one embodiment, there can be at most one OnAccept callback parameter in a list of callback parameters. If other callback parameters are specified in the list, the OnAccept is executed first. |
| OnTime | ValueList | The host application must call back after the specified date/time. |
| | Type | Description |
| | Date | The date after which the host application needs to perform the callback. |
| | Callback | Routine to call back, and associated cookie. |
| OnTimeElapsed | ValueList | The host application must call back after the specified duration has elapsed (the counting starts when the host application actually performs the action for which the permission that was granted). |
| | Type | Description |
| | Integer | Number of seconds. The value is unsigned. |
| | Callback | Routine to call back, and associated cookie. |
| OnEvent | ValueList | The host application must call back when a certain event occurs. |
| | Type | Description |
| | String | Event Name |
| | Integer | Event Flags (the integer valus is interpreted as a bit-field) |
| | Integer | Event Parameter |
| | Callback | Routine to call back, and associated cookie. |
| | | See the paragraph about events for more details about the events. |
| OnAgentCompletion | ValueList | The host application must call back when an agent specified in one of the obligation parameters has completed, or failed to run. |

-continued

| Name | Type | Description | | |
|---|---|---|---|---|
| | | Type | Description | |
| | | Integer | Agent instance id. The instance id specified in an agent obligation. | |
| | | Callback | Routine to call back, and associated cookie. When calling back, the host application must provide the following ArgumentsBlock: | |
| | | Type | Encoding | Description |
| | | 32-bit integer | 4 bytes in big-endian order | Completion status code. |
| | | 32-bit integer | 4 bytes in big-endian order | Agent result code |
| | | 8-bit byte array | Byte sequence | Agent ReturnBlock |
| | | The completion status code value is 0 if the agent was able to run or a negative error code if it was not. The agent ReturnBlock is the data returned by the agent. This is omitted if the agent was unable to run (the Completion status code is not 0). | | |

In one embodiment, the 'Callback' type mentioned in the table above is a ValueListBlock with three ValueBlock elements:

| Value Type | Description | |
|---|---|---|
| Integer | ID of the callback type. In one embodiment, two types of callbacks are defined: | |
| | ID | Description |
| | RESET = 0 | All pending callbacks requests and active obligations are cancelled upon calling the callback routine. The callback routine returns an ESB that indicates if and how the application can continue with the current operation. |
| | CONTINUE = 1 | The callback routine is called while all other pending callback requests and active obligations remain in effect. The callback routine returns a simple result code. The application can continue with the current operation unless that result code indicates a failure. |
| String | Entry point to call in the code module. In one embodiment, this must be one of the entries in the Export Table of the code module for the same control as the one containing the routine that returned the ESB with this parameter. | |
| Integer | Cookie. This value will be passed on the stack to the routine that is called. | |

1.29.1.3. Parameter Flags

In one embodiment, the same parameter flags as defined in the previous section are used. In one embodiment, callbacks and obligations that a caller is required to implement are marked as CRITICAL, so as to avoid giving a host application the choice to ignore these parameters.

1.29.2. Events

In one embodiment, events are specified by name. Depending on the type of event, there may be a set of flags defined that further specify the event. In one embodiment, if no flags are defined for a specific event, the value of the flag field is set to 0. Also, some events may specify that some information be supplied to the callback routine when the event occurs. In one embodiment, if no special information is required from the host application, the host application must call with an empty ArgumentsBlock (see the description of the callback routine interface in section 3.3, below).

In one embodiment, if the name of an event in a callback parameter marked CRITICAL is not understood or not supported by the host application, the host application must consider this parameter as a not-understood CRITICAL parameter (and the action for which permission was requested must not be performed).

In one embodiment, the following event names are defined:

| Event Name | Event Flags | Event Parameter | Description |
|---|---|---|---|
| OnPlay | None | None | The host application must call back when the multimedia object starts playing. |
| OnStop | None | None | The host application must call back when the multimedia stops playing (or is paused) |
| OnTimecode | None | Presentation time expressed in number of seconds since the start of the | The host application must call back when the specified presentation time has been reached or exceeded (during normal real-time playback or after a seek). The origin of the presentation time is when the rendering begins. The presentation time relates to the source |

| Event Name | Event Flags | Event Parameter | Description |
|---|---|---|---|
| | | presentation | media time, not the wall-clock time (e.g., when a presentation is paused, the presentation time does not change). |
| OnSeek | None | None | The host application must call back when a direct access to an arbitrary point in a multimedia presentation occurs. In one embodiment, when calling back, the host application must provide the following data in a ArgumentsBlock: |

| Type | Encoding | Description |
|---|---|---|
| 32-bit unsigned integer | 4 bytes in big-endian order | Seek position offset |
| 32-bit unsigned integer | 4 bytes in big-endian order | Seek position range |

The position within the multimedia presentation is offset "marks" out of range total "marks" in the presentation. For instance, for a presentation that is 327 seconds long, seeking to the $60^{th}$ second can be represented with offset = 60, range = 327. It is up to the caller to choose the unit that corresponds to the measurement of the offset and range (it could be a time unit, a byte-size unit, or any other unit), provided that the "marks" are homogeneously distributed over the entire presentation. The value of offset must be less than or equal to the value of range.

1.29.3. Callback Routines

In one embodiment, callback routines take the same input:

| Input: Top of stack: |
|---|
| Cookie |
| ArgumentsBlockSize |
| ...data... |

Cookie: the value of the Cookie field that was specified in the callback parameter.

ArgumentsBlockSize: number of bytes of data passed on the stack below this parameter. When the routine is called, the stack contains the value ArgumentsBlockSize supplied by the caller, indicating the size of the arguments block at the top, followed by ArgumentsBlockSize bytes of data. In one embodiment, if the size is not a multiple of 4, the data on the stack will be padded with O-value bytes to ensure that the stack pointer remains a multiple of 4.

1.29.3.1. CONTINUE Callbacks

In one embodiment, callbacks with the type CONTINUE (type ID=0) have the following output:

| Output: Top of stack: |
|---|
| ResultCode |
| ... |

ResultCode: an integer value. The result value is 0 if the routine was able to execute or a negative error code if an error occurred.

Description: if the ResultCode indicates that the callback routine was able to run (i.e., the value is 0), the host application can continue the current operation. If the ResultCode indicates that an error occurred, the host application aborts the current operation and cancels all pending callbacks and obligations.

1.29.3.2. RESET Callbacks

When a control routine has specified one or more callbacks of type RESET in the ESB returned from a routine, the host application will call any specified callback routine when the condition for that callback is met. In one embodiment, as soon as the conditions of any of the callbacks are met, the host application needs to:

Cancel all other pending callbacks
Cancel all current obligations
Provide the required parameters (if any) for that callback
Call the specified callback routine.

The return status from the routine indicates to the host application if it can continue performing the current operation. In one embodiment, if the permission is denied or the routine fails to execute successfully, the host application must abort the performance of the current operation. Similarly, if the permission is granted, the host application must comply with any obligation or callback that may be returned in an ESB, just as if it had called the original Control.Actions.<Action>.Perform routine. Previous obligations or callback specifications are no longer valid.

In one embodiment, all routines specified as callback entry points for this type of callback have the following output:

| Output: Top of stack: |
|---|
| ResultCode |
| StatusBlockPointer |
| ... |

ResultCode: an integer value. The result value is 0 if the routine was able to execute, or a negative error code if an error occurred.

StatusBlockPointer: address of a standard ExtendedStatusBlock.

Description: the return semantics of this routine are equivalent to what is described for the Control.Actions.<Action>.Perform routine.

1.30. Metadata Resources

In one embodiment, control objects can contain metadata resources, which can be referenced from the parameters returned in ExtendedStatusBlock data structures. Resources can be simple text, text templates, or other data types. Each resource is identified by a resource ID, and can contain one or more text strings or encoded data, one for each version in a different language. It is not required that resources be provided for all languages. It is up to the host application to choose which language version is most appropriate for its needs.

| Resource | | |
|---|---|---|
| Field | Type | Description |
| Id | ASCII String | URI (typically a URN referring to the Id of an Extension of the Control object that contains the code module with the routine that is currently running) |
| Type | ASCII String | MIME-type of the resource data as described in IETF RFC 2046 |
| Data | List of LocalizedData | List of all the different versions of the resource, for different locales |

| LocalizedData | | |
|---|---|---|
| Field | Type | Description |
| Language | ASCII String | Language code as specified in IETF RFC 3066 |
| Data | Type depends on the specified mime type | The actual data for the resource (text, etc . . . ) |

Resources accompany control programs by being included as Extensions in a Control object. The resource Id maps to the Id of an internal extension of the Control object that contains the code module with the routine that is currently running.

For the purpose of computing the canonical byte sequence for Resource objects, in one embodiment the data structure description is the following:

```
class LocalizedData {
    string language
    byte[ ] data;
}
class Resource {
    string id
    string type;
    LocalizedData data;
}
```

1.30.1. Simple Text
Simple text is specified as MIME-type 'text'

1.30.2. Text Templates
In addition to the standard text resources, in one embodiment, a text template type is defined. The MIME-type for this is 'text/vnd.intertrust.octopus-text-template'.

In one embodiment, a text template contains text characters encoded in UTF-8, as well as named placeholders that are to be replaced by text values obtained from parameters returned in the parameters list, such as that of an ExtendedStatusBlock. The syntax for a placeholder is '\PLACEHOLDER\', where PLACEHOLDER specifies the name of a Parameter Block and an optional formatting hint. In one embodiment, the template processor must replace the entire token '\PLACEHOLDER\' with the formatted representation of the Value field of that Parameter Block, and the formatting of the Value data is specified below in Section 4.2.1.

In one embodiment, if the character '\' appears in the text outside of a placeholder, it must be encoded as '\\', and all occurrences of '\\' in the text will be reverted to '\' by the template processor.

The syntax for the placeholder is: FORMAT|NAME, where NAME is the name of a Parameter Block, and FORMAT is the formatting hint to convert the parameter's data into text. If the default formatting rules for the parameter value's data type are sufficient, then the formatting hint can be omitted, and the placeholder is simply NAME.

1.30.2.1. Formatting
1.30.2.1.1. Default Formatting

In one embodiment, the default formatting rules for the different value types are:

| Type | Formatting |
|---|---|
| Integer | Text representation of the integer value as a signed decimal. The text is composed only of the characters for the digits "0" to "9" and the character "–". If the value is 0, the text is the string "0". If the value is not 0, the text does not start with the character "0". If the value is negative, the text starts with the character "–". If the value is positive, the text starts with a non-zero digit character. |
| Real | Text representation of the floating point value in decimal. The integral part of the value is represented using the same rules as for Integer values. The decimal separator is represented with the host application's preferred decimal separator. The factional part of the value consists of up to 6 "0" characters followed by up to 3 non-zero digit characters. |
| String | The string value itself |
| Date | A human readable representation of the date, according to the host's preferred text representation of dates |
| Parameter | The text "<name>=<value>", where <name> is the parameter name, and <value> is the parameter value formatted according to the default formatting rules for its type. |

| Type | Formatting |
|---|---|
| ExtendedParameter | Same as for Parameter |
| Resource | Text string of the resource's data. In one embodiment, the resource referenced by the placeholder must have a MIMI-type that is text-based (e.g., text or text/vnd.intertrust.octopus-text-template). |
| ValueList | The text "<value>, <value>, ..." with all the values in the list formatted according to the default formatting rules for their type. |

1.30.2.1.2. Explicit Formatting

Explicit format names can be used as the FORMAT part of a placeholder tag. If an unknown FORMAT name is encountered, the template processing engine will use the default formatting rules.

| Name | Formatting |
|---|---|
| Hex | Hexadecimal representation of an integer value interpreted as unsigned. In one embodiment, this formatting hint should be ignored for data types that are not integers. |

1.31. Context Objects

In one embodiment, when a control routine is executing, it has access to a number of context objects through the use of the System.Host.GetObject system call.

1.31.1. General Context

In one embodiment, the following context is present for running controls.

| Name | Type | Description |
|---|---|---|
| Octopus/Personality/Id | String | ID of the current personality Node |
| Octopus/Personality/Attributes | Container of Attributes | Attributes of the current personality Node |

1.31.2. Runtime Context

In one embodiment, the following context is present for all controls that are running in a VM that has been created using the System.Host.SpawnVm system call. In one embodiment, this context must be non-existent or an empty container for controls that are running in a VM that was not created using System.Host.SpawnVm.

| Name | Type | Description |
|---|---|---|
| Octopus/Runtime/Parent/Id | Container of unnamed String objects | The identity under which the caller of the system call is running. |

1.31.3. Control Context

In one embodiment, the following context is present whenever a routine of a control is running:

| Name | Type | Description |
|---|---|---|
| Octopus/Control/Id | String | Id of the running control |
| Octopus/Control/Attributes | Container | Attributes of the running control. This object may be omitted if the control has no attributes. |

1.31.4. Controller Context

In one embodiment, the following context is present whenever a routine of a control is running and the control was pointed to by a controller object (e.g., when accessing a ContentKey object in order to consume protected content).

| Name | Type | Description |
|---|---|---|
| Octopus/Controller/Id | String | Id of the Controller that points to the currently running control |
| Octopus/Controller/Attributes | Container | Attributes of the Controller pointing to the currently running control. This object may be omitted if the controller has no attributes. |

In embodiments where a host application is allowed to only group content keys that are controlled by a single controller object, for a given action, there will be only one applicable controller object.

1.31.5. Action Context

In one embodiment, the following context is present whenever a control is called for the purpose of controlling an Action.

| Name | Type | Description |
|---|---|---|
| Octopus/Action/Parameters | Container | Array of Name/Value pairs representing the parameters that are relevant for the current action, if any. In one embodiment, each action type defines a list of optional and required parameters. This container may be omitted if the action has no parameters. |

1.31.6. Link Context

In one embodiment, the following context is present whenever a control is called for the purpose of limiting the validity of a link object (e.g., a control object embedded in a link object):

| Name | Type | Description |
|---|---|---|
| Octopus/Link/Id | String | Id of the Link object |
| Octopus/Link/Attributes | Container | Attributes of the Link object that contains the running control. This object may be omitted if the link has no attributes. |

1.31.7. Agent Context

In one embodiment, the following context is present when an agent routine of a control is running:

| Name | Type | Description |
|---|---|---|
| Octopus/Agent/Parameters | Container | Array of Name/Value parameter pairs representing the input parameters for the agent. |

-continued

| Name | Type | Description |
|---|---|---|
| Octopus/Agent/Session/ContextId | String | Identifier for the session context in which the agent is running. |

The Parameter and Session containers are normally used to allow the protocols that require one entity to send and run an agent on another entity to specify which input parameters to pass to the agent, and which session context objects the host needs to set under certain conditions. The presence or absence of certain session context objects may allow the agent code to decide whether it is running as part of the protocol it was designed to support, or if it is running out of context, in which case it may refuse to run. For example, an agent whose purpose is to create a state object on the host on which it runs may refuse to run unless it is being executed during a specific protocol interaction.

1.32. Actions

In one embodiment, each action has a name and a list of parameters. In one embodiment, some parameters are required—the application must provide them when performing this action—and some are optional—the application may provide them or may omit them.

In one embodiment, the following standard actions are defined:

1.32.1. Play

Description: Normal real-time playback of the multimedia content.

1.32.2. Transfer

Description: Transfer to a compatible target system.

Transferring to a compatible target system is used when the content has to be made available to a system with the same DRM technology, such that the target system can use the same license as the one that contains this control, but state information may need to be changed on the source, the sink, or both. The system from which the transfer is being done is called the source. The target system to which the transfer is being done is called the sink.

This action is intended to be used in conjunction with a service protocol that allows an Agent to be transferred from the source to the sink in order to do the necessary updates in the source's and sink's persistent states (e.g., objects in the state database described herein). In one embodiment, a control uses the RunAgentOnPeer obligation for that purpose. Additional information about illustrative embodiments of this service protocol are provided below in connection with the discussion of the state database.

Parameters:

| Name | Type | Description |
|---|---|---|
| Sink/Id | String | Node Id of the Sink |
| Sink/Attributes | Container | Attributes of the Sink's node. This container may be omitted if the node has no attributes. |
| TransferMode | String | Transfer Mode ID indicating in which mode the content is being transferred. This ID can be a standard mode as defined below, or a URN for a system proprietary mode. In one embodiment, the following standard modes are defined: |
| | | ID / Description |
| | | Render — The sink is receiving the content for the purpose of rendering |
| | | Copy — The sink is receiving a copy of the content |
| | | Move — The content is being moved to the sink. |
| | | CheckOut — The content is being checked-out to the sink. This is similar to Move but with the distinction that the resulting state on the sink may prevent any other move than a move back to the source. |
| TransferCount | Integer | Integer value indicating how many instances of the state counters associated with this control need to be transferred to the sink. In one embodiment, this parameter is optional. If it is not present, only one instance is being transferred. It should not be present when the transfer mode is Render or Copy. |

1.32.3. Export

Description: Export to a foreign target system.

Exporting to a foreign target system is an action that is used when the content has to be exported to a system where the original content license cannot be used. This could be a system with a different DRM technology, a system with no DRM technology, or a system with the same technology but under a situation that requires a license different from the original license. The system from which the transfer is being done is called the source. The target system to which the transfer is being done is called the sink.

In one embodiment, in the Extended Status result for the Describe, Check, and Perform methods of this action, the following parameter shall be set:

| Name | Type | Description |
|---|---|---|
| ExportInfo | Any | Information that is relevant when exporting content to the target system specified in the action parameters. The actual type and content of this information is specific to each target system. For example, for CCI-based systems, this would contain the CCI bits to set for the exported content. |

Parameters:

| Name | Type | Description |
| --- | --- | --- |
| TargetSystem | String | System ID of the foreign system to which the export is being made. This ID is a URN. |
| ExportMode | String | Export Mode ID indicating in which mode the content is being exported. This ID can be a standard mode as defined below, or a URN for a system proprietary mode. In one embodiment, the following standard modes are defined: |

| ID | Description |
| --- | --- |
| DontKnow | The caller does not know what the sink's intended mode is. In this case, the control program should assume that any of the allowed modes for the TargetSystem can be assumed by the sink, and should indicate any restriction in the return status of the action routines. For example, for a CCI-based system, the control can return CCI bits that will either allow the equivalent of Render or Copy depending on what the license permits. |
| Render | The sink is receiving the content for the purpose of rendering, and will not retain a usable copy of the content except for caching purposes as specified by each target system |
| Copy | The sink is receiving a copy of the content |
| Move | The content is being moved to the sink. |

Other input parameters may be required by specific target systems.

1.32.3.1. Standard Target Systems

.32.3.1.1. Audio CD or DVD

In one embodiment, the standard TargetSystem ID 'CleartextPcmAudio' is used when the target system is an unencrypted medium onto which uncompressed PCM audio is written, such as a writeable audio CD or DVD. For this target system, the ExportInfo parameter is a single Integer parameter representing a copyright flag. This flag is indicated in the least significant bit of the integer value.

| Bit index | Description |
| --- | --- |
| 0 (LSB) | When this flag is set, the Copyright bit or flag must be set in the format of the recoded audio if the format supports the signaling of such a bit or flag. |

10. State Database

A secure object store that can be used by preferred embodiments of a DRM engine to provide a secure state storage mechanism is described below. Such a facility is useful to enable control programs to be able to read and write in a protected state database that is persistent from invocation to invocation. Such a state database can be used to store state objects such as play-counts, date of first use, accumulated rendering times, and/or the like. In a preferred embodiment, the secure database is implemented in non-volatile memory, such as flash memory on a portable device, or an encrypted area of the hard disk drive on a PC. It will be appreciated, however, that the secure database could implemented on any suitable medium.

The term "object", as used in this section, generally refers to the data objects contained within the secure object store, and not to the objects (e.g., controls, controllers, links, etc.) discussed elsewhere herein; if necessary to distinguish between these two categories of objects, the term "DRM object" will be used to refer to the objects described elsewhere herein (i.e., controls, controllers, protectors, Content-Keys, links, nodes, and the like), while the term "state object" will be used to refer to the objects stored within the state database. In the following discussion, reference will occasionally be made to an illustrative implementation of the state database, called "Seashell," which is used in connection with the Octopus DRM engine embodiment described elsewhere herein. It will be appreciated; however, that embodiments of the systems and methods described herein can be practiced without some or all of the features of this illustrative implementation.

1.33. Database Objects

The object store (e.g., a database) contains data objects. In one embodiment, objects are arranged in a logical hierarchy, where container objects are parents of their contained children objects. In one embodiment, there are four types of objects: string, integer, byte array, and container. Each object has associated metadata and a type. Depending on its type, an object can also have a value.

In one embodiment, state objects can be accessed from virtual machine programs using the System.Host.GetObject and System.Host.SetObject system calls, and, as described in more detail below, object metadata can be accessed using virtual names. In one embodiment, some of the metadata fields can be changed by clients of the database (i.e., they are read-write (RW) accessible), while other metadata fields are read-only (RO).

In one embodiment, the metadata fields shown in the following table are defined:

| Field | Type | Accessibility | Description |
| --- | --- | --- | --- |
| Name | String | RO | Name of the object. In one embodiment only the following characters are allowed as object names (all the other ones are reserved): a–z, A–Z, 0–9, '_', '-', '+', ':', '.', '$', '!', '*', ' ' |
| Owner | String | RW | Id of the owner of that object |
| CreationDate | Unsigned 32-bit integer | RO | Time at which the object was created, expressed as the number of minutes elapsed since Jan. 1, 1970 00:00:00 local time. |
| ModificationDate | Unsigned 32-bit integer | RO | Time at which the object was last modified, expressed as the number of minutes elapsed since Jan. 1, 1970 00:00:00 local time. For container objects, this is the time at which a child was last added to or removed from the container. For other objects, this is the time at which their value was last changed. |
| ExpirationDate | Unsigned 32-bit integer | RW | Time at which the object expires, expressed as the number of minutes elapsed since Jan. 1, 1970 00:00:00 local time. A value of 0 means the object does not expire. |
| Flags | 32-bit bit field | RW | Set of boolean flags indicating properties of the object. |

In one embodiment, the metadata flag shown in the following table is defined:

| Bit index | Name | Meaning |
| --- | --- | --- |
| 0 (LSB) | PUBLIC_READ | If set, indicates that the access control for this object is such that any client can read the object and its metadata. |

As previously indicated, in one embodiment there are four types of state objects: strings, integers, byte arrays, and container. In this embodiment, the value of a string object is a UTF-8 encoded character string, the value an integer object is a 32-bit integer value, and the value of a byte array object is an array of bytes. In this embodiment, a container object contains zero or more objects. A container object is referred to as the parent of the objects it contains. The contained objects are referred to as the children of the container. All the container objects that make up the chain of an object's parent, the parent's parent, and so on, are called the object's ancestors. If an object has another object as it ancestor, that object is called a descendant of the ancestor object.

1.34. Object Lifetime

In one embodiment, the lifetime of objects in the state database follows a number of rules. Objects can be explicitly destroyed, or implicitly destroyed. Objects can also be destroyed as the result of a database garbage collection. Regardless of how an object is destroyed, in one embodiment the following rules apply:

The ModificationDate for the parent container of that object is set to current local time.
If the object is a container, all its children are destroyed when the object is destroyed.

1.34.1. Explicit Object Destruction

Explicit object destruction happens when a client of the database requests that an object be removed (see Object Access for more details on how this can be done using the Host.SetObject system call).

1.34.2. Implicit Object Destruction

Implicit object destruction happens when an object is being destroyed as the result of one of the objects in its ancestry being destroyed.

1.34.3. Garbage Collection

In one embodiment, the state database destroys any object that has expired. An object is considered to have expired when the local time on the system that implements the database is later than the ExpirationDate field of the object's metadata. An implementation may periodically scan the database for expired objects and destroy them, or it may wait until an object is accessed to check its expiration date. In one embodiment, an implementation must not return to a client an expired object. In one embodiment, when a container object is destroyed (e.g., because it has expired), its children objects are also destroyed (and all their descendants, recursively) even if they have not expired yet.

1.35. Object Access

In one embodiment, the objects in the state database can be accessed from virtual machine programs through a pair of system calls: System.Host.GetObject to read the value of an object, and System.Host.SetObject to create, destroy, or set the value of an object.

In one embodiment, to be visible as a tree of host objects, the state database is "mounted" under a certain name in the host object tree. This way, the database is visible as a sub-tree in the more general tree of host objects. To achieve this, in one embodiment the state database contains a top-level, built-in root container object that always exists. This root container is essentially the name of the database. All other objects in the database are descendants of the root container. Multiple state databases can be mounted at different places in the host object tree (for two databases to be mounted under the same host container, they need to have different names for their root container). For example, if a state database whose root container is named Database1, contains a single integer child object named Child1, the database could be mounted under the host object container "/SeaShell", in which case the Child1 object would be visible as "/SeaShell/Database1/

Child1". In one embodiment, accesses to objects in the state database are governed by an access policy.

1.35.1. Reading Objects

The value of an object can be read by using the system call System.Host.GetObject. In one embodiment of the state database, the four object types (integer, string, byte array, and container) that can exist in the database map directly onto their counterparts in the virtual machine. The object values can be accessed in the normal way, and the standard virtual names can be implemented.

1.35.2. Creating Objects

Objects can be created calling System.Host.SetObject for an object name that does not already exist. The object creation is done according to the system call specification. In one embodiment, when an object is created, the state database does the following:

Sets the "owner" field of the object metadata to the value of the "owner" field of the parent container object's metadata.

Sets the CreationDate field of the metadata to the current local time.

Sets the ModificationDate field of the metadata to the current local time.

Sets the ExpirationDate field of the metadata to 0 (does not expire).

Sets the Flags field of the metadata to 0.

Sets the ModificationDate of the parent container to the current local time.

When creating an object under a path deeper than the existing container hierarchy, in one embodiment the state database implicitly creates the container objects that need to exist to create a path to the object being created. In one embodiment, implicit container object creation follows the same rules as an explicit creation. For example, if there is a container "A" with no children, a request to set "A/B/C/SomeObject" will implicitly create containers "A/B" and "A/B/C" before creating "A/B/C/SomeObject".

1.35.3. Writing Objects

The value of objects can be changed by calling System.Host.SetObject for an object that already exists. If the specified ObjectType does not match the type ID of the existing object, ERROR_INVALID_PARAMETER is returned. In one embodiment, if the type ID is OBJECT_TYPE_CONTAINER, no value needs to be specified (the ObjectAddress must be non-zero, but its value will be ignored). When an existing object is set, the state database sets the ModificationDate of object to the current local time.

1.35.4. Destroying Objects

Objects can be explicitly destroyed by calling System.Host.SetObject for an object that already exists, with an ObjectAddress value of 0. When an object is destroyed, the state database preferably:

Sets the ModificationDate of the parent container to the current local time.

Destroys all its child objects if the destroyed object is a container.

1.35.5. Object Metadata

In one embodiment, the metadata for state database objects is accessed by using the System.Host.GetObject and System.Host.SetObject system calls with virtual names. The following table lists the standard and extended virtual names that are available for objects in one embodiment of the state database, and how they map to the metadata fields.

| Virtual Name | Type | Description |
| --- | --- | --- |
| @Name | String | The Name field of the object metada |
| @Owner | String | The Owner field of the object metadata |
| @CreationDate | 32-bit unsigned integer | The CreationDate field of the object metadata |
| @ModificationDate | 32-bit unsigned integer | The ModificationDate field of the object metadata |
| @ExpirationDate | 32-bit unsigned integer | The ExpirationDate field of the object metadata |
| @Flags | 32-bit bit field | The Flags field of the object metadata |

In one embodiment, an implementation must refuse a request to set the Flags metadata field if one or more undefined flags are set to 1. In this case, the return value for the System.Host.SetObject is ERROR_INVALID_PARAMETER. In one embodiment, when reading the Flags metadata field, a client must ignore any flag that is not predefined, and when setting the Flags field of an object, a client must first read its existing value and preserve the value of any flag that is not predefined (e.g., in a system specification).

1.36. Object Ownership and Access Control

In one embodiment, whenever a request is made to read, write, create, or destroy an object, the state database implementation first checks whether the caller has the permission to perform the request. The policy that governs access to objects is based on the concepts of principal identities and delegation. In order for the policy to be implemented, the trust model under which the implementation operates needs to support the notion of authenticated control programs. This is typically done by having the virtual machine code module that contains the program be digitally signed (directly or indirectly through a secure reference) with the private key of a PKI key pair, and having a name certificate that associates a principal name with the signing key; however, it will be appreciated that different ways of determining control program identities are possible, any suitable one of which could be used.

In one embodiment, the access policy for the objects in the state database is comprised of a few simple rules:

Read access to an object's value is granted if the caller's identity is the same as the owner of the object or if the PUBLIC_READ flag is set in the object's Flags metadata field.

Read access to an object's value is granted if the caller has Read access to the object's parent container.

Write access to an object's value is granted if the caller's identity is the same as the owner of the object.

Write access to an object's value is granted if the caller has Write access to the object's parent container.

Create or Destroy access to an object is granted if the caller has Write access to the parent container of the object.

Read and Write access to an object's metadata (using virtual names) follows the same policy as Read and Write access to the object's value, with the additional restriction that read-only fields cannot be written to.

In one embodiment, when the access policy denies a client's request, the return value of the system call for the request is ERROR_PERMISSION_DENIED.

The root container of the state database is preferably fixed when the database is created. When an object is created, the value of its Owner metadata field is set to the same value as that of its parent container Owner metadata field. Ownership of an object can change. To change the ownership of an object, the value of the Owner metadata field can be set by calling the Sytem.Host.SetObject system call for the '@Owner' virtual name of that object, provided that it is permitted under the access control rules.

In embodiments where it is not possible for a control program to access objects that are not owned by the same principal as the one whose identity it is running under, a control program needs to delegate access to "foreign" objects to programs loaded from code modules that have the ability to run under the identity of the owner of the "foreign" object. To do this, a control program may use the System.Host.SpawnVm, System.Host.CallVm, and System.Host.ReleaseVm system calls in the control virtual machine.

1.37. License Transfer Protocol

The storage of state information in a database such as that described above enables rights to be moved between devices or exported from a domain (e.g., by transferring the state information to another device). The following section describes embodiments of protocols by which the state of a database can be transferred from a source to a sink. Note that although this process will be referred to as a license transfer protocol, it is the state of the state database that is being transferred, as opposed to merely an actual license (e.g., a control object, etc.). The protocol is referred to as a license transfer protocol because, in one embodiment, the transfer is initiated by execution of a transfer action in a control program, and because transfer of the state information enables the sink to successfully execute the relevant license for a piece of content.

Figure 32:
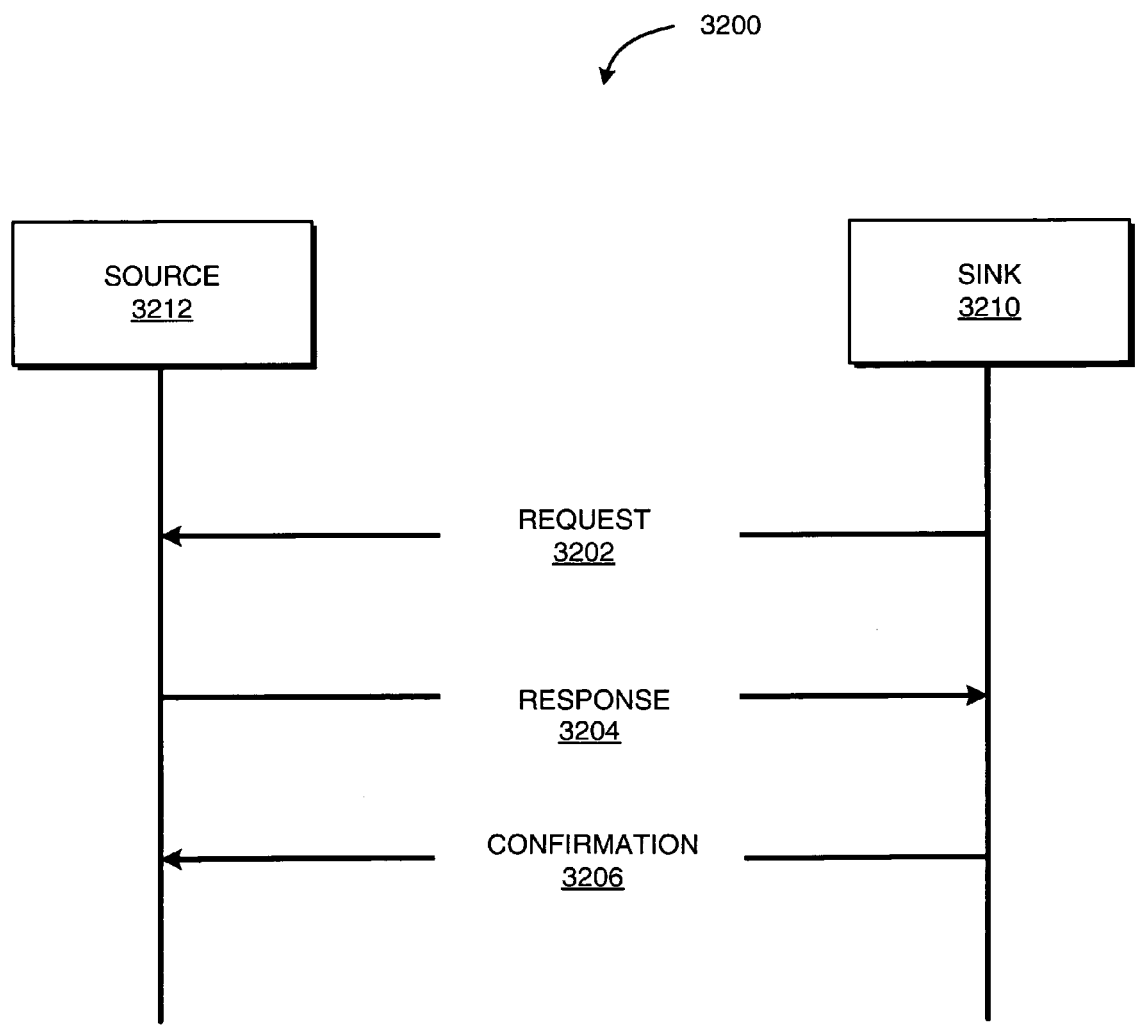
FIG. 32 shows an example of a license transfer protocol.

FIG. 32 shows an example of a license transfer 3200 composed of three messages 3202, 3204, 3206. In the example shown in FIG. 32, the protocol is initiated by sink 3210 by sending a request 3202 to source 3212. In one embodiment, request 3202 holds the ID of a piece of content to be transferred. Source 3212 sends a response 3204 to sink 3210, containing (i) an agent that will set a state in the state database of sink 3210, as well as (ii) the ContentKey object(s) targeted to the sink 3210. As shown in FIG. 32 sink 3210 sends the source 3212 a confirmation 3206 that the agent has run. Upon receiving the Content Key(s) and/or the piece of content, the sink may then use the content (e.g., play it through speakers, display it on a video screen, and/or render it in some other manner) in accordance with its associated controls.

While the approach shown in FIG. 32 can be used in some embodiments, some potential problems include:

There is No Way to Proactively Tell the Source that Rendering is Over.

In one embodiment, the protocol shown in FIG. 32 supports two modes where this is a problem: (i) render (no stop render), and (ii) checkout (no check-in). Because of this problem, control issuers may be led to issue timeouts on the states that are transferred. However, this can result in a bad consumer experience when, for example, a user wants to render content on one device but decides that she actually wants to render this content on another one: with the current design, it is likely that she will have to wait for the entire piece of content to be rendered on the first device before she is able to render it on the other device. This might be undesirable if the content is relatively long (e.g., a movie).

It can be Difficult to Resolve the License Associated with the Content IDs in the Request.

In one embodiment, the request contains only the Content IDs, and the source retrieves the license associated with the Content IDs from its license database. However, this process can be prone to error, since the licenses may be stored on a removable media, and at the time of engagement of the protocol, a particular license may not be available if the media has been removed. Moreover, even if the licenses are available, it can be cumbersome to perform a lookup for the licenses in the license store. Also, because there can be multiple licenses associated with a set of Content IDs, it may be difficult to determine if the resolved license is the same as the one that was intended in the request.

There is No Way for the Control Program to Proactively Ask for a Proximity Check.

In one embodiment, the set of system calls/callbacks/obligations does not support a way for a Control to ask for proximity checking of a peer. Instead, a control can only read a value of a host object Octopus/Action/Parameters/Sink/Proximity/LastProbe that is populated by the application during a transfer with a value it got from a previous execution of a proximity checking protocol. This can be a problem in the case where it may be desirable to avoid a proximity check if such a proximity check is not needed (e.g., if the sink is known to be within a certain domain).

There are Only Three Rounds to the Protocol.

In the embodiment shown in FIG. 32, the protocol is limited to three rounds. This can be a serious limitation, since the protocol will be unable to handle the case where the OnAgentCompletion callback returns an extended status block with another RunAgentOnPeer obligation. Moreover, after the protocol is finished, the sink will not really know if the protocol has succeeded or not. In addition, the proximity check will need to occur before the response is sent (see previous problem) but this is not needed in the case where the source and the sink are in the same domain. In addition, in the protocol shown in FIG. 32, the source gives the content key to the sink without knowing if this content key will ever be used.

No Way in the ESB to Hint that a License Transfer is Needed.

In the embodiment shown in FIG. 32, when a DRM Client evaluates a license (e.g. Control.Actions.Play.Check), there is no easy way for the control writer to hint that a license transfer is needed in order to get the state that will enable a successful evaluation of the control.

The Source Cannot Initiate the Transfer.

In the protocol shown in FIG. 32, the license transfer is initiated by the sink. It would be desirable for the source to be able to initiate the transfer as well.

Improved Embodiments

The embodiments described below can solve or ameliorate some or all of the problems described above.

Solution for the Release Problem.

In one embodiment, a new release operation is introduced. When this operation is specified in the request, the Transfer Mode ID is set to Release. In order, for the client to do the correlation between a render/checkout and a release operation, an optional element SessionId is added to the request (see section below). In one embodiment, when this element is present, it is reflected in the host object tree of the Transfer Action context under SessionId.

The sink knows that it has to send this SessionId in the release request if the Extended Status Block it will get in the Teardown message (see below) contains a parameter:

Parameter Name: SessionId

Parameter Type: String

The flag of this parameter is set to CRITICAL.

Solution for the License Resolution Problem (Refactoring the Request).

In one embodiment, the solution consists of having the sink device put the license bundle(s) in the request so that there is essentially a guarantee that the sink and the source will execute the same license. In the embodiment shown in FIG. 32, the XML schema for the request is the following:

```
<xs:complexType name="LicenseTransferRequestPayloadType">
    <xs:sequence>
        <xs:element ref="ContentIdList"/>
        <xs:element ref="Operation"/>
        <xs:element ref="oct:Bundle"/>
    </xs:sequence>
</xs:complexType>
```

Where the ContentIdList contains the list of Content IDs (one per track/stream) identifying the content, the Operation contains the type of license transfer operation, and the Bundle contains the Personality node of the requestor and the associated signature.

To avoid the license resolution problem described above, the license bundle(s) can be included in the request, e.g., by amending the schema as follows:

```
<!-new elements →
<xs:element name="LicensePart" type="LicensePartType"/>
<xs:complexType name="LicensePartType">
    <xs:sequence>
        <xs:element ref="oct:Bundle" minOccurs="0"/>
    </xs:sequence>
    <xs:attribute name="contentId" use="optional"/>
</xs:complexType>
<xs:element name="License" type="LicenseType"/>
<xs:complexType name="LicenseType">
    <xs:sequence>
        <xs:element ref="LicensePart" maxOccurs="unbounded"/>
    </xs:sequence>
</xs:complexType>
<!-- modified LicenseTransferRequestPayloadType -->
<xs:complexType name="LicenseTransferRequestPayloadType">
    <xs:sequence>
        <xs:element ref="License"/> <!-- see above for definition -->
        <xs:element ref="Operation"/>
        <xs:element ref="oct:Bundle"/>
        <xs:element name="SessionId" type="xs:string" minOccurs="0"/>
        <xs:element name="NeedsContentKeys" type="xs:boolean" minOccurs="0"/>
    </xs:sequence>
</xs:complexType>
```

In this schema, the ContentIdList element is replaced by a License element. This element carries a set of LicensePart elements. A LicensePart element carries an oct:Bundle element containing license objects as well as an optional ContentId attribute indicating that the license objects are applied to this particular ContentId. A LicensePart element with no ContentId attribute means that the objects contained in the underlying bundle are applied to all Content IDs (generally the controller and the control objects).

In one embodiment, the SessionId optional element cannot be present, except if the operation is urn:marlin:core:1-2:service:license-transfer:release in which case it may be present if a SessionId parameter was received in the Extended Status Block of the corresponding render or checkout action (see above).

In one embodiment, the NeedsContentKeys optional element should be present with a value of false if the sink knows that it is already capable of decrypting the content keys. The absence of this element means that the source has to re-encrypt the Content Keys of the sink in case of success of the protocol.

In one embodiment, when receiving such a request, the license element will be processed as follows:

(1) Collect all the ContentId attributes found in the LicensePart elements.
(2) Process all the Bundle elements found in the LicensePart elements.
(3) Open the set of content IDs collected above.
(4) Verify the appropriate signatures on the relevant objects.
(5) Optionally invoke the Control.Actions.Transfer.Check method on the processed Control object.
(6) Invoke the Control.Actions.Transfer.Perform on the process Control object.

Allowing the Control Programs to Proactively Ask for Proximity Check of the Sink.

In order to allow Control programs to do this, a new pair of Obligations/Callbacks can be defined. Specifically, the control can put a "ProximityCheckSink" obligation in its extended status block. This indicates to the application that proximity with the sink has to be checked. When the proximity check is done, the application will call back the control using the "OnSinkProximityChecked" callback.

In one embodiment, a ProximityCheck obligation is defined that is only applicable in the context of a License Transfer. In this embodiment, there needs to be zero or one such obligation per extended status block, and, if present, an OnSinkProximityChecked callback needs to be present as well.

| Name | Type | Description | |
|---|---|---|---|
| ProximityCheck | ValueList | The host application needs to perform a proximity check protocol with the sink device. | |
| | | Type | Description |
| | | String | Id of the Personality Node that has to be proximity checked |

OnSinkProximityChecked Callback

| Name | Type | Description | |
|---|---|---|---|
| OnProximityChecked | Value List | The host application needs to call back when a proximity check in one of the obligation parameters has completed. | |
| | | Type | Description |
| | | Callback | Routine to call back, and associated cookie. |

Allowing Multiple Round Trips in the Protocol.

Figure 33:
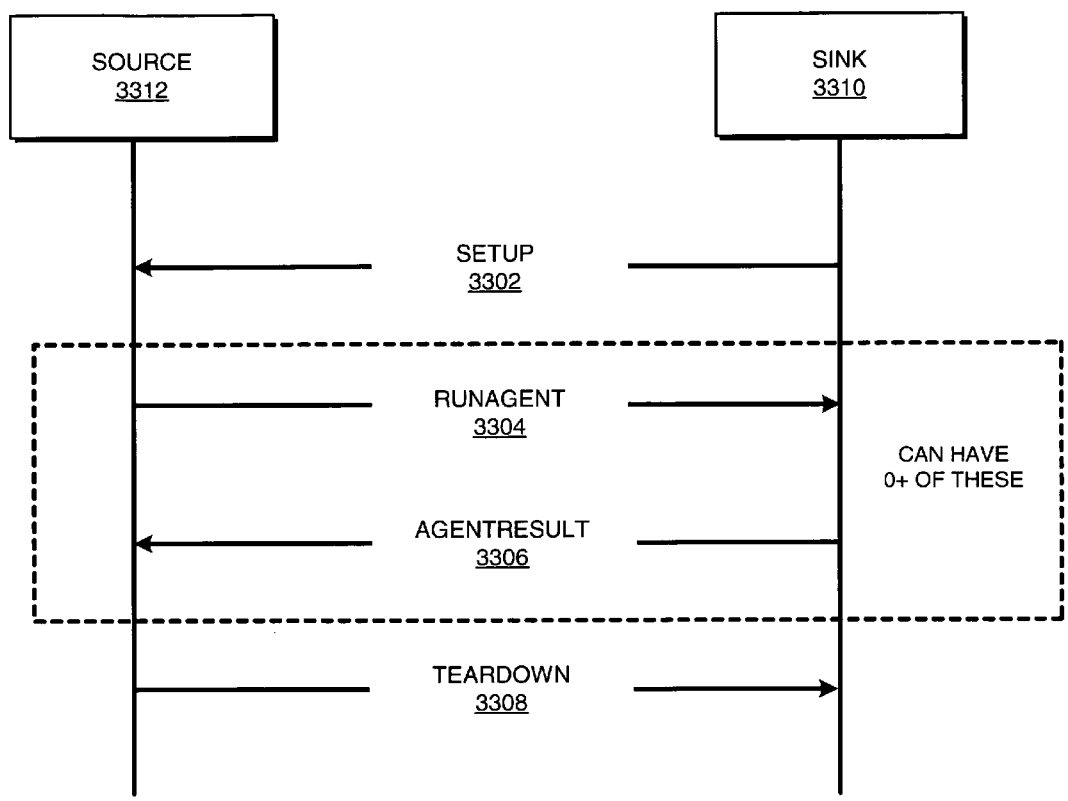
FIG. 33 shows another example of a license transfer protocol in accordance with one embodiment.

FIG. 33 outlines a modification of the protocol that would allow multiple round trips. In the embodiment shown in FIG. 33, the Setup message 3302 can, for example, be the same as the improved license transfer request message described above in connection with the license resolution problem/solution.

As shown in FIG. 33, after the Setup 3302, the application will run the Control as explained above and will get an Extended Status Block (ESB). This ESB may contain a RunAgentOnPeer obligation/OnAgentCompletion callback. In one embodiment, the RunAgentOnPeer obligation will contain all the parameters that the Source 3312 application needs to build the RunAgent message 3304. Note that in one embodiment, the RunAgent message 3304 will also be sent if the application encounters another RunAgentOnPeer/OnAgentCompletion callback/obligation pair in the Extended Status Block of the OnAgentCompletion callback (after one or more RunAgent/AgentResult message exchanges).

In one embodiment, if the ESB does not contain a RunAgentOnPeer obligation/OnAgentCompletion callback, it means that the Teardown message (see below) needs to be sent. Note that this ESB may contain a ProximityCheck obligation/OnSinkProximityChecked callback in which case the proximity check protocol will be performed and the result will be read from the ESB of the OnSinkProximity checked callback before sending the Teardown message.

In one embodiment, the payload of the RunAgent message 3304 is identical to the Response message of the previous design except that it does not carry a ContentKeyList.

As shown in FIG. 33, after the sink 3310 has run the agent sent by the source in the RunAgent message 3304, the sink 3310 sends an AgentResult message 3306 to the source 3312. In one embodiment, the message payload is the same as the Confirmation message described in connection with FIG. 32.

As shown in FIG. 33, the Teardown message 3308 is sent by the Source application 3312 when the extended status block of the OnAgentCompletion does not carry any RunAgentOnPeer/OnAgentCompletion callback/obligation pair which means that the protocol is over. In one embodiment, the Teardown message 3308 carries two pieces of information: (i) a description of the protocol result so that the sink 3310 knows if the protocol has succeeded or not and if not, an indication of why it failed (see below for more details), and (ii) in case of success of the protocol, the updated ContentKey objects (the ContentKeyList of the Response in the previous message) if the NeedsContentKey element of the setup message is set to true or not present.

In one embodiment, the description of the protocol result is actually the Extended Status Block (ESB) of the last invocation of the control carrying no agent related obligation/callback pair.

In case of failure, the parameters of the ESB may point to resources. In one embodiment, these resources are located in the ResourceList extension of the Control that was sent in the Setup message.

In case of success, in one embodiment the cache duration will indicate for how much time the Content Keys may be used without asking the control again.

An example of such an ESB XML representation is shown below, and can be added to the virtual machine schema:

```
<xs:element name="CacheDuration" type="CacheDurationType"/>
<!-- CacheDurationType -->
<xs:complexType name="CacheDurationType">
    <xs:attribute name="type" type="xs:int"/>
    <xs:attribute name="value" type="xs:int"/>
</xs:complexType>
<xs:element name="ExtendedStatusBlock"
type="ExtendedStatusBlockType"/>
<!-- ExtendedStatusBlockType -->
<xs:complexType name="ExtendedStatusBlockType">
    <xs:sequence>
        <xs:element ref="CacheDuration"/>
      <xs:element name="Parameters" type="ValueListBlockType"
      minOccurs="0"/>
    </xs:sequence>
    <xs:attribute name="globalFlags" type="xs:int" default="0"
use="optional"/>
    <xs:attribute name="category" type="xs:int" use="required"/>
    <xs:attribute name="subcategory" type="xs:int" use="optional"/>
    <xs:attribute name="localFlags" type="xs:int" use="required"/>
</xs:complexType>
```

The following is an example of a rendering use case in accordance with an embodiment of the improved license transfer mechanisms described above. In this example, a broadcast import function imports a piece of content with the following license:

Play: OK if a local state is present

Transfer:

Render OK if sink is in domain X or if sink is in proximity. Only one parallel stream can be rendered at a time.

Assume a Core DRMClient1 requests permission to render the content stream. A Setup Request is sent from the sink (Core DRMClient1) to the Source (BC Import function) containing the following parameters:

License: the license associated with the content that the sink wants to render

Operation=urn:marlin:core:1-0:service:license-transfer: render

Bundle=Personality node of the sink

Upon receiving the request, the source application populates the relevant host objects and invokes the Control.Actions.Transfer.Perform method. Illustrative pseudo-code for the method governing rendering transfer is shown below:

```
/* pseudo-code of the method governing
rendering transfer */
ESB* TransferRenderPerform(HostObjectTree* t) {
    // check the lock
    if (t->GetObject("SeaShell/.../lock") != NULL) {
        return new ESB(ACTION_DENIED);
    } else {
        // time limited lock, we will unlock in case of failure
        t->SetObject("SeaShell/.../lock", 1);
        t->SetObject("SeaShell/.../lock@ExpirationTime,
                    Time.GetCurrent( ) + 180);
        // return an ESB that contains a RunAgentOnPeer
        // obligation and a OnAgentCompleted callback
        return new ESB(ACTION_GRANTED,
                    new obligation(RUN_AGENT_ON_PEER,
                        CheckDomainAgent),
                    new Callback(ON_AGENT_COMPLETED,
                        RenderAgentCompleted));
    }
}
```

Assuming that the rendering is not locked, the RunAgentOnPeer obligation is executed. A RunAgent message is sent with the Control containing the CheckDomainAgent Method. Upon receiving this message, the sink will populate the relevant host objects and invoke the CheckDomainAgent method. Illustrative pseudo-code for the CheckDomainAgent is shown below:

```
/* pseudo-code of the CheckDomainAgent */
AgentResult* CheckDomainAgent(HostObjectTree* t) {
    // check if the domain node is reachable
    if (IsNodeReachable("urn:marlin:...:domain2042x")) {
        return new AgentResult(SUCCESS);
    } else {
        return new AgentResult(FAILURE);
    }
}
```

Assume for purposes of this illustration that the sink is indeed in the domain. The sink will then send an AgentResult message containing this agent result. Upon receiving the AgentResult, the Source will invoke the callback method. Illustrative pseudo-code for RenderAgentCompleted is shown below:

```
/* pseudo-code of the RenderAgentCompleted */
ESB* RenderAgentCompleted(HostObjectTree* t,
                          AgentResult* ar)
{
  if (ar->IsSuccess()) {
    // give an ESB with no obligation/callback
    // and a Cache duration
    return new ESB(ACTION_GRANTED, new CacheDuration(0));
  } else {
    // try to do a proximity check
    return new ESB(ACTION_GRANTED,
             new obligation(CHECK_PROXIMITY,
                 t->GetObject(".../Sink/Id"),
             new Callback(ON_SINK_PROXIMITY_CHECKED,
                     ProximityCheckCompleted));
  }
}
```

We had assumed that the agent successfully checked the domain membership on the sink. A Teardown message is sent with (i) the re-encrypted content keys for the sink (using the keys provided with the sink node in the Setup request), and (ii) the ESB carrying the cache duration specified above (0 in this case, meaning that the sink has to re-ask next time it wants to access the content). When the sink receives this message, it knows it is allowed to render the content and has the needed content keys.

Now assume that the user wants to render the content on his other device, DRMClient2. The problem is that the content is locked for 180 minutes on the source. Fortunately, when the user presses STOP on DRMClient1, DRMClient1 will initiate a new license transfer protocol with the operation: Release. Upon receiving the request, the source application will populate the relevant host objects and invoke the Control.Actions.Transfer.Perform method. Illustrative pseudo-code for the method governing transfer release is shown below:

```
/* pseudo-code of the method governing
   transfer release */
ESB* TransferReleasePerform(HostObjectTree* t) {
  // check the lock
  if (t->GetObject("SeaShell/.../lock") != NULL) {
    t->SetObject("SeaShell/.../lock", NULL); // delete
    return new ESB(ACTION_GRANTED);
  } else {
    return new ESB(ACTION_DENIED);
  }
}
```

Since no obligation/callback is found in the ESB, this means that a Teardown message will be sent back with this ESB.

This rendering use case thus illustrates that, in certain embodiments, there is no need for the requesting DRMClient of a render operation to re-evaluate the control locally, state does not have to be transferred from the source to the sink, the control can proactively ask for a proximity check, and the content can be released when the renderer is done with it.

11. Certificates

In one embodiment, certificates are used to check the credentials associated with cryptographic keys before making decisions based on the digital signature created with those keys.

In some embodiments, the DRM engine is designed to be compatible with standard certificate technologies, and can leverage information found in the elements of such certificates, such as validity periods, names, and the like. In addition to those basic constraints, in some embodiments additional constraints can be defined about what a certified key can and cannot be used for. This can accomplished by, for example, using key-usage extensions available as part of the standard encoding of the certificates. The information encoded in such extensions allows the DRM engine to check if the key that has signed a specific object was authorized to be used for that purpose. For example, a certain key may have a certificate that allows it to sign link objects only if the link is from a node with a specific attribute, to a node with another specific attribute, and no other link. Since the semantics of the generic technology used to express the certificate will generally not be capable of expressing such a constraint, as it will have no way of expressing conditions that relate to DRM engine-specific elements such as links and nodes, in one embodiment such DRM engine-specific constraints are conveyed as a key usage extension of the basic certificate that will be processed by applications that have been configured to use the DRM engine.

In one embodiment, the constraints in the key usage extension are expressed by a usage category and a VM constraint program. The usage category specifies what type of objects a key is authorized to sign. The constraint program can express dynamic conditions based on context. In one embodiment, any verifier that is being asked to verify the validity of such a certificate is required to understand the DRM engine semantics, and delegates the evaluation of the key usage extension expression to a DRM engine, which uses an instance of the virtual machine to execute the program. The certificate is considered valid if the result of the execution of that program is successful.

In one embodiment, the role of a constraint program is to return a boolean value. "True" means that the constraint conditions are met, and "false" means that they are not met. In one embodiment the control program will have access to some context information that can be used to reach a decision, such as information available to the program through the virtual machine's Host Object interface. The information available as context depends on what type of decision the DRM engine is trying to make when it requests the verification of the certificate. For example, before using the information in a link object, in one embodiment a DRM engine will need to verify that the certificate of the key that signed the object allows that key to be used for that purpose. When executing the constraint program, the virtual machine's environment will be populated with information regarding the link's attributes, as well as the attributes of the nodes referenced by the link.

In one embodiment, the constraint program embedded in the key usage extension is encoded as a virtual machine code module that exports at least one entry point named "Octopus.Certificate.<Category>.Check", where "Category" a name indicating which category of certificates needs to be checked. Parameters to the verification program will be pushed on the stack before calling the entry point. The number and types of parameters passed on the stack will generally depend on the category of certificate extension being evaluated.

12. Digital Signatures

In preferred embodiments, some or all of the objects used by the DRM engine are signed. The following is a description of how objects are digitally signed in one embodiment using the XML digital signature specification (http://www.w3.org/TR/xmldsig-core) ("XMLDSig"). In addition, a canonicalization method of XML compatible with the XML exclusive canonicalization (http://www.w3.org/TR/xml-exc-c14n/) ("c14n-ex") is also described, the output of which can be processed by a non-XML-namespace-aware parser. Appendix D provides more information on an exemplary object serialization, including an illustrative way to compute a canonical byte sequence for objects in an encoding-independent manner.

Figure 28B:
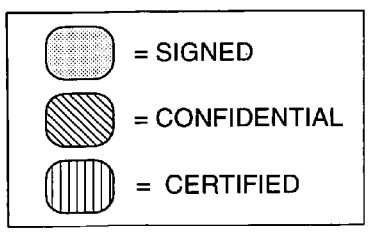
Figure 34:
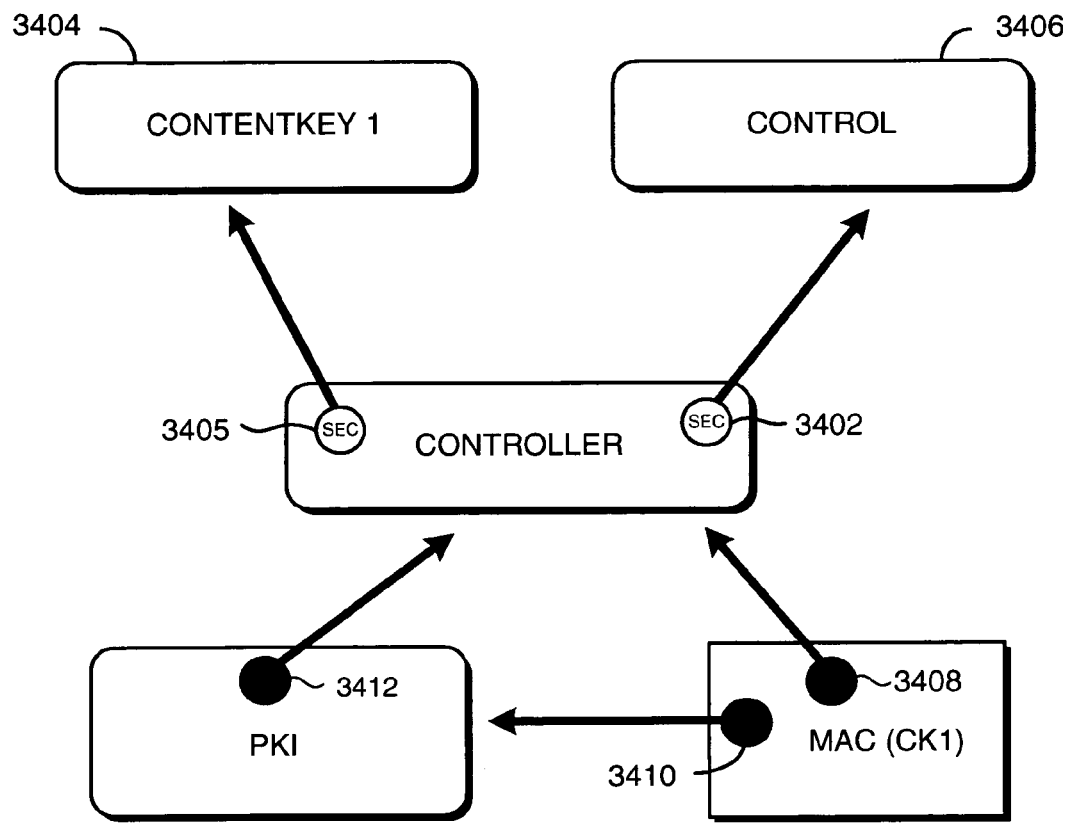
FIG. 34 shows a mechanism for protecting the integrity of license objects in one embodiment.
Figure 35:
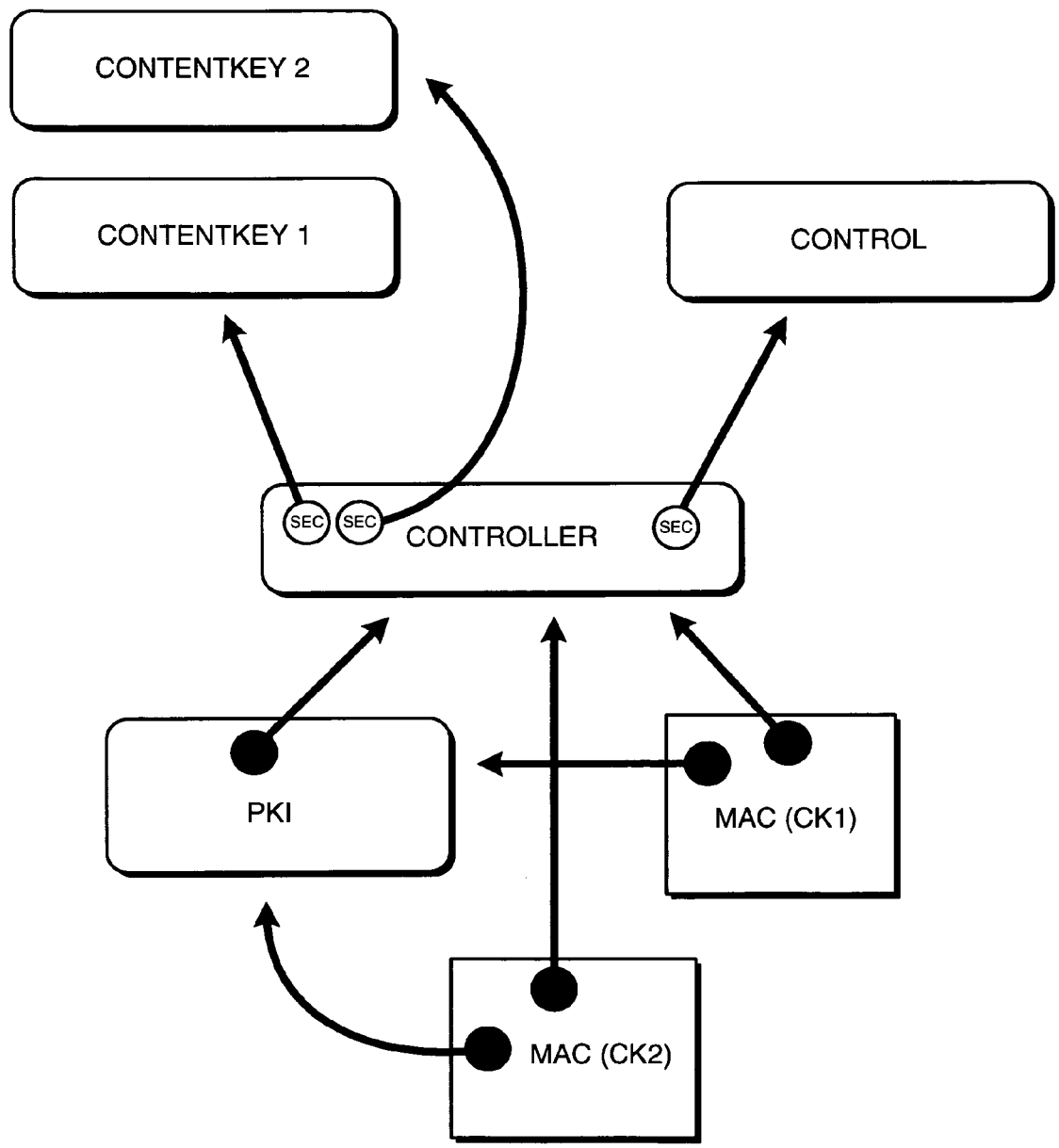
FIG. 35 shows a mechanism for protecting the integrity of license objects in another embodiment.

As shown in FIGS. 28, 34, and 35 in preferred embodiments certain elements in a DRM license are signed. Techniques such as those shown in FIGS. 28, 34, and 35 are useful in prevent or impeding tampering with or replacement of the license components. As shown in FIG. 34, in a preferred embodiment, controller object 3402 includes cryptographic digests or hashes (or other suitable bindings) 3405, 3407 of contentkey object 3404 and control object 3406, respectively. Controller 3402 is itself signed with a MAC (or, preferably, an HMAC that makes use of the content key) and a public key signature (typically of the content or license provider) 3412. In a preferred embodiment, the public key signature of the controller 3412 is itself signed with an HMAC 3410 using the content key. It will be appreciated that in other embodiments, other signature schemes could be used, depending on the desired level of security and/or other system requirements. For example, different signature schemes could be used for the signature of the controller and/or control, such as PKI, standard MACs, and/or the like. As another example, a separate MAC signature could be computed for both the control and the controller, rather than including a digest of the control in the controller and computing a single MAC signature of the controller. In yet another example, the controller could be signed with both a MAC and a public key signature. Alternatively or in addition different keys than those described above could be used to generate the various signatures. Thus while FIGS. 28, 34, and 35 illustrate several advantageous signature techniques in accordance with some embodiments, it will be appreciated that these techniques are illustrative and non-limiting. FIG. 35 illustrates an embodiment in which a controller references multiple content keys. As shown in FIG. 35, in one embodiment, each of the content keys is used to generate an HMAC of the controller and the PKI signature.

In one embodiment the data mode, processing, input parameters, and output data for XML canonicalization are the same as for Exclusive Canonical XML (c14n-ex) except that namespace prefixes are removed (namespaces are indicated using the default namespace mechanism) and external entities are not supported, only character entities are. The first limitation implies that an attribute and its element need to be in the same namespace.

Figure 42:
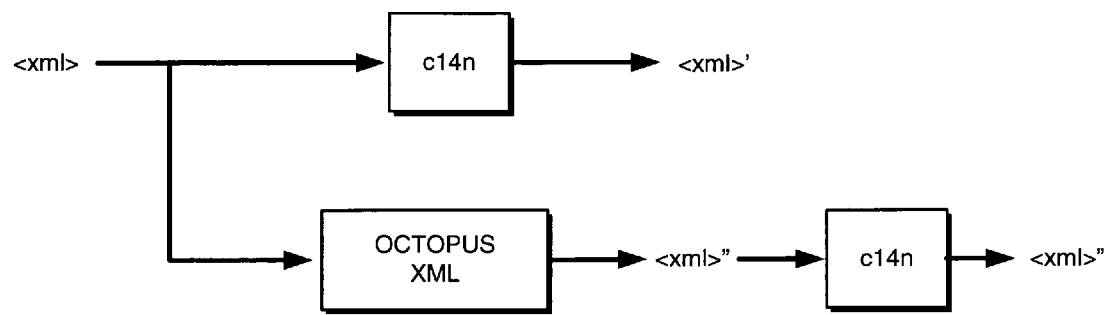
FIG. 42 shows the relationship between c14n-ex and an illustrative XML canonicalization in one embodiment.

FIG. 42 shows the relationship between c14n-ex and an illustrative XML canonicalization in one embodiment, where <xml> is any valid XML, and where <xml>'=<xml>" only if <xml> has no external entities and no namespace prefixes.

A simple example of the simplified signature scheme is provided below: In a preferred embodiment, however, the standard XML canonicalization is used.

| | |
|---|---|
| original | <n1:elem2 id="foo" |
| | xmlns:n0="foo:bar" |
| | xmlns:n1="http://example.net" |
| | xmlns:n3="ftp://example.org"> |
| | <n3:stuff/> |
| | </n1:elem2> |
| processed | <elem2 xmlns="http://example.net" id="foo"> |
| | <stuff xmlns="ftp://example.org"/> |
| | </elem2> |

The signature elements discussed in this section belong to the XMLDSig namespace (xmlns=http://www.w3.org/2000/09/xmldsig#) and are defined in the XML schema defined in the XMLDSig specification. In one embodiment, the container element of the XML representation of DRM objects is the <Bundle> element.

In one embodiment, the following objects need to be signed:
  Nodes
  Links
  Controllers
  Controls (optional)
  Extensions (depending on the data they carry)

In one embodiment, the signatures need to be detached and the <Signature> element needs to be present in the <Bundle> object that contains the XML representation of the objects that need to be signed.

In one embodiment, the <Signature> block will contain:
  A <SignedInfo> element
  A <SignatureValue> element
  A <KeyInfo> element In one embodiment, the <SignedInfo> embeds the following elements:
  <CanonicalizationMethod>

In one embodiment, the <CanonicalizationMethod> element is empty and its Algorithm attribute has the following value: http://www.w3.org/2001/10/xml-exc-c14n#
  <SignatureMethod>

In one embodiment, the <SignatureMethod> element is empty and its Algorithm attribute can have the following values:
  http://www.w3.org/2000/09/xmldsig#hmac-sha1 (HMAC signature)
  http://www.w3.org/2000/09/xmldsig#rsa-sha1 (Public Key Signature)
  <Reference>

In one embodiment, there can be one or more <Reference> elements inside the <SignedInfo> block if more than one objects need to be signed by the same key (e.g., this would be the case for the Control and the Controller object).

In one embodiment, when signing an object, the value of the 'URI' attribute of the <Reference> element is the ID of the referenced object. When signing a local XML element (for example, in the multiple signature case of the public signature method for Controller objects), the value of the URI is the value of the 'Id' attribute of the referenced element.

In one embodiment, when a reference points to an object, what is digested in the reference is not the XML representation of the object but its canonical byte sequence. This transform of the object is indicated in XMLDSig by the means of the <Tranforms> block. Therefore, in one embodiment, the <Reference> element will embed this block:

<Tranforms>
  <Transform Algorithm="http://www.intertrust.com/octopus/cbs-1_0"/>
</Tranforms>

Appendix D provides additional information. In one embodiment, no other <Tranform> is allowed for object references.

In one embodiment, the <DigestMethod> element is empty and its Algorithm attribute has the following value: http://www.w3.org/2000/09/xmldsig#sha1

The <DigestValue> element contains the base64 encoded value of the digest.
  <SignatureValue>

In one embodiment, the signature value is the base64 encoded value of the signature of the canonicalized (ex-c14n) <SignedInfo> element with the key described in the <KeyInfo> element.

HMAC-SHA1 Case for Signatures of Controller Objects

In one embodiment, in this case the <KeyInfo> will only have one child: <KeyName> that will indicate the ID of the key that has been used for the HMAC signature.

Example

```
<KeyInfo>
    <KeyName>urn:x-octopus:secret-key:1001</KeyName>
</KeyInfo>
```

RSA-SHA1 Case

In one embodiment, in this case the public key used to verify the signature will be carried in an X.509 v3 certificate, and may be accompanied by other certificates that may be necessary to complete the certificate path to a CA root.

These certificates are carried, encoded in base64, in <X509Certificate> elements. These <X509Certificate> elements are embedded in an <X509Data> element child of the <KeyInfo> element, and appear in sequential order, starting from the signing key's certificate. The certificate of the root is usually omitted.

Example (for the sake of brevity, the entire values of the example certificates have not been reproduced; the material that has been deleted is indicated by ellipses):

```
<KeyInfo>
 <X509Data>
   <!-- cert of the signing public key -->
   <X509Certificate>MIICh...</X509Certificate>
   <!-- intermediate cert to the trust root -->
   <X509Certificate>MIICo...</X509Certificate>
 </X509Data>
</KeyInfo>
```

In one embodiment, controller objects need to have at least one HMAC signature for each ContentKey referenced in their list of controlled targets. The key used for each of those signatures is the value of the content key contained in the ContentKey object referenced.

Controllers may also have an RSA signature. In one embodiment, if such a signature is present, this signature also appears as a <Reference> in each of the HMAC signatures for the object. To achieve this, in one embodiment the <Signature> element for the RSA signature must have an 'Id' attribute, unique within the enclosing XML document, which is used as the 'URI' attribute in one of the <Reference> elements of each of the HMAC signatures. In one embodiment, the verifier must reject RSA signatures that are not corroborated by the HMAC signature.

Example

```
<Signature Id="Signature.0" xmlns="http://www.w3.org/2000/09/xmldsig#">
  <SignedInfo>
    <CanonicalizationMethod Algorithm="http://www.w3.org/2001/10/xml-exc-c14n#"/>
    <SignatureMethod Algorithm="http://www.w3.org/2000/09/xmldsig#rsa-sha1"/>
    <Reference URI="urn:x-octopus.intertrust.com:controller:37A50262EE3389A14ABC0BC7BE5D43E5">
      <Transforms>
        <Transform Algorithm="http://www.intertrust.com/Octopus/xmldsig#cbs-1_0"/>
      </Transforms>
      <DigestMethod Algorithm="http://www.w3.org/2000/09/xmldsig#sha1"/>
      <DigestValue>G1zXF9Sz/zCwH6MaFm0ObOQcxuk=</DigestValue>
    </Reference>
  </SignedInfo>
<SignatureValue>mjoyW+w2S9iZDG/ha4eWYD1RmhQuqRuuSN977NODpzwUD02FdsAICVjAcw7f4nF
WuvtawW/clFzYP/pjFebESCvurHUsEaR1/LYLDkpWWxh/LlEp4r3yR9kUs0AU5a4BDxDxQE7nUdqU9
YMpnjAZEGpuxdPeZJM1vyKqNDpTk94=</SignatureValue>
  <KeyInfo>
    <X509Data><X509Certificate>MIICh...</X509Certificate></X509Data></KeyInfo>
</Signature>
<Signature xmlns="http://www.w3.org/2000/09/xmldsig#">
  <SignedInfo>
    <CanonicalizationMethod Algorithm="http://www.w3.org/2001/10/xml-exc-c14n#"/>
    <SignatureMethod Algorithm="http://www.w3.org/2000/09/xmldsig#hmac-sha1"/>
    <Reference URI="#Signature.0">
      <DigestMethod Algorithm="http://www.w3.org/2000/09/xmldsig#sha1"/>
      <DigestValue>AqPV0nvNj/vc51IcMyKJngGNKtM=</DigestValue>
    </Reference>
    <Reference URI="urn:x-octopus.intertrust.com:controller:1357">
      <Transforms>
        <Transform Algorithm="http://www.intertrust.com/Octopus/xmldsig#cbs-1_0"/>
      </Transforms>
      <DigestMethod Algorithm="http://www.w3.org/2000/09/xmldsig#sha1"/>
      <DigestValue>G1zXF9Sz/zCwH6MaFm0ObOQcxuk=</DigestValue>
    </Reference>
  </SignedInfo>
  <SignatureValue>TcKBsZZy+Yp3doOkZ62LTfY+ntQ=</SignatureValue>
  <KeyInfo>
    <KeyName>urn:x-octopus.intertrust.com:secret-key:2001</KeyName>
  </KeyInfo>
</Signature>
```

13. Proximity Check Protocol

In some embodiments, it may be desirable to restrict access to content, services, and/or other system resources based on the physical proximity of the requesting entity (e.g., to help enforce rules indicating that a protected piece of content cannot be copied outside a user's home network, office complex, and/or the like). Embodiments of a proximity check protocol are described below that provide security without unduly impeding the performance of the proximity check itself. The proximity check protocol lends itself to application in a wide variety of contexts, one of which is, as indicated above, in the context of digital rights management controls; however, it will be appreciated that the proximity checking systems and methods described below are not limited in application to the digital rights management context. For example, without limitation, the proximity checking techniques presented herein can also be used in the context of a network service orchestration system such as that described in the '551 application and/or any other suitable context.

In one embodiment, a proximity check is performed by measuring the amount of time it takes a first computing node to receive a response from a second computing node to the first computing node's request. If the amount of time is less than a predefined threshold (generally indicating that the second computing node is within a certain physical distance of the first computing node), then the proximity check is deemed a success.

It will be appreciated that due to the wide variety of different network connections over which the request and/or the response might be sent, a given amount of time may correspond to range of possible distances. In some embodiments, this variation is simply ignored, and the proximity check is deemed a success if the round-trip time of the request/response exchange is less than the predefined threshold (e.g., 8 milliseconds, or any other suitable amount of time), regardless of whether, e.g., a fast network connection is being used that could mean that the requesting and responding nodes are actually relatively distant from each other. In other embodiments, a determination could be made as to the type of network connection being used, and different round-trip time requirements could be applied to each different network connection.

In a preferred embodiment, the proximity check allows an anchor (e.g., a client) to check the proximity of a target (e.g., a service). In one embodiment, the protocol is asymmetric, in that the anchor generates the secret seed that is used, and is the only one that makes use of a secure timer. Moreover, the target does not need to trust the anchor. Preferred embodiments of the proximity check are also cryptographically efficient: in one embodiment making use of only two public key operations.

Generation of a Set, R, of Q Pairs from a Seed, S

In one embodiment, a set R is obtained from a seed S according to the following formula: $R_i = H^{2Q-i}(S)$. Where $H(M)$ is the digest value of the hash function $H$ over the message M, and $H^n(M) = H(H^{n-1}(M))$ for $n >= 1$ and $H^0(M) = M$. It will be appreciated that this is simply one illustrative technique for generating a shared secret, and that in other embodiments other techniques could be used without departing from the principles hereof.

In one embodiment, the algorithm used for the hash function H is SHA1 (see, e.g., FIPS PUB 180-1. *Secure Hash Standard*. U.S. Department of Commerce/National Institute of Standards and Technology), although it will be appreciated that in other embodiments, other hash, message digest, or functions could be used.

In one embodiment, a proximity check is performed as follows, where "A" is the anchor (e.g., client) and "B" is the target (e.g., service):

(a) A generates a set R of Q pairs of random numbers $\{R_0, R_1\}, \{R_2, R_3\} \ldots \{R_{2Q-2}, R_{2Q-1}\}$, as shown above.

(b) A sends to B: $E(PubB, \{Q,S\})$, where $E(Y, X)$ denotes the encryption of X with the key Y, and PubB denotes B's public key in a public/private key pair.

(c) B decrypts $\{Q,S\}$ and precomputes R as shown above.

(d) B sends A an acknowledgement to indicate that it is ready to proceed.

(e) A sets a loop counter, k, to zero.

(f) A measures $T_0$=current time.

(g) A sends to B: $\{k, R_{2*k}\}$.

(h) If the value of $R_{2*k}$ is correct, B responds with $R_{2*k+1}$.

(i) A measures D=new current time−$T_0$.

(j) If B responded to A with the correct value for $R_{2*k+1}$, and D is less than a predefined threshold, then the proximity check is deemed a success.

If k+1<Q, A can retry a new measurement by incrementing k and going to step (f). If it is needed to perform more than Q measurements, A can start from step (a) with a new set R. For example, in some embodiments the proximity check can be performed repeatedly (or a predefined number of times) until a correct response is received within the predefined threshold (or if correct responses are received within the predefined threshold more than a predefined percentage of a sequence of challenge/responses), since even if two computing nodes are within the required proximity of each other, an abnormally slow network connection, heavy traffic, noise, and/or the like can cause B's response to be delayed.

Figure 36:
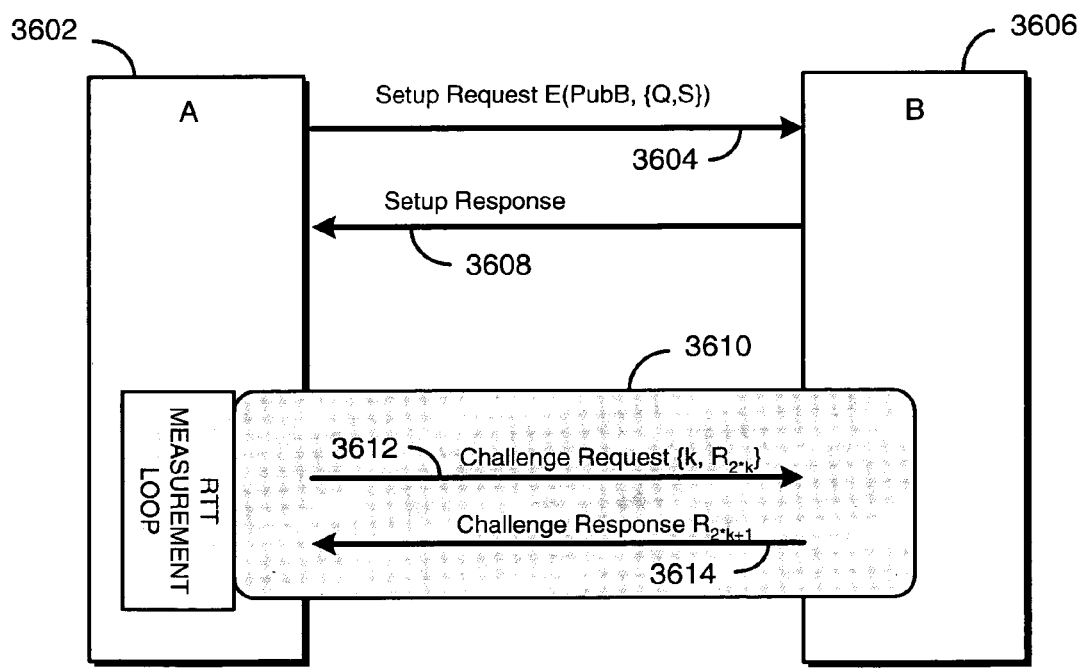
FIG. 36 illustrates a proximity checking protocol in accordance with one embodiment.

FIG. 36 illustrates an embodiment of the protocol described above, in which anchor (A) determines whether target (B) is within an acceptable proximity of anchor (A). For example, as shown in FIG. 36, A may comprise a computing node 3602 that contains protected content (e.g., music, video, text, software, and/or the like) and/or content-access material (e.g., a link, a key, and/or the like) needed by a remote computing node (B) 3606 to access protected content stored at, or accessible to, computing node B 3606. Controls associated with the content or content-access material may indicate that it can only be shared with devices within a certain proximity of node A 3602 (e.g., to approximate limiting the distribution of the content to a home network). Alternatively, or in addition, such a policy may be enforced at the system level of computing node A 3602 (which may, for example, comprise the domain manager of a home or enterprise network). That is, the proximity check need not be a condition in a control program executed by a virtual machine; it could instead simply be something that computing node A 3602 requires as a matter of operational policy before sending content or content access material to computing node B 3606. To enforce such controls and/or policies, software and/or hardware running on computing node A 3602 can perform the proximity checking protocol described above each time a request is made to distribute protected content or content-access material to computing node B 3606. Alternatively, or in addition, a proximity check could be performed at predefined intervals (e.g., once a day) to determine if node B 3606 is in the required proximity, and, if the proximity check is successful, node B 3606 could be treated as being within the required proximity for a predefined period (e.g., until the next check is performed, until a predefined amount of time elapse, and/or the like).

As shown in FIG. 36, once A and B complete any initial set-up steps (e.g., steps (a) through (e), above) 3604, 3608, A and B engage in a secure, timed, challenge-response exchange (e.g., steps (f) through (i), above) 3610 that enables A to determine whether B is within an acceptable proximity.

As shown in FIG. 36, in one embodiment A 3602 sends B 3606 a Setup Request 3604 comprising E(PubB, {Q, S})—i.e., the number of pairs, Q, as well as the secret pairs seed, S, encrypted with B's public encryption key (e.g., a key used by B in the context of service orchestration). In one embodiment, {Q, S} is the byte stream concatenation of Q (1 byte) and S (16 bytes) in network byte order. In one embodiment, the encryption is performed using RSA public key encryption (e.g., as described in B. Kaliski, J. Staddon, *PKCS #1: RSA Cryptography Specifications Version* 2.0. IETF RFC2437. October 1998). In a preferred embodiment, PubB will have been previously accessed by A through inspection, and its certificate will have been verified. Although a Setup Response 3608 from B 3606 to A 3602 is shown in FIG. 36, in other embodiments, a Setup Response 3608 is not used. As previously indicated, after receiving the Setup Request 3604, B 3606 preferably precomputes the set R, so as to facilitate rapid response to subsequent challenges from A 3602.

As shown in FIG. 36, A 36-2 sends B a Challenge Request 3612 consisting of [k, $R_{2*k}$]—i.e., the index, k, and the corresponding secret computed from the seed. In one embodiment, [k, $R_{2*k}$] is the byte stream concatenation of k (1 byte) and $R_{2*k}$ (20 bytes) in network byte order, encoded in base64 for transport. As shown in FIG. 36, in one embodiment, B 3606 is operable to send a Challenge Response 3614 to A 3602, the Challenge Response 3614 consisting, of $R_{2*k+1}$—i.e., the corresponding secret from the Challenge Request 3612. In one embodiment, $R_{2*k+1}$ is the byte stream of $R_{2*k+1}$ (20 bytes) in network byte order, encoded in base64 for transport.

Figure 37:
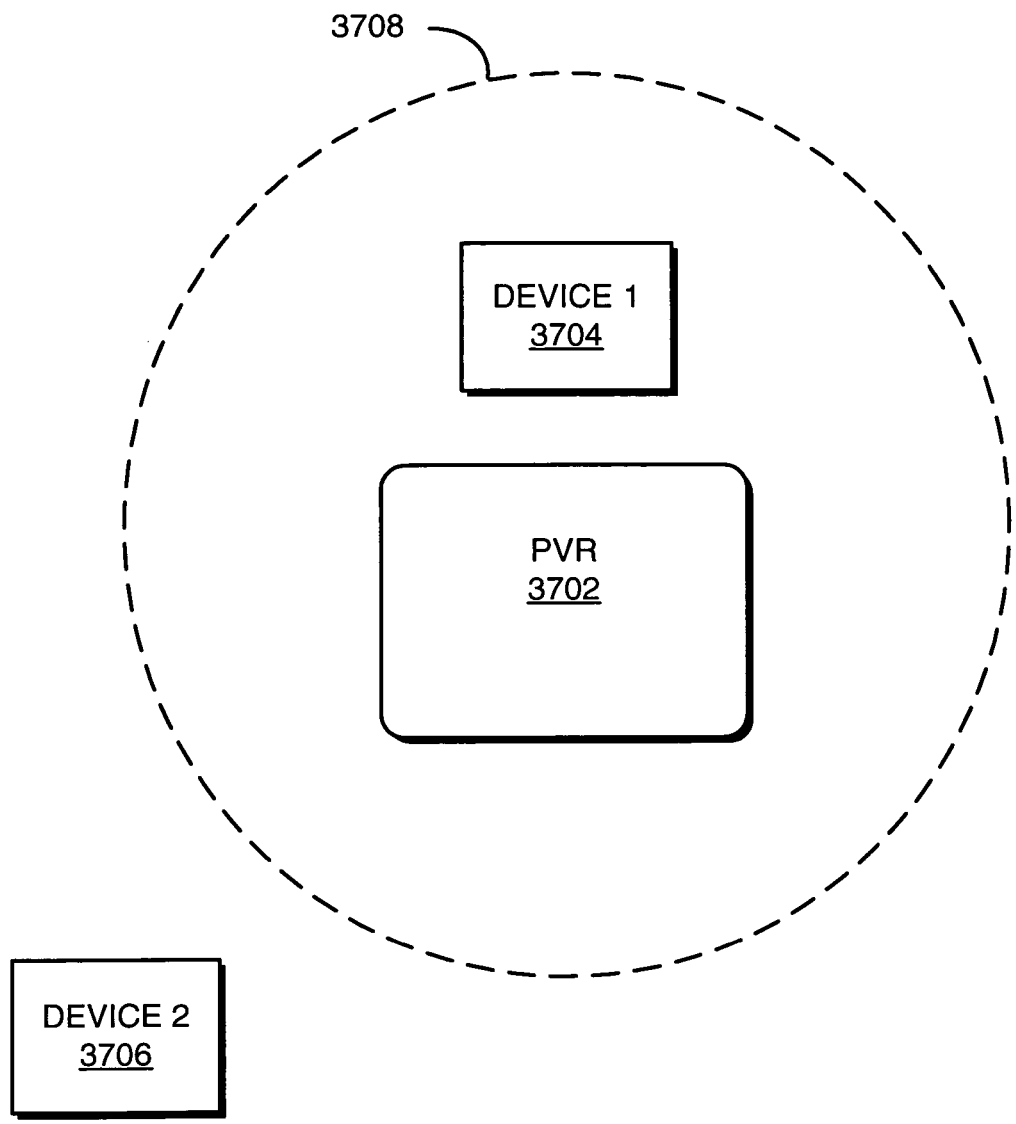
FIG. 37 illustrates the use of a proximity check protocol in accordance with one embodiment.

FIG. 37 shows an example of how an embodiment of the proximity check protocol described above could be used to control access to protected content. Referring to FIG. 37, assume that a cable or satellite content provider has a policy of allowing all devices within a predefined proximity 3708 of a user's personal video recorder (PVR) 3702 to access content through the PVR. Thus, for example, domain manager software running on the PVR 3702 might perform a proximity check on device 3704 and 3706 requesting access to content through PVR 3702. In the example, shown in FIG. 37, device 3706 is not within the proximity 3708 defined by the service provider's policy, and would be denied access by PVR 3702. In contrast, device 3704 is within the proximity, and would be provided with access (e.g., by receiving the content along with an expiring link from device 3704 to the PVR 3702. Alternatively, or in addition, the link might contain a control program that was itself operable to initiate a proximity check with PVR 3702, and deny device 3704 further access to the content if device 3704 moved beyond the predefined proximity 3708 of PVR 3702.

Security Considerations

In preferred embodiments, care should be taken to adhere to some or all of the following:

The loop comprising steps (f) through (i) is not repeated with the same value of k for any set R.

The protocol is aborted if an unexpected message is received by either party, including:
If B receives an incorrect value for $R_{2*k}$ in step (g)
If Q is not within a specified range in step (a)
If k is repeated in the loop
If k exceeds Q The protocol can alternatively or in addition be aborted if A receives an incorrect value of $R_{2*k+1}$ in step (h). In other embodiments, a certain number of incorrect responses from B may be tolerated.

It will be appreciated that optimal values for Q and the predefined time threshold will typically depend on the unique circumstances of the application at hand (e.g., the speed of the network, the importance of ensuring a relatively tight proximity, etc.). Therefore, implementations should preferably provide for flexibility in configuring these values. In one embodiment, it is assumed that implementations will support a minimum value of 64 for Q and a value of 8 ms for the threshold (where, at some of today's network speeds, 8 ms may correspond to a proximity of a few miles).

Protocol Security Policies

In a preferred embodiment, no additional security is needed for the exchange of the request and the response. Because of the size of the messages being exchanged (e.g., 20 bytes), and their effective randomness (through use of the SHA1 hashing algorithm or other method), it will be cryptographically infeasible for an attacker to determine the correct response, even if the attacker manages to intercept the request.

It should be appreciated that the above-described embodiments are illustrative, and that numerous modifications could be made without departing from the inventive principles presented herein. For example, while a recursively hashed secret seed is described above, any suitable shared secret could be used for the challenge/response. In one embodiment, the shared secret might simply comprise an encrypted number/message sent from A to B, and the challenge/response could simply comprise A and B exchanging portions of the number/message (e.g., A sends B the first character of the message, and B sends A the second character of the message, and so forth). Although such a technique may lack the security of the embodiment described in connection with FIG. 36 (since a character in a message would be much easier to guess than a 20 byte hash), in some embodiments such a level of security may be adequate (especially where, for example, the variability of network delays makes the proximity checking mechanism a fairly coarse control of actual proximity anyway), and in other embodiments security could be enhanced by performing the proximity check multiple times, where, although any particular digit or bit may be relatively easy to guess, the likelihood that an attacker would be able to correctly guess a given sequence of digits or bits will rapidly decrease with the length of the sequence. In such an embodiment, the proximity check could be deemed a success only if B is able to provide more than a predefined number of consecutive correct responses (or a predefined percentage of correct responses).

For purposes of illustration and explanation, an additional illustrative example of a proximity check protocol is provided below. In this example, a first device, SRC, communicates with a second device, SNK, over a communication channel (e.g., a computer network). We want to be able to securely determine if SRC and SNK are within proximity of each other, as measured by the time it takes for SNK to respond to a communication request from SRC. A challenge or probe message is sent from SRC to SNK, and SNK replies with a response message. The period of time between the emission of the challenge and the reception of the response will be called the round trip time or RTT. To avoid introducing unnecessary overhead in the time it takes SNK to compute and send back a response to the challenge, it will generally be desirable to make the challenge/response communication as lightweight as practical. In particular, it will typically be desirable to avoid requiring cryptographic operations by SRC or SNK between the emission of the challenge and the reception of the response.

Also, to ensure that only SNK is able to produce a valid response to the challenge from SRC (e.g., to avoid a man-inthe-middle attack, where a third party could intercept the challenge from SRC and send a response back, as if SNK had responded), the protocol could proceed as follows:

(1) SRC creates a secret. This secret is composed of one or more pairs of random or pseudo-random numbers.

(2) SRC sends to SNK the secret. This part of the protocol is not time-sensitive. The secret is kept confidential by SRC and SNK. The secret is also sent in a way that ensures that only SNK knows it. This typically involves sending the secret over a secure authenticated channel between SRC and SNK (for example, SRC can encrypt the secret data with a public key for which it knows that only SNK has the corresponding private key). The secret data does not have to be the pair(s) of random or pseudo-random numbers described above. Even in embodiments where such pairs are used, the secret data transmitted in this step only needs to be enough information to allow SNK to compute or deduct the values of the pair(s) of numbers. For example, the secret data could be a random seed number from which one or more pair(s) of pseudo-random numbers can be generated using a seeded pseudo-random number generator.

(3) Once SRC knows that SNK is ready to receive a challenge (for example, SNK may send a READY message after receiving and processing the secret data), SRC creates a challenge message. To create the challenge message. For example, in a preferred embodiment, SRC selects one of the random number pairs. If more than one pair is used, the challenge message data contains the information to indicate which pair was chosen, as well as one of the two numbers in that pair.

(4) SRC measures the value of the current time, T0. Immediately after, SRC sends the challenge message (no need for encryption or digital signature), to SNK and waits for the response. Alternatively, SRC could measure the current time, T0, immediately before sending the challenge message, although preferably after any concomitant cryptographic operations (e.g., encryption, signing, and/or the like) had been performed.

(5) SNK receives the challenge, from which it can identify one of the pairs it has received previously. SNK checks that the random number in the challenge is part of the pair, and constructs a response message that contains the value of the other random number of that pair.

(6) SNK sends the response message to SRC (no need for encryption or digital signature).

(7) SRC receives the response message, and measures the value of the current time, T1. The round trip time RTT is equal to T1-T0.

(8) SRC verifies that the number received in the response is equal to the other value in the pair that was chosen for the challenge. If the numbers match, the challenge response is successful, and SRC can be assured that SNK was within the proximity indicated by the roundtrip time. If the numbers do not match, SRC can abort the protocol, or, if more than one pair was shared, and there is at least one pair that has not been used, go back to step (3), and use a different pair.

It will be appreciated that a number of variations could be made to the illustrative proximity checking protocols described above without departing from the principles thereof. For example, without limitation, different cryptographic algorithms could be used, different shared secrets could be used, and/or the like.

14. Security

In practical applications of the systems and methods described herein, security can be provided at a variety of different levels and using a variety of different techniques. The discussion herein has focused primarily on the design and operation of a DRM engine and related host application for use in efficiently regulating potentially complex business relationships. When the DRM engine and host application operate as intended, content is protected from unauthorized access or other use by the enforcement of the license terms associated therewith.

Protection of the DRM engine and/or the environment in which the DRM engine runs (e.g., the applications and hardware with which it interacts) from malicious tampering or modification can be done using any suitable combination of security techniques. For example, cryptographic mechanisms such as encryption, digital signatures, digital certificates, message authentication codes, and the like can be employed, e.g., as described elsewhere herein, to protect the DRM engine, host application, and/or other system software or hardware from tampering and/or other attack, as could structural and/or tactical security measures such as software obfuscation, self-checking, customization, watermarking, anti-debugging, and/or other mechanisms. Representative examples of such techniques can be found, for example, in U.S. Pat. No. 6,668,325 B1, Obfuscation Techniques for Enhancing Software Security, and in commonly assigned U.S. patent application Ser. No. 11/102,306, published as US-2005-0183072-A1; U.S. patent application Ser. No. 09/629,807; U.S. patent application Ser. No. 10/172,682, published as US-2003-0023856-A1; U.S. patent application Ser. No. 11/338,187, published as US-2006-0123249-A1; and U.S. Pat. No. 7,124,170 B1, Secure Processing Unit Systems and Methods, each of which is hereby incorporated by reference herein in its entirety. Alternatively or in addition, physical security techniques (e.g., the use of relatively inaccessible memory, secure processors, secure memory management units, hardware-protected operating system modes, and/or the like) can be used to further enhance security. Such security techniques will be well-known to one of ordinary skill in the art, and it will be appreciated that any suitable combination of some, none, or all of these techniques could be used depending on desired level of protection and/or the details of the particular application at hand. Thus, it will be appreciated that while certain security mechanisms (e.g., key derivation techniques, digital signature techniques, encryption techniques, and the like) are described herein in connection with certain embodiments, use of these techniques is not required in all embodiments.

Yet another form of security can be provided by the institutional design and operation of the system, and by the legal and social regulation of the participants therein. For example, in order to obtain a personality node, keying material, protected content, and/or the like, a device or entity may be required to contractually agree to adhere to system specifications and requirements, may need to submit to a certification process during which the entity's compliance with system requirements could be verified, and/or the like. For example, a device or application may be required to implement the DRM engine in a way that is compatible with other implementations in the environment, and/or be required to provide a certain type or level of tamper resistance or other security. Digital certificates could be issued that attested to a device's or other entity's compliance with such requirements, and these certificates could be verified before allowing the device or entity to participate in the system, or as a condition of allowing continuing access.

Additional, non-limiting information on security techniques that can be used in connection with the inventive body of work is provided below.

System Security

In some embodiments, a system designer may choose to use a combination of renewability, refusal, and/or remediation techniques to manage risks and mitigate threats that may arise from attacks on and compromise of devices, applications, and services. Examples of various technical mechanisms that can be used to mitigate threats are presented below.

Renewal mechanisms can be used to serve at least two distinct purposes. First, they can be used to convey up-to-date information to trusted system entities that allow them to refuse access or service to untrusted system entities. Second, renewal mechanisms enable an untrusted entity to regain trusted status by updating any compromised component(s). Refusal countermeasures can be further characterized as exhibiting one or more of the following behaviors:

Revocation, or annulling a credential (typically by blacklisting some entity)

Exclusion, or denying access by applying cryptographic or policy enforcement mechanisms Shunning, or denying access or a service based on an identity or some other attribute bound to a credential Expiration, or annulling a credential or privilege based on a temporal event.

For example, refusal mechanisms can be used to counter threats such as device cloning, impersonation attack, protocol failures, policy enforcement failures, application security failures, and stale or suspicious information.

The following table provides examples of potential threats, some of the risks they pose, and mechanisms to remedy the threat and renew system security.

| Threat | Risks | Remediation Mechanism | Renewal Mechanism |
|---|---|---|---|
| Cloned Device | Free-access devices. | Broadcast Encryption | BKB Update. |
| Compromised Certified Key | Unauthorized licenses, links, device state, identities, service access. | Certificate Revocation | CRL Distribution. Key renewal. |
| Implementation Failure | Recipes for device hacking. | Specification Version Assertion | Software upgrade |
| Protocol Failure | Compromised keys. Ungoverned access to licensed content. | Security Metadata Assertion | Software upgrade |
| Stale Security Metadata | Bogus service interaction. Clock rollback, reliance on compromised information. | Security Metadata Assertion | Security Metadata update service. Software upgrade. |

Revocation

Revocation can be viewed as a remediation mechanism that relies on blacklisting an entity. Typically, what is revoked is a credential such as a public-key certificate. Upon revoking the credential, the blacklist will need to be updated and a renewal mechanism used to convey the update so that a relying party may benefit therefrom.

Thus, for example, devices, users, and/or other entities can be required to present identity certificates, other credentials, and a variety of security data before they are given the information necessary to consume content or a service. Similarly, in order for a client to trust a service, the service may need to provide its credentials to the client.

Examples of ways that an entity can effectively invalidate information necessary for accessing a service include:

Certificate Revocation Lists (CRLs)

Credential and data validity services, such as an Online Certificate Status Protocol (OCSP) responder Commands for self-destruction of credentials and data Certificate Revocation Lists (CRLs)

Revocation lists can be used by different entities to revoke identity certificates, licenses, links, and other security assertions. This mechanism is most effective to remedy the situation which results from a service being compromised. A number of techniques can be used for distributing CRLs. For example, some systems may employ an indirect CRL, so that there is a single CRL governing the entire ecosystem. In addition, entities can advertise (or publish) the CRL(s) in their possession, and/or subscribe to an update service. CRL(s) can be distributed peer-to-peer in a viral fashion and/or portable devices can receive published CRL(s) when tethered. The service orchestration techniques described in the '551 application can also be used for this purpose.

Validity Services

Validity services can be used to provide up-to-date information on the status of credentials and other security related data. Validity services can perform either active validation operations on behalf of a relying party or they can be used to manage security information on behalf of relying parties. An example of an active validity service is one that can check the validity of a credential or attribute. Examples of validity services that manage security information are those which disseminate CRL or security policy updates, or provide a secure time service. The use of validity services can help ensure that relying parties have current data to inform governance decisions.

Typically, not all system entities will need up-to-the-minute information on the validity of credentials and security data. For example, not all consumer devices will use an Online Certificate Status Protocol (OCSP) service to validate a license server's certificate chain each time a license is used or a new license is obtained. However, a license server may use an OCSP service with some frequency to check the validity of subscriber credentials. Policy (which can be easily updated) can determine when and what services must be used. By providing an opportunity to dynamically update policy, license servers can adapt to operational changes. Thus, security policy can evolve based on experience, technological progress, and market factors.

Directed Self-Destruction of Security Objects

Self-destruction of credentials and data by an entity is appropriate when the integrity of the entity's security processing is not suspect. When this option is available, it is often the most straightforward, expeditious, and efficient method of revocation. It can be particularly useful when there is little or no suspicion of breach of integrity, and bi-directional communication supports a protocol allowing specific directions for destruction along with verification that destruction has been completed.

There are a number of security objects that will often be useful to have destroyed or disabled. For example, when a device leaves a domain, or a content license times out, it will be useful for the associated objects that contain keys and can be used to access content to be destroyed. The agent control programs described in more detail elsewhere herein are well-suited to the implementation of self-destruction mechanisms. Agents can be crafted to destroy state in secure storage (e.g., the state database) to affect changes in domain membership or to remove keys that are no longer usable (e.g., due to changes in membership or policy).

Exclusion

Exclusion is a remediation mechanism which bars a bad actor (or group of bad actors) from participating in future consumption of goods and services. Due to the severe consequences exclusion imposes, it is typically only used as a last resort when circumstances warrant. Exclusion relies on a mechanism that effectively blacklists the bad actors, thereby prohibiting them from consuming media and media-related services. Dissemination of the blacklist relies upon a renewal mechanism to enable this remediation. However, exclusion does not necessarily provide a renewal mechanism to restore a bad actor to a trusted status.

Key Exclusion

Key exclusion is a key management mechanism that is used to broadcast key information to a set of receivers in such a way that at any given time a decision can be made to logically exclude some subset of receivers from the ability to decrypt future content. This is activated by using efficient techniques to construct a Broadcast Key Block (BKB) that includes information necessary for each member of a large group of receivers to decrypt content. The BKB is structured in such a way that it can be easily updated, excluding one or more members of the group from the ability to decrypt the content. In other words, the design of the BKB allows for an authority to update the system with a new BKB, so that a content provider can specifically exclude a target set of devices from making use of the BKB, even though s/he may have access to it.

This mechanism is particularly effective against a cloning attack, where a pirate reverse engineers a legitimate device, extracts its keys, and then deploys copies of those keys to clone devices. The clones externally act like the original, except that these clones will not necessarily adhere to the governance model. Once the compromise is discovered, an updated BKB can be deployed that excludes the compromised device and all of its clones. However, key exclusion incurs some storage, transport, and computation overhead that in some situations make it less efficient than other methods. This is especially true when the content is not broadcast or when there is a back channel.

Shunning

Shunning is a remediation mechanism very similar in behavior to exclusion but with less severe repercussions. Essentially, it is a means for refusing service because of a runtime policy decision. Instead of more heavy-handed approaches to disable a device's capability through directed self-destruction or access denial via key exclusion, shunning offers a simple approach to disabling a device by having service providers refuse to supply it with services. With the current trend towards extending the value of devices by using externally provided services, shunning becomes a more effective security mechanism.

Device shunning is driven by policy and can be used to discriminate against entities (e.g., clients, servers, and specific role players) that do not produce all of the appropriate credentials that policy requires. Policy could, for example, require that an entity demonstrate it has administered the latest security update. Therefore shunning can be either a consequence of revocation or the failure to take some specific action. Shunning can be facilitated in a peer-to-peer fashion using the inspection services and services such as those describe in the '551 application. Also, a data certification service (e.g., an instance of a validity service) can perform shunning at policy enforcement time. After a system entity has been shunned, it can be informed of the specific credential or object that is failing to comply with the policy of the service. This can trigger the shunned entity to renew the object through an appropriate service interface.

Expiration

Expiration is a remediation mechanism that relies upon some temporal event to invalidate a credential or object. Expiration is effective in enabling temporary access to media or media services; once these have expired, the governance model ensures that access is no longer permitted. Effective use of expiration may require renewal mechanisms whereby the credential or object can be refreshed to enable continued access to media or media services.

Expiration of Credentials

Certified keys can have various expiry attributes assigned to protect relying parties. Expiration of credentials can be used to ensure that entities whose certificates have expired are refused service and used in conjunction with key rollover and key renewal procedures. When entities are expected to be frequently connected to a wide area network, best-practice dictates renewing credentials and other security data regularly. Another best-practice is to keep the validity period of these objects as short as reasonable. Various techniques such as overlapping validity periods and grace periods in validity checking policies can be used to ensure smooth operation during transitions. Short validity periods also help to reduce the size of CRLs.

Expiration of Links

As previously described, link objects may be assigned validity periods. Upon expiration, a link is deemed invalid and a DRM engine will not consider it in the construction of its graph. This mechanism can be used to enable temporary access to goods and services. Links can be renewed so that continued access to media may be granted as long as it is permitted by policy. Because, in one embodiment, links are relatively lightweight, self-protected objects they can be easily distributed over peer-to-peer protocols.

Renewability Mechanisms: Application and Policy Renewability

Efficient renewability will typically entail the rapid deployment of remedies to protocol failures, which are often the dominant security problems seen in security applications (including in DRM systems). Software updates can then be used to update the business logic and security protocols. When applications are designed to separate security policy and trust policy from application logic, a separate mechanism can be used to update policy; this is a less risky approach. In fact, peer-to-peer publishing mechanisms can be used to rapidly update policy. Otherwise, the application deployer's software update methods can be used to update security and trust policy.

Using the Right Tool for the Right Job

It will generally be desirable to use relatively lightweight tools when possible. Using credentials with limited validity periods and policies that check validity dates can help keep the overall population of entities to a manageable size and eliminate the need for growing CRLs too rapidly. Shunning an entity rather than excluding it from access to keys can extend the lifetime of BKBs; moreover, it has the advantage of enabling fine-grained policies that can be temporary and change with circumstances. Different CRLs that track specific types of credentials of interest to different role players can be used instead of BKBs which can be deployed where they are most effective (such as dealing with cloned receivers). Policies can direct the use of online validity services when those services can be expected to provide a reasonable return on investment of time and effort, where fresh credentials are very important, and where slower revocation mechanisms are inadequate. When a node is likely to have integrity and can be expected to do the right thing, and when a license or security object (such as a link for a subscription or a domain link) needs to be revoked, then a reasonable approach will typically be to tell the node to destroy the object. In such a situation, there is no need to tell the world that the license is invalid and there is no need to deploy a BKB or re-key a domain. Self-destruction driven by local policy or by an authoritative command is one of the more efficient methods for revocation.

It will be appreciated that while a variety of revocation, renewal, remediation, and other technologies and practices have been described, it will be appreciated that different situations call for different tools, and that preferred embodiments of the systems and methods described herein can be practiced using any suitable combination of some or none of these techniques.

Network Services Security

The following discussion illustrates some of the security considerations and techniques that can be relevant to embodiments in which the DRM engine and applications described above are used in connection with networked service orchestration systems and methods such as those described in the '551 application.

Practical implementations of DRM systems employing a DRM engine and architecture such as those disclosed herein will often perform networked transactions for accessing content and DRM objects. In such a context, the systems and methods described in the '551 application can be used to inter alia standardize message-layer security, including entity authentication and formats for authorization attributes (roles).

For the sake of discussion, the transactions that occur in a DRM system can be separated into at least two general categories based on the type of information being accessed, acquired, or manipulated:

Content Access Transactions involve direct access to or manipulation of media or enterprise content or other sensitive information protected by the DRM system. Examples of content access transactions include rendering a protected video clip, burning a copy of a protected audio track to a compact disc, moving a protected file to a portable device, emailing a confidential document, and the like. Content access transactions typically involve direct access to a content protection key and are performed at the point of consumption under the direction of a user.

Object Transactions are transactions in which a user or system acquires or interacts with objects defined by the DRM system that in some way govern access to protected content. Such objects include DRM licenses, membership tokens, revocation lists, and so forth. One or more object transactions are usually required before all of the collateral necessary to perform a content access transaction is available. Object transactions are typically characterized by the use of some type of communications network to assemble DRM objects at the point of consumption.

These two types of transactions define two points of governance that are generally relevant to most DRM systems.

Figure 38:
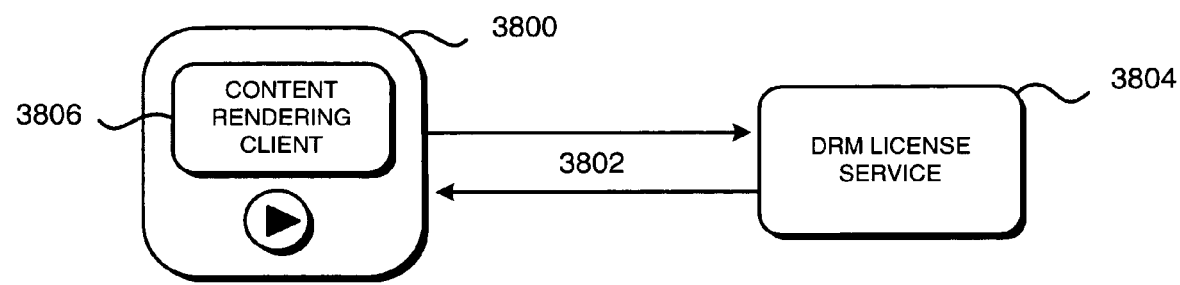
FIG. 38 illustrates an interaction between a client and a license server in one embodiment.

FIG. 38 shows a typical pair of interactions in which a DRM-enabled client 3800 requests a DRM license 3802 from an appropriate DRM license service 3804. In the example shown in FIG. 38, the DRM license 3802 is sent from the DRM license service 3804 to the client 3800, where it is evaluated in order to provide access to content 3806.

DRM systems typically require that both content access and object transactions be performed in a manner that prevents unauthorized access to content and creation of objects that protect the content. However, the security concerns for the two types of transactions are naturally different. For example:

Content Access Transactions may require authenticating a human principal, checking a secure render count, evaluating a DRM license to derive a content protection key, etc. A major threat against legitimate execution of a content access transaction is breach of the tamper-resistant boundary that protects the objects and the data inside.

Object Transactions usually involve a communications channel between the entity that requires the DRM object and the entity that can provide it. As such, object transactions face communications-based threats such as man-in-the-middle attacks, replay attacks, denial-of-service attacks, and attacks in which unauthorized entities acquire DRM objects that they should not legitimately possess.

In general, object transactions involve authentication of two interacting entities, the protection of the messages passed between them, and authorization of the transaction. The primary purpose of such transactions is to gather integrity-protected DRM objects from legitimate sources so that content access transactions can be performed. From the perspective of a content access transaction, the mechanisms by which legitimate DRM objects are obtained and the collateral information used in obtaining them are essentially irrelevant; these mechanisms can (and preferably should) be invisible to the content access itself. This natural separation of concerns leads, in a preferred embodiment, to a layered communications model that distinguishes the trusted communications framework from applications that are built on top of it.

The simplified license acquisition and consumption example shown in FIG. 38 obscures some details that will generally be important in practical applications. For example, it does not show how the DRM license service verifies that the entity requesting a DRM license is in fact a legitimate DRM client and not a malicious entity attempting to obtain an unauthorized license or to deny service to legitimate clients by consuming network bandwidth and processing power. Nor does it show how sensitive information is protected for confidentiality and integrity as it moves through the communications channels connecting the client and service.

Figure 39:
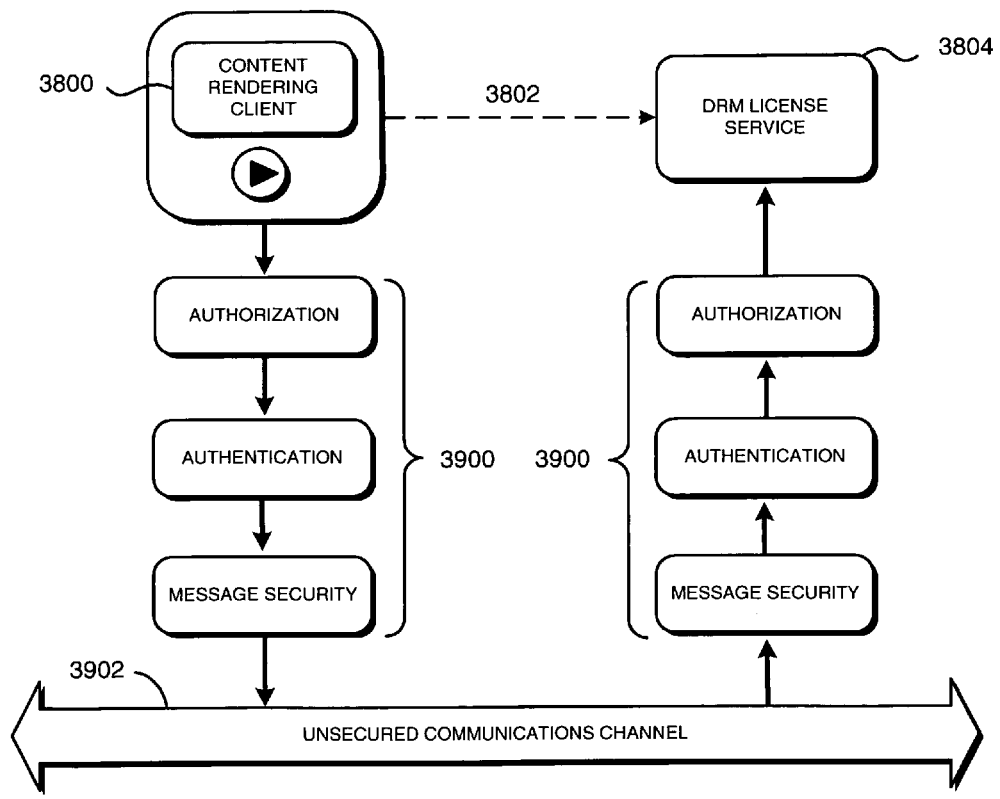
FIG. 39 is more detailed illustration of an interaction between a client and a license server in one embodiment.

A more detailed view of this example transaction is shown in FIG. 39. Referring to FIG. 39, the dotted line represents the logical transaction from the point of view of the application-layer content rendering client 3800 and DRM license server 3804. The stack 3900 below represents the layers of processing used to ensure trusted and protected delivery between the two endpoints.

In FIG. 39 a rendering client 3800 requests a license 3802 from a DRM license server 3804. The dotted line in the diagram indicates that the original source and ultimate consumer of the information are the content rendering client 3800 and the DRM license server 3804. However, in practice the message payload may actually be handled by several layers of processing interposed between the application-layer logic and the unsecured communications channel 3902 connecting the two endpoints.

The processing layers that separate the application layer components from the unsecured communications channel will be referred to collectively as the security stack. The security stack can be thought of as a secure messaging framework that ensures integrity-protected, confidential delivery of messages between trusted endpoints. The layered stack model offers advantages such as:

(1) Designers of the application layer logic do not need to expend effort developing the underlying secure communications mechanisms that connect endpoints. The trusted messaging infrastructure is a common design pattern that, once designed, can be deployed in many different situations regardless of the application layer logic that they are supporting.

(2) The messaging framework itself can remain agnostic to the precise semantics of the messages it is conveying and focus its efforts on preventing communications-related attacks and attacks on the authenticity of the messaging endpoints.

In one embodiment, the security stack consists of several distinct layers of processing, as described below. In one embodiment the service orchestration systems and methods described in the '551 application can be used to provide some or all of the operations of the security stack.

Authentication

In one embodiment, messaging endpoints may be authenticated. Authentication is a process by which a given endpoint demonstrates to another that it has been given a valid name by an authority trusted for this purpose. The naming authority should be trusted by the relying endpoint in a transaction; establishing such an authority is typically undertaken by the organizations deploying the trusted technology.

A common mechanism for demonstrating possession of a valid name uses public key cryptography and digital signatures. Using this approach, an entity is provided with three pieces of information:

(1) A distinguished name that provides an identifier for the entity;
(2) An asymmetric key pair, consisting of a public key and a secret private key; and
(3) A digitally signed certificate that asserts that the holder of the private key has the given distinguished name.

The certificate binds the distinguished name and the private key. An entity that uses the private key to sign a piece of information is trusted to have the given distinguished name. The signature can be verified using only the public key. For example, authentication can be based on the X.509v3 standard.

Since, in one embodiment, an entity that can demonstrate possession of a certified private key is trusted to have the distinguished name indicated in the certificate, protecting the private key used to sign information becomes an important consideration. In effect, the ability to use the private signing key defines the boundaries of the entity identified by the distinguished name. At the application layer, senders and recipients need to know that messages originate from trusted counterparts. As such, in one embodiment it is important that the application layer logic itself be part of the authenticated entity. For this reason, in one embodiment the security stack and the application layers that rely upon it are preferably enclosed in a trust boundary, such that a subsystem contained within the trust boundary is assumed to share access to the entity's private message signing key.

Authorization

The authentication mechanism described above proves to distributed messaging endpoints that their correspondent's identity is trustworthy. In many applications, this information is too coarse—more detailed information about the capabilities and properties of the endpoints may be needed to make policy decisions about certain transactions. For example, in the context of FIG. 38, the content rendering client may need to know not only that it is communicating with an authenticated endpoint, but also whether it is communicating with a service that has been deemed competent to provide valid DRM license objects.

Embodiments of the security stack provide a mechanism for asserting, conveying, and applying policy that is based on more fine-grained attributes about authenticated entities via an authorization mechanism. Using this mechanism, entities that already possess authentication credentials are assigned role assertions that associate a named set of capabilities with the distinguished name of the entity. For example, role names can be defined for a DRM client and a DRM license server.

The named roles are intended to convey specific capabilities held by an entity. In practice, roles can be attached to an entity by asserting an association between the entity's distinguished name and the role name. As with authentication certificates, which associate keys with distinguished names, in one embodiment role assertions used for authorization are signed by a trusted role authority that may be different from the name issuer. Inside an entity, role assertions are verified along with the authentication credentials as a condition for granting access to a messaging endpoint's application layer.

Figure 40:
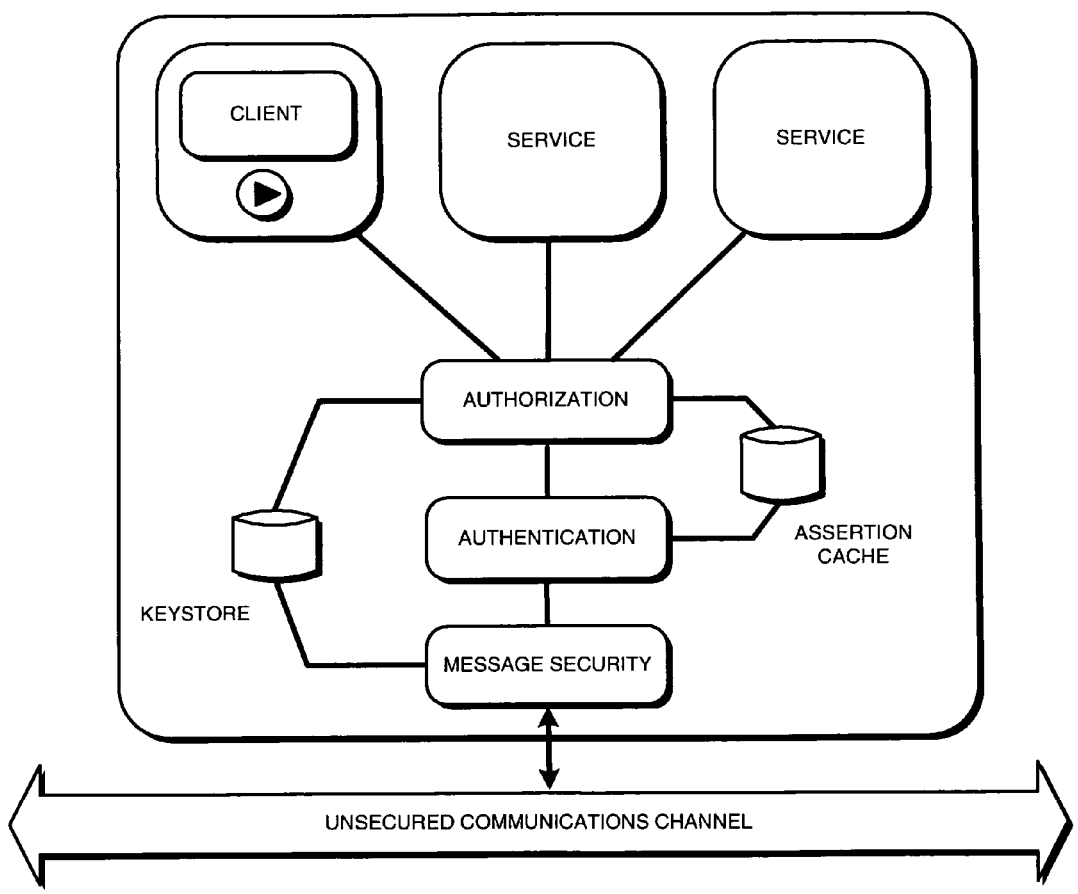
FIG. 40 shows an example of an entity with multiple roles.

An entity may hold as many role attributes as are required by the application being built. The example in FIG. 40 shows an entity with multiple roles: one role that indicates the ability to function as a DRM client and two service roles. For example, one entity may be simultaneously a DRM client, a DRM object provider, and a security data provider. In one embodiment, SAML 1.1 is used for assertions regarding entity attributes.

Message Security

The bottom layer of the security stack is the message security layer, which provides integrity, confidentiality, and freshness protection for messages, and mitigates the risk of attacks on the communications channel such as replay attacks. In the message security layer:

Messages between application layer processes are signed using the entity's private message signing key, providing integrity protection and resistance to man-in-the-middle attacks.

Messages are encrypted using a public key held by the destination entity. This guarantees that unintended recipients cannot read messages intercepted in transit.

Nonces and timestamps are added to the message, providing immunity to replay attacks and facilitating proofs of liveness between the messaging endpoints.

Using server timestamps for updating trusted time of the DRM engine

In one illustrative embodiment, support is provided for AES symmetric encryption, RSA public key cryptography, SHA-256 signature digests, and mechanisms to signal other algorithms in messages.

15. Bootstrap Protocol

In some embodiments, a bootstrap protocol is used to deliver initial confidential configuration data to entities such as devices and software clients. For example, when an entity wishes to join a larger network or system and communicate with other entities using cryptographic protocols, it may need to be configured with personalized data, including a set of keys (shared, secret, and public). When it is not possible or practical for the entity to be pre-configured with personalized data, it will need to "bootstrap" itself using a cryptographic protocol.

The example protocol described below uses a shared secret as the basis for bootstrapping an entity with a set of keys and other configuration data. In the following sections, the following notation will be used:

E(K, D) is the encryption of some data D with a key K.
D(K, D) is the decryption of some encrypted data D with a key K.
S(K, D) is the signature of some data D with a key K. This can be a Public Key signature, or a MAC.
H(D) is the message digest of data D.
V(K, D) is the verification of the signature over some data D with a key K. It can be the verification of a Public Key signature or of a MAC.
CertChain(K) is the certificate chain associated with Public Key K. The value of K is included in the first certificate in the chain.
CertVerify(RootCert, CertChain) is the verification that the certificate chain CertChain (including the Public Key found in the first certificate of the chain) is valid under the root certificate RootCert
A|B|C| . . . is the byte sequence obtained by concatenating the individual byte sequences A, B, C, . . .
CN(A) is the canonical byte sequence for A
CN(A, B, C, . . . ) is the canonical byte sequence for compound fields A, B, C . . .

1.38. Initial State
1.38.1. Client

In one embodiment, the client has the following set of bootstrap tokens (preloaded at manufacturing time and/or in firmware/software):

One or more read-only certificates that are the root of trust for the bootstrap process: BootRootCertificate
One or more secret Bootstrap Authentication Keys: BAK (shared)
An optional secret Bootstrap Seed Generation Key (unique to each client) BSGK. If the client has a good source of random data, this seed is not needed.
Some information, ClientInformation, the client will need to give to the Bootstrap service in order to get its confidentiality key (e.g., ClientInformation can include a device's serial number, the name of the manufacturer, etc.). This information consists of a list of attributes. Each attribute is a (name, value) pair.

The client may be configured with multiple BootRootCertificate certificates and BAK authentication keys, in order to be able to participate in the Boot Protocol with different Boot Servers that may require different trust domains.

1.38.2. Server

In one embodiment the server has the following tokens:
At least one of the client's Bootstrap Authentication Keys: BAK (the shared secret)
A Public/Private Key pair used for signature: (Es, Ds)
A certificate chain ServerCertificateChain=CertChain(Es) that is valid under one of the root certificates: BootRootCertificate
A Public/Private Key Pair used for Encryption: (Ee/De)

1.39. Protocol Description

Figure 41:
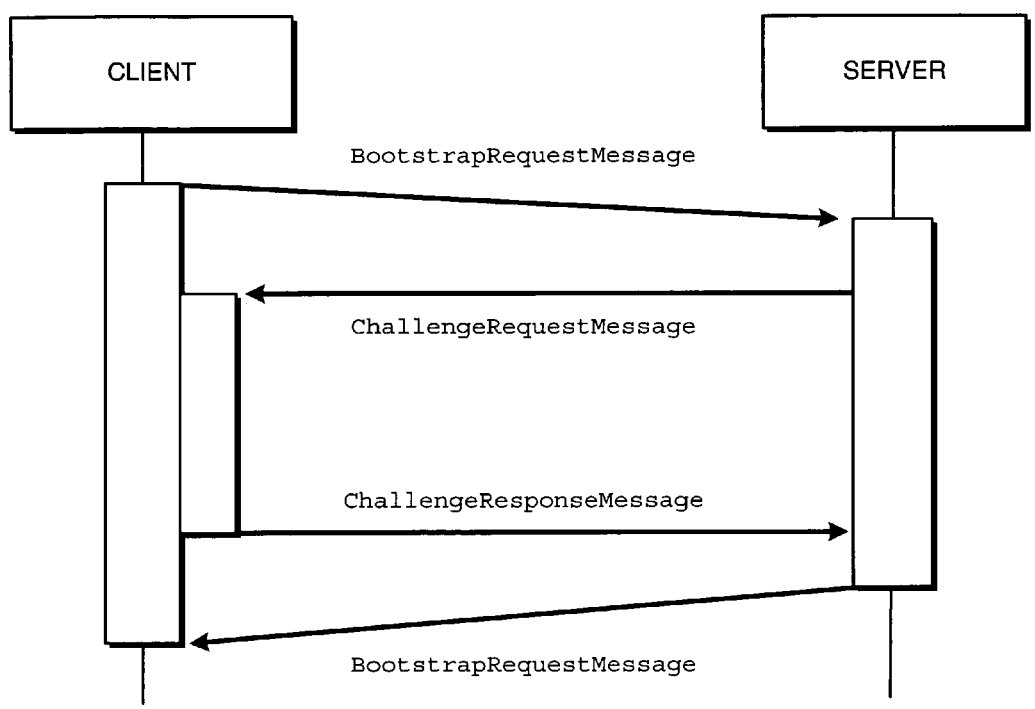
FIG. 41 illustrates a bootstrap protocol in accordance with one embodiment.

An illustrative embodiment of a bootstrap protocol is shown in FIG. 41 and described below. A failure during the process (for example, when verifying a signature or a certificate chain) will lead to an error and stop the protocol progression.

BootstrapRequestMessage

The client sends a request to the server, indicating that it wants to initiate a bootstrap session and provides some initial parameters (e.g., protocol version, profile, etc.), as well as a session ID (to prevent replay attacks) and a list of Trust Domains in which it can participate. The following table shows an illustrative format for a BootStrapRequestMessage:

| Name | BootstrapRequestMessage | | |
|---|---|---|---|
| Attributes | Name | Description | |
| | Protocol | Symbolic name of the protocol | |
| | Version | Protocol Version | |
| | Profile | Name of the Profile for this protocol/version | |
| Direction | Client → Server | | |
| Payload | BootstrapRequest | | |
| | Name | Type | Description |
| | SessionId | String | Unique session ID chosen by the client |
| | TrustDomains | List of Strings | Names of all the Trust Domains in which the client can participate. |
| Expected Response | ChallengeRequestMessage | | |

The Protocol and Version message attributes specify which protocol specification the client is using, and the Profile field identifies a predefined set of cryptographic protocols and encoding formats used for exchanging messages and data.

The Client chooses a SessionId, which should be unique to that client and not re-used. For example, a unique ID for the client and an incrementing counter value can be used as a way to generate a unique session ID.

In one embodiment, the Client also sends a list of all the Trust Domains for which it has been configured.

In one embodiment, the server receives the BootstrapRequestMessage and performs the following steps:

Checks that it supports the specified Protocol, Version, and Profile requested by the client.
Generates a Nonce (strongly random number).
Optionally generates a Cookie in order to carry information such as a timestamp, session token, or any other server-side information that will persist throughout the session. The value of the cookie is meaningful only to the server, and is considered as an opaque data block by the client.
Extract the value of SessionId from the BootstrapRequestMessage.
Generate a challenge: Challenge=[Nonce, Ee, Cookie, SessionId].
Compute S(Ds, Challenge) to sign the challenge with Ds.
Construct a ChallengeRequestMessage and send it back to the client in response.

ChallengeRequestMessage

The following table shows an illustrative format for a ChallengeRequestMessage:

| Name | ChallengeRequestMessage | | |
|---|---|---|---|
| Direction | Server → Client | | |
| Payload | Challenge | | |
| | Name | Type | Description |
| | Nonce | Byte Sequence | Server-generated random nonce |
| | ServerEncryptionKey | Byte Sequence | Encoded Public Key Ee used for message payload encryption |

-continued

|   | Cookie | Byte Sequence | Server-generated opaque data |
|---|---|---|---|
|   | SessionId | String | Client-generated session ID |
|   | Signature | Byte Sequence | Encoded Digital Signature S(Ds, CN(Challenge)) of the Challenge's canonical byte sequence Canon(Challenge) = CN (CN(Nonce), CN (ServerEncryptionKey), CN(Cookie), CN(SessionId)) |
|   | ServerCertificateChain | | |
|   | Name | Type | Description |
|   | TrustDomain | String | Trust Domain in which the certificate chain is valid |
|   | Certificates | List of Byte Sequences | An list of Encoded Certificates that form a chain: CertChain(Es). The first certificate in the array certifies the Public Key Es, and each of the following certificates, in turn, certify the Public Key of the preceding certificate. The last certificate in the array has a public key certified by the Root CA Certificate for the Trust Domain |
| In Response To | BootstrapRequestMessage | | |

In one embodiment, after receiving the ChallengeRequestMessage, the client performs the following steps:
  Verify that the certificate chain ServerCertificateChain is valid under the root certificate BootRootCertificate: CertVerif(BootRootCertificate, ServerCertificateChain).
  Extract the Public Key Es from the ServerCertificateChain.
  Verify the signature of the challenge: V(Es, Challenge).
  Check that the SessionId matches the one chosen for the session when the BootRequestMessage was sent.
  Construct a ChallengeResponseMessage and send it to the server.
ChallengeResponseMessage
To generate a ChallengeResponseMessage, the client performs the following steps:
  Generate a Session Key SK using one of the two following methods:
    Directly using a secure random key generator
    Indirectly using the Nonce and BSGK: compute HSK=H(BSGK|Nonce), and set SK=First N bytes of HSK
  Generate a ChallengeResponse object that contains [Challenge, ClientInformation, SessionKey] Here, the Challenge is the one from the previously received ChallengeRequestMessage, with the ServerEncryptionKey omitted.
  Compute S(BAK, ChallengeResponse) to sign the response with BAK.
  Encrypt the signed ChallengeResponse with SK: E(SK, [ChallengeResponse, S(BAK, ChallengeResponse)])
  Encrypt the SessionKey with the Server's Public Key Ee
  Construct a ChallengeResponseMessage and send it to the server

| Name | ChallengeResponseMessage | | | | |
|---|---|---|---|---|---|
| Direction | Client → Server | | | | |
| Payload | SessionKey [encrypted with Ee] | | | | |
|   | Name | Type | Description | | |
|   | SessionKey | Byte Sequence | Encoded Session key SK encrypted with the Server's Public Key Ee | | |
|   | ChallengeResponse [encrypted with SK] | | | | |
|   | Name | Type | Description | | |
|   | Challenge | Object | Challenge | | |
|   |   |   | Name | Type | Description |
|   |   |   | Nonce | Byte Sequence | Server-generated random nonce |
|   |   |   | Cookie | Byte Sequence | Server-generated opaque data |
|   |   |   | SessionId | String | Unique session ID |
|   | ClientInformation | Array of Attributes | Array of 0 or more Attribute Objects: Attribute | | |
|   |   |   | Name | Type | Description |
|   |   |   | Name | String | Name of the attribute |
|   |   |   | Value | String | Value of the attribute |
|   | SessionKey | Byte Sequence | Encoded value of secret session key SK | | |
|   | Signature | Byte Sequence | Encoded Digital Signature S(BAK, CN(ChallengeResponse)) of the canonical byte | | |

|  |  |
|---|---|
|  | sequence CN(ChallengeResponse) = CN (CN(Challenge), CN(ClientInformation), CN(SessionKey)) |
| Expected Response | BootstrapResponseMessage |

The server receives the BootstrapChallengeResponse and performs the following steps:
  Decrypt the session key SK using its private key De: D(De, SessionKey)
  Decrypt the ChallengeResponse with the session key SK from the previous step: D(SK, Challenge)
  Verify the signature of the challenge: V(BAK, ChallengeResponse)
  Check that the session key SK matches the one used to decrypt
  Check the Cookie and Nonce values if needed (e.g., a timestamp)
  Check that the SessionId matches the one chosen for the session when the BootRequestMessage was sent.
  Construct a BootstrapResponseMessage and send it to the Server.

BootstrapResponseMessage

To generate a BootstrapResponseMessage, the server performs the following steps:
  Parse the ClientInformation received in the ChallengeResponseMessage and lookup or generate the client configuration Data that needs to be sent for this bootstrap request (this may include confidentiality keys (Ec/Dc) for the node that represents the client). The server will typically use the value of the Nonce and Cookie to help retrieve the correct information for the client.
  Create a BootstrapResponse with the SessionId and the configuration Data
  Compute S(Ds, BootstrapResponse) to sign Data with Ds
  Encrypt the signed BootstrapResponse with the session key SK: E(SK, [BootstrapResponse, S(Ds, BootstrapResponse)])

| Name | BootstrapResponseMessage | | |
|---|---|---|---|
| Direction | Server → Client | | |
| Payload | BootstrapResponse [encrypted with SK] | | |
|  | Name | Type | Description |
|  | SessionId | String | Session ID |
|  | Data | Byte Sequence | Configuration data for the client |
|  | Signature | Signature | Digital Signature S(Ds, CN(BootstrapResponse)) of the canonical byte sequence |

|  |  |
|---|---|
|  | CN(BootstrapResponse) = CN (CN(SessionID), CN(Data)) |
| In Response To | ChallengeResponseMessage |

1.40. Trust Domains

In one embodiment, each trust domain includes a Root Certificate Authority and a unique name for the domain. When a client sends a BootstrapRequest, it identifies all the trust domains that it is willing to accept (i.e. which certificates it will consider valid). The server selects a trust domain from the list sent by the client, if it supports any.

1.41. Signatures

In one embodiment, whenever signatures are used in message payloads, the signatures are computed over a canonical byte sequence for the data fields contained in the signed portion(s) of the message. The canonical byte sequence is computed from the field values, not from the encoding of the field values. Each profile preferably defines the algorithm used to compute the canonical byte sequence of the fields for each message type.

1.42. Profiles

A profile of the bootstrap protocol is a set of choices for the various cryptographic ciphers and serialization formats. Each profile preferably has a unique name, and includes choice of:
  Public Key Encryption Algorithm
  Public Key Signature Algorithm
  Secret Key Encryption Algorithm
  Secret Key Signature Algorithm
  Public Key encoding
  Digest Algorithm
  Canonical Object Serialization
  Certificate Format
  Minimum Nonce Size
  Message Marshalling

APPENDIX A

The following is an examples of a contriller object with multiple, interlocking signatures. NOTE: in this example, the content keys are not encrypted

```
<Controller xmlns="http://www.intertrust.com/Octopus/1.0" id="urn:x-
octopus.intertrust.com:controller:37A50262EE3389A14ABC0BC7BE5D43E5">
  <ControlReference>
    <Id>urn:x-octopus.intertrust.com:control:0001</Id>
  <Digest>
    <DigestMethod xmlns="http://www.w3.org/2000/09/xmldsig#"
Algorithm="http://www.w3.org/2000/09/xmldsig#sha1" />
    <DigestValue
xmlns="http://www.w3.org/2000/09/xmldsig#">1z95n10V7CBiKs/rSQdXvKyZmfA=</DigestValue>
  </Digest>
  </ControlReference>
<ControlledTargets>
<ContentKeyReference>
    <Id>urn:x-octopus.intertrust.com:content-key:2001</Id>
  </ContentKeyReference>
```

```
<ContentKeyReference>
   <Id>urn:x-octopus.intertrust.com:content-key:2002</Id>
</ContentKeyReference>
<ContentKeyReference>
   <Id>urn:x-octopus.intertrust.com:content-key:2003</Id>
</ContentKeyReference>
</ControlledTargets>
</Controller>
<Signature Id="Signature.0" xmlns="http://www.w3.org/2000/09/xmldsig#">
<SignedInfo>
   <CanonicalizationMethod Algorithm="http://www.w3.org/2001/10/xml-exc-c14n#" />
   <SignatureMethod Algorithm="http://www.w3.org/2000/09/xmldsig#rsa-sha1" />
<Reference URI="urn:x-octopus.intertrust.com:controller:37A50262EE3389A14ABC0BC7BE5D43E5">
<Transforms>
   <Transform Algorithm="http://www.intertrust.com/Octopus/xmldsig#cbs-1_0" />
</Transforms>
   <DigestMethod Algorithm="http://www.w3.org/2000/09/xmldsig#sha1" />
   <DigestValue>G1zXF9Sz/zCwH6MaFm0ObOQcxuk=</DigestValue>
</Reference>
</SignedInfo>
<SignatureValue>mjoyW+w2S9iZDG/ha4eWYD1RmhQuqRuuSN977NODpzwUD02FdsAICVjAcw7f4n
FWuvtawW/clFzYP/pjFebESCvurHUsEaR1/LYLDkpWWxh/LlEp4r3yR9kUs0AU5a4BDxDxQE7nUdqU
9YMpnjAZEGpuxdPeZJM1vyKqNDpTk94=</SignatureValue>
<KeyInfo>
<X509Data>
<X509Certificate>MIIC6jCCAlOgAwIBAgIBBjANBgkqhkiG9w0BAQUFADCBszELMAkGA1UEBhM
CVVMxEzARBgNVBAgTCkNhbGlmb3JuaWExFDASBgNVBAcTC1NhbnRhIENsYXJhMSAwHgYDV
QQKExdJbnRlcnRydXN0IFRlY2hub2xvZ2llczEUMBIGA1UECxMLT2N0b3B1cyBEUk0xGDAWBgNV
BAMTD09jdG9wdXMgVGVzdCBDQTEnMCUGCSqGSIb3DQEJARYYb2N0b3B1cy10ZXN0LWNhQ
DhwdXMubmV0MB4XDTA0MDQwODAwNTUyOVoXDTA0MDUwODAwNTUyOVowgcExCzAJBg
NVBAYTA1VTMRMwEQYDVQQIEwpDYWxpZm9ybmlhMRQwEgYDVQQHEwtTYW50YSBDbGFy
YTEgMB4GA1UEChMXSW50ZXJ0cnVzdCBUZWNobm9sb2dpZXMxFDASBgNVBAsTC09jdG9wdX
MgRFJNMR8wHQYDVQQDExZPY3RvcHVzIFRlc3QgTm9kZSAwMDAxMS4wLAYJKoZIhvcNAQkB
Fh9vY3RvcHVzLXRlc3Qtbm9kZS0wMDAxQDhwdXMubmV0MIGfMA0GCSqGSIb3DQEBAQUAA4
GNADCBiQKBgQDU8AJQArJg+VTuwUO2fMv5sCtfmZECyJjA0vbgQc+cPXpfeIdACiCL1n1eml/ZLlu
7ZaRwQeo1yJSeK57bxv+zhW14F1jnqS/IKLG84RG1eoMiOT1lhErb2nU3xT0KCgxsEXFAbfwAYnLX7
hpy/1ho2mTmJbgksWoPrPw3xMPCYwIDAQABMA0GCSqGSIb3DQEBBQUAA4GBAH1rHStXcQkFm
cYhl5zck6twsNIRF+/1HZGuTGKeb6+J2ZLk6sNUWXLOlD1oPRMde7X1RiqpDNkbG4xoPoxHiK9Vdf
Bstjv9Q8iUceziMIXVV/q+XJMd7HfBJq25XqBScS9/RAKKKwuRRkQHEV3uBABvLSCzIRSJH9bFuYz
NeVne</X509Certificate>
</X509Data>
</KeyInfo>
</Signature>
<Signature xmlns="http://www.w3.org/2000/09/xmldsig#">
<SignedInfo>
   <CanonicalizationMethod Algorithm="http://www.w3.org/2001/10/xml-exc-c14n#" />
   <SignatureMethod Algorithm="http://www.w3.org/2000/09/xmldsig#hmac-sha1" />
<Reference URI="#Signature.0">
   <DigestMethod Algorithm="http://www.w3.org/2000/09/xmldsig#sha1" />
   <DigestValue>AqPV0nvNj/vc51IcMyKJngGNKtM=</DigestValue>
</Reference>
<Reference URI="urn:x-octopus.intertrust.com:controller:37A50262EE3389A14ABC0BC7BE5D43E5">
<Transforms>
   <Transform Algorithm="http://www.intertrust.com/Octopus/xmldsig#cbs-1_0" />
</Transforms>
   <DigestMethod Algorithm="http://www.w3.org/2000/09/xmldsig#sha1" />
   <DigestValue>G1zXF9Sz/zCwH6MaFm0ObOQcxuk=</DigestValue>
</Reference>
</SignedInfo>
   <SignatureValue>TcKBsZZy+Yp3doOkZ62LTfY+ntQ=</SignatureValue>
<KeyInfo>
   <KeyName>urn:x-octopus.intertrust.com:secret-key:2001</KeyName>
</KeyInfo>
</Signature>
<Signature xmlns="http://www.w3.org/2000/09/xmldsig#">
<SignedInfo>
   <CanonicalizationMethod Algorithm="http://www.w3.org/2001/10/xml-exc-c14n#" />
   <SignatureMethod Algorithm="http://www.w3.org/2000/09/xmldsig#hmac-sha1" />
<Reference URI="#0">
   <DigestMethod Algorithm="http://www.w3.org/2000/09/xmldsig#sha1" />
   <DigestValue>AqPV0nvNj/vc51IcMyKJngGNKtM=</DigestValue>
</Reference>
<Reference URI="urn:x-octopus.intertrust.com:controller:37A50262EE3389A14ABC0BC7BE5D43E5">
<Transforms>
   <Transform Algorithm="http://www.intertrust.com/Octopus/xmldsig#cbs-1_0" />
</Transforms>
   <DigestMethod Algorithm="http://www.w3.org/2000/09/xmldsig#sha1" />
   <DigestValue>G1zXF9Sz/zCwH6MaFm0ObOQcxuk=</DigestValue>
</Reference>
```

```
      </SignedInfo>
      <SignatureValue>qAunQpXC18kl8Veo8UHbcXTqHCA=</SignatureValue>
      <KeyInfo>
        <KeyName>urn:x-octopus.intertrust.com:secret-key:2002</KeyName>
      </KeyInfo>
    </Signature>
    <Signature xmlns="http://www.w3.org/2000/09/xmldsig#">
      <SignedInfo>
        <CanonicalizationMethod Algorithm="http://www.w3.org/2001/10/xml-exc-c14n#" />
        <SignatureMethod Algorithm="http://www.w3.org/2000/09/xmldsig#hmac-sha1" />
        <Reference URI="#0">
          <DigestMethod Algorithm="http://www.w3.org/2000/09/xmldsig#sha1" />
          <DigestValue>AqPV0nvNj/vc51IcMyKJngGNKtM=</DigestValue>
        </Reference>
        <Reference URI="urn:x-octopus.intertrust.com:controller:37A50262EE3389A14ABC0BC7BE5D43E5">
          <Transforms>
            <Transform Algorithm="http://www.intertrust.com/Octopus/xmldsig#cbs-1_0" />
          </Transforms>
          <DigestMethod Algorithm="http://www.w3.org/2000/09/xmldsig#sha1" />
          <DigestValue>G1zXF9Sz/zCwH6MaFm0ObOQcxuk=</DigestValue>
        </Reference>
      </SignedInfo>
      <SignatureValue>bRxLSM82d4ktWsYz6uhBxzJfsOo=</SignatureValue>
      <KeyInfo>
        <KeyName>urn:x-octopus.intertrust.com:secret-key:2003</KeyName>
      </KeyInfo>
    </Signature>
</Bundle>
```

APPENDIX B

This Appendix B presents the XML encoding of objects in one embodiment of a system using the example Octopus DRM engine described elsewhere herein. For a particular application, an application-specific XML schema can be created by importing the XML schema shown below (the "Octopus XML Schema") and adding elements specific to the application (e.g., extensions used for revocation). In one embodiment, the encoding of objects in XML need to be able to be validated against the application-specific XML schema. Additional possible constraints on these XML encodings can be found below.

In the example illustrated in this Appendix B, the base XML-Schema Type for all the DRM objects is OctopusObjectType. This means that all the objects support attributes and extensions. The type of each Octopus object element is derived from this base type. These types may aggregate other elements such as the SecretKey element for the ContentKeyType for instance.

In this example embodiment, the Scuba key distribution system keys are described in terms of an extension: the ScubaKeys element will then be a child of the extension element. The same applies for revocation keys with the Torpedo extension.

As described elsewhere herein, there are different kinds of Octopus Objects (e.g., ContentKey, Protector, Controller, Control, Node, and Link). These objects can be bundled together along with extensions using the <Bundle> element. In one embodiment, if objects or extensions are signed within the <Bundle>, the <Bundle> will contain <Signature> elements as described elsewhere herein.

Octopus XML Schema (Octopus.xsd):

```
<?xml version="1.0" encoding="UTF-8"?>
<xs:schema targetNamespace="http://intertrust.com/Octopus/1.0"
  xmlns="http://intertrust.com/Octopus/1.0" xmlns:xs="http://www.w3.org/2001/XMLSchema"
  xmlns:ds="http://www.w3.org/2000/09/xmldsig#" xmlns:xenc="http://www.w3.org/2001/04/xmlenc#"
  elementFormDefault="qualified" attributeFormDefault="unqualified">
  <!-- imports -->
  <xs:import namespace="http://www.w3.org/2000/09/xmldsig#" schemaLocation="xmldsig-core-schema.xsd"/>
  <xs:import namespace="http://www.w3.org/2001/04/xmlenc#" schemaLocation="xenc-schema.xsd"/>
  <!-- top level elements -->
  <xs:element name="RootLevelObject" type="RootLevelObjectType" abstract="true"/>
  <xs:element name="OctopusObject" type="OctopusObjectType" abstract="true"/>
  <!-- base element -->
  <xs:element name="Bundle" type="BundleType"/>
  <xs:element name="Link" type="LinkType" substitutionGroup="RootLevelObject"/>
  <xs:element name="Node" type="NodeType" substitutionGroup="RootLevelObject"/>
  <xs:element name="Control" type="ControlType" substitutionGroup="RootLevelObject"/>
  <xs:element name="Controller" type="ControllerType" substitutionGroup="RootLevelObject"/>
  <xs:element name="Protector" type="ProtectorType" substitutionGroup="RootLevelObject"/>
  <xs:element name="ContentKey" type="ContentKeyType" substitutionGroup="RootLevelObject"/>
  <!-- key elements -->
  <xs:element name="SecretKey" type="KeyType"/>
  <xs:element name="PublicKey" type="PairedKeyType"/>
  <xs:element name="PrivateKey" type="PairedKeyType"/>
  <xs:element name="KeyData" type="KeyDataType"/>
  <!-- other elements -->
```

```
<xs:element name="AttributeList" type="AttributeListType"/>
<xs:element name="Attribute" type="AttributeType"/>
<xs:element name="ExtensionList" type="ExtensionListType"/>
<xs:element name="Extension" type="ExtensionType" substitutionGroup="RootLevelObject"/>
<xs:element name="LinkFrom" type="OctopusObjectReferenceType"/>
<xs:element name="LinkTo" type="OctopusObjectReferenceType"/>
<xs:element name="Id" type="xs:string"/>
<xs:element name="Digest" type="DigestType"/>
<xs:element name="ControlProgram" type="ControlProgramType"/>
<xs:element name="CodeModule" type="CodeModuleType"/>
<xs:element name="ControlReference" type="OctopusObjectReferenceType"/>
<xs:element name="ContentKeyReference" type="OctopusObjectReferenceType"/>
<xs:element name="ContentReference" type="OctopusObjectReferenceType"/>
<xs:element name="ProtectedTargets" type="ProtectedTargetsType"/>
<xs:element name="ControlledTargets" type="ControlledTargetsType"/>
<!-- scuba -->
<xs:element name="ScubaKeys" type="ScubaKeysType"/>
<!-- base type for Octopus Objects -->
<xs:complexType name="RootLevelObjectType"/>
<xs:complexType name="OctopusObjectType">
    <xs:complexContent>
        <xs:extension base="RootLevelObjectType">
            <xs:sequence>
                <xs:element ref="AttributeList" minOccurs="0"/>
                <xs:element ref="ExtensionList" minOccurs="0"/>
            </xs:sequence>
            <xs:attribute name="id" type="xs:string" use="optional"/>
        </xs:extension>
    </xs:complexContent>
</xs:complexType>
<xs:complexType name="AnyContainerType">
    <xs:complexContent>
        <xs:extension base="RootLevelObjectType">
            <xs:sequence>
                <xs:any processContents="lax"/>
            </xs:sequence>
        </xs:extension>
    </xs:complexContent>
</xs:complexType>
<xs:complexType name="ExtensionType">
    <xs:complexContent>
        <xs:extension base="AnyContainerType">
            <xs:sequence minOccurs="0">
                <xs:element ref="Digest" minOccurs="0"/>
            </xs:sequence>
            <xs:attribute name="id" type="xs:string" use="required"/>
            <xs:attribute name="subject" type="xs:string"/>
        </xs:extension>
    </xs:complexContent>
</xs:complexType>
<xs:complexType name="ExtensionListType">
    <xs:sequence>
        <xs:element ref="Extension" maxOccurs="unbounded"/>
    </xs:sequence>
</xs:complexType>
<xs:complexType name="AttributeListType">
    <xs:sequence>
        <xs:element ref="Attribute" maxOccurs="unbounded"/>
    </xs:sequence>
</xs:complexType>
<xs:complexType name="AttributeType">
    <xs:simpleContent>
        <xs:extension base="xs:string">
            <xs:attribute name="name" type="xs:string" use="required"/>
            <xs:attribute name="type" type="xs:string" default="string"/>
        </xs:extension>
    </xs:simpleContent>
</xs:complexType>
<xs:complexType name="DigestType">
    <xs:sequence>
        <xs:element ref="ds:DigestMethod"/>
        <xs:element ref="ds:DigestValue"/>
    </xs:sequence>
</xs:complexType>
<xs:complexType name="OctopusObjectReferenceType">
    <xs:sequence>
        <xs:element ref="Id"/>
        <xs:element ref="Digest" minOccurs="0"/>
    </xs:sequence>
```

```
  </xs:complexType>
  <xs:complexType name="ProtectedTargetsType">
    <xs:sequence>
      <xs:element ref="ContentReference" maxOccurs="unbounded"/>
    </xs:sequence>
  </xs:complexType>
  <xs:complexType name="ControlledTargetsType">
    <xs:sequence>
      <xs:element ref="ContentKeyReference" maxOccurs="unbounded"/>
    </xs:sequence>
  </xs:complexType>
  <!-- Bundle Type -->
  <xs:complexType name="BundleType">
    <xs:sequence>
      <xs:element ref="RootLevelObject" maxOccurs="unbounded"/>
      <xs:element ref="ds:Signature" minOccurs="0" maxOccurs="unbounded"/>
    </xs:sequence>
  </xs:complexType>
  <!-- Node Types -->
  <xs:complexType name="NodeType">
    <xs:complexContent>
      <xs:extension base="OctopusObjectType"/>
    </xs:complexContent>
  </xs:complexType>
  <!-- Link Types -->
<xs:complexType name="LinkType">
    <xs:complexContent>
      <xs:extension base="OctopusObjectType">
        <xs:sequence>
          <xs:element ref="LinkFrom"/>
          <xs:element ref="LinkTo"/>
          <xs:element ref="Control" minOccurs="0"/>
        </xs:sequence>
      </xs:extension>
    </xs:complexContent>
  </xs:complexType>
  <!-- Protector Types -->
  <xs:complexType name="ProtectorType">
    <xs:complexContent>
      <xs:extension base="OctopusObjectType">
        <xs:sequence>
          <xs:element ref="ContentKeyReference"/>
          <xs:element ref="ProtectedTargets"/>
        </xs:sequence>
      </xs:extension>
    </xs:complexContent>
  </xs:complexType>
  <!-- Control Types -->
  <xs:complexType name="CodeModuleType">
    <xs:simpleContent>
      <xs:extension base="xs:string">
        <xs:attribute name="byteCodeType" use="required"/>
      </xs:extension>
    </xs:simpleContent>
  </xs:complexType>
  <xs:complexType name="ControlProgramType">
    <xs:sequence>
      <xs:element ref="CodeModule"/>
    </xs:sequence>
    <xs:attribute name="type" use="required"/>
  </xs:complexType>
  <xs:complexType name="ControlType">
    <xs:complexContent>
      <xs:extension base="OctopusObjectType">
        <xs:sequence>
          <xs:element ref="ControlProgram"/>
        </xs:sequence>
      </xs:extension>
    </xs:complexContent>
  </xs:complexType>
  <!-- Controller Type -->
  <xs:complexType name="ControllerType">
    <xs:complexContent>
      <xs:extension base="OctopusObjectType">
        <xs:sequence>
          <xs:element ref="ControlReference"/>
          <xs:element ref="ControlledTargets"/>
        </xs:sequence>
      </xs:extension>
```

```
      </xs:complexContent>
    </xs:complexType>
    <!-- Key types -->
    <xs:complexType name="KeyType">
      <xs:sequence>
        <xs:element ref="KeyData"/>
      </xs:sequence>
      <xs:attribute name="id" type="xs:string" use="required"/>
      <xs:attribute name="usage" type="xs:string" use="optional"/>
    </xs:complexType>
    <xs:complexType name="PairedKeyType">
      <xs:complexContent>
        <xs:extension base="KeyType">
          <xs:attribute name="pair" type="xs:string" use="required"/>
        </xs:extension>
      </xs:complexContent>
    </xs:complexType>
    <xs:complexType name="KeyDataType" mixed="true">
      <xs:sequence>
        <xs:element ref="xenc:EncryptedData" minOccurs="0"/>
      </xs:sequence>
      <xs:attribute name="encoding" use="required">
        <xs:simpleType>
          <xs:restriction base="xs:string">
            <xs:enumeration value="xmlenc"/>
            <xs:enumeration value="base64"/>
          </xs:restriction>
        </xs:simpleType>
      </xs:attribute>
      <xs:attribute name="format" use="required">
        <xs:simpleType>
          <xs:restriction base="xs:string">
            <xs:enumeration value="PKCS#8"/>
            <xs:enumeration value="X.509"/>
            <xs:enumeration value="RAW"/>
          </xs:restriction>
        </xs:simpleType>
      </xs:attribute>
    </xs:complexType>
    <!-- ContentKey Types -->
    <xs:complexType name="ContentKeyType">
      <xs:complexContent>
        <xs:extension base="OctopusObjectType">
          <xs:sequence>
            <xs:element ref="SecretKey"/>
          </xs:sequence>
        </xs:extension>
      </xs:complexContent>
    </xs:complexType>
    <!-- Scuba extensions -->
    <xs:complexType name="ScubaKeysType">
      <xs:sequence>
        <xs:element ref="SecretKey" minOccurs="0" maxOccurs="unbounded"/>
        <xs:element ref="PublicKey" minOccurs="0" maxOccurs="unbounded"/>
        <xs:element ref="PrivateKey" minOccurs="0" maxOccurs="unbounded"/>
      </xs:sequence>
    </xs:complexType>
</xs:schema>
```

An Illustrative Application-Specific Schema:

```
<?xml version="1.0" encoding="UTF-8"?>
<xs:schema targetNamespace="http://intertrust.com/kformat/1.0"
xmlns="http://intertrust.com/kformat/1.0" xmlns:oct="http://intertrust.com/Octopus/1.0"
xmlns:xs="http://www.w3.org/2001/XMLSchema" xmlns:ds="http://www.w3.org/2000/09/xmldsig#"
xmlns:xenc="http://www.w3.org/2001/04/xmlenc#" elementFormDefault="qualified"
attributeFormDefault="unqualified">
    <!-- imports -->
    <xs:import namespace="http://intertrust.com/Octopus/1.0" schemaLocation="Octopus.xsd"/>
    <!-- elements -->
    <xs:element name="Torpedo" type="TorpedoType"/>
    <xs:element name="BroadcastKey" type="BroadcastKeyType"/>
    <xs:element name="BroadcastKeyMethod" type="BroadcastKeyMethodType"/>
    <!-- types -->
    <xs:complexType name="TorpedoType">
      <xs:sequence>
```

-continued

```
      <xs:element ref="BroadcastKey"/>
    </xs:sequence>
  </xs:complexType>
  <xs:complexType name="BroadcastKeyType">
    <xs:sequence>
      <xs:element ref="BroadcastKeyMethod"/>
      <xs:element ref="oct:KeyData"/>
    </xs:sequence>
    <!-- the id is the name of the MNK -->
    <xs:attribute name="id" type="xs:string"/>
    <!-- the source is the name of the MKT -->
    <xs:attribute name="source" type="xs:string"/>
  </xs:complexType>
  <xs:complexType name="BroadcastKeyMethodType">
    <xs:attribute name="Algorithm" fixed="http://marlin-drm.com/mangrove/1.0"/>
  </xs:complexType>
</xs:schema>
```

B.1. Additional Constraints

B.1.1. Nodes

In one embodiment, the following types of nodes are defined:
  Octopus Personality nodes, which are the root nodes of a given DRM engine (e.g., Device Node or PC Software Node).
  Other types of nodes, such as User Nodes, or nodes for group of users, such as Subscription Nodes or Membership Nodes.

In one embodiment, nodes contain keys (e.g., in Extensions such as ScubaKeys) and it is necessary to be able to separate the public information of the node (e.g., the id, attributes, and public keys) and its private extensions (that will, e.g., carry the secret and private keys). Moreover, there will be one signature per part (the public and the private) so that the public node with its signature can be exported as is (as a parameter of the request to the license service for example).

In one embodiment, the private extensions will be carried in an ExternalExtension and signed. The public node and its private extensions can be packaged in the same <Bundle> element or can arrive separately. An example of a signed Octopus Personality Node is given below in Annex A to Appendix B.

B.1.1.1 Attributes

In one embodiment, each XML encoding of a Node object will carry an <AttributeList> with the following <Attribute>(s):

For Octopus Personalities:

```
<AttributeList xmlns="http://intertrust.com/Octopus/1.0">
  <Attribute name="urn:x-marlin.intertrust.com:type">...</Attribute>
  <Attribute name="urn:x-marlin.intertrust.com:dnk_id">...
  </Attribute>
  <Attribute name="urn:x-marlin.intertrust.com:manufacturer">...
  </Attribute>
  <Attribute name="urn:x-marlin.intertrust.com:model">...</Attribute>
  <Attribute name="urn:x-marlin.intertrust.com:version">...</Attribute>
</AttributeList>
```

For other type of nodes:

```
<AttributeList xmlns="http://intertrust.com/Octopus/1.0">
  <Attribute name="urn:x-marlin.intertrust.com:type">...</Attribute>
</AttributeList>
```

B.1.1.2 Extensions

As shown in Annex A to this Appendix B, in one embodiment Octopus personality nodes carry extensions for ScubaKeys (both sharing and confidentiality keys) and Torpedo (broadcast secret key). Other types of nodes carry only Scuba sharing keys.

All the public keys are carried inside the <Node> element in an <Extension> element in the <ExtensionList>. Other keys are carried in a separate <Extension> element outside of the <Node> element.

In one embodiment, the <ScubaKeys> extensions are signed in the <Node>. In this embodiment, the internal <Extension> carrying <ScubaKeys> inside the <Node> (public keys) will need to include a <ds:DigestMethod> element as well as a <ds:DigestValue> element. The private keys carried in an external <Extension> will need to be signed and this by signing the whole extension. Likewise, the <Torpedo> extension will be signed.

B.1.2 Links

In one embodiment, the <LinkTo> and <LinkFrom> elements of the <Link> element contain only an <Id> element and no <Digest> element. The <Control> element is optional. Annex C to this Appendix B contains an example of a signed link object.

B.1.1.1 Attributes

In one embodiment, links do not have mandatory attributes. This means that the <AttributeList> is not required and will be ignored by a compliant implementation.

B.1.1.2 Extensions

In the example embodiment shown in this Appendix B, links have <ScubaKeys> internal extensions carried inside the <Link>, and thus the <ExtensionList> element is mandatory. In addition, the <ScubaKeys> extension in a link is not signed, and thus, no <ds:DigestMethod> and <ds:DigestValue> element are carried inside the <Extension> element. This <ScubaKeys> extension contains an encrypted version of the private/secret Scuba Sharing keys (in a <PrivateKey> and a <SecretKey> element) of the "To Node" with the public or secret Scuba Sharing key of the "From Node". This encryption is signaled using the XML encryption syntax. In the embodiment illustrated in this Appendix B, the "encoding" attribute of the <KeyData> element, child of the <PrivateKey> and <SecretKey> elements, is set to "xmlenc". The child of this <KeyData> element will be an <xenc:EncryptedData> element. The name of the encryption key will be advertised in the <KeyInfo>/<KeyName> element.

In one embodiment, if the encryption key is a public key, then:
  The <KeyName> element is the name of the pair to which the key belongs.
  If the encrypted data (e.g., a private key) is too big to get encrypted directly with a public key, an intermediary 128-bit secret key is generated. The data is then encrypted with this intermediary key using, e.g., aes-128-cbc, and the intermediary key is encrypted with the public key (using the <EncryptedKey> element).

The XML chunk will then look like:

```
<!-E(I, data) -->
<EncryptedData xmlns="http://www.w3.org/2001/04/xmlenc#">
  <EncryptionMethod Algorithm="http://www.w3.org/2001/04/xmlenc#aes128-cbc"/>
  <KeyInfo xmlns="http://www.w3.org/2000/09/xmldsig#">
    <!--E(PUBa, I) -->
    <EncryptedKey xmlns="http://www.w3.org/2001/04/xmlenc#">
      <EncryptionMethod Algorithm="http://www.w3.org/2001/04/xmlenc#rsa-1_5"/>
      <KeyInfo xmlns="http://www.w3.org/2000/09/xmldsig#">
        <KeyName>urn:x-octopus.intertrust.com:key-pair:300a</KeyName>
      </KeyInfo>
      <CipherData>
        <CipherValue>
fFeGD4KAPEmESz/jW6CkbRegpM5kyH0Oy/o/uDQ78PaShtvUMoozeO4a0b785YnB
13Qa1ZUEYqR9V5TCUaOcH7wxxvBEIsd1nYKkVOgW/kFnRr98UDFvU90PRqaEP/SA
Bb+JuAUmvxYX47qOVQqBQGGqzFssBDKmUk+s98dkPR8=
        </CipherValue>
      </CipherData>
    </EncryptedKey>
  </KeyInfo>
  <CipherData>
    <CipherValue>
c8LBj4BLzGOYv/GT3Y4w2XcwTYbr8fHNJhCOQjULuvoha/QYvZKKCpUY+nuCXC/s
t9TU+8tMtaMt1GUpkCZQhSaTNcluCSxOyBoA6Xh/bmyZLDJ78+aJ/sITmfNpJGdb
vTaI7x9DD1Mp1mvFEjpAUjTTvruN32g4bxsF7FD8C1RWNAc4hS96nFDgrmzoO5pR
dda6mswFKG5B0kY7mYbhacb1owXkAk1Wc/OuXA+QLHdUthxeajoXNPfAGRz9FM3b
puJxbxDAaaAJDxoReiTtS1nGaHhqa1hvLCpKk1zHBowHyvTvDLElLjHYEPeG6xSH
BbzpT298tdKUhXfaY6vvdceMdVXuBVL3eZP1jkJHDxeaBy1ce8xlQKZpo6Pjuxlb
bn5KUMt/PxWp7rLa5s786S740cwuN63+ZRgienxPK1CnYO3htMJ7hh/agvO9IyUD
RvcgnSEY9KA5Exy/6gIS/gouIjFU8r7056XcE4/IBodTWDkfyli/y8q5QA/0VaD9
Y3oER1p3pYuHwn/IeXM4gsBD31cgd7nvfK7lKYkZjowR9P6pSy57a+K4LZKDmfUH
zG/gZs2XcoPb9o6mVAEEej7+aLwqmoileykkR+0pkFntvqvXYRPkphhcVdzjzlMV
scpXBXfWx7wbQURXkiew7R4RihQy3wcv+ZFJpl9NsAE1yqyWy4rBobzZ7cTNMtfR
znhVlt+Wwq5G0IBxzU9WIFzFd/Rn2H9L4TI71LCa4VR3uNpf+XM8lp9LjLPRUnNh
28KrMdAddceyopYyiIF5p8idfh0//a/LKdE7JAk0q9ewk19ryqfl6CFeKI5oOMjh
kzNx3BR/iHxm31HIe3ZKtA==</CipherValue>
    </CipherData>
</EncryptedData>
``` by the <SecretKey> element will be only encrypted by the Scuba key (public or secret) of the entity the content is bound to (the user for example). (2) After the first revocation where the content key is encrypted according to the Mangrove broadcast encryption scheme. The resulting data is then encrypted with the Scuba key (public or secret) of the entity the content is bound to. In this case, we have super-encryption.

Illustrative methods for encrypting the <EncryptedData> element in case of super-encryption are described elsewhere herein. The following explains how to apply this to case b.

In one embodiment, the xmlenc syntax for the encryption of the content key Kc with the Mangrove Broadcast Encryption scheme is:

```
<EncryptedData xmlns="http://www.w3.org/2001/04/xmlenc#">
  <EncryptionMethod Algorithm="see (*)"/>
  <KeyInfo xmlns="'http://www.w3.org/2000/09/xmldsig#">
    <KeyName>see (**)</KeyName>
  </KeyInfo>
  <CipherData>
    <CipherValue>see (***)</CipherValue>
  </CipherData>
</EncryptedData>
```

(*) is the URL identifying the Mangrove Broadcast Encryption scheme, which, in one embodiment, is also the <BroadcastKeyMethod> Algorithm of the <Torpedo> extension in an application-specific xml schema call "kformat.xsd".

(**) is the name of the Mangrove Key Tree. In one embodiment, this value must be the same as the source attribute of the <BroadcastKey> element defined in kformat.xsd.

(***) is the base64 encoded value of the ASN.1 sequence representing the encryption of the content key Kc according to the Mangrove Broadcast Key algorithm:

B.1.3 License Objects

Annex C to this Appendix B provides an example of a signed license (before the first revocation has occurred, see the ContentKey section, below).

B.1.3.1 Protector

In the example embodiment shown in this Appendix B, the <ContentKeyReference> element and the <ContentReference> elements (e.g., inside the <ProtectedTargets> element) contain only an <Id> element and no <Digest> element. In this illustrative embodiment, Protector objects contain no mandatory attributes or extensions; the <AttributeList> and <ExtensionList> elements are optional and will be ignored.

B.1.3.2 ContentKey

In the example embodiment shown in this Appendix B, ContentKey objects contain no mandatory attributes or extensions. Therefore, the <AttributeList> and <ExtensionList> elements are optional and will be ignored.

In one embodiment, <ContentKey> elements contain a <SecretKey> element which represent the actual key that will be used to decrypt the content. The <KeyData> associated with the <SecretKey> is encrypted. In one embodiment, it is mandatory that the "encoding" attribute of <KeyData> is set to "xmlenc".

In one embodiment, there are two distinct cases for ContentKey objects: (1) Before the first revocation of a device or a PC application: in this case, the content key Kc represented -continued

```
SEQUENCE {
    tags BIT STRING
    keys OCTET STRING
}
```

In one embodiment, the byte sequence of the <EncryptedData> referred to above is encrypted with the scuba sharing key (public or secret) of the entity the license is bound to. If the public key is used, then the same conventions apply as the one described in below (e.g., see encrypting with a public key) and an intermediary key is needed if the byte sequence of the <EncryptedData> is too big for a RSA 1024 public key. An example of the XML encoding of such a ContentKey object can be found in Annex D to this Appendix B.

B.1.3.3 Controller

In one embodiment, controller objects contain no mandatory attributes or extensions. Therefore the <AttributeList> and <ExtensionList> elements are optional and will be ignored by a compliant implementation.

In one embodiment, the value of the Algorithm attribute of the <DigestMethod> elements is always http://www.w3.org/2000/09/xmldsig#sha1.

In one embodiment, the <ControlReference> must have a <Digest> element. The <DigestValue> element must contain the base64 encoding of the digest of the referenced control.

In one embodiment, if the signature over the Controller is a PKI signature (rsa-sha1), the <ContentKeyRefence> elements (within the <ControlledTargets> elements) need to include a <Digest> element and the <DigestValue> element must contain the digest of the plain-text content key embedded in the ContentKey object.

B.1.3.4 Control

In one embodiment, control objects contain no mandatory attributes or extensions. Therefore the <AttributeList> and <ExtensionList> elements are optional and will be ignored by a compliant implementation.

In one embodiment, the type attribute of the <ControlProgram> element is set to "plankton," and the byteCodeType attribute of the <CodeModule> element is set to "Plankton-1-0."

APPENDIX B

Annex A: Example of signed Octopus personality node

```
<Bundle xmlns:ds="http://www.w3.org/2000/09/xmldsig#"
xmlns:xenc="http://www.w3.org/2001/04/xmlenc#" xmlns="http://intertrust.com/Octopus/1.0"
xmlns:xsi="http://www.w3.org/2001/XMLSchema-instance"
xsi:schemaLocation="http://intertrust.com/kformat/1.0
C:\DOCUME~1\julien\Desktop\kformat\kformat.xsd">
    <!-- FIRST THE NODE with PUBLIC INFO-->
    <Node id="urn:kformat:device:0001">
        <AttributeList>
            <Attribute name="urn:x-marlin.intertrust.com:type">device</Attribute>
            <Attribute name="urn:x-marlin.intertrust.com:dnk__id">urn:kformat:mangrove:0001</Attribute>
            <Attribute name="urn:x-marlin.intertrust.com:manufacturer__id">SONY</Attribute>
            <Attribute name="urn:x-marlin.intertrust.com:model">urn:sony:walkman</Attribute>
            <Attribute name="urn:x-marlin.intertrust.com:version">urn:sony:walkman:002a</Attribute>
        </AttributeList>
        <ExtensionList>
            <Extension id="urn:kformat:device:0001:scuba:public">
                <ScubaKeys>
                    <PublicKey id="urn:kformat:device:0001:scuba:public:sharing"
                            pair="urn:kformat:device:0001:scuba:pair:sharing">
                        <KeyData encoding="base64" format="X509">MIIC...MEbB</KeyData>
                    </PublicKey>
                    <PublicKey id="urn:kformat:device:0001:scuba:public:confidentiality"
                            usage="confidentiality"
                            pair="urn:kformat:device:0001:scuba:pair:confidentiality">
                        <KeyData encoding="base64" format="X.509">MIIChDCC... vh8BM52</KeyData>
                    </PublicKey>
                </ScubaKeys>
                <Digest>
                    <DigestMethod xmlns="http://www.w3.org/2000/09/xmldsig#"
                            Algorithm="http://www.w3.org/2000/09/xmldsig#sha1"/>
                        <DigestValue xmlns="http://www.w3.org/2000/09/xmldsig#">OGZGBY8OpQXs</DigestValue>
                </Digest>
            </Extension>
        </ExtensionList>
    </Node>
    <!-- THEN the PRIVATE Scuba extension -->
    <Extension id="urn:kformat:device:0001:scuba:private" subject="urn:kformat:device:0001">
        <ScubaKeys>
            <PrivateKey id="urn:kformat:device:0001:scuba:private:sharing"
                    pair="urn:kformat:device:0001:scuba:pair:sharing">
                <KeyData encoding="base64" format="PKCS8">MIICdgIBADAN... DXywQLg==</KeyData>
            </PrivateKey>
            <PrivateKey id="urn:kformat:device:0001:scuba:private:confidentiality"
                    usage="confidentiality"
                    pair="urn:kformat:device:0001:scuba:pair:confidentiality">
                <KeyData encoding="base64" format="PKCS8">MIICdwIBADAN... q4olog34=</KeyData>
            </PrivateKey>
            <SecretKey id="urn:kformat:device:0001:scuba:secret:sharing">
                <KeyData encoding="base64" format="RAW">Z1n2/2cbz1oO/fZo9xtmyA==</KeyData>
            </SecretKey>
            <SecretKey id="urn:kformat:device:0001:scuba:secret:confidentiality"
```

APPENDIX B-continued

Annex A: Example of signed Octopus personality node

```xml
          usage="confidentiality">
            <KeyData encoding="base64" format="RAW">0CJ8bcORW6GLX4GzT7XKvg==</KeyData>
          </SecretKey>
        </ScubaKeys>
      </Extension>
      <!-- Then the PRIVATE Torpedo extension -->
      <Extension id="urn:kformat:device:0001:torpedo" subject="urn:kformat:device:0001">
        <Torpedo xmlns="http://intertrust.com/kformat/1.0">
          <BroadcastKey id="urn:kformat:mangrove:0001">
            <BroadcastKeyMethod Algorithm="http://marlin-drm.com/mangrove/1.0"/>
            <KeyData xmlns="http://intertrust.com/Octopus/1.0" encoding="base64"
format="RAW">....</KeyData>
          </BroadcastKey>
        </Torpedo>
      </Extension>
      <!-- Then the signature on the public part -->
      <Signature xmlns="http://www.w3.org/2000/09/xmldsig#">
        <SignedInfo>
          <CanonicalizationMethod Algorithm="http://www.w3.org/2001/10/xml-exc-c14n#"/>
          <SignatureMethod Algorithm="http://www.w3.org/2000/09/xmldsig#rsa-sha1"/>
          <Reference URI="urn:kformat:device:0001">
            <Transforms>
              <Transform Algorithm="http://www.octopus-drm.com/2004/07/format-independent-cano#"/>
            </Transforms>
            <DigestMethod Algorithm="http://www.w3.org/2000/09/xmldsig#sha1"/>
            <DigestValue>gI5QoD7MUAgjcpkPiciZhoSHbEQ=</DigestValue>
          </Reference>
        </SignedInfo>
        <SignatureValue>gI5QoD7MUAgjcpkPiciZhoSHbEQ=</SignatureValue>
        <KeyInfo>
          <X509Data>
            <!-- Put the public key cert of the signing key here -->
            <X509Certificate>...</X509Certificate>
            <!-- and the certificate chain without the root if needed -->
            <X509Certificate>...</X509Certificate>
          </X509Data>
        </KeyInfo>
      </Signature>
      <!-- Then the signature on the private part -->
      <Signature xmlns="http://www.w3.org/2000/09/xmldsig#">
        <SignedInfo>
          <CanonicalizationMethod Algorithm="http://www.w3.org/2001/10/xml-exc-c14n#"/>
          <SignatureMethod Algorithm="http://www.w3.org/2000/09/xmldsig#rsa-sha1"/>
          <Reference URI="urn:kformat:0001:scuba:private">
            <Transforms>
              <Transform Algorithm="http://www.octopus-drm.com/2004/07/format-independent-cano#"/>
            </Transforms>
            <DigestMethod Algorithm="http://www.w3.org/2000/09/xmldsig#sha1"/>
            <DigestValue>gI5QoD7MUAgjcpkPiciZhoSHbEQ=</DigestValue>
          </Reference>
          <Reference URI="urn:kformat:device:0001:torpedo">
            <Transforms>
              <Transform Algorithm="http://www.octopus-drm.com/2004/07/format-independent-cano#"/>
            </Transforms>
            <ds:DigestMethod Algorithm="http://www.w3.org/2000/09/xmldsig#sha1"/>
            <ds:DigestValue>97mDfnw0vF/ECQHcvDk</ds:DigestValue>
          </Reference>
        </SignedInfo>
        <SignatureValue>gI5QoD7MUAgjcpkPiciZhoSHbEQ=</SignatureValue>
        <KeyInfo>
          <X509Data>
            <!-- Put the public key cert of the signing key here -->
            <X509Certificate>...</X509Certificate>
            <!-- and the certificate chain without the root if needed -->
            <X509Certificate>...</X509Certificate>
          </X509Data>
        </KeyInfo>
      </Signature>
</Bundle>
```

APPENDIX B

Annex B: Example of a signed Octopus link

```xml
<?xml version="1.0" encoding="UTF-8"?>
<!--Sample XML file generated by XMLSPY v2004 rel. 2 U (http://www.xmlspy.com)-->
<Bundle xmlns="http://intertrust.com/Octopus/1.0" xmlns:ds="http://www.w3.org/2000/09/xmldsig#"
xmlns:xenc="http://www.w3.org/2001/04/xmlenc#" xmlns:xsi="http://www.w3.org/2001/XMLSchema-
instance" xsi:schemaLocation="http://intertrust.com/Octopus/1.0
C:\ws\Octopus\Source\Xml\Schemas\Octopus.xsd">
   <Link id="urn:kformat:link:device:0001:to:user:1234">
      <ExtensionList>
         <Extension id="urn:kformat:link:device:0001:to:user:1234:scuba">
            <ScubaKeys>
               <!-- E(PUBdevice, PRIVuser) -->
               <PrivateKey id="urn:kformat:user:1234:scuba:private:sharing"
                  pair="urn:kformat:user:1234:scuba:pair:sharing">
                  <KeyData encoding="xmlenc" format="PKCS8">
                     <!-- E(I, PRIVuser) I: intermediate key-->
                     <EncryptedData xmlns="http://www.w3.org/2001/04/xmlenc#">
                        <EncryptionMethod Algorithm="http://www.w3.org/2001/04/xmlenc#aes128-cbc"/>
                        <KeyInfo xmlns="http://www.w3.org/2000/09/xmldsig#">
                           <!-- E(PUBdevice, I) -->
                           <EncryptedKey xmlns="http://www.w3.org/2001/04/xmlenc#">
                              <EncryptionMethod Algorithm="http://www.w3.org/2001/04/xmlenc#rsa-1_5"/>
                              <KeyInfo xmlns="http://www.w3.org/2000/09/xmldsig#">
                                 <KeyName>urn:kformat:device:0001:scuba:pair:sharing</KeyName>
                              </KeyInfo>
                              <CipherData>
                                 <CipherValue>fFeGD4K... s98dkPR8=</CipherValue>
                              </CipherData>
                           </EncryptedKey>
                        </KeyInfo>
                        <CipherData>
                           <CipherValue>
c8LBj4BLzGOYv...HIe3ZKtA==</CipherValue>
                        </CipherData>
                     </EncryptedData>
                  </KeyData>
               </PrivateKey>
               <!-- E(PUBdevice, Suser) -->
               <SecretKey id="urn:kformat:user:1234:secret:sharing">
                  <KeyData encoding="xmlenc" format="RAW">
                     <EncryptedData xmlns="http://www.w3.org/2001/04/xmlenc#">
                        <EncryptionMethod Algorithm="http://www.w3.org/2001/04/xmlenc#rsa-1_5"/>
                        <KeyInfo xmlns="http://www.w3.org/2000/09/xmldsig#">
                           <KeyName>urn:kformat:device:0001:scuba:pair:sharing</KeyName>
                        </KeyInfo>
                        <CipherData>
                           <CipherValue>OHVaH... kjLA=</CipherValue>
                        </CipherData>
                     </EncryptedData>
                  </KeyData>
               </SecretKey>
            </ScubaKeys>
         </Extension>
      </ExtensionList>
      <LinkFrom>
         <Id>urn:kformat:device:0001</Id>
      </LinkFrom>
      <LinkTo>
         <Id>urn:kformat:user:1234</Id>
      </LinkTo>
   </Link>
   <Signature xmlns="http://www.w3.org/2000/09/xmldsig#">
      <SignedInfo>
         <CanonicalizationMethod Algorithm="http://www.w3.org/2001/10/xml-exc-c14n#"/>
         <SignatureMethod Algorithm="http://www.w3.org/2000/09/xmldsig#rsa-sha1"/>
         <Reference URI="urn:kformat:link:device:0001:to:user:1234">
            <Transforms>
               <Transform Algorithm="http://www.octopus-drm.com/2004/07/format-independent-cano#"/>
            </Transforms>
            <DigestMethod Algorithm="http://www.w3.org/2000/09/xmldsig#sha1"/>
            <DigestValue>gI5QoD7MUAgjcpkPiciZhoSHbEQ=</DigestValue>
         </Reference>
      </SignedInfo>
      <SignatureValue>gI5QoD7MUAgjcpkPiciZhoSHbEQ=</SignatureValue>
      <KeyInfo>
         <X509Data>
            <!-- Put the public key cert of the signing key here -->
            <X509Certificate>...</X509Certificate>
            <!-- and the certificate chain without the root if needed -->
```

APPENDIX B-continued

Annex B: Example of a signed Octopus link

```
        <X509Certificate>...</X509Certificate>
      </X509Data>
    </KeyInfo>
  </Signature>
</Bundle>
```

APPENDIX B

Annex C: Example of a signed Octopus license (without revocation)

```
<Bundle xmlns="http://intertrust.com/Octopus/1.0" xmlns:xsi="http://www.w3.org/2001/XMLSchema-
instance" xsi:schemaLocation="http://intertrust.com/Octopus/1.0
C:\ws\Octopus\Source\Xml\Schemas\Octopus.xsd">
  <ContentKey id="urn:x-octopus.intertrust.com:content-key:2002">
    <SecretKey id="urn:x-octopus.intertrust.com:secret-key:2002">
      <KeyData encoding="xmlenc" format="RAW">
        <EncryptedData xmlns="http://www.w3.org/2001/04/xmlenc#">
          <EncryptionMethod Algorithm="http://www.w3.org/2001/04/xmlenc#aes128-cbc"/>
          <KeyInfo xmlns="http://www.w3.org/2000/09/xmldsig#">
            <KeyName>urn:x-octopus.intertrust.com:secret-key:303c</KeyName>
          </KeyInfo>
          <CipherData>
            <CipherValue>
MCR0LGaoyuO2o6zsIW9IrOOSMfhuZCtV20o94/OfQ5dHbIJ3q2vZrgwRbJepLvRa
            </CipherValue>
          </CipherData>
        </EncryptedData>
      </KeyData>
    </SecretKey>
  </ContentKey>
  <ContentKey id="urn:x-octopus.intertrust.com:content-key:2001">
    <SecretKey id="urn:x-octopus.intertrust.com:secret-key:2001">
      <KeyData encoding="xmlenc" format="RAW">
        <EncryptedData xmlns="http://www.w3.org/2001/04/xmlenc#">
          <EncryptionMethod Algorithm="http://www.w3.org/2001/04/xmlenc#rsa-1_5"/>
          <KeyInfo xmlns="http://www.w3.org/2000/09/xmldsig#">
            <KeyName>urn:x-octopus.intertrust.com:key-pair:300c</KeyName>
          </KeyInfo>
          <CipherData>
            <CipherValue>
LD51cJ71Bswwb2GttPoPjMytFn3ooeI7vhZPA5mKY06R82KZjxFDtcCmbOIYZ5Hv
6ldqQ3hy74/mQF3AJ1jRXa9/ymmasVBxsJnv426B9/JkzTT4CGqNjS+WPOKL9NZC
qnRWguJmk8dQ+jaxW51SQSjp4MCpGZB63zfvcuBD7qE=
            </CipherValue>
          </CipherData>
        </EncryptedData>
      </KeyData>
    </SecretKey>
  </ContentKey>
  <Control id="urn:x-octopus.intertrust.com:control:0001">
    <ControlProgram type="Plankton">
      <CodeModule byteCodeType="Plankton-1-0">
AAABUnBrQ00AAAA2cGtFWAAAAAIOR2xvYmFsLk9uTG9hZAAAAAAAEkFjdGlvbi5QbGF5LkNo
ZWNrAAAAAFgAAAACmcGtDUwEAAAAEGgEAAAAABQEAAAACIAMBAAAABBoBAAAAHgUb
AQAAACwYAQAAAQaAQAAACIFAQAAAIgAwEAAAAEGgEAAAA7BRsBAAAABhgBAAAA
ABUB/////xUBAAAABBoBAAAAPwUBAAAABBoBAAAAHgUaIAEAAAAgGAEAAAAEGgEAAAA
7BRogAQEOX3oLAQAAAAYYAQAAAAAVAf////8VAAAAbnBrRFNPY3RvcHVzLkxkxpbmtzLklzTm9
kZVJ1YWNoYWJsZSQQAAAAAAU3lzdGVtLkxkhvc3QuR2V0VGltZVN0YW1wAAAAAAB1cm46eC1vY3
RvcHVzLmludGVydHJ1c3QuY29tOm5vZGU6MDAwMwA=
      </CodeModule>
    </ControlProgram>
  </Control>
  <Protector>
    <ContentKeyReference>
      <Id>urn:x-octopus.intertrust.com:content-key:2002</Id>
    </ContentKeyReference>
    <ProtectedTargets>
      <ContentReference>
        <Id>urn:x-octopus.intertrust.com:content:2001</Id>
      </ContentReference>
      <ContentReference>
        <Id>urn:x-octopus.intertrust.com:content:2002</Id>
      </ContentReference>
    </ProtectedTargets>
```

APPENDIX B-continued

Annex C: Example of a signed Octopus license (without revocation)

```
    </Protector>
    <Protector>
      <ContentKeyReference>
        <Id>urn:x-octopus.intertrust.com:content-key:2001</Id>
      </ContentKeyReference>
      <ProtectedTargets>
        <ContentReference>
          <Id>urn:x-octopus.intertrust.com:content:2003</Id>
        </ContentReference>
        <ContentReference>
          <Id>urn:x-octopus.intertrust.com:content:2004</Id>
        </ContentReference>
      </ProtectedTargets>
    </Protector>
    <Controller id="urn:x-octopus.intertrust.com:controller:0001">
      <ControlReference>
        <Id>urn:x-octopus.intertrust.com:control:0001</Id>
        <Digest>
          <DigestMethod Algorithm="http://www.w3.org/2000/09/xmldsig#sha1"> xmlns="http://www.w3.org/2000/09/xmldsig#"/>
          <DigestValue xmlns="http://www.w3.org/2000/09/xmldsig#">02ACF5674287FF45CFA5A66D70125FF5601A63F7</DigestValue>
        </Digest>
      </ControlReference>
      <ControlledTargets>
        <ContentKeyReference>
          <Id>urn:x-octopus.intertrust.com:content-key:2002</Id>
        </ContentKeyReference>
        <ContentKeyReference>
          <Id>urn:x-octopus.intertrust.com:content-key:2001</Id>
        </ContentKeyReference>
      </ControlledTargets>
    </Controller>
    <Signature xmlns="http://www.w3.org/2000/09/xmldsig#">
      <SignedInfo>
        <CanonicalizationMethod Algorithm="http://www.w3.org/2001/10/xml-exc-c14n#"/>
        <SignatureMethod Algorithm="http://www.w3.org/2000/09/xmldsig#hmac-sha1"/>
        <Reference URI="urn:x-octopus.intertrust.com:controller:0001">
          <Transforms>
            <Transform Algorithm="http://www.octopus-drm.com/2004/07/format-independent-cano#"/>
          </Transforms>
          <DigestMethod Algorithm="http://www.w3.org/2000/09/xmldsig#sha1"/>
          <DigestValue>A42CZFK4DQvb/M0wqOLZRnyiS1Y=</DigestValue>
        </Reference>
      </SignedInfo>
      <SignatureValue>gI5QoD7MUAgjcpkPiciZhoSHbEQ=</SignatureValue>
      <KeyInfo>
        <KeyName>urn:x-octopus.intertrust.com:secret-key:2002;urn:x-octopus.intertrust.com:secret-key:2001</KeyName>
      </KeyInfo>
    </Signature>
</Bundle>
```

APPENDIX B

Annex D: Example of a ContentKey with revocation

```
<ContentKey id="urn:x-octopus.intertrust.com:content-key:2001">
  <SecretKey id="urn:x-octopus.intertrust.com:secret-key:2001">
    <KeyData encoding="xmlenc" format="RAW">
      <EncryptedData xmlns="http://www.w3.org/2001/04/xmlenc#">
        <EncryptionMethod Algorithm="http://www.w3.org/2001/04/xmlenc#aes128-cbc"/>
        <KeyInfo xmlns="http://www.w3.org/2000/09/xmldsig#">
          <EncryptedKey xmlns="http://www.w3.org/2001/04/xmlenc#">
            <EncryptionMethod Algorithm="http://www.w3.org/2001/04/xmlenc#rsa-1_5"/>
            <KeyInfo xmlns="http://www.w3.org/2000/09/xmldsig#">
            <KeyName>urn:kformat:user:0001:scuba:pair:sharing</KeyName>
            </KeyInfo>
            <CipherData>
              <CipherValue>E(PUBuser, I)</CipherValue>
            </CipherData>
          </EncryptedKey>
        </KeyInfo>
```

APPENDIX B-continued

Annex D: Example of a ContentKey with revocation

```
        <CipherData>
          <CipherValue>
          Encryption of the EncryptedData element containing
          the encryption of Kc with the broadcast encryption
          scheme (see note on xmlenc and broadcast key encryption
          in the ContentKey section) with the intermediate key I.
          </CipherValue>
        </CipherData>
      </EncryptedData>
    </KeyData>
  </SecretKey>
</ContentKey>
```

APPENDIX C

This Appendix C shows an example of simple profile for use with the bootstrap protocol described above. Also provided are a simple canonical serialization, an example XML marshalling, and example WSDL for the Octopus Bootstrap SOAP Web Service.

Simple Profile

In one embodiment, a simple profile is used that consists of the following:

| Profile Name | SimpleProfile |
|---|---|
| Public Key Encryption Algorithm | http://www.w3.org/2001/04/xmlenc#rsa-1_5 |
| Public Key Signature Algorithm | http://www.w3.org/2000/09/xmldsig#rsa-sha1 |
| Secret Key Encryption Algorithm | http://www.w3.org/2001/04/xmlenc#aes128-cbc |
| Secret Key Signature Algorithm | http://www.w3.org/2000/09/xmldsig#hmac-sha1 |
| Digest Algorithm | http://www.w3.org/2000/09/xmldsig#sha1 |
| Certificate Format | X.509 (version 3) |
| Message Marshalling | Simple XML Marshalling 1.0 |
| Minimum Nonce Size | 16 bytes |
| Canonical Object Serialization | Simple Canonical Serialization 1.0 |

Simple Canonical Serialization 1.0

In one embodiment, the simple canonical byte sequence used in the simple profile described above consists of constructing sequences of bytes from the values of the fields of the objects in the messages. Each message and each object is made of one or more fields. Each field is either a simple field, or a compound field.

Simple fields can be one of four types: integer, string, byte sequence, or arrays of fields. Compound fields consist of one or more sub-fields, each sub-field being simple or compound.

In one embodiment, the rules for constructing the canonical byte sequence for each field type are as follows:

| Compound Fields | | | |
|---|---|---|---|
| Field 0 | Field 1 | Field 2 | ... |

The canonical byte sequence is the concatenation of the canonical byte sequences of each sub-field (optional fields are not skipped, but serialized according to the rule for optional fields).

| Arrays of Fields | | | |
|---|---|---|---|
| Field count | Field 0 | Field 1 | ... |

The field count, encoded as a sequence of 4 bytes in big-endian order, followed by each field's canonical byte sequence. If the field count is 0, then nothing follows the 4-bytes field count (in this case, all 4 bytes have the value 0).

| Integer | | | |
|---|---|---|---|
| I0 | I1 | I2 | I3 |

32-bit signed value, encoded as a sequence of 4 bytes, in big-endian order.

| String | | | |
|---|---|---|---|
| Byte Count | Byte 0 | Byte 1 | ... |

The string is represented by a UTF-8 encoded sequence of 8-bit bytes. The byte count of the encoded byte sequence is encoded as a sequence of 4 bytes in big-endian order. The byte count is followed by the sequence of bytes of the UTF-8 encoded string.

| Byte Sequence | | | |
|---|---|---|---|
| Byte Count | Byte 0 | Byte 1 | ... |

The byte count is encoded as a sequence of 4 bytes in big-endian order (if the byte sequence is empty, or the corresponding field has been omitted, the Byte Count is 0, and no byte value follows the 4-byte byte count). Each byte is encoded as-is.

Simple XML Marshalling 1.0
Schema SimpleBootProtocol.xsd

```
<xs:schema xmlns:xs="http://www.w3.org/2001/XMLSchema"
elementFormDefault="qualified">
  <xs:element name="BootstrapRequestMessage">
    <xs:complexType>
      <xs:sequence>
        <xs:element ref="BootstrapRequest"/>
      </xs:sequence>
      <xs:attribute name="Protocol" type="xs:string" use="required"/>
      <xs:attribute name="Profile" type="xs:string" use="required"/>
      <xs:attribute name="Version" type="xs:decimal" use="required"/>
```

```
</xs:complexType>
</xs:element>
<xs:element name="BootstrapRequest">
  <xs:complexType>
    <xs:sequence>
      <xs:element ref="SessionId"/>
      <xs:element ref="TrustDomain" maxOccurs="unbounded"/>
    </xs:sequence>
  </xs:complexType>
</xs:element>
<xs:element name="ChallengeRequestMessage">
  <xs:complexType>
    <xs:sequence>
      <xs:element ref="ChallengeRequest"/>
    </xs:sequence>
  </xs:complexType>
</xs:element>
<xs:element name="ChallengeRequest">
  <xs:complexType>
    <xs:sequence>
      <xs:element ref="Challenge"/>
      <xs:element ref="Signature"/>
      <xs:element ref="CertificateChain"/>
    </xs:sequence>
  </xs:complexType>
</xs:element>
<xs:element name="ChallengeResponseMessage">
  <xs:complexType>
    <xs:sequence>
      <xs:element ref="SessionKey"/>
      <xs:element ref="EncryptedChallengeResponse"/>
    </xs:sequence>
  </xs:complexType>
</xs:element>
<xs:element name="EncryptedChallengeResponse" type="xs:base64Binary"/>
<xs:element name="ChallengeResponse">
  <xs:complexType>
    <xs:sequence>
      <xs:element ref="ClientInfo"/>
      <xs:element ref="Challenge"/>
      <xs:element ref="SessionKey"/>
      <xs:element ref="Signature"/>
    </xs:sequence>
  </xs:complexType>
</xs:element>
<xs:element name="Challenge">
  <xs:complexType>
    <xs:sequence>
      <xs:element ref="Cookie"/>
      <xs:element ref="Nonce"/>
      <xs:element ref="SessionId"/>
      <xs:element ref="EncryptionKey" minOccurs="0"/>
    </xs:sequence>
  </xs:complexType>
</xs:element>
<xs:element name="BootstrapResponseMessage">
  <xs:complexType>
    <xs:sequence>
      <xs:element ref="EncryptedBootstrapResponse"/>
    </xs:sequence>
  </xs:complexType>
</xs:element>
<xs:element name="EncryptedBootstrapResponse" type="xs:base64Binary"/>
<xs:element name="BootstrapResponse">
  <xs:complexType>
    <xs:sequence>
      <xs:element ref="SessionId"/>
      <xs:element ref="Data"/>
      <xs:element ref="Signature"/>
    </xs:sequence>
  </xs:complexType>
</xs:element>
<xs:element name="ErrorResponseMessage">
  <xs:complexType>
    <xs:sequence>
      <xs:element ref="ErrorResponse"/>
    </xs:sequence>
  </xs:complexType>
</xs:element>
<xs:element name="ErrorResponse" type="xs:string"/>
<xs:element name="CertificateChain">
  <xs:complexType>
    <xs:sequence>
      <xs:element ref="Certificate" maxOccurs="unbounded"/>
    </xs:sequence>
    <xs:attribute name="TrustDomain" type="xs:string" use="required"/>
  </xs:complexType>
</xs:element>
<xs:element name="Certificate" type="xs:base64Binary"/>
<xs:element name="ClientInfo">
  <xs:complexType>
    <xs:sequence>
      <xs:element ref="Attribute"/>
    </xs:sequence>
  </xs:complexType>
</xs:element>
<xs:element name="Attribute" type="xs:string"/>
<xs:element name="Cookie" type="xs:base64Binary"/>
<xs:element name="Data" type="xs:base64Binary"/>
<xs:element name="EncryptionKey" type="xs:base64Binary"/>
<xs:element name="Nonce" type="xs:base64Binary"/>
<xs:element name="SessionId" type="xs:string"/>
<xs:element name="SessionKey" type="xs:base64Binary"/>
<xs:element name="Signature" type="xs:base64Binary"/>
<xs:element name="TrustDomain" type="xs:string"/>
</xs:schema>
```

Example

```
<BootstrapRequestMessage Protocol="OctopusSimpleBoot" Profile="SimpleProfile" Version="1.0">
    <BootstrapRequest>
        <SessionId>some-unique-session-id-0008</SessionId>
        <TrustDomain>urn:x-octopus.intertrust.com:scuba:boot:trust-domain:test001</TrustDomain>
    </BootstrapRequest>
</BootstrapRequestMessage>
<ChallengeRequestMessage>
    <ChallengeRequest>
        <Challenge>
            <Cookie>c29tZS11bmlxdWUtc2Vzc2lvbi1pZC0wMDA4</Cookie>
            <Nonce>Mv5VIv73cxo5b+gisQJP8Q==</Nonce>
            <SessionId>some-unique-session-id-0008</SessionId>
            <EncryptionKey>
MIGfMA0GCSqGSIb3DQEBAQUAA4GNADCBiQKBgQCpMY4wvgTJvVPTufNVbdIfTUwOi4FZPtzi
3ezetY9gx51O6dfRn+LKPq1nJsSXCR5ZIvRUyoNZC0Qc3SLobUhXD6uTsrV5xtRKOSxZTLt5DZ15At
ddSrAAfF9baDGMi5KQP9w7qB2Ci/MmYha4Jix1iUltv0zWIKmSpytgHC8i/QIDAQAB
            </EncryptionKey>
        </Challenge>
        <Signature>
GsWP3yPT36r3e1jZfulUS7xp5w2ei7iTsAJ/YD13fX+pSJrpeKAtq2BTzHQ1AclOorPJwzWHDanc
```

```
cui9/rinlg3Drw52bQXLzhZbZLXadIGFP3YP1gTKPuazUCYCLAjYTJbdulWlnTKDtmf34/66H0sz
DCCyxQsdFZhSNk6pyQE=
    </Signature>
    <CertificateChain TrustDomain="urn:x-octopus.intertrust.com:scuba:boot:trust-domain:test001">
      <Certificate>
        MIID...<!-- End entity cert -->
      </Certificate>
        MIID...<!-- intermediary cert -->
      <Certificate>
        MIIE...<!-- intermediary cert -->
      </Certificate>
      <Certificate>
        MIID...<!-- cert that chains directly to the trust anchor -->
      </Certificate>
    </CertificateChain>
  </ChallengeRequest>
</ChallengeRequestMessage>
<ChallengeResponseMessage>
  <SessionKey>
PtzJcFT2s1sW7oRZ1a+HASdRmZer4pk4QArFZWYlkUWZcIZTN2g2YeCQwORq2J9QXOksU6utKm
OmgfEHY151UdcMFake3CwquvVN6w/7mFH0qtDoc+GhuKe9eQXN2RHa3SlhfR5ShF2A/cwZHd4Nk
nt4w8MWMDDn3SUDd6aS/ZI=
  </SessionKey>
  <EncryptedChallengeResponse>
        mQCkPL560D00o...
  </EncryptedChallengeResponse>
</ChallengeResponseMessage>
<ChallengeResponse>
  <ClientInfo>
    <Attribute Name="SomeAttribute">Bla Bla</Attribute>
  </ClientInfo>
  <Challenge>
    <Cookie>c29tZS11bmlxdWUtc2Vzc2lvbi1pZC0wMDA4</Cookie>
    <Nonce>Mv5VIv73cxo5b+gisQJP8Q==</Nonce>
    <SessionId>some-unique-session-id-0008</SessionId>
  </Challenge>
  <SessionKey>bbBG8JsGaApFdNJq6hFrIQ==</SessionKey>
  <Signature>WYMULPpF4lOJ6MiAxd1lueN7p/4=</Signature>
</ChallengeResponse>
<BootstrapResponseMessage>
  <EncryptedBootstrapResponse>
chXTp20+yI7/i1pHLawFOLXdGb...
  </EncryptedBootstrapResponse>
</BootstrapResponseMessage>
<BootstrapResponse>
  <SessionId>some-unique-session-id-0008</SessionId>
  <Data>
PD94bWwgdmVyc...
  </Data>
  <Signature>
XqCeVRb4YaYAK9Ilj60B5R1hQ03tFpHPw3wMMATbeUfqCpEXfAB7u2/qnjs9jLgWTOOvLDE5C5a
VVMvzlnRnDv0GHLls6g43HusVx7fpazwHoFrb3M3eKwXMoYsI6xpdYy2BX1bs5QT2xdwBv2ClBjo7
KzQfmb/3bYEO+xGdg48=
  </Signature>
</BootstrapResponse>
<ErrorResponseMessage>
  <ErrorResponse Code="6">Some Error Info</ErrorResponse>
</ErrorResponseMessage>
```

WSDL for the Bootstrap SOAP Web Service

```
<?xml version="1.0" encoding="UTF-8"?>
<!--
  This wsdl file describes the interface for a stateless multiround bootstrap protocol
  The protocol works this way:
  1. C->S: BootstrapRequestMessage
  2. S->C: ChallengeRequestMessage
  3. C->S: ChallengeResponseMessage
  4. S->C: BootstrapResponseMessage
-->
<wsdl:definitions name="OctopusBootstrap"
targetNamespace="http://www.intertrust.com/services/OctopusBootstrap"
xmlns="http://schemas.xmlsoap.org/wsdl/" xmlns:apachesoap="http://xml.apache.org/xml-soap"
xmlns:impl="http://www.intertrust.com/services/OctopusBootstrap"
xmlns:intf="http://www.intertrust.com/services/OctopusBootstrap"
xmlns:soapenc="http://schemas.xmlsoap.org/soap/encoding/"
```

```
xmlns:tnstype="http://www.intertrust.com/services/OctopusBootstrap"
xmlns: wsdl="http://schemas.xmlsoap.org/wsdl/" xmlns:wsdlsoap="http://schemas.xmlsoap.org/wsdl/soap/"
xmlns:xsd="http://www.w3.org/2001/XMLSchema"
xmlns:ob="http://www.intertrust.com/Octopus/Bootstrap/1.0"
xmlns:nc="http://www.intertrust.com/core">
  <wsdl:types>
    <schema targetNamespace="http://www.intertrust.com/services/OctopusBootstrap"
xmlns="http://www.w3.org/2001/XMLSchema">
      <!-- imports -->
      <import namespace="http://www.intertrust.com/Octopus/Bootstrap/1.0"
schemaLocation="./SimpleBootProtocol.xsd"/>
      <!-- elements -->
      <element name="requestdata">
        <complexType>
          <!-- This is a multiround stateless (thanks to the cookie) protocol:
               the client can send a BootstrapRequestMessage or
               ChallengeReponseMessage -->
          <choice>
            <element ref="ob:BootstrapRequestMessage"/>
            <element ref="ob:ChallengeResponseMessage"/>
          </choice>
        </complexType>
      </element>
      <element name="responsedata">
        <complexType>
          <!-- This is a multiround stateless (thanks to the cookie) protocol:
               the server can send back a ChallengeRequestMessage or
               BootstrapResponseMessage or an ErrorResponseMessage -->
          <choice>
            <element ref="ob:ChallengeRequestMessage"/>
            <element ref="ob:BootstrapResponseMessage"/>
            <element ref="ob:ErrorResponseMessage"/>
          </choice>
        </complexType>
      </element>
    </schema>
  </wsdl:types>
  <!-- message declarations -->
  <wsdl:message name="invokeRequest">
    <wsdl:part element="tnstype:requestdata" name="invokeRequest"/>
  </wsdl:message>
  <wsdl:message name="invokeResponse">
    <wsdl:part element="tnstype:responsedata" name="invokeResponse"/>
  </wsdl:message>
  <!-- port type declarations -->
  <wsdl:portType name="OctopusBootstrap">
    <wsdl:operation name="invoke">
      <wsdl:input message="impl:invokeRequest" name="invokeRequest"/>
      <wsdl:output message="impl:invokeResponse" name="invokeResponse"/>
    </wsdl:operation>
  </wsdl:portType>
  <!-- binding declarations -->
  <wsdl:binding name="OctopusBootstrapSoapBinding" type="impl:OctopusBootstrap">
    <wsdlsoap:binding style="document" transport="http://schemas.xmlsoap.org/soap/http"/>
    <wsdl:operation name="invoke">
      <wsdlsoap:operation soapAction=""/>
      <wsdl:input name="invokeRequest">
        <wsdlsoap:body encodingStyle=""
namespace="http://www.intertrust.com/services/OctopusBootstrap" use="literal"/>
      </wsdl:input>
      <wsdl:output name="invokeResponse">
        <wsdlsoap:body encodingStyle=""
namespace="http://www.intertrust.com/services/OctopusBootstrap" use="literal"/>
      </wsdl:output>
    </wsdl:operation>
  </wsdl:binding>
  <!-- service declarations -->
  <wsdl:service name="OctopusBootstrapService">
    <wsdl:port binding="impl:OctopusBootstrapSoapBinding" name="OctopusBootstrap">
      <wsdlsoap:address location="http://localhost:8080/OctopusBootstrap/services/OctopusBootstrap"/>
    </wsdl:port>
  </wsdl:service>
</wsdl:definitions>
```

APPENDIX D

An encoding-neutral way of computing a canonical byte sequence (CBS) for objects is presented below and used, in preferred embodiments, in the calculation of digests for use digitally signing objects. This byte sequence is independent of the way the objects are represented or transmitted, thus enabling the same digest and signature values to be used throughout systems in which multiple encoding formats (e.g., XML, ANSI), programming languages, or the like are used.

1. Canonical Byte Sequence Algorithm

The canonical byte sequence algorithm consists of constructing sequences of bytes from value of fields. Each field has a value with a simple type or a compound type. Some fields can be specified to be optional (the field may be present or omitted).

In one embodiment, simple types are: integer, string, byte, and boolean.

Compound types consist of one or more sub-fields; each sub-field having a value with a simple or compound type. Compound types are either heterogeneous or homogenous, meaning that there are one or more sub-field values (simple or compound) of different types (i.e., heterogeneous), or that there are one or more sub-field values (simple or compound) all of the same type (homogeneous).

The canonical byte sequence of a field is obtained by applying the encoding rule to the field's value when the field is always present or the encoding rule for optional fields when the field is specified to be optional. In the following encoding rule descriptions, the term byte means an 8-bit value (octet):

1.1. Optional Fields

If an optional field is present, its value is serialized as the byte value 1 followed by the canonical byte sequence of the field value. If it is omitted, its value is serialized as the byte value 0.

1.2. Heterogeneous Compound

The canonical byte sequence is the concatenation of the canonical byte sequences of each sub-field value (optional fields are not skipped, but serialized according to the rule for optional fields).

1.3. Homogeneous Compound

The canonical byte sequence is the sub-field count, encoded as a sequence of 4 bytes in big-endian order, followed by the concatenation of each sub-field value's canonical byte sequence. If the sub-field count is 0, then nothing follows the 4-bytes field count (in this case, all 4 bytes have the value 0).

1.4. Integer 32-bit integer value, encoded as a sequence of 4 bytes, in big-endian order.

| String | | | |
|---|---|---|---|
| Byte Count | Byte 0 | Byte 1 | ... |

Strings are represented by a UTF-8 encoded byte sequence (not null-terminated). The canonical byte sequence for a string consists of (1) the byte count of the string, encoded as a sequence of 4 bytes in big-endian order, followed by (2) the sequence of bytes of the string.

1.6. Byte 8-bit value 1.7. Boolean 8-bit value: 0 for false, and 1 for true

2. Application to Octopus Objects

In one embodiment, the canonical byte sequence for an Octopus object is the concatenation of the canonical byte sequences of each of its fields, in the order they are defined in the object model.

For heterogeneous compound types, the order of the fields is the one specified in the type definition. For homogeneous compound types, the order of the elements is specified in the following paragraphs.

Attributes

An object's "attributes" field is treated as an unnamed attribute of type "list" (it is an unsorted container of named attributes). Named attributes contained in the value of attributes of type "list" are sorted lexicographically by their "name" field. Unnamed Attributes contained in the value attribute of type "array" are not sorted (they are serialized in their array order).

Extensions

An object's internal extensions are sorted lexicographically by their 'id' field. In one embodiment, for internal extensions, the 'extensionData' field is not used in the computation of the canonical byte sequence. For such extensions, if they need to be included in the computation of a digest for the purpose of a signature, they will contain a 'digest' field that will represent the digest of the actual data carried in the 'extensionData'. For each type of extension data, a definition will be given that allows the computation of its canonical byte sequence.

Controller

ContentKey references are sorted lexicographically by their 'id' field.

3. ScubaKeys

The keys in the 'publicKeys', 'privateKeys' and 'secretKeys' fields are sorted lexicographically by their 'id' field.

4. Example

```
Class X {
    int i;
    int j;
}
class A {
    int a[ ];
    string s;
}
class B extends A {
    {X optional_x;}
    X x;
    (string toDiscardInCano;)
    string s2;
}
```

The canonical byte sequence of an instance of class B where a[ ]={7,8,9}, s="Abc", x={5,4}, s2=" ", and optional_x is not present is serialized as:

| 3 | 7 | 8 | 9 | 3 | "Abc" as UTF-8 | 0 | Cano(X) | 0 |
|---|---|---|---|---|---|---|---|---|
| 4 bytes | 4 bytes | 4 bytes | 4 bytes | 4 bytes | 3 bytes | 1 byte | 8 bytes | 4 bytes |

Where Cano(X) is:

| 5 | 4 |
|---|---|
| 4 bytes | 4 bytes |

APPENDIX E

An example of a control program is provided below. In this example, the license indicates that the play action can be granted if the membership state (provisioned during registration) or the license state (provisioned during a license transfer) can be found in the state database (referred to as the "Seashell" database in this example embodiment). The license also allows a peer to request a license transfer. This transfer will be granted if the two peers are in a given proximity. The license contains an agent that will set the license state on the peer.

In the code files that follow, "MovableDomainBoundLicense.asm" is the main control, "LicenseUtils/*" are helpers for the license, "GenericUtils/*" are generic helpers that perform functions such as computing the length of a string, comparing strings, manipulating the stack, and/or the like, and "ExtendedStatusBlockParameters/*" contains an XML description of an extended status block parameter and the corresponding representation as a series of bytes compiled from the XML.

E.1 MovableDomainBound.asm

```
;*************************************************************
;   File Name: MovableDomainBoundLicense.asm
;   Description: Example of a movable license
;*************************************************************
;=========================
; constants
;=========================
.equ DEBUG_PRINT_SYSCALL,           1
.equ FIND_SYSCALL_BY_NAME_SYSCALL,  2
.equ SYSTEM_HOST_GET_OBJECT_SYSCALL, 3
.equ SYSTEM_HOST_SET_OBJECT_SYSCALL, 4
.equ SUCCESS,                       0
.equ FAILURE,                      -1
.equ ERROR_NO_SUCH_ITEM,           -6
.equ CONTAINER_IGNORED_ADDRESS,     1
;=========================
; includes
;=========================
.include "StrCmp.asm"
.include "PrintInt.asm"
.include "MembershipUtils.asm"
.include "LicenseStateUtils.asm"
;=========================
; data
;=========================
.data
GetTrustedTimeFunctionName:
    .string "System.Host.GetTrustedTime"
GetTrustedTimeFunctionNumber:
    .long 0
ActionGrantedNoObligationXStatus:
    .long 0x00000000 ; global flags
    .long 0x00000000 ; category = ACTION_GRANTED
    .long 0x00000000 ; sub-category
    .long 0x00000000 ; local flags
    .long 0x00000000 ; cache duration type
    .long 0x00000000 ; cache duration value
    .long 0x00000000 ; value list size = 0
ActionDeniedXStatus:
    .long 0x00000000 ; global flags
    .long 0x00000001 ; category = ACTION_DENIED
    .long 0x00000000 ; sub-category
    .long 0x00000000 ; local flags
    .long 0x00000000 ; cache duration type
    .long 0x00000000 ; cache duration value
    .long 0x00000000 ; value list size = 0
TransferGrantedProximityNotChecked:
    .long 0x00000000 ; global flags
    .long 0x00000000 ; category = ACTION_GRANTED
    .long 0x00000000 ; sub-category
    .long 0x00000003 ; local flags: Obligation and Callback Notices
    .long 0x00000000 ; cache duration type
    .long 0x00000000 ; cache duration value
    .include "TransferXStatusProximityCheckFailed.asm"
TransferGrantedProximityChecked:
    .long 0x00000000 ; global flags
    .long 0x00000000 ; category = ACTION_GRANTED
    .long 0x00000000 ; sub-category
    .long 0x00000003 ; local flags: Obligation and Callback Notices
    .long 0x00000000 ; cache duration type
    .long 0x00000000 ; cache duration value
    .include "TransferXStatusProximityCheckSucceed.asm"
AgentContextPath:
    .string "Octopus/Agent/Session/ContextId"
AgentContextDesiredValue:
    .string "MoveStateContent0023"
AgentContextValue:
    .zeros 32
SinkProximityLastProbePath:
    .string "Octopus/Action/Parameters/Sink/Proximity/LastProbe"
SinkProximityLastProbeResult:
    .long -1
AgentProximityCheckedPath:
    .string "Octopus/Agent/Parameters/ProximityChecked"
AgentProximityCheckedValue:
    .long 0
ControllerTimestampAttributePath:
    .string "Octopus/Controller/Attributes/Import-time"
ControllerTimestampAttributeValue:
    .long 0
; debug
.ifdef DEBUG
Controller.Timestamp.Query.Debug:
    .string "--------- Entering Controller.Timestamp.Query ------------
    --\n"
Control.Actions.Play.Perform.Debug:
    .string "--------- Entering Control.Actions.Play.Perform ----------
    ----\n"
Control.Agents.SetStateContent0023.Run.Debug:
    .string "--------- Entering Control.Agents.SetStateContent0023.Run
    --------------\n"
Control.Actions.Transfer.Perform.Debug:
    .string "--------- Entering Control.Actions.Transfer.Perform ------
    --------\n"
Control.Agents.SetStateContent0023.OnAgentCompletion.Debug:
    .string "--------- Entering
    Control.Agents.SetStateContent0023.OnAgentCompletion
    --------------\n"
Transfer_OK_Proximity_Not_Checked.Debug:
    .string "####### Transfer_OK_Proximity_Not_Checked
    #######\n"
Transfer_OK_Proximity_Checked.Debug:
    .string "####### Transfer_OK_Proximity_Checked #######\n"
Agent_Failure.Debug:
    .string "####### Agent Failure #######\n"
Agent_Success.Debug:
    .string "####### Agent Success #######\n"
Action_Granted.Debug:
    .string "####### Action Granted #######\n"
Action_Denied.Debug:
    .string "####### Action Denied #######\n"
.endif
;=========================
; code
;=========================
.code
;
; Global.OnLoad
;
Global.OnLoad:
    ; get the GetTrustedTime functionNumber
    PUSH @GetTrustedTimeFunctionName
    PUSH FIND_SYSCALL_BY_NAME_SYSCALL
    CALL
    DUP
    PUSH @GetTrustedTimeFunctionNumber
    POKE
    BRN OnLoad_Failed
    ; ok
    PUSH SUCCESS
    STOP
    ; fail
OnLoad_Failed:
    PUSH FAILURE
    STOP
;
; Controller.Timestamp.Query
;
Controller.Timestamp.Query:
.ifdef DEBUG
    ;debug
```

```
            PUSH @Controller.Timestamp.Query.Debug
            PUSH DEBUG_PRINT_SYSCALL
            CALL
       .endif
            ; get the timestamp attribute in the controller object
            PUSH 4                                        ; ReturnBufferSize (4
                bytes)
            PUSH @ControllerTimestampAttributeValue       ; ReturnBuffer (type is
                long)
            PUSH @ControllerTimestampAttributePath        ; Name
            PUSH 0                                        ; Parent = root
                                                            container
            PUSH SYSTEM_HOST_GET_OBJECT_SYSCALL
            CALL
            RET
       ;
       ; Control.Actions.Play.Check
       ;
       Control.Actions.Play.Check:
       ;
       ; Control.Actions.Play.Perform
       ;
       Control.Actions.Play.Perform:
            ; query the state paths
            JSR MembershipStatePath.Query
            BRN Action_Denied
            JSR LicenseStatePath.Query
            BRN Action_Denied
       .ifdef DEBUG
            ;debug
            PUSH @Control.Actions.Play.Perform.Debug
            PUSH DEBUG_PRINT_SYSCALL
            CALL
       .endif
            ; if the timestamp of the membership state is >
            ; to the timestamp of the controller
            JSR MembershipStateValue.Query
            BRN Action_Denied
            JSR Controller.Timestamp.Query
            BRN Action_Denied
            PUSH @MembershipStateValue
            PEEK
            PUSH @ControllerTimestampAttributeValue
            PEEK
            SUB
            BRP Action_Granted    ; we don't need to check for the license state
                                  ; in this case
            ; we just check that the state is present
            JSR LicenseStateValue.Query
            BRN Action_Denied
       Action_Granted:
       .ifdef DEBUG
            ;debug
            PUSH @Action_Granted.Debug
            PUSH DEBUG_PRINT_SYSCALL
            CALL
       .endif
            PUSH @ActionGrantedNoObligationXStatus
            PUSH SUCCESS
            STOP
       Action_Denied:
       .ifdef DEBUG
            ;debug
            PUSH @Action_Denied.Debug
            PUSH DEBUG_PRINT_SYSCALL
            CALL
       .endif
            PUSH @ActionDeniedXStatus
            PUSH SUCCESS
            STOP
       ;
       ; Control.Actions.Transfer.Check
       ;
       Control.Actions.Transfer.Check:
       ;
       ; Control.Actions.Transfer.Perform
       ;
       Control.Actions.Transfer.Perform:
            ; query the state paths
            JSR MembershipStatePath.Query
            BRN Action_Denied
            JSR LicenseStatePath.Query
            BRN Action_Denied
       .ifdef DEBUG
            ;debug
            PUSH @Control.Actions.Transfer.Perform.Debug
            PUSH DEBUG_PRINT_SYSCALL
            CALL
       .endif
            ; get the last time proximity has been checked
            PUSH 4                                        ; ReturnBufferSize
            PUSH @SinkProximityLastProbeResult            ; ReturnBuffer
            PUSH @SinkProximityLastProbePath              ; Name
            PUSH 0                                        ; Parent = root container
            PUSH SYSTEM_HOST_GET_OBJECT_SYSCALL
            CALL
            ; if the object is not visible, proximity has not been checked.
            ; the resulting agent (look at the
                TransferXStatusProximityCheckFailed.xml
            ; file on line 23). The agent will then make sure that the agent is
                part
            ; of the domain before setting the state
            BRN Transfer_OK_Proximity_Not_Checked
            ; check that proximity has been checked in the last 10 minutes
            DROP                                          ; we know that
                the type id is long
            DROP                                          ; we know that
                the size is 4
            PUSH @GetTrustedTimeFunctionNumber
            PEEK
            CALL
            SWAP
            DROP                                          ; we just need the value
            PUSH @SinkProximityLastProbeResult
            PEEK
            SUB
            PUSH 10
            SWAP
            SUB
            ; last time proximity was checked is more than 10' ago: same thing
            ; as if proximity had not been checked at all (see above)
            BRN Transfer_OK_Proximity_Not_Checked
            ; proximity has been checked successfully
       .ifdef DEBUG
            ;debug
            PUSH @Transfer_OK_Proximity_Checked.Debug
            PUSH DEBUG_PRINT_SYSCALL
            CALL
       .endif
            PUSH @TransferGrantedProximityChecked
            PUSH SUCCESS
            STOP
       Transfer_OK_Proximity_Not_Checked:
       .ifdef DEBUG
            ;debug
            PUSH @Transfer_OK_Proximity_Not_Checked.Debug
            PUSH DEBUG_PRINT_SYSCALL
            CALL
       .endif
            ; give back the RunAgentOnPeer Obligation (indicating that
            ; proximity has not been checked) and the OnAgentCompletion
                Callback
            PUSH @TransferGrantedProximityNotChecked
            PUSH SUCCESS
            STOP
       ;
       ; Control.Agents.SetStateContent0023.Run
       ;
       Control.Agents.SetStateContent0023.Run:
            ; query the state paths
            JSR MembershipStatePath.Query
            BRN Agent_Run_Failed
            JSR LicenseStatePath.Query
            BRN Agent_Run_Failed
       .ifdef DEBUG
            ;debug
            PUSH @Control.Agents.SetStateContent0023.Run.Debug
            PUSH DEBUG_PRINT_SYSCALL
```

```
                CALL
.endif
        ; if the peer is in the domain we don't need to do anything
        JSR Membership.Check
        BRZ Agent_Success
        ; check that the context is set
        PUSH 32                                  ; ReturnBufferSize
        PUSH @AgentContextValue                  ; ReturnBuffer
        PUSH @AgentContextPath                   ; Name
        PUSH 0                                   ; Parent = root container
        PUSH SYSTEM_HOST_GET_OBJECT_SYSCALL
        CALL
        ; check the result
        BRN Agent_Run_Failed
        DROP                                     ; we know that
                the type id is string
        DROP                                     ; we don't care
                                                   about the size
        PUSH @AgentContextValue
        PUSH @AgentContextDesiredValue
        JSR streq                                ; make sure we're
                                                   in the good context
        BRN Agent_Run_Failed
        ; check if the source has successfully proxmity checked the sink
        PUSH 4                                   ; ReturnBufferSize
        PUSH @AgentProximityCheckedValue         ; ReturnBuffer
        PUSH @AgentProximityCheckedPath          ; Name
        PUSH 0                                   ; Parent = root container
        PUSH SYSTEM_HOST_GET_OBJECT_SYSCALL
        CALL
        ; check the result
        BRN Agent_Run_Failed                     ; this parameter
                should always be set
                                                 ; by the app when
                receiving the agent
        DROP                                     ; we know that the
                type id is long
        DROP                                     ; we know that the
                                                   size is 4
        PUSH @AgentProximityCheckedValue
        PEEK
        NOT
        BRZ Agent_Set_State
Agent_Run_Failed:
.ifdef DEBUG
        ;debug
        PUSH @Agent_Failure.Debug
        PUSH DEBUG_PRINT_SYSCALL
        CALL
.endif
        PUSH 0                                   ; Return Block Size
        PUSH 0                                   ; Return Block Address
        PUSH FAILURE                             ; Result Code
        STOP
Agent_Set_State:
        ; set the state
        JSR LicenseState.Set
        BRN Agent_Run_Failed
Agent_Success:
.ifdef DEBUG
        ;debug
        PUSH @Agent_Success.Debug
        PUSH DEBUG_PRINT_SYSCALL
        CALL
.endif
        ; success
        PUSH 0                                   ; Return Block Size
        PUSH 0                                   ; Return Block Address
        PUSH SUCCESS                             ; Result Code
        STOP
;
; Control.Agents.SetStateContent0023.OnAgentCompletion callback (of
                type RESET)
;
Control.Agents.SetStateContent0023.OnAgentCompletion:
.ifdef DEBUG
        ;debug
        PUSH
                @Control.Agents.SetStateContent0023.OnAgentCompletion.Debug
        PUSH DEBUG_PRINT_SYSCALL
        CALL
.endif
        ; check that the agent result code is OK
        ; the stack is:
        ; ... AgentResultCode CompletionStatusCode ArgumentsBlockSize
                Cookie
        DROP                                     ; we don't need
                                                   the cookie
        DROP                                     ; we don't need the
                arguments block size
        BRN Action_Denied                        ; if the agent was not
                able to run, failure
        BRN Action_Denied                        ; same thing if the agent
                was not able to set the state on the peer
        ; success
        PUSH @ActionGrantedNoObligationXStatus
        PUSH SUCCESS
        STOP
Agent_Completion_Failed:
        PUSH FAILURE
        STOP
;========================
; exports
;========================
.export Global.OnLoad
.export Control.Actions.Play.Check
.export Control.Actions.Play.Perform
.export Control.Actions.Transfer.Check
.export Control.Actions.Transfer.Perform
.export Control.Agents.SetStateContent0023.Run
.export Control.Agents.SetStateContent0023.OnAgentCompletion
```

E.2 LicenseUtils

E.2.1 LicenseStateUtils.asm

```
;***********************************************************
;       File Name: LicenseStateUtils.asm
;       Description: Utils for License States
;***********************************************************;
;========================
; data
;========================
.data
LicenseStatePathControlAttribute:
        .string "Octopus/Control/Attributes/LicenseStatePath"
LicenseStatePath:
        .zeros 256
LicenseStateValue:
        .long 0
; debug
LicenseStatePath.Query.Debug:
        .string "--------- Entering LicenseStatePath.Query --------------\n"
LicenseStateValue.Query.Debug:
        .string "--------- Entering LicenseStateValue.Query --------------\n"
LicenseState.Erase.Debug:
        .string "--------- Entering LicenseState.Erase --------------\n"
LicenseState.Set.Debug:
        .string "--------- Entering LicenseState.Set --------------\n"
;========================
; code
;========================
.code
;
; LicenseStatePath.Query
;
LicenseStatePath.Query:
        ;debug
        PUSH @LicenseStatePath.Query.Debug
        PUSH DEBUG_PRINT_SYSCALL
        CALL
        PUSH 256                                 ; ReturnBufferSize
        PUSH @LicenseStatePath                   ; ReturnBuffer
        PUSH @LicenseStatePathControlAttribute   ; Name
        PUSH 0                                   ; Parent = root container
        PUSH SYSTEM_HOST_GET_OBJECT_SYSCALL
```

E.2.1 LicenseStateUtils.asm

```
        CALL
        RET
;
; LicenseStateValue.Query
;
LicenseStateValue.Query:
        ;debug
        PUSH @LicenseStateValue.Query.Debug
        PUSH DEBUG_PRINT_SYSCALL
        CALL
        PUSH 4                          ; ReturnBufferSize (4 bytes)
        PUSH @LicenseStateValue         ; ReturnBuffer (type is long)
        PUSH @LicenseStatePath          ; Name
        PUSH 0 ;                        Parent = root container
        PUSH SYSTEM_HOST_GET_OBJECT_SYSCALL
        CALL
        RET
;
; LicenseState.Erase
;
LicenseState.Erase:
        ;debug
        PUSH @LicenseState.Erase.Debug
        PUSH DEBUG_PRINT_SYSCALL
        CALL
        ; erase the local state
        PUSH 0                          ; Object Size (container)
        PUSH 0                          ; Object Type (container)
        PUSH 0                          ; Delete the container
        PUSH @LicenseStatePath          ; Name
        PUSH 0                          ; Parent = root container
        PUSH SYSTEM_HOST_SET_OBJECT_SYSCALL
        CALL
        RET
;
; LicenseState.Set
;
LicenseState.Set:
        ;debug
        PUSH @LicenseState.Set.Debug
        PUSH DEBUG_PRINT_SYSCALL
        CALL
        ; set the state
        PUSH 0                          ; Object Size (container)
        PUSH 0                          ; Object Type (container)
        PUSH CONTAINER_IGNORED_ADDRESS
        PUSH @LicenseStatePath          ; Name
        PUSH 0                          ; Parent = root container
        PUSH SYSTEM_HOST_SET_OBJECT_SYSCALL
        CALL
        RET
```

E.2.2 MembershipUtils.asm

```
;**************************************************************
;   File Name: MembershipUtils.asm
;   Description: Utils for Broadcast Membership
;
;**************************************************************;
;========================
; data
;========================
.data
MembershipStatePathControlAttribute:
        .string "Octopus/Control/Attributes/MembershipStatePath"
MembershipStatePath:
        .zeros 256
MembershipStateValue:
        .long 0
; debug
intStrOutput:
        .string "............"
MembershipStatePath.Query.Debug:
        .string "--------- Entering MembershipStatePath.Query ----------\n"
```

E.2.2 MembershipUtils.asm

```
MembershipStateValue.Query.Debug:
        .string "--------- Entering MembershipStateValue.Query ---------\n"
Membership.Check.Debug:
        .string "--------- Entering Membership.Check --------------\n"
Membership_Check_Success.Debug:
        .string "####### Membership Check Success #######\n"
Membership_Check_Failure.Debug:
        .string "####### Membership Check Failure #######\n"
MembershipPath.Debug:
        .string "MembershipState path: "
MembershipGetObjOutput.Debug:
        .string "MembershipState get object returns: "
Membership_Expired.Debug:
        .string "MembershipState has expired. Check the Value of the
                Membership SeaShell token against the local time."
NewlineString:
        .string "\n"
;========================
; code
;========================
.code
;
; MembershipStatePath.Query
;
MembershipStatePath.Query:
        ;debug
        PUSH @MembershipStatePath.Query.Debug
        PUSH DEBUG_PRINT_SYSCALL
        CALL
        PUSH 256                                    ; ReturnBufferSize
        PUSH @MembershipStatePath                   ; ReturnBuffer
        PUSH @MembershipStatePathControlAttribute   ; Name
        PUSH 0                                      ; Parent = root
                                                      container
        PUSH SYSTEM_HOST_GET_OBJECT_SYSCALL
        CALL
        RET
;
; MembershipStateValue.Query
;
MembershipStateValue.Query:
        ;debug
        PUSH @MembershipStateValue.Query.Debug
        PUSH DEBUG_PRINT_SYSCALL
        CALL
        PUSH @MembershipPath.Debug
        PUSH DEBUG_PRINT_SYSCALL
        CALL
        PUSH @MembershipStatePath
        PUSH DEBUG_PRINT_SYSCALL
        CALL
        PUSH @NewlineString
        PUSH DEBUG_PRINT_SYSCALL
        CALL
        PUSH 4                          ; ReturnBufferSize (4 bytes)
        PUSH @MembershipStateValue      ; ReturnBuffer (type is long)
        PUSH @MembershipStatePath       ; Name
        PUSH 0                          ; Parent = root container
        PUSH SYSTEM_HOST_GET_OBJECT_SYSCALL
        CALL
        PUSH @MembershipGetObjOutput.Debug
        PUSH DEBUG_PRINT_SYSCALL
        CALL
        ; print result -- first convert int to string
        DUP
        PUSH @intStrOutput
        ADD
        SWAP
        JSR printInt
        ; call print result
        PUSH @intStrOutput
        PUSH DEBUG_PRINT_SYSCALL
        CALL
        PUSH @NewlineString
        PUSH DEBUG_PRINT_SYSCALL
        CALL
        RET
```

E.2.2 MembershipUtils.asm

```
;
; Membership.Check
;
Membership.Check:
    ;debug
    PUSH @Membership.Check.Debug
    PUSH DEBUG_PRINT_SYSCALL
    CALL
    ; query the membership state
    JSR MembershipStateValue.Query
    ; see if we succeeded
    BRN Membership_Check_Failed
    ; check that time is < the one retrieved in the membership state
    PUSH @MembershipStateValue ; timestamp
    PEEK
    PUSH @GetTrustedTimeFunctionNumber
    PEEK
    CALL
    SWAP
    DROP ; we just need the value (not the estimate)
    SUB
    BRN Membership_Expired
    ; success
    ;debug
    PUSH @Membership_Check_Success.Debug
    PUSH DEBUG_PRINT_SYSCALL
    CALL
    PUSH SUCCESS
    RET
Membership_Expired:
    ;debug
    PUSH @Membership_Expired.Debug
    PUSH DEBUG_PRINT_SYSCALL
    CALL
    BRA Membership_Check_Failed
Membership_Check_Failed:
    ;debug
    PUSH @Membership_Check_Failure.Debug
    PUSH DEBUG_PRINT_SYSCALL
    CALL
    PUSH FAILURE
    RET
```

E.3 GlobalUtils

E.3.1 IntUtils.asm

```
;**********************************************************
;   File Name: IntUtils.asm
;   Description: utils for comparing 2 ints
;**********************************************************
;========================
; includes
;========================
.include "StackUtils.asm"
;========================
; code
;========================
.code
;
; min
;
; computes the min between 2 ints
;
; input: ... a b
; output: ... a<b?a:b
;
min:
    DUP                 ; ... a b b
    PUSH 2
    JSR pick            ; ... a b b a
    CMP                 ; ... a b cmp_result
    BRN Swap_Stack      ; ... a b
    DROP
    RET                 ; a
```

E.3.1 IntUtils.asm

```
Swap_Stack:
    SWAP
    DROP
    RET                 ; b
;
; max
;
; computes the max between 2 ints
;
; input: ... a b
; output: ... a>b?a:b
;
max:
    DUP                 ; ... a b b
    PUSH 2
    JSR pick            ; ... a b b a
    CMP                 ; ... a b cmp_result
    NEG
    BRN Swap_Stack
    DROP
    RET                 ; a
```

E.3.2 PrintInt.asm

```
;**********************************************************
;   File Name: PrintInt.asm
;   Description: converts an integer (signed or unsigned) into a
;       string
;**********************************************************
;; NOTE: requires "StackUtils.asm" to have been included already
; data section
    .data
; code section
    .code
; converts an integer into string representation
; params: dest, int
printInt:
    ; duplicate dest param
    SWAP
    DUP
    PUSH 2
    JSR pick
    ; STACK: origval, startstring, startstring,
      unsignedval
    ; now, we end up with an extra copy of int at bottom
    ; we use this to test original sign later
printIntLoop:
    ; get the single digit
    DUP
    PUSH 10
    MOD
    ; convert to ascii
    PUSH 48 ; ASCII for '0'
    ADD
    ; get the address for the output buffer
    PUSH 2
    JSR pick
    POKEB ; print to the buffer
    ; move our buffer pointer along
    SWAP
    PUSH 1
    ADD
    SWAP
    ; divide by 10 and see where we're at
    PUSH 10
    DIV
    DUP
    BRP printIntLoop
    DROP ; gets rid of the 0 at the top
    ; STACK = orignum, startofstring, endofstring
    ; if original number was negative, put a minus sign
    ; terminate with a null
    DUP
    PUSH 0
```

E.3.2 PrintInt.asm

```
            SWAP
            POKEB
            ; move end of string up 1, so don't flip terminator
            PUSH 1
            SUB
            ; we're done: just need to reverse string
fliploop:
            ; get second byte
            DUP
            PEEKB
            ; get first byte
            PUSH 2
            JSR pick
            PEEKB
            ; put first byte in last place
            PUSH 2
            JSR pick
            POKEB
            ; put last byte in first place
            PUSH 2
            JSR pick
            POKEB
            ; move the end pointer up one
            PUSH 1
            SUB
            ; move the start pointer down one
            SWAP
            PUSH 1
            ADD
            SWAP
            ; see if the pointers have met
            ; must dup the values first
            DUP
            PUSH 2
            JSR pick
            SUB
            BRP fliploop
            ; get rid of some detritus on the stack
            DROP
            DROP
            DROP
            RET
```

E.3.3 StackUtils.asm

```
;**********************************************************
;       File Name: StackUtils.asm
;       Description: Stack utils functions inspired from FORTH
;
;**********************************************************
.ifndef __STACK_UTILS__
.define __STACK_UTILS__
;=========================
; code
;=========================
.code
;
; over
;
; copy the second item on the stack
;
; input: . . . a b
; output: . . . a b a
;
over:
            PUSH 1
            JSR pick
            RET
;
; pick
;
; input: . . . v3 v2 v1 v0 N
; output: . . . v3 v2 v1 v0 vN
;
```

E.3.3 StackUtils.asm

```
pick:
            PUSH 1
            ADD
            PUSH 4
            MUL
            PUSHSP
            ADD
            PEEK
            RET
.endif ; __STACK_UTILS__
```

E.3.4 StdLib.asm

```
            ; Standard Library for Plankton
                    .equ HEAP_ADDR, 16
            ; data section
            ; code section
                    .code
strlen:
            DUP
loop:
            DUP
            PEEKB
            BRZ done
            PUSH 1
            ADD
            BRA loop
done:
            SWAP
            SUB
            RET
            .export strlen
```

E.3.5 StrCmp.asm

```
;**********************************************************
;       File Name: StrCmp.asm
;       Description: streq tests for the equality of two strings
;**********************************************************
.ifndef __STR_CMP__
.define __STR_CMP__
;=========================
; includes
;=========================
.include "StackUtils.asm"
;=========================
; code
;=========================
.code
;
; streq
;
; test for the equality of two strings
;
; input: . . . @str1 @str2
; output: . . . res (res = 0 if strings are equal, −1 otherwise)
;
streq:
            ; get the offset btw the 2 strings
            JSR over
            SUB
            SWAP                    ; . . . offset @str1
streqloop:
            ; get the cur char of str1
            DUP
            PEEKB                   ; . . . offset @str1 char1
            ; get the cur char of str2
            JSR over                ; . . . offset @str1 char1 @str1
            PUSH 3
            JSR pick                ; . . . offset @str1 char1 @str1 offset
            ADD
```

| E.3.5 StrCmp.asm |
|---|
| ```
        PEEKB           ; ... offset @str1 char1 char2
; now compare the two chars
        JSR over
        SUB             ; ... offset @str1 char1 char1-char2
; fail if the char1 != char2
        NOT
        BRZ streqfailure
; if char1 is 0 (char1 == char2 == 0) we're done
        BRZ streqsuccess    ; ... offset @str1
; increment the @str1 pointer and loop
        PUSH 1
        ADD
        BRA streqloop
streqfailure:
        ; ... offset @str1 char1
``` |

| E.3.5 StrCmp.asm |
|---|
| ```
        DROP
        DROP
        DROP
        PUSH -1
        RET
streqsuccess:
        ; ... offset @str1
        DROP
        DROP
        PUSH 0
        RET
.endif ; __STR_CMP__
``` |

E.4 ExtendedStatusBlock Parameters

| E.4.1 TransferXStatusProximityCheckSucceeded.xml |
|---|
| ```
- <ValueListBlock>
 - <ValueBlock type="Parameter">
  - <ParameterBlock name="Obligations">
   - <ValueBlock type="ValueList">
    - <ValueListBlock>
     - <ValueBlock type="ExtendedParameter">
      - <ParameterBlock name="RunAgentOnPeer" flags="1">
       - <ValueBlock type="ValueList">
        - <ValueListBlock>
         - <!-- Control ID -->
          <ValueBlock type="String">urn:marlin:control:0023</ValueBlock>
         - <!-- Agent Name -->
          <ValueBlock type="String">SetStateContent0023</ValueBlock>
         - <!-- instance ID -->
          <ValueBlock type="Integer">240343</ValueBlock>
         - <!-- Context ID -->
          <ValueBlock type="String">MoveStateContent0023</ValueBlock>
         - <!-- additional parameters -->
         - <ValueBlock type="ValueList">
          - <ValueListBlock>
           - <ValueBlock type="Parameter">
            - <!-- The ONLY thing that changes with
                 TransferXStatusProximityCheckFailed.xml -->
            - <ParameterBlock name="ProximityChecked">
              <ValueBlock type="Integer">1</ValueBlock>
             </ParameterBlock>
           </ValueBlock>
          </ValueListBlock>
         </ValueBlock>
        </ValueListBlock>
       </ValueBlock>
      </ParameterBlock>
     </ValueBlock>
    </ValueListBlock>
   </ValueBlock>
  </ParameterBlock>
 </ValueBlock>
 - <ValueBlock type="Parameter">
  - <ParameterBlock name="Callbacks">
   - <ValueBlock type="ValueList">
    - <ValueListBlock>
     - <ValueBlock type="ExtendedParameter">
      - <ParameterBlock name="OnAgentCompletion" flags="1">
       - <ValueBlock type="ValueList">
        - <ValueListBlock>
         - <!-- Agent instance ID -->
          <ValueBlock type="String">240343</ValueBlock>
         - <!-- Callback Routine -->
         - <ValueBlock type="ValueList">
          - <ValueListBlock>
           - <!-- RESET -->
            <ValueBlock type="Integer">0</ValueBlock>
           - <!-- Name -->
            <ValueBlock
type="String">Control.Agents.SetStateContent0023.OnAgentCompletion</ValueBlock>
           - <!-- cookie -->
            <ValueBlock type="Integer">0</ValueBlock>
``` |

| E.4.1 TransferXStatusProximityCheckSucceeded.xml |
|---|
| ```
            </ValueListBlock>
          </ValueBlock>
        </ValueListBlock>
      </ValueBlock>
    </ParameterBlock>
   </ValueBlock>
  </ValueListBlock>
 </ValueBlock>
</ParameterBlock>
</ValueBlock>
</ValueListBlock>
``` |

| E.4.2 TransferXStatusProximityCheckFailed.xml |
|---|
| ```
- <ValueListBlock>
 - <ValueBlock type="Parameter">
  - <ParameterBlock name="Obligations">
   - <ValueBlock type="ValueList">
    - <ValueListBlock>
     - <ValueBlock type="ExtendedParameter">
      - <ParameterBlock name="RunAgentOnPeer" flags="1">
       - <ValueBlock type="ValueList">
        - <ValueListBlock>
          - <!-- Control ID -->
            <ValueBlock type="String">urn:marlin:control:0023</ValueBlock>
          - <!-- Agent Name -->
            <ValueBlock type="String">SetStateContent0023</ValueBlock>
          - <!-- instance ID -->
            <ValueBlock type="Integer">240343</ValueBlock>
          - <!-- Context ID -->
            <ValueBlock type="String">MoveStateContent0023</ValueBlock>
          - <!-- additional parameters -->
          - <ValueBlock type="ValueList">
           - <ValueListBlock>
            - <ValueBlock type="Parameter">
             - <!-- The ONLY thing that changes with TransferXStatusProximityCheckSucceed.xml -->
              - <ParameterBlock name="ProximityChecked">
                <ValueBlock type="Integer">0</ValueBlock>
              </ParameterBlock>
            </ValueBlock>
           </ValueListBlock>
          </ValueBlock>
        </ValueListBlock>
       </ValueBlock>
      </ParameterBlock>
     </ValueBlock>
    </ValueListBlock>
   </ValueBlock>
  </ParameterBlock>
 </ValueBlock>
 - <ValueBlock type="Parameter">
  - <ParameterBlock name="Callbacks">
   - <ValueBlock type="ValueList">
    - <ValueListBlock>
     - <ValueBlock type="ExtendedParameter">
      - <ParameterBlock name="OnAgentCompletion" flags="1">
       - <ValueBlock type="ValueList">
        - <ValueListBlock>
            - <!-- Agent instance ID -->
            <ValueBlock type="String">240343</ValueBlock>
            - <!-- Callback Routine -->
          - <ValueBlock type="ValueList">
           - <ValueListBlock>
            - <!-- RESET -->
            <ValueBlock type="Integer">0</ValueBlock>
          - <!-- Name -->
          <ValueBlock type="String">Control.Agents.SetStateContent0023.OnAgentCompletion</ValueBlock>
            - <!-- cookie -->
            <ValueBlock type="Integer">0</ValueBlock>
           </ValueListBlock>
          </ValueBlock>
        </ValueListBlock>
       </ValueBlock>
      </ParameterBlock>
``` |

-continued

| E.4.2 TransferXStatusProximityCheckFailed.xml |
|---|
|       </ValueBlock> <br>      </ValueListBlock> <br>     </ValueBlock> <br>    </ParameterBlock> <br>   </ValueBlock> <br> </ValueListBlock> |

| E.4.3 TransferXStatusProximityCheckSucceeded.asm | | | | | | | | | | | |
|---|---|---|---|---|---|---|---|---|---|---|---|
| 0x00 | 0x00 | 0x00 | 0x02 | 0x00 | 0x00 | 0x00 | 0x04 | 0x00 | 0x00 | 0x00 | 0x20 |
| 0x00 | 0x00 | 0x00 | 0x0C | 0x4F | 0x62 | 0x6C | 0x69 | 0x67 | 0x61 | 0x74 | 0x69 |
| 0x6F | 0x6E | 0x73 | 0x00 | 0x00 | 0x00 | 0x00 | 0x07 | 0x00 | 0x00 | 0x00 | 0x0C |
| 0x00 | 0x00 | 0x00 | 0x01 | 0x00 | 0x00 | 0x00 | 0x05 | 0x00 | 0x00 | 0x00 | 0x04 |
| 0x00 | 0x00 | 0x00 | 0x01 | 0x00 | 0x00 | 0x00 | 0x0F | 0x52 | 0x75 | 0x6E | 0x41 |
| 0x67 | 0x65 | 0x6E | 0x74 | 0x4F | 0x6E | 0x50 | 0x65 | 0x65 | 0x72 | 0x00 | 0x00 |
| 0x00 | 0x00 | 0x07 | 0x00 | 0x00 | 0x00 | 0x92 | 0x00 | 0x00 | 0x00 | 0x05 | 0x00 |
| 0x00 | 0x00 | 0x02 | 0x00 | 0x00 | 0x00 | 0x18 | 0x75 | 0x72 | 0x6E | 0x3A | 0x6D |
| 0x61 | 0x72 | 0x6C | 0x69 | 0x6E | 0x3A | 0x63 | 0x6F | 0x6E | 0x74 | 0x72 | 0x6F |
| 0x6C | 0x3A | 0x30 | 0x30 | 0x32 | 0x33 | 0x00 | 0x00 | 0x00 | 0x02 | 0x00 |
| 0x00 | 0x00 | 0x14 | 0x53 | 0x65 | 0x74 | 0x53 | 0x74 | 0x61 | 0x74 | 0x65 | 0x43 |
| 0x6F | 0x6E | 0x74 | 0x65 | 0x6E | 0x74 | 0x30 | 0x30 | 0x32 | 0x33 | 0x00 | 0x00 |
| 0x00 | 0x00 | 0x00 | 0x00 | 0x00 | 0x00 | 0x04 | 0x00 | 0x03 | 0xAA | 0xD7 | 0x00 |
| 0x00 | 0x00 | 0x00 | 0x02 | 0x00 | 0x00 | 0x00 | 0x15 | 0x4D | 0x6F | 0x76 | 0x65 | 0x53 |
| 0x74 | 0x61 | 0x74 | 0x65 | 0x43 | 0x6F | 0x6E | 0x74 | 0x65 | 0x6E | 0x74 | 0x30 |
| 0x30 | 0x32 | 0x33 | 0x00 | 0x00 | 0x00 | 0x00 | 0x07 | 0x00 | 0x00 | 0x00 | 0x25 |
| 0x00 | 0x00 | 0x00 | 0x01 | 0x00 | 0x00 | 0x00 | 0x04 | 0x00 | 0x00 | 0x00 | 0x1D |
| 0x00 | 0x00 | 0x00 | 0x11 | 0x50 | 0x72 | 0x6F | 0x78 | 0x69 | 0x6D | 0x69 | 0x74 |
| 0x79 | 0x43 | 0x68 | 0x65 | 0x63 | 0x6B | 0x65 | 0x64 | 0x00 | 0x00 | 0x00 | 0x00 |
| 0x00 | 0x00 | 0x00 | 0x00 | 0x04 | 0x00 | 0x00 | 0x00 | 0x01 | 0x00 | 0x00 | 0x00 |
| 0x04 | 0x00 | 0x00 | 0x00 | 0x1E | 0x00 | 0x00 | 0x00 | 0x0A | 0x43 | 0x61 | 0x6C |
| 0x6C | 0x62 | 0x61 | 0x63 | 0x6B | 0x73 | 0x00 | 0x00 | 0x00 | 0x00 | 0x07 | 0x00 |
| 0x00 | 0x00 | 0x0C | 0x00 | 0x00 | 0x00 | 0x01 | 0x00 | 0x00 | 0x00 | 0x05 | 0x00 |
| 0x00 | 0x00 | 0x04 | 0x00 | 0x00 | 0x00 | 0x01 | 0x00 | 0x00 | 0x00 | 0x12 | 0x4F |
| 0x6E | 0x41 | 0x67 | 0x65 | 0x6E | 0x74 | 0x43 | 0x6F | 0x6D | 0x70 | 0x6C | 0x65 |
| 0x74 | 0x69 | 0x6F | 0x6E | 0x00 | 0x00 | 0x00 | 0x00 | 0x07 | 0x00 | 0x00 | 0x00 |
| 0x6C | 0x00 | 0x00 | 0x00 | 0x02 | 0x00 | 0x00 | 0x00 | 0x02 | 0x00 | 0x00 | 0x00 |
| 0x07 | 0x32 | 0x34 | 0x30 | 0x33 | 0x34 | 0x33 | 0x00 | 0x00 | 0x00 | 0x00 | 0x07 |
| 0x00 | 0x00 | 0x00 | 0x55 | 0x00 | 0x00 | 0x00 | 0x03 | 0x00 | 0x00 | 0x00 | 0x00 |
| 0x00 | 0x00 | 0x00 | 0x04 | 0x00 | 0x00 | 0x00 | 0x00 | 0x00 | 0x00 | 0x00 | 0x02 |
| 0x00 | 0x00 | 0x00 | 0x35 | 0x43 | 0x6F | 0x6E | 0x74 | 0x72 | 0x6F | 0x6C | 0x2E |
| 0x41 | 0x67 | 0x65 | 0x6E | 0x74 | 0x73 | 0x2E | 0x53 | 0x65 | 0x74 | 0x53 | 0x74 |
| 0x61 | 0x74 | 0x65 | 0x43 | 0x6F | 0x6E | 0x74 | 0x65 | 0x6E | 0x74 | 0x30 | 0x30 |
| 0x32 | 0x33 | 0x2E | 0x4F | 0x6E | 0x41 | 0x67 | 0x65 | 0x6E | 0x74 | 0x43 | 0x6F |
| 0x6D | 0x70 | 0x6C | 0x65 | 0x74 | 0x69 | 0x6F | 0x6E | 0x00 | 0x00 | 0x00 | 0x00 |
| 0x00 | 0x00 | 0x00 | 0x00 | 0x04 | 0x00 | 0x00 | 0x00 | 0x00 | | | |

| E.4.4 TransferXStatusProximityCheckFailed.asm | | | | | | | | | | | |
|---|---|---|---|---|---|---|---|---|---|---|---|
| 0x00 | 0x00 | 0x00 | 0x02 | 0x00 | 0x00 | 0x00 | 0x04 | 0x00 | 0x00 | 0x00 | 0x20 |
| 0x00 | 0x00 | 0x00 | 0x0C | 0x4F | 0x62 | 0x6C | 0x69 | 0x67 | 0x61 | 0x74 | 0x69 |
| 0x6F | 0x6E | 0x73 | 0x00 | 0x00 | 0x00 | 0x00 | 0x07 | 0x00 | 0x00 | 0x00 | 0x0C |
| 0x00 | 0x00 | 0x00 | 0x01 | 0x00 | 0x00 | 0x00 | 0x05 | 0x00 | 0x00 | 0x00 | 0x04 |
| 0x00 | 0x00 | 0x00 | 0x01 | 0x00 | 0x00 | 0x00 | 0x0F | 0x52 | 0x75 | 0x6E | 0x41 |
| 0x67 | 0x65 | 0x6E | 0x74 | 0x4F | 0x6E | 0x50 | 0x65 | 0x65 | 0x72 | 0x00 | 0x00 |
| 0x00 | 0x00 | 0x07 | 0x00 | 0x00 | 0x00 | 0x92 | 0x00 | 0x00 | 0x00 | 0x05 | 0x00 |
| 0x00 | 0x00 | 0x02 | 0x00 | 0x00 | 0x00 | 0x18 | 0x75 | 0x72 | 0x6E | 0x3A | 0x6D |
| 0x61 | 0x72 | 0x6C | 0x69 | 0x6E | 0x3A | 0x63 | 0x6F | 0x6E | 0x74 | 0x72 | 0x6F |
| 0x6C | 0x3A | 0x30 | 0x30 | 0x32 | 0x33 | 0x00 | 0x00 | 0x00 | 0x02 | 0x00 |
| 0x00 | 0x00 | 0x14 | 0x53 | 0x65 | 0x74 | 0x53 | 0x74 | 0x61 | 0x74 | 0x65 | 0x43 |
| 0x6F | 0x6E | 0x74 | 0x65 | 0x6E | 0x74 | 0x30 | 0x30 | 0x32 | 0x33 | 0x00 | 0x00 |
| 0x00 | 0x00 | 0x00 | 0x00 | 0x00 | 0x00 | 0x04 | 0x00 | 0x03 | 0xAA | 0xD7 | 0x00 |
| 0x00 | 0x00 | 0x00 | 0x02 | 0x00 | 0x00 | 0x00 | 0x15 | 0x4D | 0x6F | 0x76 | 0x65 | 0x53 |
| 0x74 | 0x61 | 0x74 | 0x65 | 0x43 | 0x6F | 0x6E | 0x74 | 0x65 | 0x6E | 0x74 | 0x30 |
| 0x30 | 0x32 | 0x33 | 0x00 | 0x00 | 0x00 | 0x00 | 0x07 | 0x00 | 0x00 | 0x00 | 0x25 |
| 0x00 | 0x00 | 0x00 | 0x01 | 0x00 | 0x00 | 0x00 | 0x04 | 0x00 | 0x00 | 0x00 | 0x1D |
| 0x00 | 0x00 | 0x00 | 0x11 | 0x50 | 0x72 | 0x6F | 0x78 | 0x69 | 0x6D | 0x69 | 0x74 |
| 0x79 | 0x43 | 0x68 | 0x65 | 0x63 | 0x6B | 0x65 | 0x64 | 0x00 | 0x00 | 0x00 | 0x00 |
| 0x00 | 0x00 | 0x00 | 0x00 | 0x04 | 0x00 | 0x00 | 0x00 | 0x01 | 0x00 | 0x00 | 0x00 |
| 0x04 | 0x00 | 0x00 | 0x00 | 0x1E | 0x00 | 0x00 | 0x00 | 0x0A | 0x43 | 0x61 | 0x6C |
| 0x6C | 0x62 | 0x61 | 0x63 | 0x6B | 0x73 | 0x00 | 0x00 | 0x00 | 0x00 | 0x07 | 0x00 |
| 0x00 | 0x00 | 0x0C | 0x00 | 0x00 | 0x00 | 0x01 | 0x00 | 0x00 | 0x00 | 0x05 | 0x00 |

| E.4.4 TransferXStatusProximityCheckFailed.asm | | | | | | | | | | | |
|---|---|---|---|---|---|---|---|---|---|---|---|
| 0x00 | 0x00 | 0x04 | 0x00 | 0x00 | 0x00 | 0x01 | 0x00 | 0x00 | 0x00 | 0x12 | 0x4F |
| 0x6E | 0x41 | 0x67 | 0x65 | 0x6E | 0x74 | 0x43 | 0x6F | 0x6D | 0x70 | 0x6C | 0x65 |
| 0x74 | 0x69 | 0x6F | 0x6E | 0x00 | 0x00 | 0x00 | 0x00 | 0x07 | 0x00 | 0x00 | 0x00 |
| 0x6C | 0x00 | 0x00 | 0x00 | 0x02 | 0x00 | 0x00 | 0x00 | 0x02 | 0x00 | 0x00 | 0x00 |
| 0x07 | 0x32 | 0x34 | 0x30 | 0x33 | 0x34 | 0x33 | 0x00 | 0x00 | 0x00 | 0x00 | 0x07 |
| 0x00 | 0x00 | 0x00 | 0x55 | 0x00 | 0x00 | 0x00 | 0x03 | 0x00 | 0x00 | 0x00 | 0x00 |
| 0x00 | 0x00 | 0x00 | 0x04 | 0x00 | 0x00 | 0x00 | 0x00 | 0x00 | 0x00 | 0x00 | 0x02 |
| 0x00 | 0x00 | 0x00 | 0x35 | 0x43 | 0x6F | 0x6E | 0x74 | 0x72 | 0x6F | 0x6C | 0x2E |
| 0x41 | 0x67 | 0x65 | 0x6E | 0x74 | 0x73 | 0x2E | 0x53 | 0x65 | 0x74 | 0x53 | 0x74 |
| 0x61 | 0x74 | 0x65 | 0x43 | 0x6F | 0x6E | 0x74 | 0x65 | 0x6E | 0x74 | 0x30 | 0x30 |
| 0x32 | 0x33 | 0x2E | 0x4F | 0x6E | 0x41 | 0x67 | 0x65 | 0x6E | 0x74 | 0x43 | 0x6F |
| 0x6D | 0x70 | 0x6C | 0x65 | 0x74 | 0x69 | 0x6F | 0x6E | 0x00 | 0x00 | 0x00 | 0x00 |
| 0x00 | 0x00 | 0x00 | 0x00 | 0x04 | 0x00 | 0x00 | 0x00 | 0x00 | | | |

Although the foregoing has been described in some detail for purposes of clarity, it will be apparent that certain changes and modifications may be made within the scope of the appended claims. It should be noted that there are many alternative ways of implementing both the processes and apparatuses described herein. Accordingly, the present embodiments are to be considered as illustrative and not restrictive, and the inventive body of work is not to be limited to the details given herein, but may be modified within the scope and equivalents of the appended claims.

The invention claimed is:

1. A method of authorizing access to a piece of electronic content on a host computer system, the method comprising:
receiving a request from a user of the host computer system to access the piece of electronic content;
retrieving a license associated with the piece of electronic content, the license comprising a control object, a controller object, a protector object, and a content key object;
retrieving a first control program from the control object;
executing the first control program using a digital rights management engine running on the host computer system to determine whether the request is granted, including determining that a path of valid link objects exists between nodes in a first authorization graph from a first node associated with the user to a second node associated with the host computer system, wherein each link object represents a relationship between two entities in an authorization graph, wherein a link object is valid if all of one or more conditions expressed by the link object are met; and
executing a second control program included in a first link object using the digital rights management engine running on the host computer system to determine whether all of the one or more conditions expressed by the first link object are satisfied, wherein the one or more conditions expressed by the first link object includes a time restriction, and wherein the first authorization graph is formed by adding the first link object to a second authorization graph.

2. The method of claim 1, in which the controller object is configured to bind the control object with the content key object.

3. The method of claim 1, wherein the time restriction requires that the current time be on before a predefined time.

4. The method of claim 1, wherein the time restriction requires that the current time be after a predetermined time.

5. The method of claim 1, in which at least one of the one or more conditions expressed by the link object comprises a requirement that the second control program not have been previously executed more than a predefined number of times.

6. The method of claim 1, in which at least one of the one or more conditions expressed by the link object comprises a requirement that a counter stored in memory not exceed a predefined value.

7. The method of claim 1, in which at least one of the one or more conditions expressed by the link object comprises a requirement that a predefined event not have previously occurred.

8. The method of claim 1, in which at least one of the one or more conditions expressed by the first control program comprises a requirement that the host computer system must have one or more predefined characteristics.

9. The method of claim 1, in which at least one of the one or more conditions expressed by the first control program comprises a requirement that software running on the host computer system for rendering the piece of electronic content be unable to export the piece of electronic content to a predefined interface.

10. A method of authorizing a given action to be performed on a piece of electronic content, the method comprising:
executing a first control program using a virtual machine running on a first digital rights management engine, the first control program being configured to determine whether the given action on the piece of electronic content is authorized, wherein the first control program is configured to evaluate a first set of one or more conditions that must be satisfied in order for the given action to be authorized, and wherein at least one of the first set of one or more conditions comprises a requirement that each link object be valid among one or more link objects along a path of link objects between nodes in a first authorization graph from a first node representing a first entity to a second node representing a second entity;
retrieving the one or more link objects, each of the link objects expressing a relationship between two entities, wherein a link object is valid if all of one or more conditions expressed by the link object have been met, and a first link object includes a second control program configured to evaluate one or more conditions all of which must be satisfied in order for the first link object to be considered valid; and
executing the second control program using the digital rights management engine running on the host computer system to determine whether all of the one or more conditions expressed by the first link object are satisfied, wherein the one or more conditions expressed by the first link object includes a time restriction, and wherein the first authorization graph is formed by adding the first link object to a second authorization graph.

11. The method of claim 10, in which at least one of the conditions comprises a requirement that a counter stored in memory not exceed a predefined value.

* * * * *